(12) United States Patent
Kamo

(10) Patent No.: US 7,301,712 B2
(45) Date of Patent: Nov. 27, 2007

(54) IMAGE-FORMATION OPTICAL SYSTEM, AND IMAGING SYSTEM INCORPORATING THE SAME

(75) Inventor: Yuji Kamo, Hino (JP)

(73) Assignee: Olympus Corporation, Tokyo (JP)

( * ) Notice: Subject to any disclaimer, the term of this patent is extended or adjusted under 35 U.S.C. 154(b) by 717 days.

(21) Appl. No.: 10/728,745

(22) Filed: Dec. 8, 2003

(65) Prior Publication Data
US 2004/0223068 A1 Nov. 11, 2004

(30) Foreign Application Priority Data

| Jan. 9, 2003 | (JP) | ............................. 2003-002828 |
| Jan. 29, 2003 | (JP) | ............................. 2003-020587 |
| Feb. 18, 2003 | (JP) | ............................. 2003-039480 |
| Feb. 18, 2003 | (JP) | ............................. 2003-039481 |
| Feb. 21, 2003 | (JP) | ............................. 2003-044053 |

(51) Int. Cl.
*G02B 9/14* (2006.01)

(52) U.S. Cl. ...................................... 359/785; 359/784

(58) Field of Classification Search ................ 359/785, 359/784, 690, 689, 691, 692, 793, 794, 795
See application file for complete search history.

(56) References Cited

U.S. PATENT DOCUMENTS 6,259,508 B1 * 7/2001 Shigematsu .................. 355/53
6,441,971 B2 * 8/2002 Ning ........................... 359/739
6,466,377 B1 * 10/2002 Saito et al. ................... 359/661
2004/0223068 A1 * 11/2004 Kamo ........................... 348/335

FOREIGN PATENT DOCUMENTS

| JP | 01-144007 | 6/1989 |
| JP | 02-191907 | 7/1990 |
| JP | 04-153612 | 5/1992 |
| JP | 05-188284 | 7/1993 |
| JP | 09-288235 | 11/1997 |
| JP | 2001-075006 | 3/2001 |

* cited by examiner

Primary Examiner—Timothy Thompson
(74) Attorney, Agent, or Firm—Kenyon & Kenyon LLP

(57) ABSTRACT

The invention relates to an image-formation optical system that meets both demands for high performance and compactness, and an imaging system that incorporates the same. The imaging system is built up of an image-formation optical system comprises, in order from its object side, an aperture stop S, a first positive single lens L1 wherein the absolute value of the axial radius curvature of its image side-surface is smaller than that of its object side-surface, a second negative single lens L2 wherein the absolute value of the axial radius curvature of its image side-surface is smaller than that of its object side-surface and a third positive single lens L3, three single lenses in all, and an image pickup device located on the image plane I of the image-formation optical system.

29 Claims, 41 Drawing Sheets

C : Cyan   M : Magenta
Ye : Yellow   G : Green

IMAGE-FORMATION OPTICAL SYSTEM, AND IMAGING SYSTEM INCORPORATING THE SAME

This application claims the benefits of Japanese Application(s) No. 2003-2828 filed in Japan on Jan. 9, 2003, No. 2003-20587 filed in Japan on Jan. 29, 2003, Nos. 2003-39480 and 2003-39481 filed in Japan on Feb. 18, 2003 and No. 2003-44053 filed in Japan on Feb. 21, 2003, the contents of which are herein incorporated by this reference.

BACKGROUND OF THE INVENTION

The present invention relates generally to an image-formation optical system and an imaging system that incorporates the same. More particularly, the invention is concerned with imaging systems such as digital still cameras, digital video cameras, small-format cameras mounted on cellular phones and personal computers, and surveillance cameras or the like, all harnessing solid-state image pickup devices, e.g., CCDs or CMOSs, In recent years, electronic cameras using solid-state image pickup devices such as CCDs or CMOSs to take subject images have come into wide use in place of silver-halide film cameras. For imaging systems mounted on portable computers, cellular phones, etc. among those electronic cameras, size and weight reductions are especially demanded.

Some conventional image-formation optical systems used with such imaging systems are made up of one or two lenses. With those optical systems, however, any high performance is not expectable because of their inability to correct field curvature, as already known from discussions about aberrations. To achieve high performance, therefore, it is required to use three or more lenses.

Referring on the other hand to a CCD, as off-axis light beams leaving an image-formation lens system are incident on an image plane at too large an angle, a microlens fails to perform its own light-condensation capability, offering a problem that the brightness of an image changes extremely between the central and the peripheral portion of the image. Thus, the angle of incidence of light on the CCD, that is, the position of an exit pupil becomes important in view of design. To an optical system comprising fewer lenses, the position of an aperture stop becomes important.

Among image-formation lenses with these problems taken into account, there is a triplet type with a stop located at the front, as set forth typically in the following patent publications 1, 2, 3, 4, 5 and 6.

However, all those prior arts have problems in conjunction with performance and size.

Patent Publication 1
JP-A 1-144007
Patent Publication 2
JP-A 2-191907
Patent Publication 3
JP-A 4-153612
Patent Publication 4
JP-A 5-188284
Patent Publication 5
JP-A 9-288235
Patent Publication 6
JP-A 2001-75006

SUMMARY OF THE INVENTION

In consideration of such problems with the prior arts as mentioned above, one object of the present invention is to provide an image-formation optical system that can meet demands for high performance and significant compactness at the same time, and an imaging system that incorporates the same.

Another object of the present invention is to provide an image-formation optical system that can meet demands for high performance and significant compactness at the same time, and can accommodate well to a wide-angle arrangement, and an imaging system that incorporates the same.

Yet another of the present invention is to provide a wide-angle image-formation optical system with a half angle of view of about 35°, which can meet demands for high performance and significant compactness at the same time as well as an imaging system that incorporates the same.

To achieve these objects, the present invention is embodied in the form of the following first to fifth aspects.

According to the first aspect of the invention, there is provided an image-formation optical system, characterized by comprising, in order from an object side thereof, an aperture stop, and a first positive meniscus lens that is convex on an image side thereof, a second negative lens of double-concave shape and a third positive lens, three lenses in all.

According to the first aspect of the invention, there is provided an imaging system, characterized by comprising an image-formation optical system comprising, in order from an object side thereof, an aperture stop, and a first positive meniscus lens that is convex on an image side thereof, a second negative lens that is of double-concave shape and a third positive lens, three lenses in all.

Preferably in this case, an image pickup device is located on an image side of a three-lens assembly.

It is also preferable that the three lenses are each defined by a single lens and two air lenses defined by the three lenses are interposed between two differently shaped refracting surfaces. Preferably in this case, the two air lenses are interposed between two differently shaped aspheric surfaces.

According to the first aspect of the invention, there is further provided an imaging system, characterized by comprising an image-formation optical system comprising, in order from an object side thereof, an aperture stop, and a first positive lens defined by a positive single lens wherein the absolute value of the axial radius of curvature of an image side-surface thereof is smaller than the absolute value of the axial radius of curvature of an object side-surface thereof, a second negative lens defined by a negative single lens wherein the absolute value of the axial radius of curvature of an image side-surface thereof is smaller than the absolute value of the axial radius of curvature of an object side-surface thereof and a third positive lens defined by a positive single lens, three single lenses in all, and an image pickup device located on an image side of the image-formation optical system, wherein the following conditions are satisfied:

$$0.30 < f_1/Ih < 0.90 \tag{10}$$

$$-0.75 < f_2/Ih < -0.1 \tag{3}$$

$$0.70 < f_3/Ih < 2.00 \tag{11}$$

Here $f_1$ is the focal length of the first positive lens, $f_2$ is the focal length of the second negative lens, $f_3$ is the focal length of the third positive lens, and Ih is the maximum image height.

According to the first aspect of the invention, there is further provided an imaging system, characterized by comprising an image-formation optical system comprising, in order from an object side thereof, an aperture stop, and a first positive lens defined by a positive single lens wherein the absolute value of the axial radius of curvature of an image side-surface thereof is smaller than the absolute value of the axial radius of curvature of an object side-surface thereof, a second negative lens defined by a negative single lens wherein the absolute value of the axial radius of curvature of an image side-surface thereof is smaller than the absolute value of the axial radius of curvature of an object side-surface thereof and a third positive lens defined by a positive single lens, three single lenses in all, and an image pickup device located on an image side of the image-formation optical system, wherein the following conditions are satisfied:

$$0.1 < f_1/f < 0.46 \tag{9-3}$$

$$-0.75 < f_2/f < -0.29 \tag{12}$$

$$0.40 < f_3/f < 0.85 \tag{13}$$

Here $f_1$ is the focal length of the first positive lens, $f_2$ is the focal length of the second negative lens, $f_3$ is the focal length of the third positive lens, and f is the focal length of the image-formation optical system.

Throughout the above embodiments of the first aspect of the invention, it is preferable to satisfy the following condition.

$$-0.5 < (r_{2f}+r_{2r})/(r_{2f}-r_{2r}) < 0.98 \tag{1}$$

Here $r_{2f}$ is the axial radius of curvature of the object side-surface of the second negative lens, and $r_{2r}$ is the axial radius of curvature of the image side-surface of the second negative lens.

It is also preferable to satisfy the following condition.

$$0.01 < r_{1r}/r_{2f} < 0.75 \tag{2}$$

Here $r_{1r}$ is the axial radius of curvature of the image side-surface of the first positive lens, and $r_{2f}$ is the axial radius of curvature of the object side-surface of the second negative lens.

It is further preferable to satisfy the following condition.

$$-0.75 < f_2/Ih < -0.1 \tag{3}$$

Here $f_2$ is the focal length of the second negative lens, and Ih is the maximum image height.

It is further preferable to satisfy the following condition.

$$-5.0 < f_{2-3}/f < -0.1 \tag{4}$$

Here $f_{2-3}$ is the composite focal length of the second negative lens and the third positive lens, and f is the focal length of the image-formation optical system.

It is further preferable to satisfy the following condition.

$$-0.8 < f_2/f_3 < -0.1 \tag{5}$$

Here $f_2$ is the focal length of the second negative lens, and $f_3$ is the focal length of the third positive lens.

It is further preferable that the object side-surface of the second negative lens is defined by an aspheric surface, and satisfies the following condition.

$$0.01 < |(r_{2fs}+r_{2fa})/(r_{fs}-r_{fa})-1| < 100 \tag{6}$$

Here $r_{2fs}$ is the axial radius of curvature of the object side-surface of the second negative lens, and $r_{2fa}$ is a value of the radius of curvature of the object side-surface of the second negative lens with the aspheric surface taken into consideration, upon a difference between $r_{2fs}$ and said radius of curvature reaching a maximum.

It is further preferable that the image side-surface of the second negative lens is defined by an aspheric surface, and satisfies the following condition.

$$0.01 < |(r_{2rs}+r_{2ra})/(r_{2rs}-r_{2ra})-1| < 100 \tag{7}$$

Here $r_{2rs}$ is the axial radius of curvature of the image side-surface of the second negative lens, and $r_{2ra}$ is a value of the radius of curvature of the image side-surface of the second negative lens with the aspheric surface taken into consideration, upon a difference between $r_{2fs}$ and said radius of curvature reaching a maximum.

It is further preferable to satisfy the following condition.

$$10° < \alpha < 40° \tag{8}$$

Here $\alpha$ is the angle of incidence of a chief ray on an image plane at the maximum image height.

It is further preferable to satisfy the following condition.

$$0.1 < f_1/f < 1.2 \tag{9}$$

Here $f_1$ is the focal length of the first positive lens, and f is the focal length of the image-formation optical system.

According to the second aspect of the invention, the above objects are achievable by the provision of an image-formation optical system, characterized by comprising, in order from an object side thereof, an aperture stop, a first positive lens, a second negative lens and a third positive lens, and satisfying the following condition.

$$1.5 < d/(f \tan \theta) < 3.0 \tag{21}$$

Here d is a distance of the image-formation optical system as measured by an aperture stop plane to an image plane on an optical axis, $\theta$ is the maximum angle of incidence of the image-formation optical system, and f is the focal length of the image-formation optical system.

According to the second aspect of the invention, there is also provided an image-formation optical system, characterized by comprising, in order from an object side thereof, an aperture stop, a first positive meniscus lens that is convex on an image side thereof, a second negative lens and a third positive lens, and satisfying the following condition.

$$-5.0 < f_{2-3}/f < -0.5 \tag{22}$$

Here $f_{2-3}$ is the composite focal length of the second negative lens and the third positive lens, and f is the focal length of the image-formation optical system.

According to the third aspect of the invention, the above objects are achievable by the provision of an image-formation optical system, characterized by comprising, in order from an object side thereof, an aperture stop, a first positive meniscus lens that is convex on an image side thereof, a second negative lens and a third positive lens, and satisfying the following condition.

$$0.1 < f_1/f < 0.55 \tag{31}$$

Here $f_1$ is the focal length of the first positive lens, and f is the focal length of the image-formation optical system.

According to the third aspect of the invention, there is also provided an image-formation optical system, characterized by comprising, in order from an object side thereof, an aperture stop, a first positive meniscus lens that is convex on an image side thereof, a second negative lens and a third positive lens, and satisfying the following condition.

$$1.0 < (r_{1f} + r_{1r})/(r_{1f} - r_{1r}) < 1.7 \qquad (32)$$

Here $r_{1f}$ is the radius of curvature of the object side-surface of the first positive lens, and $r_{1r}$ is the radius of curvature of the image side-surface of the first positive lens.

According to the fourth aspect of the invention, the above objects are achievable by the provision of an image-formation optical system, characterized by comprising, in order from an object side thereof, an aperture stop, a first positive meniscus lens that is convex on an image side thereof, a second negative lens and a third positive lens, and satisfying the following condition.

$$-0.55 < f_2/f_3 < -0.1 \qquad (41)$$

Here $f_2$ is the focal length of the second negative lens, and $f_3$ is the focal length of the third positive lens.

According to the fourth aspect of the invention, there is also provided an image-formation optical system, characterized by comprising, in order from an object side thereof, an aperture stop, a first positive meniscus lens that is convex on an image side thereof, a second negative lens and a third positive lens, and satisfying the following conditions.

$$-2.0 < (r_{3f} + r_{3r})/(r_{3f} - r_{3r}) < 0.85 \qquad (42)$$

$$0.1 < \beta_3 < 1.0 \qquad (43)$$

Here $r_{3f}$ is the axial radius of curvature of the object side-surface of the third positive lens, $r_{3r}$ is the axial radius of curvature of the image side-surface of the third positive lens, and $\beta_3$ is the transverse magnification of the third positive lens.

According to the fifth aspect of the invention, the above objects are achievable by the provision of an image-formation optical system, characterized by comprising, in order from an object side thereof, an aperture stop, a first positive meniscus lens that is convex on an image side thereof, a second negative meniscus lens that is convex on an object side thereof and a third positive lens, and satisfying the following conditions.

$$-0.35 < r_{1r}/r_{2f} < -0.08 \qquad (61)$$

$$-1.5 < r_{1r}/r_{2r} < -0.75 \qquad (62)$$

Here $r_{1r}$ is the axial radius of curvature of the image side-surface of the first positive lens, $r_{2f}$ is the axial radius of curvature of the object side-surface of the second negative lens, and $r_{2r}$ is the axial radius of curvature of the image side-surface of the second negative lens.

According to the fifth aspect of the invention, there is also provided an image-formation optical system, characterized by comprising, in order from an object side thereof, an aperture stop, a first positive lens, a second negative meniscus lens that is convex on an object side thereof and a third positive lens, and satisfying the following condition.

$$0.2 < r_{2f}/r_{3f} < 3.5 \qquad (63)$$

Here $r_{2f}$ is the axial radius of curvature of the object side-surface of the second negative lens, and $r_{3f}$ is the axial radius of curvature of the object side-surface of the third positive lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
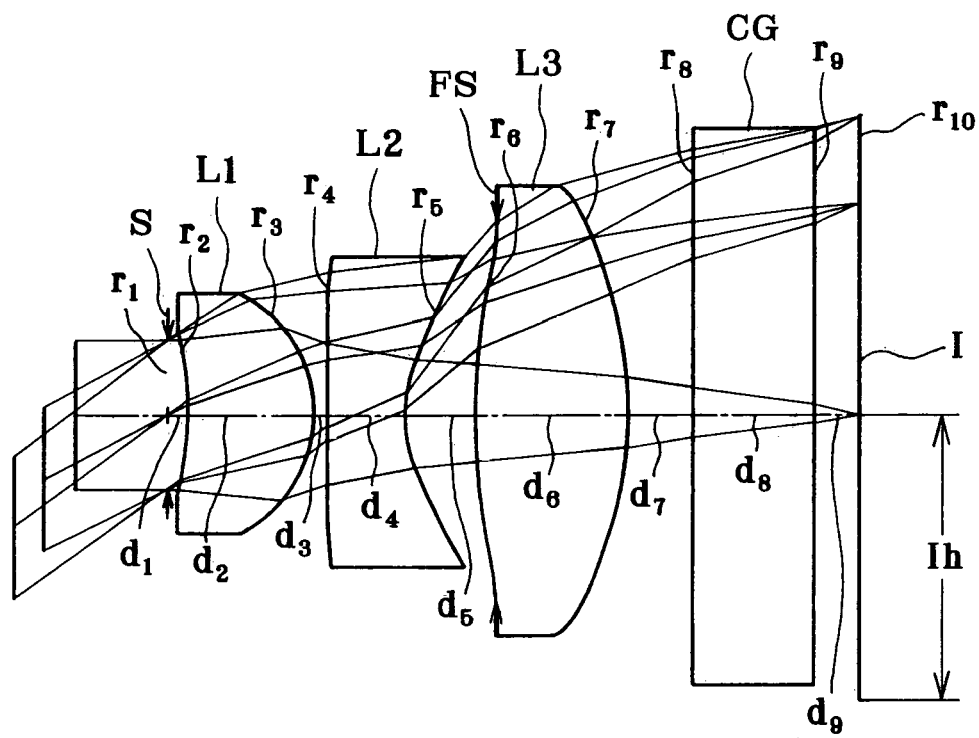
FIG. 1 is illustrative in section of the lens arrangement of Example 1 of the image-formation optical system according to the first aspect of the invention upon focused on an object point at infinity.

First of all, advantages and actions of the above arrangements according to the first to fifth aspects of the invention are explained.

Advantages and actions of the above arrangements according to the first aspect of the invention are now explained.

First, the number of lenses used is explained. In favor of performance and compactness, the lens arrangements according to the first aspect of the invention are each made up of three lenses. It is obvious that if four or more lenses are used, then performance will be much more enhanced. However, addition of one lens to a three-lens arrangement causes the thickness of the lens arrangement to increase and requires more lens-to-lens spaces and larger lens barrel space, resulting unavoidably in bulkiness. With two or less lenses, field curvature cannot be reduced with a deterioration of peripheral performance, as described in the "BACKGROUND OF THE INVENTION". For performance and compactness, therefore, it is optimum to rely on three lenses.

To make the angle of incidence of light rays on a CCD or other image pickup device small, an aperture stop is located nearest to the object side of the image-formation optical system. Generally, it is preferable that the lens power profile of the optical system is determined in such a way as to locate an exit pupil at a position away from the object side. Since the optical system is made up of fewer lenses, however, it is most effective to position the aperture stop on the object side of the optical system.

It is here noted that the location of the aperture stop nearest to the object side of the optical system makes it difficult to correct distortion and chromatic aberration of magnification that are peripheral performance in view of optical design, because the lenses are found on only one side of the stop. To make correction for those aberrations, a positive lens, a negative lens and a positive lens are arranged in order from the object side of the optical system in such a way that the second and third lenses, where light rays become higher, have powers of opposite signs. Regarding center performance, spherical aberrations and longitudinal chromatic aberration occurring at the first positive lens are corrected at the second negative lens, so that higher performance is achieved throughout a screen.

According to the first aspect of the invention, the first positive lens is configured in a meniscus shape that is convex on its image side, as described in the "PROBLEM TO BE SOLVED BY THE INVENTION", so that off-axis aberrations can be well corrected with the achievement of high performance.

In this case, if the second negative lens is configured in a meniscus form, problems will arise in connection with optical performance. Generally in the case of a lens of meniscus shape, its one surface has a converging effect of positive power, even though it is a negative lens. Therefore, as the power of this lens becomes strong, the curvature of another surface, i.e., the surface of negative power becomes too steep to hold back higher-order aberrations, rendering performance likely to become worse. For the reason that aberrations are canceled out at both surfaces, there is another problem that performance becomes far worse due to fabrication errors by relative decentration of each surface. This becomes a factor detrimental to compactness, because as lens power is increased for the purpose of length reductions, etc., performance becomes even worse.

For compactness, it is preferable that the principal points of the optical system are shifted toward its object side relative to its focal length as is the case with a telephoto type optical system. However, when the second negative lens is configured in a meniscus shape that is convex on its object side, the principal points are moved along with the first positive lens toward the image side of the optical system, rendering it difficult to achieve compactness. For making correction for spherical aberrations, etc., it is effective to keep the principal point spacing between the first positive lens and the second negative lens small, thereby keeping the height of marginal rays substantially invariable, and so the principal points must be further shifted toward the image side. This causes the curvatures of both surfaces, in particular that of the exit side surface to become steep, rendering it difficult to gain performance balance.

For this reason, the second negative lens in the first aspect of the invention is constructed in a double-concave form, thereby making performance less likely to degrade because higher-order aberrations are reduced even when the length of the optical system is shortened. In addition, a deterioration of performance due to relative decentration of the respective surfaces of the second negative lens can be held back because negative power is divided at each surface. In other words, the performance of the optical system can be much enhanced even when its length is shortened.

If the respective lenses are each a single lens and differently shaped refracting surfaces are imparted to both sides of two air lenses interposed between the lenses, both aberrations, say, longitudinal aberration and off-axis aberration can be well corrected in a well-balanced state. Especially if two air lenses defined by the three lenses are interposed between two differently shaped aspheric surfaces, better correction of aberrations is achievable.

Preferably in the first aspect of the invention, it is desirable to satisfy the following condition.

$$-0.5 < (r_{2f} + r_{2r})/(r_{2f} - r_{2r}) < 0.98 \qquad (1)$$

Here $r_{2f}$ is the axial radius of curvature of the object side-surface of the second negative lens, and $r_{2r}$ is the axial radius of curvature of the image side-surface of the second negative lens.

As the upper limit of 0.98 to condition (1) is exceeded, the negative power of the object side-surface of the second negative lens becomes too weak to make good correction for aberrations occurring at the first positive lens, and as the lower limit of −0.5 is not reached, the power of the image side-surface of the second negative lens, where rim light beam rays become higher, becomes too weak and so chromatic aberration of magnification becomes worse.

More preferably, $$0 < (r_{2f}+r_{2r})/(r_{2f}-r_{2r}) < 0.95 \quad (1\text{-}1)$$

Even more preferably, $$0.3 < (r_{2f}+r_{2f})/(r_{2f}-r_{2r}) < 0.8 \quad (1\text{-}2)$$

Since the image side-surface of the first positive lens has strong positive power, it is desired to make effective correction for residual aberrations at the object side-surface of the next lens that is the second negative lens. It is then preferable to satisfy the following condition.

$$0.01 < r_{1r}/r_{2f} < 0.75 \quad (2)$$

Here $r_{1r}$ is the axial radius of curvature of the image side-surface of the first positive lens, and $r_{2f}$ is the axial radius of curvature of the object side-surface of the second negative lens.

As the upper limit of 0.75 to condition (2) is exceeded, the negative power of the object side-surface of the second negative lens becomes too strong, leading to overcorrection, and as the lower limit of 0.01 is not reached, that negative power becomes too weak, ending up with undercorrection. In either case, there is a deterioration of performance.

More preferably, $$0.05 < r_{1r}/r_{2f} < 0.6 \quad (2\text{-}1)$$

Even more preferably, $$0.1 < r_{1r}/r_{2f} < 0.4 \quad (2\text{-}2)$$

Unless the power of the second negative lens located halfway between the first positive lens and the third positive lens is properly determined, it will then be impossible to make effective correction for aberrations occurring at both the positive lenses. It is then preferable to satisfy the following condition.

$$-0.75 < f_2/Ih < -0.1 \quad (3)$$

Here $f_2$ is the focal length of the second negative lens, and Ih is the maximum image height.

As the upper limit of −0.1 to condition (3) is exceeded, the power of the second negative lens becomes too strong, leading to overcorrection, and as the lower limit of −0.75 is not reached, that power becomes too weak, ending up with undercorrection. In either case, there is a deterioration of performance.

It is here noted that the maximum image height, Ih, of the imaging system means a half of the diagonal length of a field frame that is located on the image plane side of the image-formation optical system to limit an image pickup area, and a half of the diagonal length of an effective image pickup area of an image pickup device such as a solid-state image pickup device when it is used.

More preferably, $$-0.6 < f_2/Ih < -0.25 \quad (3\text{-}1)$$

Having diverging action, the second negative lens acts unfavorably on the angle of incidence of light on the image plane. For this reason, the makeup of the next lens that is the third positive lens is of importance; it is desirable to satisfy the following condition.

$$-5.0 < f_{2\text{-}3}/f < -0.1 \quad (4)$$

Here $f_{2\text{-}3}$ is the composite focal length of the second negative lens and the third lens positive lens, and f is the focal length of the image-formation optical system.

As the upper limit of −0.1 to condition (4) is exceeded, the negative power becomes too strong and so the angle of incidence of light on the image plane becomes too steep, and as the lower limit of −5.0 is not reached, the negative power becomes too weak and so the image-formation optical system becomes too long.

More preferably, $$-2.0 < f_{2\text{-}3}/f < -0.3 \quad (4\text{-}1)$$

Considerable chromatic aberration of magnification and distortion are likely to occur at the second and third lenses, because they are spaced far away from the aperture stop and off-axis light rays attain some height there. It is thus preferable to satisfy the following condition.

$$-0.8 < f_2/f_3 < -0.1 \quad (5)$$

Here $f_2$ is the focal length of the second negative lens, and $f_3$ is the focal length of the third positive lens.

Any departure from the upper limit of −0.1 and the lower limit of −0.8 to condition (5) causes chromatic aberration of magnification and distortion to remain over-corrected or undercorrected. In either case, peripheral performance becomes worse.

More preferably, $$-0.5 < f_2/f_3 < -0.2 \quad (5\text{-}1)$$

If the object side-surface of the second negative lens is made up of an aspheric surface, it is then possible to make good correction for aberrations; it is desirable to satisfy the following condition.

$$0.01 < |(r_{2fs}+r_{2fa})/(r_{2fs}-r_{2fa})-1| < 100 \quad (6)$$

Here $r_{2fs}$ is the axial radius of curvature of the object side-surface of the second negative lens, and $r_{2fa}$ is a value of the radius of curvature of the object side-surface of the second negative lens with the aspheric surface taken into consideration, upon a difference between $r_{2fs}$ and said radius of curvature reaching a maximum.

It is here noted that the radius of curvature $r_{ASP}$ with the aspheric surface taken into account is defined by the following equation, with the proviso that the defining equation for an aspheric surface is given by f(y).

$$r_{ASP} = y \cdot (1+f'(y)^2)^{1/2}/f'(y)$$

Here y is a height from an optical axis, and f′ (y) is differential of first order.

As the upper limit of 100 to condition (6) is exceeded, the effect of the aspheric surface becomes too weak, resulting in undercorrection and rendering coma and astigmatism worse, and as the lower limit of 0.01 is not reached, the effect of the aspheric surface becomes too strong, resulting in overcorrection with a deterioration of performance and rendering lens processing difficult.

More preferably, $$0.05 < |(r_{2fs}+r_{2fa})/(r_{2fs}-r_{2fa})-1| < 5.0 \quad (6\text{-}1)$$

Even more preferably, $$0.1 < |(r_{2fs}+r_{2fa})/(r_{2fs}-r_{2fa})-1| < 3.0 \quad (6\text{-}2)$$

If the image side-surface of the second negative lens is made up of an aspheric surface, it is then possible to make good correction for aberrations; it is desired to satisfy the following condition.

$$0.01 < |(r_{2rs}+r_{2ra})/(r_{2rs}-r_{2ra})-1| < 100 \quad (7)$$

Here $r_{2rs}$ is the axial radius of curvature of the image side-surface of the second negative lens, and $r_{2ra}$ is a value of the radius of curvature of the image side-surface of the second negative lens with the aspheric surface taken into consideration, upon a difference between $r_{2fs}$ and said radius of curvature reaching a maximum.

As the upper limit of 100 to condition (7) is exceeded, the effect of the aspheric surface becomes too weak, resulting in undercorrection and rendering coma and astigmatism worse, and as the lower limit of 0.01 is not reached, the effect of the aspheric surface becomes too strong, resulting in overcorrection with a deterioration of performance and rendering lens processing difficult.

More preferably, $$0.05<|(r_{2rs}+r_{2ra})/(r_{2rs}-r_{2ra})-1|<10.0 \qquad (7\text{-}1)$$

Even more preferably, $$0.1<|(r_{2rs}+r_{2ra})/(r_{2rs}-r_{2ra})-1|<5.0 \qquad (7\text{-}2)$$

When a CCD is used for the image pickup device, an image varies in brightness between the central portion and the peripheral portion thereof upon incidence of an off-axis light beam from the image-formation optical system on the image plane at too large an angle. Upon incidence of that light beam on the image plane at a small angle, on the other hand, this problem may be solved to a certain degree, but now the optical system becomes long. It is thus desired to satisfy the following condition.

$$10°<\alpha<40° \qquad (8)$$

Here $\alpha$ is the angle of incidence of a chief ray on the image plane at the maximum image height.

As the upper limit of 40° to condition (8) is exceeded, the angle of incidence of the chief ray becomes too large, resulting in a lowering of the brightness of the peripheral portion of the image, and as the lower limit of 10° is not reached, the optical system becomes too long.

More preferably, $$15°<\alpha<35° \qquad (8\text{-}1)$$

Even more preferably, $$17.5°<\alpha<25° \qquad (8\text{-}2)$$

Since the first positive lens is located nearest to the aperture stop, all rays from the center to the periphery of the screen come together, passing through much the same point; unless the first positive lens is properly determined, the whole performance of the screen is adversely affected. It is thus preferable to satisfy the following condition.

$$0.1<f_1/f<1.2 \qquad (9)$$

Here $f_1$ is the focal length of the first positive lens, and f is the focal length of the image-formation optical system.

As the upper limit of 1.2 to condition (9) is exceeded, the power of the positive lens becomes too weak; the optical system becomes too long. As the lower limit of 0.1 is not reached, the power of the positive lens becomes too strong; the whole performance of the screen deteriorates because of the occurrence of spherical aberrations, coma, etc.

More preferably, $$0.2<f_1/f<0.7 \qquad (9\text{-}1)$$

Even more preferably, $$0.25<f_1/f<0.5 \qquad (9\text{-}2)$$

In another imaging system according to the first aspect of the invention, the image-formation optical system is constructed with a stop at the front and using three single lenses in order of positive, negative and positive, and a main positive refracting power is allocated to the first positive lens having a short focal length to set up a telephoto type having generally positive and negative powers in this order, wherein principal points are located nearer to the object side of the optical system. In this way, it is possible to shorten the length of the optical system.

In this case, if a strong radius of curvature is imparted to the image side-surface of the first positive lens, it is then possible to make correction for off-axis aberrations while the first positive lens is allowed to have a proper degree of refracting power and the angle of refraction of an off-axis light beam incident from the aperture stop is kept gentle.

The third positive lens acts to bring a light beam incident on the image pickup device close to vertical, and if the image side-surface of the second negative lens is allowed to have strong refracting power, then the third positive lens cooperates with the second negative lens to hold back chromatic aberration of magnification and off-axis aberrations.

Preferably in this arrangement, the following conditions are satisfied.

$$0.30<f_1/Ih<0.90 \qquad (10)$$

$$-0.75<f_2/Ih<-0.1 \qquad (3)$$

$$0.70<f_3/Ih<2.00 \qquad (11)$$

Here $f_1$ is the focal length of the first positive lens, $f_2$ is the focal length of the second negative lens, $f_3$ is the focal length of the third positive lens, and Ih is the maximum image height.

Alternatively, it is desired to satisfy the following conditions.

$$0.1<f_1/f<0.46 \qquad (9\text{-}3)$$

$$-0.75<f_2/f<-0.29 \qquad (12)$$

$$0.40<f_3/f<0.85 \qquad (13)$$

Conditions (10), (3) and (11) are provided to define the focal lengths of the respective lenses in terms of the maximum image height Ih.

Condition (10) is provided to determine the refracting power of the first positive lens that bears a main refracting power on the basis of image plane size in such a way as to shorten the length of the image-formation optical system while putting aberrations in a balanced state. On the premise that condition (10) is satisfied, conditions (3) and (11) are provided to determine the refracting powers of the second negative lens and the third positive lens for correction of aberrations, again on the basis of the maximum image height.

By satisfying those conditions at the same time, the length of the image-formation optical system can be made short with the achievement of a wide-angle arrangement and aberrations can be well corrected in a balanced state.

As the lower limit of 0.30 to condition (10) is not reached, it is difficult to make correction for aberrations occurring at the first positive lens, and as the upper limit of 0.90 is exceeded, the effect on shortening the length of the image-formation optical system by constructing that optical system generally as a telephoto type becomes slender.

Preferably for correction of aberrations, the lower limit to condition (10) should be set at 0.35 or 0.40, and preferably for length reductions, the upper limit should be set at 0.75 or 0.70.

Any deviation from the upper and lower limits of −0.75 and −0.1 to condition (3) renders correction of aberrations difficult.

As the lower limit of 0.70 to condition (11) is not reached, the refracting power of the third positive lens becomes strong and the third positive lens becomes axially thick, rendering it difficult to slime down the optical system or make correction for aberrations. As the upper limit of 2.00 is exceeded, on the other hand, the action on bringing the farthest off-axis light beam close to vertical becomes slender.

Preferably for facilitated correction of aberrations, the lower limit to condition (11) should be set at 0.80 or 0.90, and preferably for bringing the off-axis light beam close to vertical, the upper limit should be set at 1.80 or 1.60.

Conditions (9-3), (12) and (13) are provided to define the focal lengths of the respective lenses in terms of the focal length of the image-formation optical system.

Condition (9-3) implies that a substantial portion of refracting power for the image-formation optical system is allocated to the first positive lens. Further, on the premise that condition (9-3) is satisfied, conditions (12) and (13) are provided to determine the refracting powers of the second negative lens and the third positive lens for the purpose of correction of aberrations.

By satisfying those conditions at the same time, the length of the image-formation optical system can be made short with the achievement of a wide-angle arrangement and aberrations can be well corrected in a balanced state.

As the lower limit of 0.1 to condition (9-3) is not reached, it is difficult to make correction for aberrations occurring at the first positive lens, and as the upper limit of 0.46 is exceeded, the effect on shortening the length of the image-formation optical system by constructing that optical system generally as a telephoto type becomes slender.

Preferably for correction of aberrations, the lower limit to condition (9-3) should be set at 0.2 or 0.25, and preferably for length reductions, the upper limit should be set at 0.44 or 0.43.

Any deviation from the upper and lower limits of −0.75 and −0.29 to condition (12) renders correction of aberrations difficult.

Preferably for facilitated correction of aberrations, the lower limit to condition (12) should be set at −0.6 or −0.37, and the upper limit should be set at −0.3 or −0.31.

As the lower limit of 0.40 to condition (13) is not reached, the refracting power of the third positive lens becomes strong and the third positive lens becomes axially thick, rendering it difficult to slime down the optical system or make correction for aberrations. As the upper limit of 0.85 is exceeded, on the other hand, the action on bringing the farthest off-axis light beam close to vertical becomes slender.

Preferably for facilitated correction of aberrations, the lower limit to condition (13) should be set at 0.60 or 0.70, and preferably for bringing the off-axis light beam close to vertical, the upper limit should be set at 0.84 or 0.83.

It is acceptable to satisfy a set of conditions (10), (3) and 11) and a set of (9-3), (12) and (13) at the same time. It is also acceptable to satisfy the above conditions (1) to (9-2) alone or in combinations of two or more.

Commonly to each of the above broader conditions, the upper and lower limits thereof could be reduced down to those of the corresponding narrower condition(s).

It is understood that if the above conditions are applied in suitable combinations as desired, the advantages of the first aspect of the invention are then much more enhanced.

Advantages and actions of the above arrangements according to the second aspect of the invention are now explained.

First, the number of lenses used is explained. In favor of performance and compactness, the lens arrangements according to the second aspect of the invention are each made up of three lenses. It is obvious that if four or more lenses are used, then performance will be much more enhanced. However, addition of one lens to a three-lens arrangement causes the thickness of the lens arrangement to increase and requires more lens-to-lens spaces and larger lens barrel space, resulting unavoidably in bulkiness. With two or less lenses, field curvature cannot be reduced with a considerable deterioration of peripheral performance, as described in the "BACKGROUND OF THE INVENTION". For performance and compactness, therefore, it is optimum to rely on three lenses.

To make the angle of incidence of light rays on a CCD or other image pickup device small, the aperture stop is located nearest to the object side of the image-formation optical system. Generally, it is preferable that the lens power profile of the optical system is determined in such a way as to locate an exit pupil at a position away from the object side. Since the optical system is made up of fewer lenses, however, it is most effective to position the aperture stop on the object side of the optical system.

It is here noted that the location of the aperture stop nearest to the object side of the optical system renders it difficult to correct distortion and chromatic aberration of magnification that are peripheral performance in view of optical design, because the lenses are found on only one side of the stop. To make correction for those aberrations, a positive lens, a negative lens and a positive lens are arranged in order from the object side of the optical system in such a way that the second and third lenses, where light rays become higher, have powers of opposite signs. Regarding center performance, spherical aberrations and longitudinal chromatic aberration occurring at the first positive lens are corrected at the second negative lens, so that higher performance is achieved throughout a screen.

Rudimentarily in this way, the length of the optical system may be shortened, and the angle of incidence of light rays on the image plane may be decreased as well. Since the number of lenses is limited, however, no compactness is achievable unless a surface-to-surface spacing, lens thickness and a back focus are properly determined with a focal length and an angle of view taken into full account. It is thus required to satisfy the following condition.

$$1.5 < d/(f\tan\theta) < 3.0 \tag{21}$$

Here d is a distance of the image-formation optical system as measured from the aperture stop plane to the image plane, $\theta$ is the maximum angle of incidence of the image-formation optical system, and f is the focal length of the image-formation optical system.

As the upper limit of 3.0 to condition (21) is exceeded, the image-formation optical system becomes too long for compactness. As the lower limit of 1.5 is not reached, the power of each lens becomes too strong, resulting in a deterioration of performance, and the lens becomes thick with a narrow surface-to-surface spacing and so difficult to process and assemble.

More preferably, $$1.8 < d/(f\tan\theta) < 2.8 \tag{21-1}$$

The power profile for effectively reducing the size and enhancing the performance of the image-formation optical system is now explained. To reduce the length of an optical system relative to its focal length, it is thought of as reasonable to arrange positive power and negative power in this order as is the case with a telephoto type. When this arrangement is used as such, however, the angle of incidence of light on the image plane is likely to become steep, because the negative power has diverging action. When a wide-angle optical system is set up, on the other hand, it is known that the location of a lens group having negative diverging action nearest to the object side of the optical system is favorable for optical performance.

In the second aspect of the invention, therefore, the rudimental power profile for shortening the length of the optical system is comprised of positive power and negative power. Then, the negative power is allocated to the negative lens and the positive lens in order from the object side of the optical system to set up a telephoto type, wherein the angle of incidence of light on the image plane can be made gentle due to the converging action of the positive lens located nearest to the image plane side of the optical system. Even when a wide-angle optical system is constructed with no deterioration of performance, the entrance surface of the first positive lens is configured in a meniscus form of positive power in such a way that the entrance surface is defined by a concave surface having diverging action. It is thus possible to make full correction for coma and astigmatism of off-axis light rays that are likely to occur in the wide-angle arrangement.

Then, to reconcile the effect on length reductions with the angle of incidence of light on the image plane, the second negative lens and the third positive lens must be determined in such a way as to have a proper negative power profile; it is required to satisfy the following condition.

$$-5.0 < f_{2-3}/f < -0.5 \qquad (22)$$

Here $f_{2-3}$ is the composite focal length of the second negative lens and the third positive lens, and f is the focal length of the image-formation optical system.

As the upper limit of −0.5 to condition (22) is exceeded, the telephoto effect becomes too strong and so the angle of incidence of light on the image plane becomes too steep, and as the lower limit of −5.0 is not reached, the telephoto effect becomes too slender and so the image-formation optical system becomes overly long.

More preferably, $$-3.5 < f_{2-3}/f < -0.8 \qquad (22\text{-}1)$$

Even more preferably, $$-2.0 < f_{2-3}/f < -0.9 \qquad (22\text{-}2)$$

Preferably for setting up the telephoto type, the first positive lens of the two positive lenses should have stronger positive power. To this end it is desired to satisfy the following condition.

$$0.1 < f_1/f_3 < 0.7 \qquad (23)$$

Here $f_1$ is the focal length of the first positive lens, and $f_3$ is the focal length of the third positive lens.

As the upper limit of 0.7 to condition (23) is exceeded, the telephoto effect becomes too slender, resulting in bulkiness or the powers of the second negative lens and the third positive lens become too strong, rendering coma and astigmatism worse. As the lower limit of 0.1 is not reached, the telephoto effect becomes too strong and so the amount of aberrations produced at the first positive lens becomes large, or the power of the third positive lens becomes too weak to make correction for chromatic aberration of magnification and distortion produced at the second negative lens.

More preferably, $$0.2 < f_1/f_3 < 0.58 \qquad (23\text{-}1)$$

The second negative lens and third positive lens which have negative composite power have some influences on the telephoto effect. The second negative lens and the third positive lens tend to produce a large amount of chromatic aberration of magnification and distortion, because they are spaced far away from the aperture stop and off-axis light rays attain some height there. To this end it is desirable to satisfy the following condition.

$$-0.6 < f_2/f_3 < -0.1 \qquad (24)$$

Here $f_2$ is the focal length of the second negative lens, and $f_3$ is the focal length of the third positive lens.

As the upper limit of −0.1 to condition (24) is exceeded, the power of the second negative lens becomes weak or the power of the third positive lens becomes too strong. In either case, the telephoto effect diminishes, resulting in bulkiness. As the lower limit of −0.6 is not reached, the power of the second negative lens becomes strong or the power of the third positive lens becomes weak; chromatic aberration of magnification and distortion cannot be balanced, resulting in a deterioration of performance.

More preferably, $$-0.5 < f_2/f_3 < -0.15 \qquad (24\text{-}1)$$

Use of glasses having high refractive indices may contribute to performance improvements; however, they cost much. It is thus desirable to satisfy the following condition.

$$1.45 < n_{avg} < 1.70 \qquad (25)$$

Here $n_{avg}$ is the average value of d-line refractive indices of the first positive lens, the second negative lens and the third positive lens.

If the upper limit of 1.70 to condition (25) is exceeded, cost reductions will be unachievable. As the upper limit of 1.45 is not reached, the amount of aberrations occurring at each lens becomes too large, resulting in a deterioration of performance.

More preferably, $$1.5 < n_{avg} < 1.65 \qquad (25\text{-}1)$$

Since the first positive lens is closest to the stop, central to peripheral light beams pass through much the same area of that lens. That is, unless aberrations produced at this surface are properly corrected, they often remain uncorrected at the second negative lens and the third positive lens, ending up with a deterioration of the performance of the whole screen, in particular coma and astigmatism. In other words, it is preferable to satisfy the following condition.

$$1.0 < (r_{1f} + r_{1r})/(r_{1f} - r_{1r}) < 1.7 \qquad (26)$$

Here $r_{1f}$ is the paraxial radius of curvature of the object side-surface of the first positive lens, and $r_{1r}$ is the paraxial radius of curvature of the image side-surface of the first positive lens.

As the upper limit of 1.7 to condition (26) is exceeded, the power of the image side-surface of the first positive lens becomes relatively too strong, rendering spherical aberrations and coma in particular worse, and as the lower limit of 1.0 is not reached, the power of the object side-surface of the first positive lens becomes relatively too weak, rendering off-axis aberrations, especially astigmatism and coma worse.

More preferably, $$1.1 < (r_{1f}+r_{1r})/(r_{1f}-r_{1r}) < 1.6 \quad (26\text{-}1)$$

To shorten the length of the optical system by the telephoto effect, the first positive lens must have strong positive power. In this case, if at least one surface of the first positive lens is defined by an aspheric surface, it is then possible to make good correction for aberrations. Therefore, it is desirable to satisfy the following condition.

$$0.01 < |(r_{1s}+r_{1s})/(r_{1s}-r_{1a})-1| < 100 \quad (27)$$

Here $r_{1s}$ is the paraxial radius of curvature of the aspheric surface of the first positive lens, and $r_{1a}$ is the value of a difference between a radius of curvature $r_{ASp}$ of the first positive lens with an aspheric surface, defined below, taken into account and the paraxial radius of curvature of the first positive lens, upon a difference between $r_{1s}$ and said radius of curvature reaching a maximum.

It is here noted that the radius of curvature $r_{ASP}$ with the aspheric surface taken into consideration is defined by the following equation.

$$r_{ASP} = y \cdot (1+f'(y)^2)^{1/2}/f'(y)$$

Here f(y) is an aspheric surface defining equation (that is a shape function (wherein the direction of propagation of light from a plane tangential to an apex is defined as positive), y is a height from an optical axis, and f'(y) is differential of first order.

As the upper limit of 100 to condition (27) is exceeded, the aspheric effect becomes too weak, resulting in undercorrection, and coma and astigmatism become worse. As the lower limit of 0.01 is not reached, the aspheric effect becomes too strong, resulting in overcorrection. This in turn causes a deterioration of performance, and renders lens processing difficult.

More preferably, $$0.05 < |(r_{1s}+r_{1a})/(r_{1s}-r_{1a})-1| < 10 \quad (27\text{-}1)$$

Even more preferably, $$0.1 < |(r_{1s}+r_{1a})/(r_{1s}-r_{1a})-1| < 5 \quad (27\text{-}2)$$

Most preferably, $$0.1 < |(r_{1s}+r_{1a})/(r_{1s}-r_{1a})-1| < 3 \quad (27\text{-}3)$$

To shorten the length of the optical system by the telephoto effect, the second negative lens must have strong negative power. In this case, if at least one surface of the second negative lens is defined by an aspheric surface, it is then possible to make good correction for aberrations; that is, it is desirable to satisfy the following condition.

$$0.01 < |(r_{2s}+r_{2a})/(r_{2s}-r_{2a})-1| < 100 \quad (28)$$

Here $r_{2s}$ is the paraxial radius of curvature of the aspheric surface of the second negative lens, and $r_{2a}$ is the value of a difference between a radius of curvature $r_{ASP}$ of the second negative lens with an aspheric surface, defined below, taken into account and the paraxial radius of curvature of the second negative lens, upon a difference between $r_{2s}$ and said radius of curvature reaching a maximum.

As the upper limit of 100 to condition (28) is exceeded, the aspheric effect becomes too weak, resulting in undercorrection, and coma and astigmatism become worse. As the lower limit of 0.01 is not reached, the aspheric effect becomes too strong, resulting in overcorrection. This in turn causes a deterioration of performance, and renders lens processing difficult.

More preferably, $$0.1 < |(r_{2s}+r_{2a})/(r_{2s}-r_{2a})-1| < 5 \quad (28\text{-}1)$$

When a CCD is used for the image pickup device, an image varies in brightness between the central portion and the peripheral portion thereof upon incidence of an off-axis light beam from the image-formation optical system on an image plane at too large an angle. Upon incidence of that light beam on the image plane at a small angle, on the other hand, this problem may be solved to a certain degree, but now the optical system becomes long. It is thus desired to satisfy the following condition.

$$10° < \alpha < 40° \quad (29)$$

Here α is the angle of incidence of a chief ray on the image plane at the maximum image height.

As the upper limit of 40° to condition (29) is exceeded, the angle of incidence of the chief ray becomes too large, resulting in a lowering of the brightness of the peripheral portion of the image, and as the lower limit of 10° is not reached, the optical system becomes too long.

More preferably, $$15° < \alpha < 35° \quad (29\text{-}1)$$

Even more preferably, $$17.5° < \alpha < 25° \quad (29\text{-}2)$$

The second aspect of the invention also includes an imaging system comprising the image-formation optical system according to the second aspect of the invention and an image pickup device located on an image side thereof.

More specifically, the first imaging system according to the second aspect of the invention is characterized by comprising an image-formation optical system comprising, in order from an object side thereof, an aperture stop, a first positive lens that is convex on an image side thereof, a second negative lens that is concave on an image side thereof and a third positive lens, and an image pickup device located on an image side of the image-formation optical system, wherein said aperture stop has an aperture of fixed shape through which an optical axis of the image-formation optical system passes, and a rim surface of the aperture is inclined down at an angle of inclination not smaller than the angle of incidence of the farthest off-axis light beam in such a way as to come closer to the optical axis toward the image plane side thereof.

Advantages and actions of this arrangement are now explained. As light reflected at the rim surface of the aperture stop enters the image-formation optical system, phenomena such as ghosts and flares are apt to occur. Referring particularly to a small-format image-formation optical system comprising, in order from an object side thereof, an aperture stop, a first positive lens, a second negative lens and a third positive lens such as an inventive one, light reflected at the rim surface of the aperture stop has relatively large influences thereon, because the image pickup plane of an associated image pickup device becomes small too.

According to the second aspect of the invention wherein the aperture stop is located nearest to the object side of the image-formation optical system, the rim surface of an aperture of fixed shape in the aperture stop is inclined down at an angle of inclination not smaller than the angle of incidence of the farthest off-axis light beam in such a way as to come closer to the optical axis toward the image side thereof.

This arrangement makes a light beam reflected at the rim surface of the aperture less likely to enter the image pickup device so that the influences of flares and ghosts can be reduced.

The second imaging system according to the second aspect of the invention is characterized by comprising an image-formation optical system comprising, in order from an object side thereof, an aperture stop, a first positive lens that is convex on an image side thereof, a second negative lens that is concave on an image side thereof and a third positive lens, and an image pickup device located on an image side of the image-formation optical system, wherein the imaging system further comprises a lens barrel for holding said image-formation optical system and said image pickup device, wherein said lens barrel is integrally molded of the same resin material of which said aperture stop is formed.

Advantages and actions of this arrangement are now explained. In the optical system according to the second aspect of the invention, the aperture stop is positioned nearest to the object side thereof, and the effective surfaces of the first, second and third lenses subsequent thereto become large in this order. Accordingly, if a lens barrel for holding these lenses is integrally molded of the same, easily moldable resin material, then it is possible to insert the lenses into the lens barrel from its image plane side and bring them in alignment with one another, so that the optical system can be easily fabricated.

In this case, if the aperture stop is made integral with the lens barrel, it is then possible to substantially cut back fabrication steps, and if the lens barrel itself is provided with a function of retaining the image pickup device, it is then possible to make dust less likely to enter the lens barrel.

The third imaging system according to the second aspect of the invention is characterized by comprising an image-formation optical system comprising, in order from an object side thereof, a first positive lens that is convex on an image side thereof, a second negative lens that is concave on an image side thereof and a third positive lens, and an image pickup device located on an image side of the image-formation optical system, wherein the imaging system further comprises a lens barrel for holding said image-formation optical system, wherein a rim of each of at least the first positive lens and the third positive lens is inclined down in such a way as to come closer to an optical axis of the image-formation optical system toward the object side of the image-formation optical system, and an inclined rim is in engagement with said lens barrel.

Advantages and actions of this arrangement are now explained. In the optical system according to the second aspect of the invention, the aperture stop is positioned nearest to the object side thereof, and the effective surfaces of the first, second and third lenses subsequent thereto become large in this order. This is particularly true for the first positive lens and the third positive lens. According to the above arrangement, therefore, the contour of the lens assembly is consistent with off-axis light beams, so that the optical system can be made compact while shading is held back, and by inserting the lenses into the lens barrel from its image plane side, they can be so positioned that the optical system can be easily fabricated.

It is here acceptable that all the lenses are provided with inclined rims that come closer to the optical axis of the optical system toward the object side thereof, wherein the inclined rims are in engagement with the lens barrel.

The fourth imaging system according to the second aspect of the invention is characterized by comprising an image-formation optical system comprising, in order from an object side thereof, an aperture stop, a first positive lens that is convex on an image side thereof, a second negative lens that is concave on an image side thereof and a third positive lens, and an image pickup device located on an image side of the image-formation optical system, wherein the imaging system further comprises a lens barrel for holding said image-formation optical system, wherein as viewed from an entrance side of the image-formation optical system, said first positive lens looks as a circle and, as viewed from the entrance side, said third positive lens is in such a shape that the length of a direction corresponding to a short-side direction of an effective image pickup area of the image pickup device is shorter than the length of a direction corresponding to a long-side direction of the image pickup area.

Advantages and actions of this arrangement are now explained. In the optical system according to the second aspect of the invention, the aperture stop is positioned nearest to the object side thereof; the effective surfaces of the first, second and third lenses subsequent thereto become large in this order, and the shape of an effective light beam comes closer to the shape of the effective image pickup area on the image side of the optical system. According to the above arrangement, therefore, the contour of the lens assembly is consistent with the shape of the effective light beam, so that the optical system can be made compact while shading is held back, Commonly to each of the above broader conditions, the upper and lower limits thereof could be reduced down to those of the corresponding narrower condition(s).

It is understood that if the above conditions are applied in suitable combinations as desired, the advantages of the second aspect of the invention are then much more enhanced.

Advantages and actions of the above arrangements according to the third aspect of the invention are now explained.

First, the number of lenses used is explained. In favor of performance and compactness, the lens arrangements according to the third aspect of the invention are each made up of three lenses. It is obvious that if four or more lenses are used, then performance will be much more enhanced. However, addition of one lens to a three-lens arrangement causes the thickness of the lens arrangement to increase and requires more lens-to-lens spaces e and larger barrel space, resulting unavoidably in bulkiness. With two or less lenses, field curvature cannot be reduced with a considerable deterioration of peripheral performance, as described in the "BACKGROUND OF THE INVENTION". For performance and compactness, therefore, it is optimum to rely on three lenses.

To make the angle of incidence of light rays on a CCD or other image pickup device small, the aperture stop is located nearest to the object side of the image-formation optical system. Generally, it is preferable that the lens power profile of the optical system is determined in such a way as to locate an exit pupil at a position away from the object side. Since the optical system is made up of fewer lenses, however, it is most effective to position the aperture stop on the object side of the optical system.

It is here noted that the location of the aperture stop nearest to the object side of the optical system makes it difficult to correct distortion and chromatic aberration of magnification that are peripheral performance in view of optical design, because the lenses are found on only one side of the stop. To make correction for those aberrations, a positive lens, a negative lens and a positive lens are arranged in order from the object side of the optical system in such a way that the second and third lenses, where light rays become higher, have powers of opposite signs. Regarding center performance, spherical aberrations and longitudinal chromatic aberration occurring at the first positive lens are corrected at the second negative lens, so that higher performance is achieved throughout a screen.

To achieve high performance and compactness that are the object of the third aspect of the invention, the makeup of the first lens is of importance as described below.

For the achievement of high performance, the first positive lens is configured in a meniscus shape that is convex on its image side. This allows a rim light beam incident at a steep angle to leave at a gentle angle under the diverging action of the entrance surface, so that coma and field of curvature that are peripheral performance can be effectively corrected. However, it is noted that the entrance surface of the first positive lens has diverging action, and so the exit surface thereof must have strong converging action. Accordingly, unless the power of that exit surface is properly determined, it is then impossible to make good correction for aberrations.

For the achievement of compactness, on the other hand, it is necessary to shift the principal points of the image-formation optical system toward the object side thereof relative to the focal length thereof. The image-formation optical system according to the third aspect of the invention works to form a real image, and so the focal length of the image-formation optical system becomes positive. For this reason, the two positive lenses are permitted to take just only aberration-correction action but also image-formation action. To shift the principal points toward the object side, it is effective to allocate stronger image-formation action to the first positive lens; that is, the focal length of the first positive lens takes on importance. In other words, it is necessary to satisfy the following condition.

$$0.1 < f_1/f < 0.55 \tag{31}$$

Here $f_1$ is the focal length of the first positive lens, and f is the focal length of the image-formation optical system.

As the upper limit of 0.55 to this condition is exceeded, the positive power becomes too weak for compactness, and as the lower limit of 0.1 is not reached, the positive power becomes too strong, failing to meet demand for high performance.

More preferably, $$0.2 < f_1/f < 0.5 \tag{31-1}$$

The shape of the first positive meniscus lens is also important for the purpose of accomplishing high performance and compactness that are the object of the third aspect of the invention.

In the case of a meniscus lens having convex and concave lens surfaces, they have optical actions of positive power and negative power. In this case, if strong power is imparted to the lens, then the power is canceled out at both surfaces; stronger power must be given to one surface. Allocation of diverging action to the entrance surface of the first positive lens in the third aspect of the invention may be effective for peripheral performance. However, if that action is too strong, then the power of the exit surface becomes too strong, resulting in an increase in the amount of aberrations occurring there. This in turn incurs a deterioration of performance, and renders the optical system vulnerable to fabrication errors due to lens decentration, etc.

In the case of a positive meniscus lens that is convex on its image side, on the other hand, the principal points are displaced toward the image side of the optical system. For the purpose of length reductions, it is effective to move the principal points toward the object side of the optical system; however, if the radii of curvature of both lens surfaces are shortened to allow the meniscus effect to become too strong, that is then contradictory to compactness. It is thus desirable to satisfy the following condition.

$$1.0 < (r_{1f} + r_{1r})/(r_{1f} - r_{1r}) < 1.7 \tag{32}$$

Here $r_{1f}$ is the axial radius of curvature of the object side-surface of the first positive lens, and $r_{1r}$ is the axial radius of curvature of the image side-surface of the first positive lens.

As the upper limit of 1.7 to this condition is exceeded, the radius of curvature of the exit surface becomes small, resulting in a deterioration of performance or length increases, and as the lower limit of 1.0 is not reached, the radius of curvature of the entrance surface becomes large, resulting in a deterioration of the peripheral performance of a screen.

More preferably, $$1.1 < (r_{1f} + r_{1r})/(r_{1f} - r_{1r}) < 1.5 \tag{32-1}$$

For compactness, it is preferable for the first positive lens of the two positive lenses to have stronger positive power; that is, it is preferable to satisfy the following condition.

$$0.1 < f_1/f_3 < 0.8 \tag{33}$$

Here $f_1$ is the focal length of the first lens, and $f_3$ is the focal length of the third lens.

As the upper limit of 0.8 to this condition is exceeded, the principal points of the optical system are shifted toward the image side of the optical system, rendering the optical system too long. As the lower limit of 0.1 is not reached, the power of the first positive lens becomes strong with the result of an increase in the amount of aberrations produced, and the power of the third positive lens becomes weak and less effective for correction of aberrations. In either case, there is a deterioration of performance.

More preferably, $$0.15 < f_1/f_3 < 0.7 \tag{33-1}$$

Even more preferably, $$0.2 < f_1/f_3 < 0.58 \tag{33-2}$$

For the achievement of high performance and compactness, the makeup of the second negative lens is also important. It is thus desirable to satisfy the following condition indicative of a specific relation between the first positive lens and the second negative lens.

$$1.0 < f_{1-2}/f < 4.0 \tag{34}$$

Here $f_{1-2}$ is the composite focal length of the first and second lenses, and f is the focal length of the image-formation optical system.

As the upper limit of 4.0 to this condition is exceeded, the principal points of the optical system are shifted toward the image side of the optical system, resulting in an increase in the length of the optical system. As the lower limit of 1.0 is not reached, the power of the second negative lens relative to the first positive lens becomes too weak to correct residual aberrations at the first positive lens, resulting in a deterioration of performance.

More preferably, $$1.5 < f_{1-2}/f < 2.7 \tag{34-1}$$

The second negative lens has another role in correction of aberrations remaining at the first positive lens. To this end, unless the power of the second negative lens is properly determined, it is then impossible to make effective correction for aberrations. It is thus desirable to satisfy the following condition.

$$-0.75 < f_2/Ih < -0.1 \tag{35}$$

Here $f_2$ is the focal length of the second negative lens, and Ih is the maximum image height.

As the upper limit of −0.1 to this condition is exceeded, the power of the second negative lens becomes too strong, resulting in overcorrection, and as the lower limit of −0.75 is not reached, the power of the second negative lens becomes too weak, leading to under-correction. In either case, there is a deterioration of performance.

More preferably, $$-0.65 < f_2/Ih < -0.25 \tag{35-1}$$

Any high performance cannot be obtained without making correction for aberrations occurring at the surface of positive power by the surface of negative power. For compactness, it is also necessary for that power to have a proper profile while making correction for aberrations. Therefore, it is desirable for the negative power of the object side of the first lens and the negative power of the image side of the second lens to satisfy the following condition.

$$-0.25 < r_{2r}/r_{1f} < -0.01 \tag{36}$$

Here $r_{2r}$ is the axial radius of curvature of the image side-surface of the second negative lens, and $r_{1f}$ is the axial radius of curvature of the object side-surface of the first positive lens.

Exceeding the upper limit of −0.01 to this condition is unfavorable for compactness, because the power of the entrance surface of the first lens becomes stronger, resulting in a shift of the principal points of the optical system toward the image side thereof, and falling short of the lower limit of −0.25 causes the power of the entrance surface of the first lens to become weak, rendering correction of off-axis aberrations less than satisfactory or the power of the exit surface of the second lens to become strong, ending up with overcorrection of aberrations remaining uncorrected at the first lens, especially spherical aberrations and coma.

More preferably, $$-0.20 < r_{2r}/r_{1f} < -0.02 \tag{36-1}$$

Since the entrance surface of the first positive lens is nearest to the stop, light rays of every angle inclusive of center and rim light beams come together there. In other words, unless aberrations occurring at that surface are properly corrected, there is then a deterioration of the performance of the whole screen. Preferably for this reason, the entrance surface of the first positive lens should be defined by an aspheric surface. It is then desirable to satisfy the following condition.

$$0.01 < |(r_{1fs} + r_{1fa})/(r_{1fs} - r_{1fa}) - 1| < 100 \tag{37}$$

Here $r_{1fs}$ is the axial radius of curvature of the object side-surface of the first positive lens, and $r_{1fa}$ is the value of a difference between a radius of curvature $r_{ASP}$ of the object side-surface of the first positive lens with the aspheric surface taken into account and the axial radius of curvature, upon a difference between $r_{1fs}$ and said radius curvature reaching a maximum.

It is here noted that the radius of curvature $r_{ASP}$ with the aspheric surface taken into consideration is defined by the following equation.

$$r_{ASP} = y \cdot (1 + f'(y)^2)^{1/2}/f'(y)$$

Here f(y) is an aspheric surface defining equation (that is a shape function (wherein the direction of propagation of light from a plane tangential to an apex is defined as positive)), y is a height from an optical axis, and f'(y) is differential of first order.

As the upper limit of 100 to this condition is exceeded, the aspheric effect becomes too slender, resulting in a deterioration of the performance of the whole screen. As the lower limit of 0.01 is not reached, the amount of asphericity becomes too large with the result that processability becomes worse.

More preferably, $$0.02 < |(r_{1fs} + r_{1fa})/(r_{1fs} - r_{1fa}) - 1| < 10 \tag{37-1}$$

Even more preferably, $$0.05 < |(r_{1fs} + r_{1fa})/(r_{1fs} - r_{1fa}) - 1| < 3 \tag{37-2}$$

The exit surface of the first positive lens has a strong curvature for the purpose of letting the meniscus lens keep positive power, and so large aberrations are likely to occur at that surface. For this reason, it is desirable that the exit surface of the first positive lens be defined by an aspheric surface. It is then desirable to satisfy the following condition.

$$0.01 < |(r_{1rs} + r_{1ra})/(r_{1rs} - r_{1ra}) - 1| < 100 \tag{38}$$

Here $r_{1rs}$ is the axial radius of curvature of the image side-surface of the first positive lens, and $r_{1ra}$ is the value of a difference between a radius of curvature $r_{ASP}$ of the image side-surface of the first positive lens with the aspheric surface taken into account and the axial radius of curvature, upon a difference between $r_{1rs}$ and said radius of curvature reaching a maximum.

As the upper limit of 100 to this condition is exceeded, the aspheric effect becomes too slender, resulting in a deterioration of performance. As the lower limit of 0.01 is not reached, the amount of asphericity becomes too large with the result that processability becomes worse.

More preferably, $$0.02 < |(r_{1rs} + r_{1ra})/(r_{1rs} - r_{1ra}) - 1| < 10 \tag{38-1}$$

Even more preferably, $$0.05 < |(r_{1rs} + r_{1ra})/(r_{1rs} - r_{1ra}) - 1| < 5 \tag{38-2}$$

When a CCD is used for the image pickup device, an image varies in brightness between the central portion and the peripheral portion thereof upon incidence of an off-axis light beam from the image-formation optical system on an image plane at too large an angle. Upon incidence of that light beam on the image plane at a small angle, on the other hand, this problem may be solved to a certain degree, but now the optical system becomes long. It is thus desired to satisfy the following condition.

$$10° < \alpha < 40° \tag{39}$$

Here $\alpha$ is the angle of incidence of a chief ray on the image plane at the maximum image height.

As the upper limit of 40° to this condition is exceeded, the angle of incidence of the chief ray becomes too large, resulting in a lowering of the brightness of the peripheral portion of the image, and as the lower limit of 10° is not reached, the optical system becomes too long.

More preferably, $$15° < \alpha < 35° \qquad (39\text{-}1)$$

Even more preferably, $$17.5° < \alpha < 25° \qquad (39\text{-}2)$$

The third aspect of the invention encompasses an electronic imaging system comprising any one of the above image-formation optical systems and an image pickup device located on an image side thereof.

Preferably in that case, the half angle of view should be 30° to 50° inclusive.

At less than 30° that is the lower limit to this condition, the phototaking range of the imaging system becomes narrow. At greater than 50° that is the upper limit, distortion tends to occur, and the angle of incidence of a light beam on the periphery of the effective image pickup area of the imaging system becomes large, leading to the likelihood of an image degradation.

Another imaging system according to the third aspect of the invention is characterized by comprising an image-formation optical system comprising, in order from an object side thereof, an aperture stop, a first positive lens that is convex on an image side thereof, a second negative lens and a third positive lens, and an image pickup device located on an image side of the image-formation optical system, wherein said aperture stop has an aperture of fixed shape through which an optical axis of the optical system passes, and a rim surface of the aperture is inclined down at an angle of inclination not smaller than the angle of incidence of the farthest off-axis light beam in such a way as to come closer to the optical axis on the image side thereof.

Advantages and actions of this system are now explained. As light reflected at the rim surface of the aperture stop enters the image-formation optical system, phenomena such as ghosts and flares are apt to occur. Referring particularly to a small-format image-formation optical system comprising, in order from an object side thereof, an aperture stop, a first positive lens, a second negative lens and a third positive lens such as an inventive one, light reflected at the rim surface of the aperture stop has relatively large influences thereon, because the image pickup plane of an associated image pickup device becomes small too.

According to the third aspect of the invention wherein the aperture stop is located nearest to the object side of the image-formation optical system, the rim surface of an aperture of fixed shape in the aperture stop is inclined down at an angle of inclination not smaller than the angle of incidence of the farthest off-axis light beam in such a way as to come closer to the optical axis on the image side thereof.

This arrangement makes a light beam reflected at the rim surface of the aperture less likely to enter the image pickup device so that the influences of flares and ghosts can be reduced.

Yet another imaging system according to the third aspect of the invention is characterized by comprising an image-formation optical system comprising, in order from an object side thereof, an aperture stop, a first positive lens that is convex on an image side thereof, a second negative lens and a third positive lens, and an image pickup device located on an image side of the image-formation optical system, wherein the imaging system further comprises a lens barrel for holding said image-formation optical system and said image pickup device, wherein said lens barrel is integrally molded of the same resin material of which said aperture stop is formed.

Advantages and actions of this arrangement are now explained. In the optical system according to the third aspect of the invention, the aperture stop is positioned nearest to the object side thereof, and the effective surfaces of the first, second and third lenses subsequent thereto become large in this order. Accordingly, if a lens barrel for holding these lenses is integrally molded of the same, easily moldable resin material, then it is possible to insert the lenses into the lens barrel from its image plane side and bring them in alignment with one another, so that the optical system can be easily fabricated.

In this case, if the aperture stop is made integral with the lens barrel, it is then possible to substantially cut back fabrication steps, and if the lens barrel itself is provided with a function of retaining the image pickup device, it is then possible to make dust less likely to enter the lens barrel.

A further imaging system according to the third aspect of the invention is characterized by comprising an image-formation optical system comprising, in order from an object side thereof, a first positive lens that is convex on an image side thereof, a second negative lens and a third positive lens, and an image pickup device located on an image side of the image-formation optical system, wherein the imaging system further comprises a lens barrel for holding said image-formation optical system, wherein each of at least the first positive lens and the third positive lens has an inclined rim that comes closer to an optical axis of the image-formation optical system on the object side thereof, wherein said inclined rim is in engagement with said lens barrel.

Advantages and actions of this arrangement are now explained. In the optical system according to the second aspect of the invention, the aperture stop is positioned nearest to the object side thereof, and the effective surfaces of the first, second and third lenses subsequent thereto become large in this order. This is particularly true for the first positive lens and the third positive lens. According to the above arrangement, therefore, the contour of the lens assembly is consistent with off-axis light beams, so that the optical system can be made compact while shading is held back, and by inserting the lenses into the lens barrel from its image plane side, they can be so positioned that the optical system can be easily fabricated.

It is here acceptable that all the lenses are provided with inclined rims that come closer to the optical axis of the image-formation optical system on the object side thereof, wherein the inclined rims are in engagement with the lens barrel.

A further imaging system according to the third aspect of the invention is characterized by comprising an image-formation optical system comprising, in order from an object side thereof, an aperture stop, a first positive lens that is convex on an image side thereof, a second negative lens and a third positive lens, and an image pickup device located on an image side of the image-formation optical system, wherein the imaging system further comprises a lens barrel for holding said image-formation optical system, wherein as viewed from an entrance side of the image-formation optical system, said first positive lens looks as a circle and, as viewed from the entrance side, said third positive lens is in such a shape that the length of a direction corresponding to a short-side direction of an effective image pickup area of the image pickup device is shorter than the length of a direction corresponding to a long-side direction of the image pickup area.

Advantages and actions of this arrangement are now explained. In the optical system according to the second aspect of the invention, the aperture stop is positioned nearest to the object side thereof; the effective surfaces of the first, second and third lenses subsequent thereto become large in this order, and the shape of an effective light beam comes closer to the shape of the effective image pickup area on the image side of the optical system. According to the above arrangement, therefore, the contour of the lens assembly is consistent with the shape of the effective light beam, so that the optical system can be made compact while shading is held back, Commonly to each of the above broader conditions, the upper and lower limits thereof could be reduced down to those of the corresponding narrower condition(s).

It is understood that if the above conditions are applied in suitable combinations as desired, the advantages of the third aspect of the invention are then much more enhanced.

Advantages and actions of the above arrangements according to the fourth aspect of the invention are now explained.

First, the number of lenses used is explained. In favor of performance and compactness, the lens arrangements according to the fourth aspect of the invention are each made up of three lenses. It is obvious that if four or more lenses are used, then performance will be much more enhanced. However, addition of one lens to a three-lens arrangement causes the thickness of the lens arrangement to increase and requires more lens-to-lens spaces and larger barrel space, resulting unavoidably in bulkiness. With two or less lenses, field curvature cannot be reduced with a considerable deterioration of peripheral performance, as described in the "BACKGROUND OF THE INVENTION". For performance and compactness, therefore, it is optimum to rely on three lenses.

To make the angle of incidence of light rays on a CCD or other image pickup device small, the aperture stop is located nearest to the object side of the image-formation optical system. Generally, it is preferable that the lens power profile of the optical system is determined in such a way as to locate an exit pupil at a position away from the object side. Since the optical system is made up of fewer lenses, however, it is most effective to position the aperture stop on the object side of the optical system.

It is here noted that the location of the aperture stop nearest to the object side of the optical system makes it difficult to correct distortion and chromatic aberration of magnification that are peripheral performance in view of optical design, because the lenses are found on only one side of the stop. To make correction for those aberrations, a positive lens, a negative lens and a positive lens are arranged in order from the object side of the optical system in such a way that the second and third lenses, where light rays are at some considerable height, have powers of opposite signs. Regarding center performance, spherical aberrations and longitudinal chromatic aberration occurring at the first positive lens are corrected at the second negative lens, so that higher performance is achieved throughout a screen.

According to the fourth aspect of the invention, the first positive lens is configured in a meniscus shape that is convex on its image side, as described in the "PROBLEM TO BE SOLVED BY THE INVENTION", so that higher performance is achievable even in a wide-angle arrangement.

It is noted understood that when a wide-angle optical system is set up, any high performance is unachievable unless aberrations at the periphery of a screen, especially chromatic aberration of magnification and distortion are well corrected. These aberrations are likely to occur at the second and third lenses spaced away from the aperture stop, where light rays gain some heights.

Thus, of importance is how power is distributed to the second negative lens and the third positive lens in the first image-formation optical system according to the fourth aspect of the invention is important. In other words, it is necessary to satisfy the following condition.

$$-0.55 < f_2/f_3 < -0.1 \quad (41)$$

Here $f_2$ is the focal length of the second negative lens, and $f_3$ is the focal length of the third positive lens.

As the upper limit of −0.1 to this condition is exceeded, the positive power becomes weak or the negative power becomes too strong, and as the lower limit of −0.55 is not reached, the positive power becomes strong or the negative power becomes too weak. In either case, chromatic aberration of magnification and distortion become worse.

More preferably, $$-0.5 < f_2/f_3 < -0.15 \quad (41\text{-}1)$$

It is here understood that the third positive lens located farthest off the aperture stop has the highest effect on correction of chromatic aberration of magnification and distortion, because rim light rays become highest. In the second image-formation optical system according to the fourth aspect of the invention, therefore, the shape of the third positive lens is of vital importance. Especially at the entrance surface of the third positive lens, aberrations are effectively canceled out, because the height of a rim chief ray there comes close to that at the second negative lens. Accordingly, if the third positive lens is configured in, for instance, a convex meniscus shape that is convex on its image side, then its entrance side has some negative effect on correction of aberrations; it cannot make correction for aberrations. It is thus desirable to satisfy the following condition.

$$-2.0 < (r_{3f} + r_{3r})/(r_{3f} - r_{3r}) < 0.85 \quad (42)$$

Here $r_{3f}$ is the axial radius of curvature of the object side-surface of the third positive lens, and $r_{3r}$ is the axial radius of curvature of the image side-surface of the third positive lens.

As the upper limit of 0.85 to this condition is exceeded, the effect of the entrance surface on correction of aberrations becomes slender with the result that chromatic aberration of magnification and distortion become worse, and as the lower limit of −2.0 is not reached, the meniscus shape of the third positive lens convex on its object side becomes steep with the result that coma and astigmatism become worse.

More preferably, $$-1.5 < (r_{3f} + r_{3r})/(r_{3f} - r_{3r}) < 0.7 \quad (42\text{-}1)$$

Preferably, the third positive lens should have a double-convex shape both surfaces of which have strong powers. It is then preferable to satisfy the following condition.

$$-0.95 < (r_{3f} + r_{3r})/(r_{3f} - r_{3r}) < 0.85 \quad (42\text{-}2)$$

More preferably in this case, $$-0.8 < (r_{3f} + r_{3r})/(r_{3f} - r_{3r}) < 0.1 \quad (42\text{-}3)$$

It is also acceptable that the third positive lens is of a meniscus shape that is convex on its object side. It is then preferable to satisfy the following condition.

$$-2.0 < (r_{3f} + r_{3r})/(r_{3f} - r_{3r}) < -1.0 \quad (42\text{-}4)$$

More preferably in this case, $$-1.5 < (r_{3f} + r_{3r})/(r_{3f} - r_{3r}) < -1.1 \quad (42\text{-}5)$$

It is here noted that aberrations, too, vary depending on magnification, because an image formed through the first positive lens and the second negative lens is subjected to conversion by magnification. This has also influences on making the optical system compact. Therefore, it is necessary for the third positive lens to satisfy the transverse magnification defined by the following condition, in addition to satisfying the above conditions.

$$0.1 < \beta_3 < 1.0 \quad (43)$$

Here $\beta_3$ is the transverse magnification of the third positive lens.

As the upper limit of 1.0 to this condition is exceeded, aberrations at the periphery of a screen, especially chromatic aberration of magnification and distortion deteriorate, and as the lower limit of 0.1 is not reached, the optical system becomes bulky.

More preferably, $$0.2 < \beta_3 < 0.8 \quad (43\text{-}1)$$

Chromatic aberration of magnification also depends largely on the makeup of the second negative lens, and the third positive lens where light rays become high. It is particularly important to balance the power of the exit surface of the second negative lens against that of the entrance surface of the third positive lens; that is, it is desirable to satisfy the following condition.

$$0.1 < r_{2r}/r_{3f} < 1.0 \quad (44)$$

Here $r_{2r}$ is the axial radius of curvature of the image side-surface of the second negative lens, and $r_{3f}$ is the axial radius of curvature of the object side-surface of the third positive lens.

Any deviation from the upper and lower limits of 1.0 and 0.1 to this condition causes the power balance between the image side-surface of the second negative lens and the object side-surface of the third positive lens to be upset. In either case, chromatic aberration of magnification becomes worse.

More preferably, $$0.1 < r_{2r}/r_{3f} < 0.5 \quad (44\text{-}1)$$

Even more preferably, $$0.05 < r_{2r}/r_{3f} < 0.23 \quad (44\text{-}2)$$

Any high performance is unachievable without making proper correction for just only peripheral aberrations but also longitudinal aberrations. The first positive lens is effective for correction of spherical aberrations, because of being located nearest to the aperture stop, and the third positive lens has significant influences on peripheral performance, conversely because of being positioned farthest off it. To put aberrations in a well-balanced state, it is thus desirable to satisfy the following condition.

$$-0.25 < r_{1r}/r_{3r} < 0.6 \quad (45)$$

Here $r_{1r}$ is the axial radius of curvature of the image side-surface of the first positive lens, and $r_{3r}$ is the axial radius of curvature of the image side-surface of the third positive lens.

Any deviation from the upper and lower limits of 0.6 and −0.25 to this condition renders it difficult to gain a balance between aberrations.

More preferably, $$-0.2 < r_{1r}/r_{3r} < 0.45 \quad (45\text{-}1)$$

Even more preferably, $$-0.15 < r_{1r}/r_{3r} < 0.35 \quad (45\text{-}2)$$

In this connection, it is desirable for the third positive lens to have a refractive index defined by the following condition.

$$1.40 < n_3 < 1.66 \quad (46)$$

Here $n_3$ is the refractive index of the third positive lens.

As the lower limit of 1.66 to this condition is exceeded, field curvature becomes worse or the glass used for the third positive lens costs much. As the lower limit of 1.40 is not reached, there is a deterioration of performance due to the occurrence of a good deal of coma and astigmatism.

Since the first positive lens is closest to the stop, central to peripheral light beams pass through much the same area of that lens. That is, unless aberrations produced at this surface are properly corrected, they often remain undercorrected at the second negative lens and the third positive lens, ending up with a deterioration of the performance of the whole screen, in particular coma and astigmatism. In other words, it is preferable to satisfy the following condition.

$$1.0 < (r_{1f} + r_{1r})/(r_{1f} - r_{1r}) < 2.5 \quad (47)$$

Here $r_{1f}$ is the axial radius of curvature of the object side-surface of the first positive lens, and $r_{1r}$ is the axial radius of curvature of the image side-surface of the first positive lens.

As the upper limit of 2.5 to this condition is exceeded, the power of the image side-surface of the first positive lens becomes relatively too strong, rendering spherical aberrations and coma in particular worse, and as the lower limit of 1.0 is not reached, the power of the object side-surface of the first positive lens becomes relatively too weak, rendering off-axis aberrations, especially astigmatism and coma worse.

More preferably, $$1.0 < (r_{1f} + r_{1r})/(r_{1f} - r_{1r}) < 1.7 \quad (47\text{-}1)$$

Even more preferably, $$1.1 < (r_{1f} + r_{1r})/(r_{1f} - r_{1r}) < 1.6 \quad (47\text{-}2)$$

The second negative lens is located halfway between the first positive lens and the third positive lens, and so aberrations occurring at both positive lenses cannot effectively be corrected with no proper determination of the power of that negative lens. It is thus desirable to satisfy the following condition.

$$-1.0 < f_2/Ih < -0.05 \quad (48)$$

Here $f_2$ is the focal length of the second negative lens, and Ih is the maximum image height.

As the upper limit of −0.05 to this condition is exceeded, the power of the second negative lens becomes too strong, resulting in overcorrection, and as the lower limit of −1.0 is not reached, that power becomes too weak, resulting in undercorrection. In either case, there is a deterioration of performance.

More preferably, $$-0.75 < f_2/Ih < -0.1 \quad (48\text{-}1)$$

Even more preferably, $$-0.6 < f_2/Ih < -0.25 \quad (48\text{-}2)$$

Diverged by the second negative lens, light rays are likely to enter the object side-surface of the third positive lens at a steep angle, rendering astigmatism and coma likely to occur there. Especially in the case of a wide-angle optical system, it is necessary to make full correction for aberrations produced at that surface. For this reason, it is preferable that the object side-surface of the third positive lens is defined by an aspheric surface, and that aspheric surface has a slacking positive power. In this regard, it is desirable to satisfy the following condition.

$$0.01 < |(r_{3fs}+r_{3fa})/(r_{3fs}-r_{3fa})-1| < 100 \quad (49)$$

Here $r_{3fs}$ is the axial radius of curvature of the object side-surface of the third positive lens, and $r_{3fa}$ is the value of a difference between a radius of curvature of $r_{ASP}$ of the object side-surface of the third positive lens with the aspheric surface taken into consideration and the axial radius of curvature, upon changing to maximum in a range inside of a point of the maximum image height through which a chief ray passes.

It is here noted that the radius of curvature $r_{ASP}$ with the aspheric surface taken into account is defined by the following equation, with the proviso that the defining equation for an aspheric surface is given by f(y).

$$r_{ASP} = y \cdot (1+f'(y)^2)^{1/2}/f'(y)$$

Here y is a height from an optical axis, and f'(y) is differential of first order.

As the upper limit of 100 to condition (49) is exceeded, the aspheric effect becomes too slender with the result that astigmatism and coma cannot be corrected, and as the lower limit of 0.01 is not reached, the aspheric effect becomes too noticeable with the result that lens processing becomes difficult.

More preferably, $$0.05 < |(r_{3fs}+r_{3fa})/(r_{3fs}-r_{3fa})-1| < 100 \quad (49\text{-}1)$$

Closest to the image plane, the image side-surface of the third positive lens is relatively less capable of correcting aberrations such as spherical aberrations and coma, because a light beam passing through that surface becomes thin. For this reason, distortion that is a chief ray aberration can be corrected primarily at the image side-surface of the third positive lens without having influences on those aberrations. Therefore, it is desired that the aspheric surface be used at that surface, and have a slacking positive power. If the positive power is much too weak, however, the angle of incidence of light on the image plane then becomes steep. In other words, that positive power must be increased to a certain degree; it is desirable for the aspheric surface to satisfy the following condition.

$$0.01 < |(r_{3rs}+r_{3ra})/(r_{3rs}-r_{3ra})-1| < 100 \quad (50)$$

Here $r_{3rs}$ is the axial radius of curvature of the image side-surface of the third positive lens, and $r_{3ra}$ is the value of a difference between a radius of curvature of the image side-surface of the third positive lens with the aspheric surface taken into consideration and the axial radius of curvature, upon changing to maximum in a range inside of a point of the maximum image height through which a chief ray passes.

As the upper limit of 100 to this condition is exceeded, the aspheric effect becomes too slender to make good correction for distortion, and as the lower limit of 0.01 is not reached, the angle of incidence of light on the image plane becomes large.

More preferably, $$0.05 < |(r_{3rs}+r_{3ra})/(r_{3rs}-r_{3ra})-1| < 10 \quad (50\text{-}1)$$

Even more preferably, $$0.1 < |(r_{3rs}+r_{3ra})/(r_{3rs}-r_{3ra})-1| < 2.5 \quad (50\text{-}2)$$

When a CCD is used for the image pickup device, an image varies in brightness between the central portion and the peripheral portion thereof upon incidence of an off-axis light beam from the image-formation optical system on an image plane at too large an angle. Upon incidence of that light beam on the image plane at a small angle, on the other hand, this problem may be solved to a certain degree, but now the optical system becomes long. It is thus desired to satisfy the following condition.

$$10° < \alpha < 40° \quad (51)$$

Here $\alpha$ is the angle of incidence of a chief ray on the image plane at the maximum image height.

As the upper limit of 40° to this condition is exceeded, the angle of incidence of the chief ray on the CCD becomes too large, resulting in a lowering of the brightness of the peripheral portion of the image, and as the lower limit of 10° is not reached, the optical system becomes too long.

More preferably, $$15 < \alpha < 35° \quad (51\text{-}1)$$

Even more preferably, $$17.5° < \alpha < 25° \quad (51\text{-}2)$$

The third aspect of the invention encompasses an electronic imaging system comprising any one of the above image-formation optical systems and an image pickup device located on an image side thereof.

One imaging system according to the fourth aspect of the invention is characterized by comprising an image-formation optical system comprising, in order from an object side thereof, an aperture stop, a first positive meniscus lens that is convex on an image side thereof, a second negative lens and a third positive lens, and an image pickup device located on an image side of the image-formation optical system, wherein said aperture stop has an aperture of fixed shape through which an optical axis of the image-formation optical system passes, wherein a rim surface of the aperture is inclined down at an angle of inclination not smaller than the angle of incidence of the farthest off-axis light beam in such a way as to come closer to the optical axis on an image plane side thereof.

Advantages and actions of this system are now explained. As light reflected at the rim surface of the aperture stop enters the image-formation optical system, phenomena such as ghosts and flares are apt to occur. Referring particularly to a small-format image-formation optical system comprising, in order from an object side thereof, an aperture stop, a first positive lens, a second negative lens and a third positive lens such as an inventive one, light reflected at the rim surface of the aperture stop has relatively large influences thereon, because the image pickup plane of an associated image pickup device becomes small too.

According to the fourth aspect of the invention wherein the aperture stop is located nearest to the object side of the image-formation optical system, the rim surface of the aperture of fixed shape in the aperture stop is inclined down at an angle of inclination not smaller than the angle of incidence of the farthest off-axis light beam in such a way as to come closer to the optical axis on its image plane side.

This arrangement makes a light beam reflected at the rim surface of the aperture less likely to enter the image pickup device so that the influences of flares and ghosts can be reduced.

Another imaging system according to the fourth aspect of the invention is characterized by comprising an image-formation optical system comprising, in order from an object side thereof, an aperture stop, a first positive meniscus lens that is convex on its image side, a second negative lens and a third positive lens, and an image pickup device located on an image side of the image-formation optical system, wherein the imaging system further comprises a lens barrel for holding said image-formation optical system and said image pickup device, wherein said lens barrel is integrally molded of the same resin material of which said aperture stop is formed.

Advantages and actions of this arrangement are now explained. In the optical system according to the fourth aspect of the invention, the aperture stop is positioned nearest to the object side thereof, and the effective surfaces of the first, second and third lenses subsequent thereto become large in this order toward the image side of the optical system. Accordingly, if the lens barrel for holding these lenses is integrally molded of the same, easily mold-able resin material, then it is possible to insert the lenses into the lens barrel from its image plane side and bring them in alignment with one another, so that the optical system can be easily fabricated.

In this case, if the aperture stop is made integral with the lens barrel, it is then possible to substantially cut back fabrication steps, and if the lens barrel itself is provided with a function of retaining the image pickup device, it is then possible to make dust less likely to enter the lens barrel.

The third imaging system according to the fourth aspect of the invention is characterized by comprising an image-formation optical system comprising, in order from an object side thereof, a first positive meniscus lens that is convex on its image side thereof, a second negative lens and a third positive lens, and an image pickup device located on an image side of the image-formation optical system, wherein the imaging system further comprises a lens barrel for holding said image-formation optical system, wherein each of at least the first positive lens and the third positive lens has an inclined rim that comes closer to the optical axis of the image-formation optical system on an object side thereof, wherein said inclined rim is in engagement with said lens barrel.

Advantages and actions of this arrangement are now explained. In the optical system according to the fourth aspect of the invention, the aperture stop is positioned nearest to the object side thereof, and the effective surfaces of the first, second and third lenses subsequent thereto become large in this order toward the image side thereof. This is particularly true for the first positive lens and the third positive lens. According to the above arrangement, therefore, the contour of the lens assembly is consistent with off-axis light beams, so that the optical system can be made compact while shading is held back, and by inserting the lenses into the lens barrel from its image plane side, they can be so positioned that the optical system can be easily fabricated.

It is here acceptable that all the lenses are provided with inclined rims that come closer to the optical axis of the optical system on the object side thereof, wherein the inclined rims are in engagement with the lens barrel.

The fourth imaging system according to the fourth aspect of the invention is characterized by comprising an image-formation optical system comprising, in order from its object side thereof, an aperture stop, a first positive meniscus lens that is convex on its image side, a second negative lens and a third positive lens, and an image pickup device located on an image side of the image-formation optical system, wherein the imaging system further comprises a lens barrel for holding said image-formation optical system, wherein as viewed from an entrance side of the image-formation optical system, said first positive lens looks as a circle and, as viewed from that entrance side, said third positive lens is in such a shape that the length of a direction corresponding to the short-side direction of an effective image pickup area of the image pickup device is shorter than the length of a direction corresponding to the long-side direction of the effective image pickup area.

Advantages and actions of this arrangement are now explained. In the optical system according to the fourth aspect of the invention, the aperture stop is positioned nearest to the object side thereof; the effective surfaces of the first, second and third lenses subsequent thereto become large in this order toward the image side thereof, and the shape of an effective light beam comes closer to the shape of the effective image pickup area on the image side of the optical system. According to the above arrangement, therefore, the contour of the lens assembly is consistent with the shape of the effective light beam, so that the optical system can be made compact while shading is held back, Commonly to each of the above broader conditions, the upper and lower limits thereof could be reduced down to those of the corresponding narrower condition(s).

It is understood that if the above conditions are applied in suitable combinations as desired, the advantages of the fourth aspect of the invention are then much more enhanced.

Advantages and actions of the above arrangements according to the fifth aspect of the invention are now explained.

First, the number of lenses used is explained. In favor of performance and compactness, the lens arrangements according to the fifth aspect of the invention are each made up of three lenses. It is obvious that if four or more lenses are used, then performance will be much more enhanced. However, addition of one lens to a three-lens arrangement causes the thickness of the lens arrangement to increase and requires more lens-to-lens spaces and larger lens barrel space e, resulting unavoidably in bulkiness. With two or less lenses, field curvature cannot be reduced with a considerable deterioration of peripheral performance, as described in the "BACKGROUND OF THE INVENTION". In view of performance and compactness, therefore, it is optimum to rely on three lenses.

To make the angle of incidence of light rays on a CCD or other image pickup device small, the aperture stop is located nearest to the object side of the image-formation optical system. Generally, it is preferable that the lens power profile of the optical system is determined in such a way as to locate an exit pupil at a position far way from the object side. Since the optical system is made up of fewer lenses, however, it is most effective to position the aperture stop on the object side of the optical system.

It is here noted that the location of the aperture stop nearest to the object side of the optical system renders it difficult to correct distortion and chromatic aberration of magnification that are peripheral performance in view of optical design, because the lenses are found on only one side of the stop. To make correction for those aberrations, the positive lens, the negative lens and the positive lens are arranged in order from the object side of the optical system in such a way that the second and third lenses, where light rays become higher, have powers of opposite signs. Regarding center performance, spherical aberrations and longitudinal chromatic aberration occurring at the first positive lens are corrected at the second negative lens, so that higher performance is achieved throughout a screen.

As described in the "PROBLEM TO BE SOLVED BY THE INVENTION", the first positive lens is configured into a meniscus shape that is convex on its image side. By allowing the entrance surface of the first positive lens to have negative power, it is thus possible to make good correction of off-axis aberrations. It is to be noted, however, that since the entrance surface of the meniscus lens has negative power, the positive power of the exit surface must be increased to keep the positive power of the first lens, ending up with an increase in the amount of aberrations produced at that surface.

According to the first image-formation optical system of the fifth aspect of the invention, this problem is solved by configuring the second negative lens in a meniscus shape that is convex on its object side to give positive power to its entrance surface, because a part of the positive power of the first positive lens is distributed to the second negative lens so that the amount of aberrations produced can be reduced. For compactness, on the other hand, it is necessary to shift the principal points of the optical system toward its object side relative to its focal length. To shift the principal points by the distribution of a part of that positive power to the second negative lens, it is thus necessary to satisfy the following condition.

$$-0.35 < r_{1r}/r_{2f} < -0.08 \quad (61)$$

Here $r_{1r}$ is the axial radius of curvature of the image side-surface of the first positive lens, and $r_{2f}$ is the axial radius of curvature of the object side-surface of the second negative lens.

Exceeding the upper limit of −0.08 to this condition is unfavorable for compactness, because the power of the entrance surface of the second negative lens becomes too strong, leading to a shift of the principal points of the optical system toward its image side. Falling short of the lower limit of −0.35 causes the power of the second negative lens to become too weak to make full correction for aberrations remaining at the first positive lens, especially spherical aberrations and coma.

More preferably, $$-0.3 < r_{1r}/r_{2f} < -0.1 \quad (61\text{-}1)$$

Unless aberrations produced by these positive powers are corrected by the negative power simultaneously with satisfaction of condition (61), no high performance is achievable. It is thus necessary for the positive power of the image side of the first lens and the negative power of the image side of the second lens to satisfy the following condition.

$$-1.5 < r_{1r}/r_{2r} < -0.75 \quad (62)$$

Here $r_{1r}$ is the axial radius of curvature of the image side-surface of the first positive lens, and $r_{2r}$ is the axial radius of curvature of the image side-surface of the second negative lens.

As the upper limit of −0.7 to this condition is exceeded, the negative power of the exit surface of the second lens becomes too strong, resulting in overcorrection of aberrations remaining at the first lens, especially spherical aberrations and coma, and as the lower limit of −1.5 is not reached, the positive power of the entrance surface of the first lens becomes too strong, resulting in undercorrection.

More preferably, $$-1.2 < r_{1r}/r_{2r} < -0.8 \quad (62\text{-}1)$$

For the second image-formation optical system according to the fifth aspect of the invention, it is important to optimize the makeup of the second negative lens, and the third positive lens.

As already described, the amount of spherical aberrations and coma produced can be reduced by configuring the second negative lens in a meniscus shape that is convex on its object side and imparting positive power to its entrance surface, with the result that the occurrence of spherical aberrations and coma can be held back. In this arrangement, only the image side-surface of the second negative lens that faces away the aperture stop has diverging action, and the first positive lens is not effective for correction of off-axis aberrations produced at the image side-surface of the second negative lens, especially chromatic aberration of magnification, because it is near to the aperture stop and chief rays through the periphery of a screen become low. For this reason, unless the meniscus effect of the second negative lens is much too enhanced, it is then difficult to make correction for aberrations with the first positive lens alone. In favor of correction of those aberrations, therefore, of important significance is the power of the third positive lens located on the image side of the optical system with respect to the second negative lens, at which a rim chief ray becomes high, especially the power of its entrance surface, where the height of a rim chief ray is close to that through the second lens. To shorten the length of the optical system relative to its focal length, on the other hand, it is effective to rely on a telephoto type. In this case, unless there is a proper power profile, it is difficult, if not impossible, to achieve compactness, because the arrangement of the second negative lens and the third positive lens is reverse to that of the telephoto type. The meniscus shape of the negative meniscus lens also affects compactness, because its principal points are shifted toward the image side. It is thus desired that the entrance surfaces of the second negative lens and the third positive lens satisfy the following condition.

$$0.2 < r_{2f}/r_{3f} < 3.5 \quad (63)$$

Here $r_{2f}$ is the axial radius of curvature of the object side-surface of the second negative lens, and $r_{3f}$ is the axial radius of curvature of the object side-surface of the third positive lens.

As the upper limit of 3.5 to this condition is exceeded, the power of the entrance surface of the third positive lens becomes too strong, resulting in over-correction of off-axis aberrations, and as the lower limit of 0.2 is not reached, the negative power of the exit surface of the second negative lens becomes too strong, with the result that the performance of a screen deteriorates or effective compactness is hardly achievable.

More preferably, $$0.4 < r_{2f}/r_{3f} < 2.5 \quad (63\text{-}1)$$

In any case, too, it is desirable to give a proper power profile to the second negative lens and the third positive lens because both lenses have some influences on the performance of the periphery of the screen and compactness. It is thus desirable to satisfy the following condition.

$$-0.7 < f_2/f_3 < -0.1 \quad (64)$$

Here $f_2$ is the focal length of the second negative lens, and $f_3$ is the focal length of the third positive lens.

As the upper limit of −0.1 to this condition is exceeded, the power of the third positive lens becomes too weak or the power of the second negative lens becomes too strong, resulting in overcorrection of chromatic aberration of magnification and distortion, and as the lower limit of −0.7 is not reached, the power of the third positive lens becomes strong or the power of the second negative lens becomes too weak, resulting in under-correction of chromatic aberration of magnification and distortion.

More preferably, $$-0.5 < f_2/f_3 < -0.25 \tag{64-1}$$

It is here noted that the third positive lens located farthest off the aperture stop has the highest effect on correction of chromatic aberration of magnification and distortion, because rim light rays become highest there. Accordingly, if the third positive lens is configured in a meniscus shape that is convex on its image side as an example, aberrations can never be corrected because its entrance side has negative correction effect. It is thus desirable to satisfy the following condition.

$$-2.0 < (r_{3f}+r_{3r})/(r_{3f}-r_{3r}) < 0.8 \tag{65}$$

Here $r_{3f}$ is the axial radius of curvature of the object side-surface of the third positive lens, and $r_{3r}$ is the axial radius of curvature of the image side-surface of the third positive lens.

As the upper limit of 0.8 to this condition is exceeded, the correction effect of that entrance surface becomes slender with the result that chromatic aberration of magnification and distortion become worse, and as the lower limit of −2.0 is not reached, the meniscus shape convex on its object side becomes too steep with the result that coma and astigmatism become worse.

More preferably, $$-1.5 < (r_{3f}+r_{3r})/(r_{3f}-r_{3r}) < 0.5 \tag{65-1}$$

Even more preferably, the third positive lens is in a double-convex shape both surfaces of which have positive powers, and satisfies the following condition.

$$-0.95 < (r_{3f}+r_{3r})/(r_{3f}-r_{3r}) < 0.8 \tag{65-2}$$

Most preferably, $$-0.8 < (r_{3f}+r_{3r})/(r_{3f}-r_{3r}) < 0.1 \tag{65-3}$$

In this conjunction, it is preferable for the second negative lens to have a radius of curvature defined by the following condition.

$$1.2 < (r_{2f}+r_{2r})/(r_{2f}-r_{2r}) < 2.0 \tag{66}$$

Here $r_{2f}$ is the axial radius of curvature of the object side-surface of the second negative lens, and $r_{2r}$ is the axial radius of curvature of the image side-surface of the second negative lens.

As the upper limit of 2.0 to this condition is exceeded, the negative power of the object side of the second negative lens becomes too weak to make good correction for aberrations at the first positive lens, and as the lower limit of 1.2 is not reached, the power of the image side-surface of the second negative lens, where rim light rays become higher, becomes too weak with the result that chromatic aberration of magnification becomes worse.

More preferably, $$1.4 < (r_{2f}+r_{2r})/(r_{2f}-r_{2r}) < 1.8 \tag{66-1}$$

If the object side-surface of the second negative lens is defined by an aspheric surface, it is then possible to make good correction for aberrations. In this case, it is desired to satisfy the following condition.

$$0.01 < |(r_{2fs}+r_{2fa})/(r_{2fs}-r_{2fa})-1| < 100 \tag{67}$$

Here $r_{2fs}$ is the axial radius of curvature of the object side-surface of the second negative lens, and $r_{2fa}$ is the value of a difference between a radius of curvature $r_{ASP}$ of the object side-surface of the second negative lens with the aspheric surface taken into account and the axial radius of curvature, upon a difference between $r_{2fs}$ and said radius of curvature reaching a maximum.

It is here noted that the radius of curvature $r_{ASP}$ with the aspheric surface taken into consideration is defined by the following equation.

$$r_{ASP}=y\cdot(1+f'(y)^2)^{1/2}/f'(y)$$

Here f(y) is an aspheric surface defining equation (that is a shape function (wherein the direction of propagation of light from a plane tangential to an apex is defined as positive)), y is a height from an optical axis, and f'(y) is differential of first order.

As the upper limit of 100 to this condition is exceeded, the aspheric effect becomes too slender, leading to undercorrection that renders coma and astigmatism worse. As the lower limit of 0.01 is not reached, the aspheric effect becomes too noticeable leading to overcorrection, with the result that there is a deterioration of performance and lens processing becomes difficult.

More preferably, $$0.02 < |(r_{2fs}+r_{2fa})/(r_{2fs}-r_{2fa})-1| < 10.0 \tag{67-1}$$

Even more preferably, $$1.5 < |(r_{2fs}+r_{2fa})/(r_{2fs}-r_{2fa})-1| < 3.5 \tag{67-2}$$

If the image side-surface of the second negative lens is defined by an aspheric surface, then it is possible to make good correction for aberrations. In this case, it is desirable to satisfy the following condition.

$$0.01 < |(r_{2rs}+r_{2ra})/(r_{2rs}-r_{2ra})-1| < 100 \tag{68}$$

Here $r_{2rs}$ is the axial radius of curvature of the image side-surface of the second negative lens, and $r_{2ra}$ is the value of a difference between a radius of curvature of the image side-surface of the second negative lens with the aspheric surface taken into account and the axial radius of curvature, upon a difference between $r_{2rs}$ and said radius of curvature reaching a maximum.

As the upper limit of 100 to this condition is exceeded, the aspheric effect becomes too slender, leading to undercorrection that renders coma and astigmatism worse. As the lower limit of 0.01 is not reached, the aspheric effect becomes too noticeable leading to overcorrection, with the result that there is a deterioration of performance and lens processing becomes difficult.

More preferably, $$0.05 < |(r_{2rs}+r_{2ra})/(r_{2rs}-r_{2ra})-1| < 10.0 \tag{68-1}$$

Diverged by the second negative lens, light rays are likely to enter the object side-surface of the third positive lens at a steep angle, rendering astigmatism and coma likely to occur there. Especially in the case of a wide-angle optical system, it is necessary to make full correction for aberrations produced at that surface. For this reason, it is preferable that the object side-surface of the third positive lens is defined by an aspheric surface, and that aspheric surface has a slacking positive power. In this regard, it is desirable to satisfy the following condition.

$$0.01<|(r_{3fs}+r_{3fa})/(r_{3fs}-r_{3fa})-1|<100 \quad (69)$$

Here $r_{3fs}$ is the axial radius of curvature of the object side-surface of the third positive lens, and $r_{3fa}$ is the value of a difference between a radius of curvature of the object side-surface of the third positive lens with the aspheric surface taken into consideration and the axial radius of curvature, upon changing to maximum in a range inside of a point of the maximum image height through which a chief ray passes.

As the upper limit of 100 to condition (69) is exceeded, the aspheric effect becomes too slender, resulting in under-correction that renders coma and astigmatism worse, and as the lower limit of 0.01 is not reached, the aspheric effect becomes too noticeable, resulting in overcorrection that renders performance worse and lens processing difficult.

More preferably, $$0.05<|(r_{3fs}+r_{3fa})/(r_{3fs}-r_{3fa})-1|<10 \quad (69\text{-}1)$$

Closest to the image plane, the image side-surface of the third positive lens is relatively less capable of correcting aberrations such as spherical aberrations and coma, because a light beam passing through that surface becomes thin. For this reason, distortion that is a chief ray aberration can be corrected primarily at the image side-surface of the third positive lens without having influences on those aberrations. Therefore, it is desired that the aspheric surface be used at that surface, and have a slacking positive power. If the positive power is much too weak, however, the angle of incidence of light on the image plane then becomes steep. In other words, that positive power must be increased to a certain degree; it is desirable for the aspheric surface to satisfy the following condition.

$$0.01<|(r_{3rs}+r_{3ra})/(r_{3rs}-r_{3ra})-1|<100 \quad (70)$$

Here $r_{3rs}$ is the axial radius of curvature of the image side-surface of the third positive lens, and $r_{3ra}$ is the value of a difference between a radius of curvature of the image side-surface of the third positive lens with the aspheric surface taken into consideration and the axial radius of curvature, upon changing to maximum in a range inside of a point of the maximum image height through which a chief ray passes.

As the upper limit of 100 to this condition is exceeded, the aspheric effect becomes too slender to make good correction for distortion, and as the lower limit of 0.01 is not reached, the angle of incidence of light on the image plane becomes large.

More preferably, $$0.05<|(r_{3rs}+r_{3ra})/(r_{3rs}-r_{3ra})-1|<10 \quad (70\text{-}1)$$

Even more preferably, $$0.1<|(r_{3rs}+r_{3ra})/(r_{3rs}-r_{3ra})-1|<2.5 \quad (70\text{-}2)$$

When a CCD is used for the image pickup device, an image varies in brightness between the central portion and the peripheral portion thereof upon incidence of an off-axis light beam from the image-formation optical system on an image plane at too large an angle. Upon incidence of that light beam on the image plane at a small angle, on the other hand, this problem may be solved to a certain degree, but now the optical system becomes long. It is thus desired to satisfy the following condition.

$$10°<\alpha<40° \quad (71)$$

Here $\alpha$ is the angle of incidence of a chief ray on the image plane at the maximum image height.

As the upper limit of 40° to this condition is exceeded, the angle of incidence of the chief ray on the CCD becomes too large, resulting in a lowering of the brightness of the peripheral portion of the image, and as the lower limit of 10° is not reached, the optical system becomes too long.

More preferably, $$15°<\alpha<35° \quad (71\text{-}1)$$

Even more preferably, $$17.5°<\alpha<25° \quad (71\text{-}2)$$

The fifth aspect of the invention encompasses an electronic imaging system comprising any one of the above image-formation optical systems and an image pickup device located on an image side thereof.

Preferably in that case, the half angle of view of the image-formation optical system should be 30° to 50° inclusive.

At less than 30° that is the lower limit, the phototaking range of the imaging system becomes narrow. At greater than 50° that is the upper limit, distortion tends to occur, and the angle of incidence of a light beam on the periphery of the effective image pickup area of the imaging system becomes large, leading to the likelihood of an image degradation.

Another imaging system according to the fifth aspect of the invention is characterized by comprising an image-formation optical system comprising, in order from an object side thereof, an aperture stop, a first positive lens that is convex on an image side thereof, a second negative lens and a third positive lens, and an image pickup device located on an image side of the image-formation optical system, wherein said aperture stop has an aperture of fixed shape through which an optical axis of the image-formation optical system passes, wherein a rim surface of the aperture is inclined down at an angle of inclination not smaller than the angle of incidence of the farthest off-axis light beam in such a way as to come closer to the optical axis on an image plane side thereof.

Advantages and actions of this system are now explained. As light reflected at the rim surface of the aperture stop enters the image-formation optical system, phenomena such as ghosts and flares are apt to occur. Referring particularly to a small-format image-formation optical system comprising, in order from an object side thereof, an aperture stop, a first positive lens, a second negative lens and a third positive lens such as an inventive one, light reflected at the rim surface of the aperture stop has relatively large influences thereon, because the image pickup plane of an associated image pickup device becomes small too.

According to the fifth aspect of the invention wherein the aperture stop is located nearest to the object side of the image-formation optical system, the rim surface of the aperture of fixed shape in the aperture stop is inclined down at an angle of inclination not smaller than the angle of incidence of the farthest off-axis light beam in such a way as to come closer to the optical axis on its image side.

This arrangement makes a light beam reflected at the rim surface of the aperture less likely to enter the image pickup device so that the influences of flares and ghosts can be reduced.

Yet another imaging system according to the fifth aspect of the invention is characterized by comprising an image-formation optical system comprising, in order from its object side thereof, an aperture stop, a first positive lens that is convex on its image side, a second negative lens and a third positive lens, and an image pickup device located on an image side of the image-formation optical system, wherein the imaging system further comprises a lens barrel for holding said image-formation optical system and said image pickup device, wherein said lens barrel is integrally molded of the same resin material of which said aperture stop is formed.

Advantages and actions of this arrangement are now explained. In the optical system according to the fifth aspect of the invention, the aperture stop is positioned nearest to the object side thereof, and the effective surfaces of the first, second and third lenses subsequent thereto become large in this order toward the image side of the optical system. Accordingly, if the lens barrel for holding these lenses is integrally molded of the same, easily moldable resin material, then it is possible to insert the lenses into the lens barrel from its image plane side and bring them in alignment with one another, so that the optical system can be easily fabricated.

In this case, if the aperture stop is made integral with the lens barrel, it is then possible to substantially cut back fabrication steps, and if the lens barrel itself is provided with a function of retaining the image pickup device, it is then possible to make dust less likely to enter the lens barrel.

A further imaging system according to the fifth aspect of the invention is characterized by comprising an image-formation optical system comprising, in order from an object side thereof, a first positive lens that is convex on its image side thereof, a second negative lens and a third positive lens, and an image pickup device located on an image side of the image-formation optical system, wherein the imaging system further comprises a lens barrel for holding said image-formation optical system, wherein each of at least the first positive lens and the third positive lens has an inclined rim that is inclined down in such a way as to come closer to an optical axis of the image-formation optical system on an object side thereof, said inclined rim being in engagement with said lens barrel.

Advantages and actions of this arrangement are now explained. In the optical system according to the fifth aspect of the invention, the aperture stop is positioned nearest to the object side thereof, and the effective surfaces of the first, second and third lenses subsequent thereto become large in this order toward the image side thereof. This is particularly true for the first positive lens and the third positive lens. According to the above arrangement, therefore, the contour of the lens assembly is consistent with off-axis light beams, so that the optical system can be made compact while shading is held back, and by inserting the lenses into the lens barrel from its image plane side, they can be so positioned that the optical system can be easily fabricated.

It is here acceptable that all the lenses are provided with rims that are inclined down in such a way as to come closer to the optical axis on the object side of the optical system, wherein the inclined rims are in engagement with the lens barrel.

A further imaging system according to the fifth aspect of the invention is characterized by comprising an image-formation optical system comprising, in order from its object side thereof, an aperture stop, a first positive lens that is convex on its image side, a second negative lens and a third positive lens, and an image pickup device located on an image side of the image-formation optical system, wherein the imaging system further comprises a lens barrel for holding said image-formation optical system, wherein as viewed from an entrance side of the image-formation optical system, said first positive lens looks as a circle and, as viewed from that entrance side, said third positive lens is configured in such a way that the length of a direction corresponding to the short-side direction of an effective image pickup area of the image pickup device is shorter than the length of a direction corresponding to the long-side direction of the effective image pickup area.

Advantages and actions of this arrangement are now explained. In the optical system according to the fifth aspect of the invention, the aperture stop is positioned nearest to the object side thereof; the effective surfaces of the first, second and third lenses subsequent thereto become large in this order toward the image side thereof, and the shape of an effective light beam comes closer to the shape of the effective image pickup area on the image side of the optical system. According to the above arrangement, therefore, the contour of the lens assembly is consistent with the shape of the effective light beam, so that the optical system can be made compact while shading is held back.

Commonly to each of the above broader conditions, the upper and lower limits thereof could be reduced down to those of the corresponding narrower condition(s).

It is understood that if the above conditions are applied in suitable combinations as desired, the advantages of the fifth aspect of the invention are then much more enhanced.

Examples 1 to 4 of the image-formation optical system according to the first aspect of the invention are given below. FIGS. 1 to 4 are illustrative in section of the lens arrangements of Examples 1 to 4 upon focused on an object point at infinity. In these figures, S stands for an aperture stop, L1 a first positive lens, L2 a second negative lens, L3 a third positive lens, CG a cover glass for an electronic image pickup device, and I an image plane. It is noted that the cover glass CG may be provided on its surface with a wavelength range-limiting multilayer film, with or without a low-pass filter function.

EXAMPLE 1

As shown in FIG. 1, the image-formation optical system of Example 1 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instant example, the first, second and third lenses L1, L2 and L3 are all made up of plastics. More specifically, the first lens L1 and the third lens L3 are each made of an amorphous polyolefin Zeonex (trade name), and the second lens L2 is made of polycarbonate.

The specifications of the wide-angle optical system according to this example are:

a focal length f=3.3 mm, an image height Ih=2.4 mm, and a half angle of view ω=34°.

The optically effective diameters of the respective lenses (on one sides) are 0.644 mm for $2^{nd}$ surface $r_2$, 0.962 mm for $3^{rd}$ surface $r_3$, 1.144 mm for $4^{th}$ surface $r_4$, 1.247 mm for $5^{th}$ surface $r_5$, 1.526 mm for $6^{th}$ surface $r_6$, and 1.815 mm for $7^{th}$ surface $r_7$.

EXAMPLE 2

Figure 2:
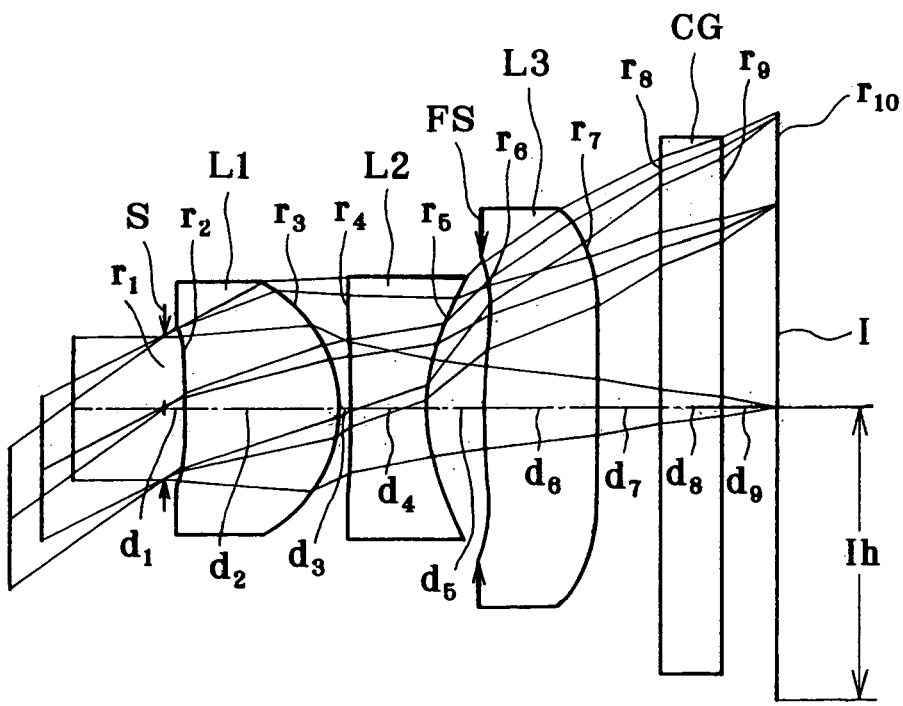
FIG. 2 is a lens arrangement section similar to FIG. 1 of Example 2 of the image-formation optical system.

As shown in FIG. 2, the image-formation optical system of Example 2 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive meniscus lens L3 that is convex on its object side and has aspheric surfaces on both its sides, and a cover glass CG. In the instant example, the first lens and second lens L1 and L2 are each made of glass, and the third lens L3 is made of plastics. More specifically, the third lens L3 is made of an amorphous polyolefin Zeonex (trade name).

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.667 mm for $2^{nd}$ surface $r_2$, 1.043 mm for $3^{rd}$ surface $r_3$, 1.088 mm for $4^{th}$ surface $r_4$, 1.062 mm for $5^{th}$ surface $r_5$, 1.195 mm for $6^{th}$ surface $r_6$, and 1.641 mm for $7^{th}$ surface $r_7$.

EXAMPLE 3

Figure 3:
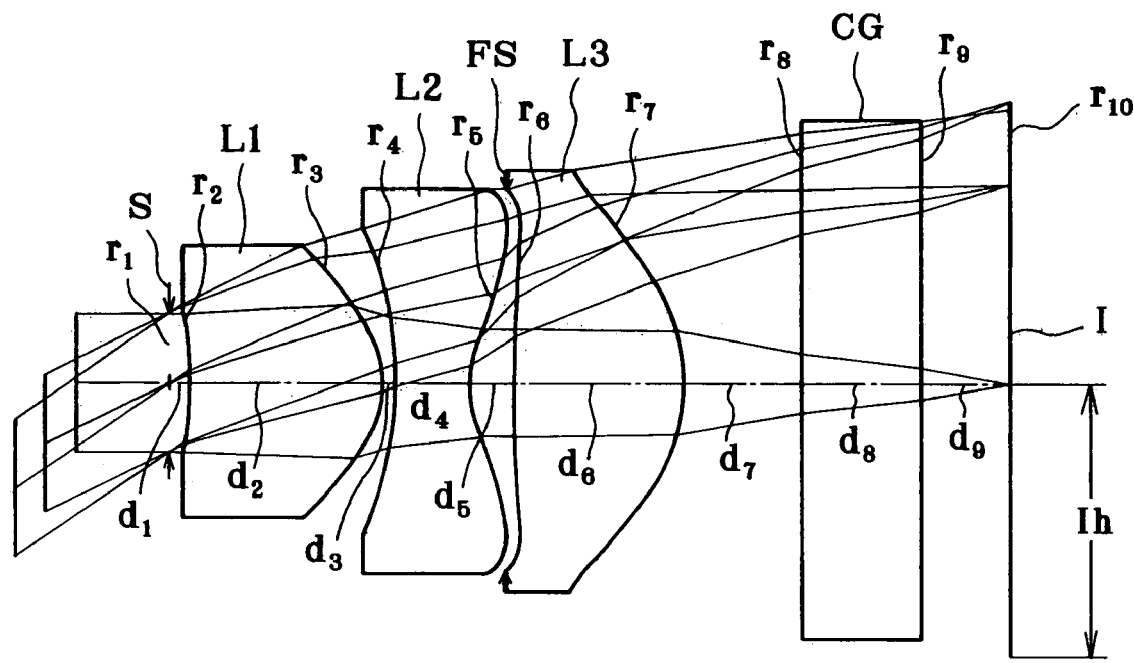
FIG. 3 is a lens arrangement section similar to FIG. 1 of Example 3 of the image-formation optical system.

As shown in FIG. 3, the image-formation optical system of Example 3 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instant example, the first and third lenses L1 and L3 are each made of plastics and the second lens L2 is made of glass. More specifically, the first lens L1 and the third lens L3 are each made of an amorphous polyolefin Zeonex (trade name).

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.670 mm for $2^{nd}$ surface $r_2$, 1.163 mm for $3^{rd}$ surface $r_3$, 1.309 mm for $4^{th}$ surface $r_4$, 1.641 mm for $5^{th}$ surface $r_5$, 1.624 mm for $6^{th}$ surface $r_6$, and 1.791 mm for $7^{th}$ surface $r_7$.

EXAMPLE 4

Figure 4:
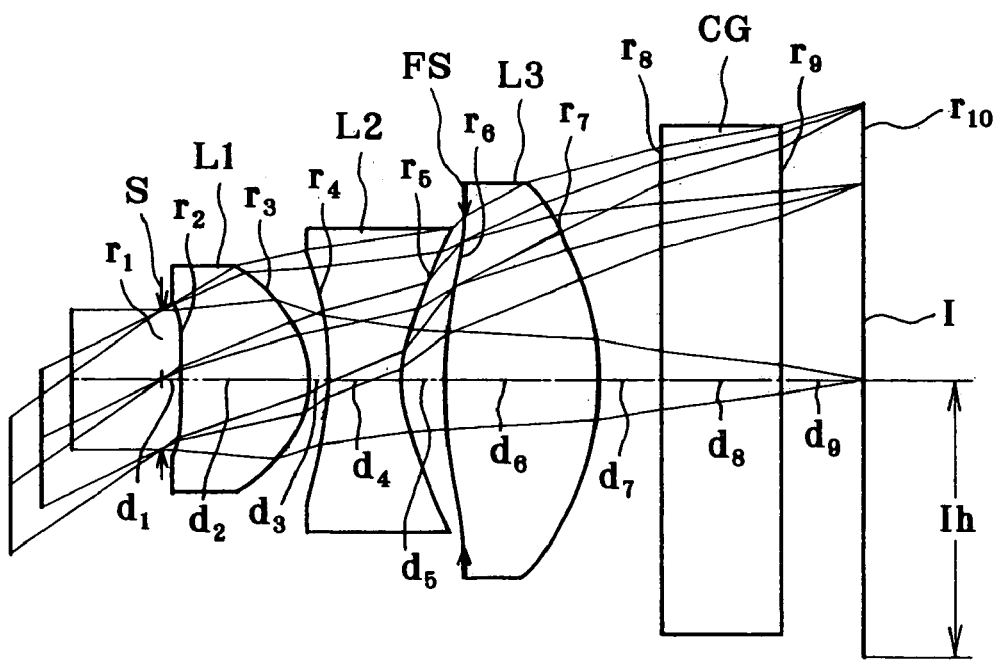
FIG. 4 is a lens arrangement section similar to FIG. 1 of Example 4 of the image-formation optical system.
Figure 5:
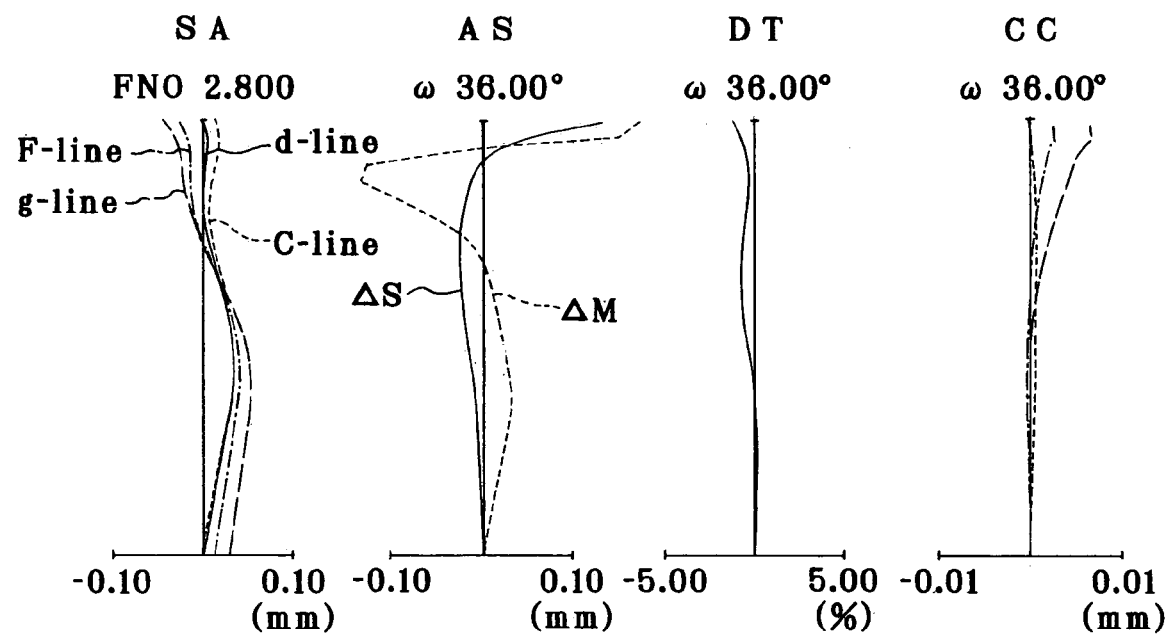
FIG. 5 is an aberration diagram for Example 1 upon focused on an object point at infinity.
Figure 6:
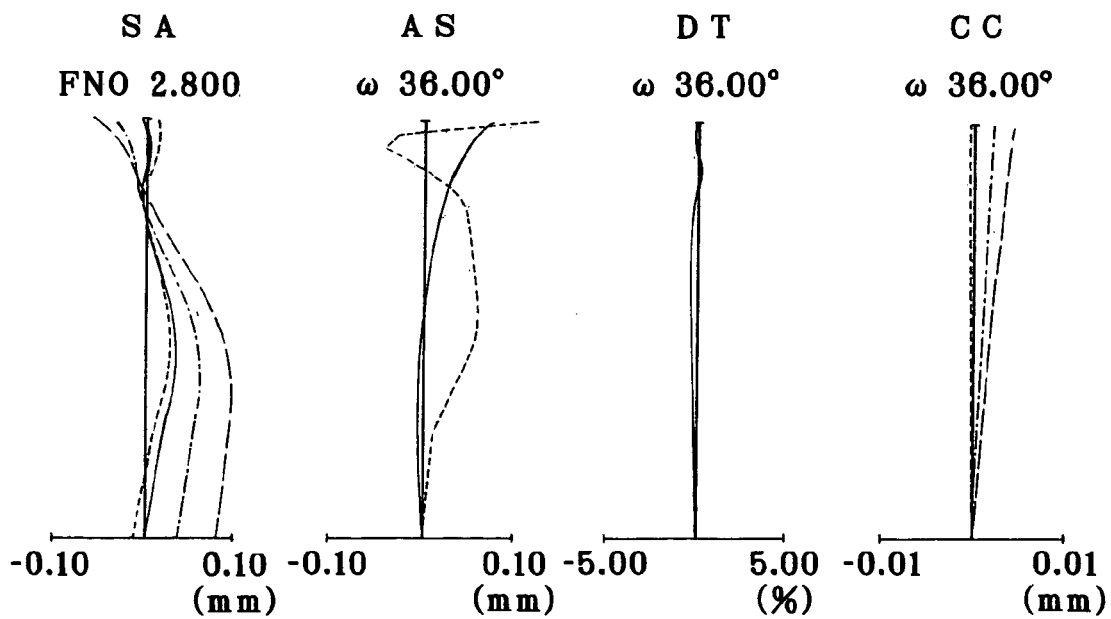
FIG. 6 is an aberration diagram for Example 2 upon focused on an object point at infinity.
Figure 7:
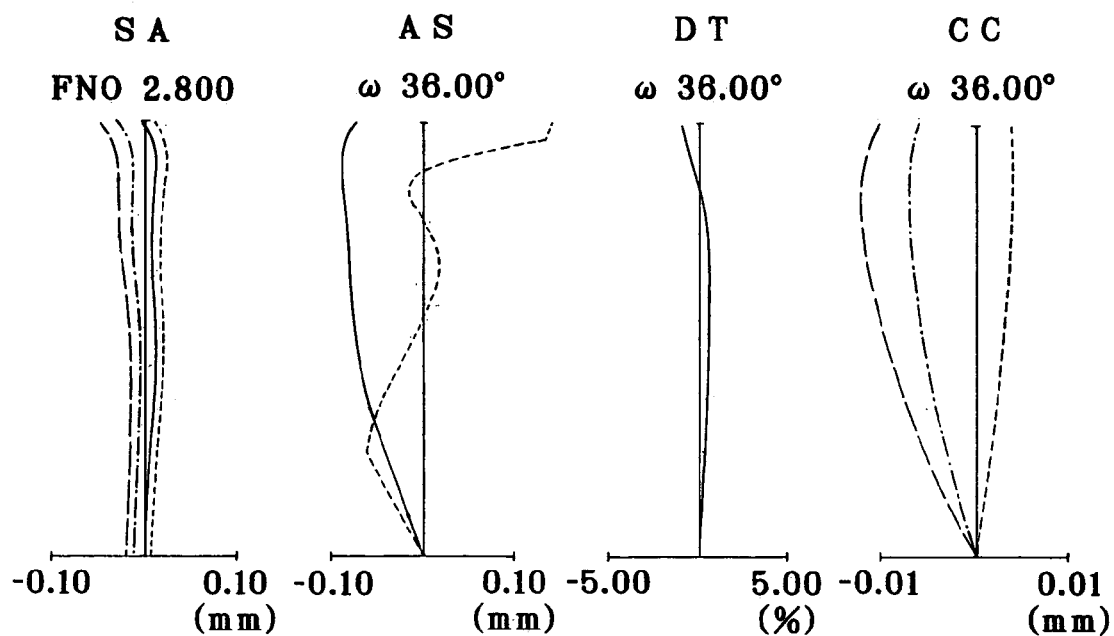
FIG. 7 is an aberration diagram for Example 3 upon focused on an object point at infinity.
Figure 8:
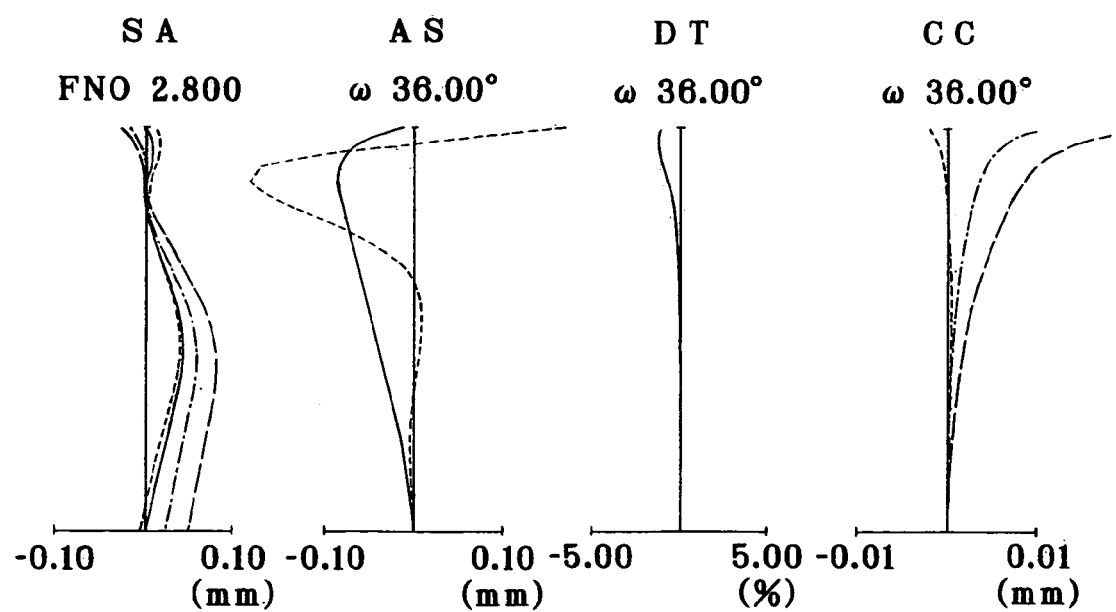
FIG. 8 is an aberration diagram for Example 4 upon focused on an object point at infinity.

As shown in FIG. 4, the image-formation optical system of Example 4 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instant example, the first, second and third lenses L1, L2 and L3 are all made up of plastics. More specifically, the first lens L1 and the third lens L3 are each made of an amorphous polyolefin Zeonex (trade name), and the second lens L2 is made of polycarbonate.

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.652 mm for $2^{nd}$ surface $r_2$, 0.962 mm for $3^{rd}$ surface $r_3$, 1.097 mm for $4^{th}$ surface $r_4$, 1.291 mm for $5^{th}$ surface $r_5$, 1.397 mm for $6^{th}$ surface $r_6$, and 1.682 mm for $7^{th}$ surface $r_7$.

The numerical data on each example are given below. Symbols used hereinafter but not hereinbefore have the following meanings:
$r_1, r_2, \ldots$ : radius of curvature of each lens surface,
$d_1, d_2, \ldots$ : spacing between adjacent lens surfaces,
$n_{d1}, n_{d2}, \ldots$ : d-line refractive index of each lens, and
$\nu_{d1}, \nu_{d2}, \ldots$ : Abbe number of each lens.

Here let x be an optical axis on condition that the direction of propagation of light is positive and y be a direction orthogonal to the optical axis. Then, aspheric configuration is given by the following equation (a).

$$x=(y^2/r)/[1+\{1-(K+1)(y/r)^2\}^{1/2}]+A_4y^4+A_6y^6+A_8y^8+A_{10}y^{10} \quad (a)$$

where r is an axial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | |
|---|---|---|---|
| $r_1 = \infty$(Stop) | $d_1 = 0.1500$ | | |
| $r_2 = -6.5436$(Aspheric) | $d_2 = 1.0517$ | $n_{d1} = 1.52542$ | $\nu_{d1} = 55.78$ |
| $r_3 = -0.7168$(Aspheric) | $d_3 = 0.1000$ | | |
| $r_4 = -30.0120$(Aspheric) | $d_4 = 0.6000$ | $n_{d2} = 1.58423$ | $\nu_{d2} = 30.49$ |
| $r_5 = 0.7919$(Aspheric) | $d_5 = 0.5843$ | | |
| $r_6 = 3.9990$(Aspheric) | $d_6 = 1.2677$ | $n_{d3} = 1.52542$ | $\nu_{d3} = 55.78$ |
| $r_7 = -2.9858$(Aspheric) | $d_7 = 0.5000$ | | |
| $r_8 = \infty$ | $d_8 = 1.0000$ | $n_{d4} = 1.51633$ | $\nu_{d4} = 64.14$ |
| $r_9 = \infty$ | $d_9 = 0.3868$ | | |
| $r_{10} = \infty$(Image Plane) | | | |

| Aspherical Coefficients |
|---|

2nd surface

K = 16.6569
$A_4 = -2.1175 \times 10^{-1}$
$A_6 = 2.4986 \times 10^{-1}$
$A_8 = -1.0799$
$A_{10} = 6.7759 \times 10^{-1}$ 3rd surface K = −3.0582
$A_4 = -2.0333 \times 10^{-1}$
$A_6 = -1.0575 \times 10^{-2}$
$A_8 = 3.6568 \times 10^{-2}$
$A_{10} = -7.2420 \times 10^{-2}$ 4th surface K = 0
$A_4 = 2.1456 \times 10^{-2}$
$A_6 = -4.1265 \times 10^{-2}$
$A_8 = 3.3083 \times 10^{-2}$
$A_{10} = -3.5946 \times 10^{-3}$ 5th surface K = −5.0261
$A_4 = 1.4181 \times 10^{-2}$
$A_6 = 1.8308 \times 10^{-2}$
$A_8 = -2.1621 \times 10^{-2}$ -continued $A_{10} = 7.4684 \times 10^{-3}$
6th surface $K = 0$
$A_4 = -7.3992 \times 10^{-2}$
$A_6 = 5.0526 \times 10^{-2}$
$A_8 = -1.0842 \times 10^{-2}$
$A_{10} = -5.7950 \times 10^{-4}$
7th surface $K = -6.1449$
$A_4 = -1.2884 \times 10^{-2}$
$A_6 = -1.7773 \times 10^{-2}$
$A_8 = 1.5345 \times 10^{-2}$
$A_{10} = -3.1206 \times 10^{-3}$

EXAMPLE 2

$r_1 = \infty$(Stop)         $d_1 = 0.1500$
$r_2 = -163.0826$(Aspheric)  $d_2 = 1.2486$  $n_{d1} = 1.71700$  $\nu_{d1} = 47.90$
$r_3 = -0.8468$(Aspheric)    $d_3 = 0.1000$
$r_4 = -7.1595$(Aspheric)    $d_4 = 0.6000$  $n_{d2} = 1.84666$  $\nu_{d2} = 23.80$
$r_5 = 1.0846$(Aspheric)     $d_5 = 0.4862$
$r_6 = 2.8595$(Aspheric)     $d_6 = 0.9365$  $n_{d3} = 1.52542$  $\nu_{d3} = 55.78$
$r_7 = 21.6886$(Aspheric)    $d_7 = 0.5000$
$r_8 = \infty$               $d_8 = 0.5000$  $n_{d4} = 1.51633$  $\nu_{d4} = 64.10$
$r_9 = \infty$               $d_9 = 0.4488$
$r_{10} = \infty$(Image Plane)

Aspherical Coefficients

2nd surface $K = 17.3876$
$A_4 = -1.6527 \times 10^{-1}$
$A_6 = 1.6223 \times 10^{-1}$
$A_8 = -7.9356 \times 10^{-1}$
$A_{10} = 4.3502 \times 10^{-1}$
3rd surface $K = -3.7934$
$A_4 = -1.5515 \times 10^{-1}$
$A_6 = -1.2895 \times 10^{-3}$
$A_8 = 5.4504 \times 10^{-3}$
$A_{10} = -1.9223 \times 10^{-2}$
4th surface $K = 0$
$A_4 = 6.7955 \times 10^{-2}$
$A_6 = -5.9704 \times 10^{-2}$
$A_8 = 3.8965 \times 10^{-2}$
$A_{10} = -3.5723 \times 10^{-3}$
5th surface $K = -8.5753$
$A_4 = 2.1750 \times 10^{-2}$
$A_6 = 4.8974 \times 10^{-2}$
$A_8 = -4.1661 \times 10^{-2}$
$A_{10} = 1.8845 \times 10^{-2}$
6th surface $K = 0$
$A_4 = -2.0748 \times 10^{-1}$
$A_6 = 1.0850 \times 10^{-1}$
$A_8 = -4.7593 \times 10^{-2}$
$A_{10} = 5.6268 \times 10^{-3}$
7th surface $K = -23.8701$
$A_4 = -4.0887 \times 10^{-2}$
$A_6 = -7.4333 \times 10^{-3}$
$A_8 = 7.2471 \times 10^{-3}$ -continued $A_{10} = -2.3127 \times 10^{-3}$

EXAMPLE 3

$r_1 = \infty$(Stop)         $d_1 = 0.1500$
$r_2 = -9.6860$(Aspheric)    $d_2 = 1.6384$  $n_{d1} = 1.52542$  $\nu_{d1} = 55.78$
$r_3 = -0.6937$(Aspheric)    $d_3 = 0.1018$
$r_4 = -5.1048$(Aspheric)    $d_4 = 0.6000$  $n_{d2} = 1.70514$  $\nu_{d2} = 41.20$
$r_5 = 0.8648$(Aspheric)     $d_5 = 0.3762$
$r_6 = 6.5333$(Aspheric)     $d_6 = 1.4299$  $n_{d3} = 1.52542$  $\nu_{d3} = 55.78$
$r_7 = -1.4995$(Aspheric)    $d_7 = 1.0000$
$r_8 = \infty$               $d_8 = 1.0000$  $n_{d4} = 1.51633$  $\nu_{d4} = 64.10$
$r_9 = \infty$               $d_9 = 0.7389$
$r_{10} = \infty$(Image Plane)

Aspherical Coefficients

2nd surface $K = -59.1814$
$A_4 = -1.2120 \times 10^{-1}$
$A_6 = 3.1625 \times 10^{-1}$
$A_8 = -9.7874 \times 10^{-1}$
$A_{10} = 9.8482 \times 10^{-1}$
3rd surface $K = -3.1900$
$A_4 = -9.8717 \times 10^{-2}$
$A_6 = 2.5463 \times 10^{-3}$
$A_8 = -2.6289 \times 10^{-3}$
$A_{10} = 7.4538 \times 10^{-3}$
4th surface $K = 12.0804$
$A_4 = -2.4281 \times 10^{-2}$
$A_6 = -3.1148 \times 10^{-2}$
$A_8 = 2.2428 \times 10^{-2}$
$A_{10} = 6.2579 \times 10^{-4}$
5th surface $K = -7.2129$
$A_4 = -6.7698 \times 10^{-2}$
$A_6 = 4.6894 \times 10^{-2}$
$A_8 = -1.9662 \times 10^{-2}$
$A_{10} = 1.7027 \times 10^{-3}$
6th surface $K = 0$
$A_4 = -9.2594 \times 10^{-2}$
$A_6 = 6.9802 \times 10^{-2}$
$A_8 = -1.7483 \times 10^{-2}$
$A_{10} = -5.7216 \times 10^{-4}$
7th surface $K = -2.7819$
$A_4 = -5.2887 \times 10^{-2}$
$A_6 = 6.6560 \times 10^{-4}$
$A_8 = 4.8128 \times 10^{-3}$
$A_{10} = -5.7750 \times 10^{-4}$

EXAMPLE 4

$r_1 = \infty$(Stop)         $d_1 = 0.1500$
$r_2 = -12.6294$(Aspheric)   $d_2 = 1.0730$  $n_{d1} = 1.52542$  $\nu_{d1} = 55.78$
$r_3 = -0.7143$(Aspheric)    $d_3 = 0.1409$
$r_4 = -2.9570$(Aspheric)    $d_4 = 0.6000$  $n_{d2} = 1.58423$  $\nu_{d2} = 30.49$
$r_5 = 0.8935$(Aspheric)     $d_5 = 0.3713$ -continued

| | | | |
|---|---|---|---|
| $r_6 = 3.3450$(Aspheric) | $d_6 = 1.3104$ | $n_{d3} = 1.52542$ | $\nu_{d3} = 55.78$ |
| $r_7 = -2.1798$(Aspheric) | $d_7 = 0.5000$ | | |
| $r_8 = \infty$ | $d_8 = 1.0000$ | $n_{d4} = 1.51633$ | $\nu_{d4} = 64.10$ |
| $r_9 = \infty$ | $d_9 = 0.6950$ | | |
| $r_{10} = \infty$(Image Plane) | | | |

Aspherical Coefficients

2nd surface $K = 151.6475$
$A_4 = -2.1628 \times 10^{-1}$
$A_6 = 3.0208 \times 10^{-1}$
$A_8 = -1.2104$
$A_{10} = 7.1578 \times 10^{-1}$ 3rd surface $K = -2.9151$
$A_4 = -2.0522 \times 10^{-1}$
$A_6 = -2.2638 \times 10^{-2}$
$A_8 = 5.9992 \times 10^{-2}$
$A_{10} = -9.5552 \times 10^{-2}$ 4th surface $K = 3.6058$
$A_4 = 5.2938 \times 10^{-2}$
$A_6 = -4.8469 \times 10^{-2}$
$A_8 = 4.4066 \times 10^{-2}$
$A_{10} = 2.4170 \times 10^{-3}$ 5th surface $K = -6.2499$
$A_4 = -1.9244 \times 10^{-2}$
$A_6 = 4.2544 \times 10^{-2}$
$A_8 = -3.3552 \times 10^{-2}$
$A_{10} = 9.7446 \times 10^{-3}$ 6th surface $K = 0$
$A_4 = -1.1018 \times 10^{-1}$
$A_6 = 9.8531 \times 10^{-2}$
$A_8 = -4.0642 \times 10^{-2}$
$A_{10} = 4.6017 \times 10^{-3}$ 7th surface $K = -5.6092$
$A_4 = -3.7110 \times 10^{-2}$
$A_6 = -1.1639 \times 10^{-4}$
$A_8 = 1.0065 \times 10^{-2}$
$A_{10} = -3.0086 \times 10^{-3}$ FIGS. 5 to 8 are aberration diagrams for Examples 1 to 4 upon focused at infinity. In these figures, "SA", "AS", "DT", "CC" and "ω" represent spherical aberrations, astigmatism, distortion, chromatic aberration of magnification and a half angle of view, respectively.

The values of conditions (1) to (13) in Examples 1 to 4 are enumerated below.

| Condition | Example 1 | Example 2 | Example 3 | Example 4 |
|---|---|---|---|---|
| (1) | 0.95 | 0.74 | 0.71 | 0.54 |
| (2) | 0.024 | 0.12 | 0.14 | 0.24 |
| (3) | −0.55 | −0.45 | −0.42 | −0.46 |
| (4) | −1.30 | −0.43 | −3.30 | −1.52 |
| (5) | −0.38 | −0.17 | −0.41 | −0.41 |
| (6) | 0.38 | 1.06 | 2.51 | 2.43 |
| (7) | 3.06 | 4.20 | 1.45 | 2.90 |
| (8) | 18.9° | 30.4° | 15.8° | 20.4° |
| (9) | 0.44 | 0.34 | 0.41 | 0.42 |
| (10) | 0.60 | 0.47 | 0.56 | 0.58 |
| (11) | 1.45 | 2.57 | 1.03 | 1.14 |
| (12) | −0.40 | −0.33 | −0.31 | −0.34 |
| (13) | 1.05 | 1.87 | 0.75 | 0.83 |

In the first aspect of the invention, it is understood that the maximum image height Ih at the image plane is defined by ½ of the diagonal length L of the (substantially rectangular) effective image pickup area of the image pickup device used. More specifically, when a field frame is located as means for defining the image pickup area, the maximum image height is given by ½ of the diagonal length L of the field frame, and when an image pickup device such as a solid-state image pickup device is used, it is given by ½ of the diagonal length L of its effective image pickup area.

Figure 9:
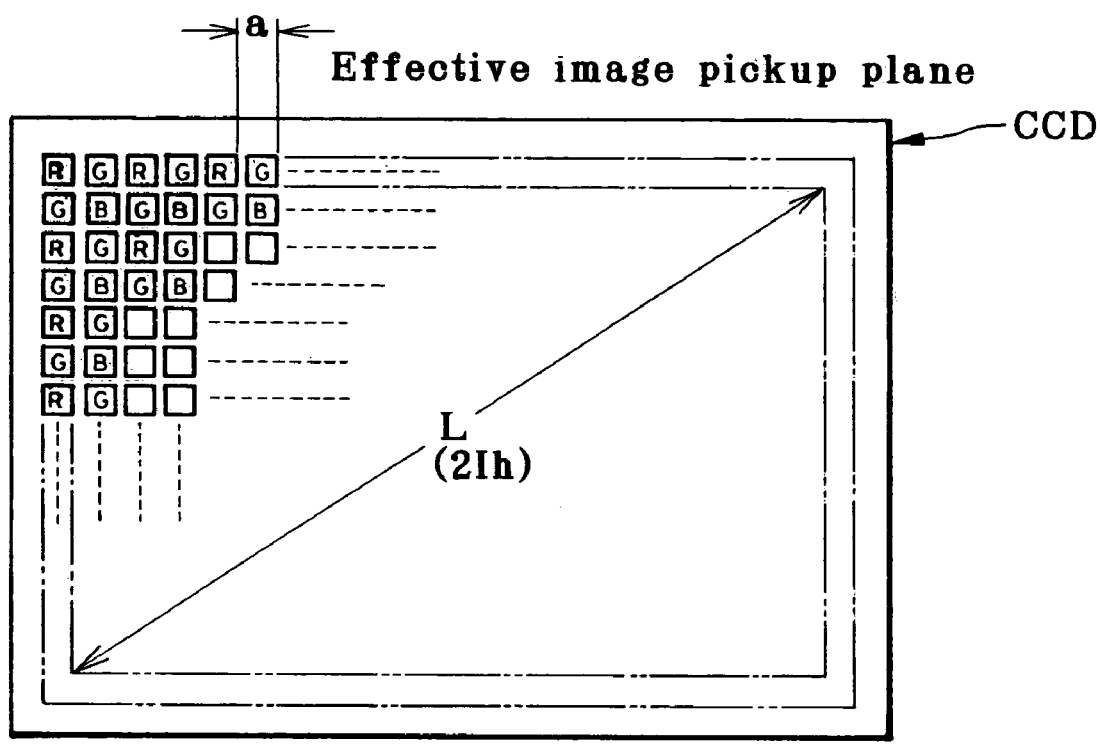
FIG. 9 is illustrative of the diagonal length L of the effective image pickup plane of an image pickup device used for phototaking, by which the maximum image height Ih is defined.

Referring here to a CCD or other electronic image pickup device used as the image pickup recording medium, the diagonal length L of the effective image pickup plane (area) of the electronic image pickup device and the pixel spacing a are explained. FIG. 9 is illustrative of one exemplary pixel array for the image pickup device, wherein R (red), G (green) and B (blue) pixels are mosaically arranged at the pixel spacing a. The "effective image pickup plane." used herein is understood to mean a certain area in the photoelectric conversion surface on the image pickup device used for the reproduction of phototaken images (on a personal computer or by a printer). The effective image pickup plane shown in FIG. 9 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the image-formation optical system of the first aspect of the invention is used on an image pickup apparatus having such functions, the diagonal length L of its effective image pickup plane varies. In that case, the diagonal length L of the effective image pickup plane that defines the maximum image height Ih herein is given by the maximum value in the widest possible range for L.

Figure 10:
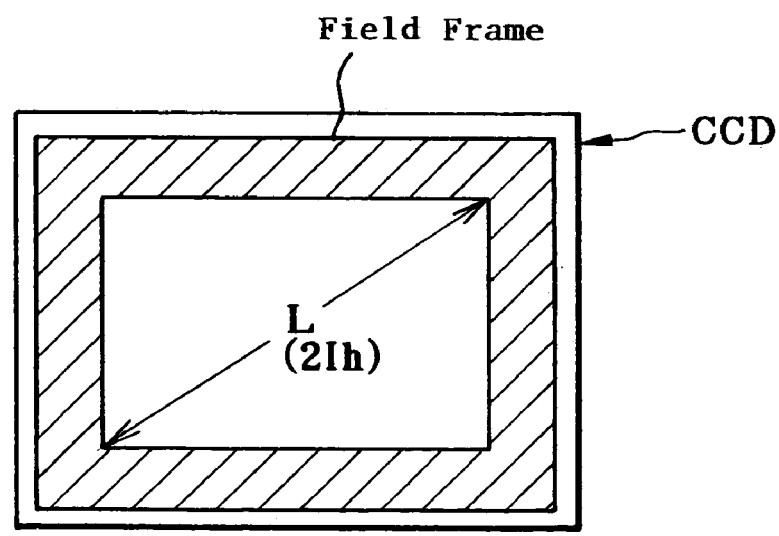
FIG. 10 is illustrative of the diagonal length L of an effective image pickup plane, by which the maximum image height Ih is defined when a field frame is located on the image pickup plane of an image pickup device.

FIG. 10 is illustrative of the diagonal length of a field frame when located on the image pickup plane of an electronic image pickup device such as a CCD. When an image formed on the CCD or other electronic image pickup device is used for phototaking purposes, its effective image pickup area is determined by an aperture in the field frame located just before the image pickup plane. In this case, too, the field frame may be configured in various forms; however, as in FIG. 9, the diagonal length L of the effective image pickup plane that defines the maximum image height Ih herein is given by the maximum value in the widest possible range for L.

Throughout Examples 1 to 4 according to the first aspect of the invention, the cover glass may be located just before the aperture stop S.

Throughout the above examples according to the first aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop FS in addition to the aperture stop S (as typically illustrated in FIGS. 1-4). That flare stop FS may be interposed at any desired position between the aperture stop S and the first lens L1, the first lens L1 and the second lens L2, the second lens L2 and the third lens L3, and the third lens L3 and the image plane I. Alternatively, a lens barrel may be used to cut off flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut off not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

With each of the above examples, images of good quality are obtained as can be seen from FIGS. 5-8, although it is of a small-format size.

In the example of the invention, the entrance side of the cover glass CG may be provided with a near-infrared cut coating, as already described. This near-infrared cut coating is designed to have a transmittance of at least 80% at 600 nm wavelength and a transmittance of up to 10% at 700 nm wavelength. More specifically, the near-infrared cut coating has a multilayer structure made up of such 27 layers as described in Table A as an example; however, the design wavelength is 780 nm.

TABLE A

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |

TABLE A-continued

| Substrate | Material | Physical Thickness (nm) | λ/4 |
|---|---|---|---|
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |
| Air | | | |

Figure 11:
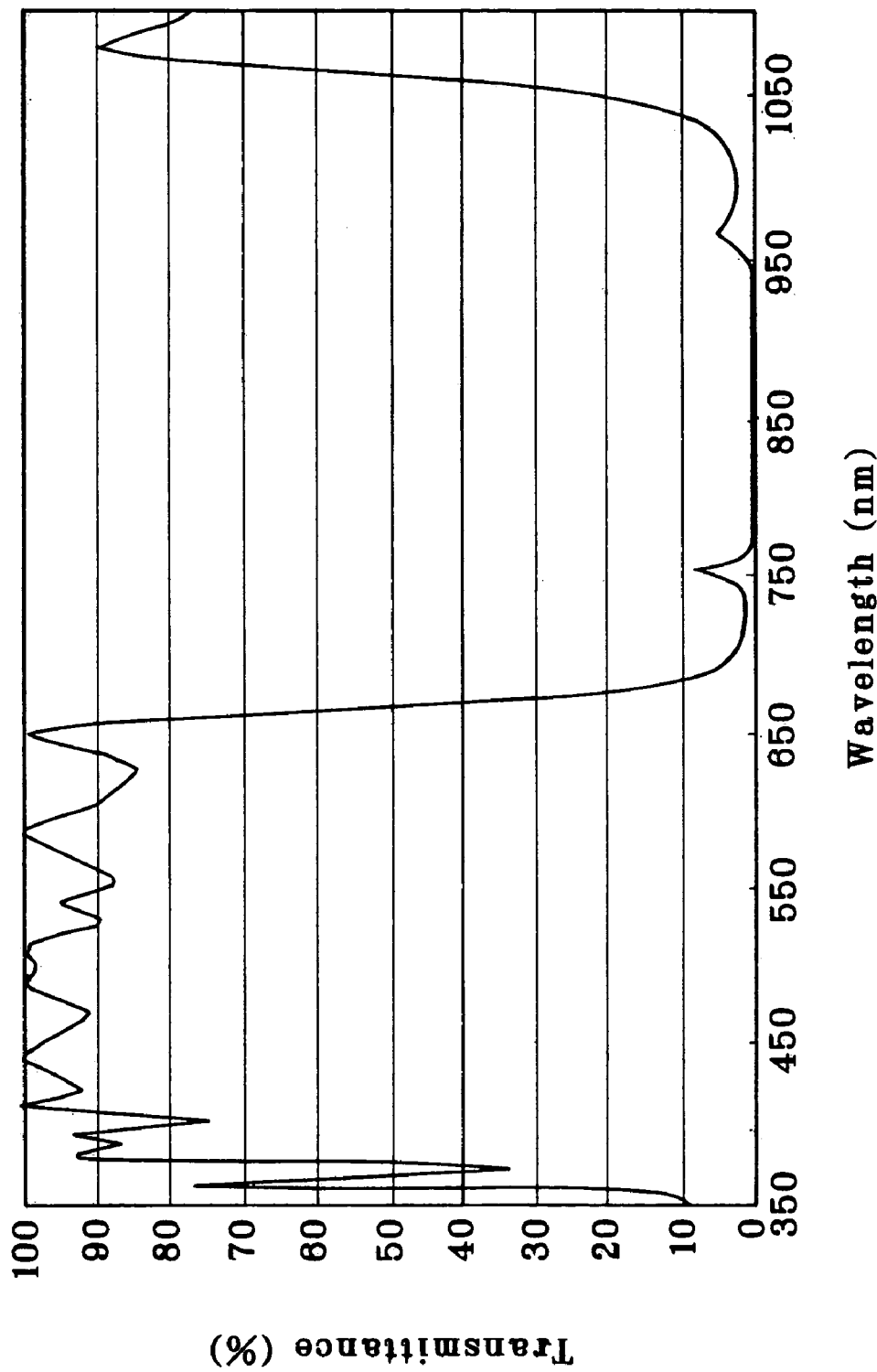
FIG. 11 is illustrative of the transmittance characteristics of one exemplary near infrared sharp cut coating.

The aforesaid near-infrared sharp cut coating has such transmittance characteristics as shown in FIG. 11.

Figure 12:
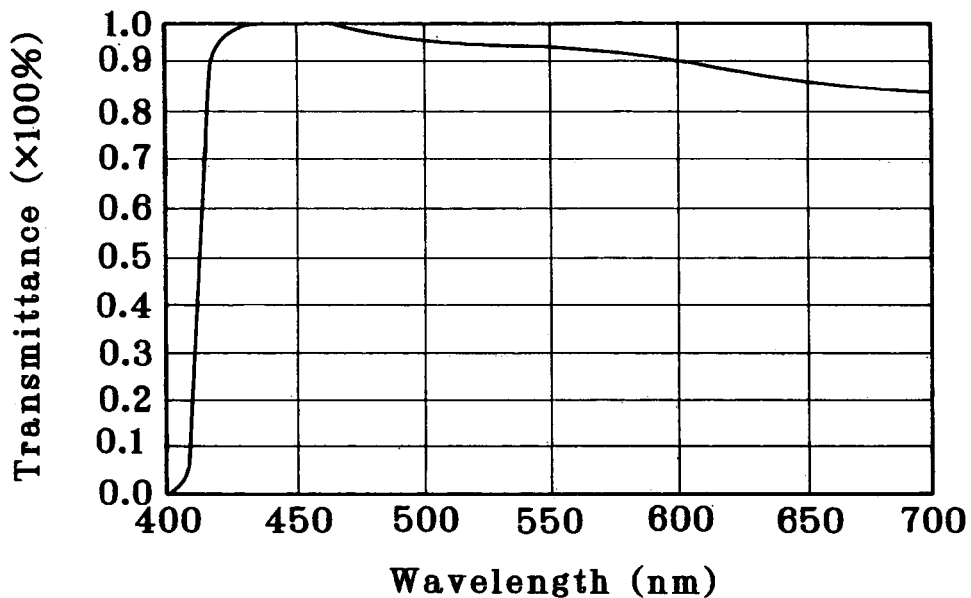
FIG. 12 is illustrative of the transmittance characteristics of one exemplary color filter located on the exit surface side of a low-pass filter.

A low-pass filter is provided on its exit surface side with a color filter or coating for reducing the transmission of colors at such a short wavelength range as shown in FIG. 12, thereby making the color reproducibility of an electronic image much higher.

Preferably, that filter or coating should be designed such that the ratio of the transmittance of 420 nm wavelength with respect to the highest transmittance of a wavelength that is found in the range of 400 nm to 700 nm is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength range perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 12, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter is made up of three different filter elements stacked one upon another in the optical axis direction, each filter element having crystal axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moire control, wherein SQRT means a square root.

Figure 13:
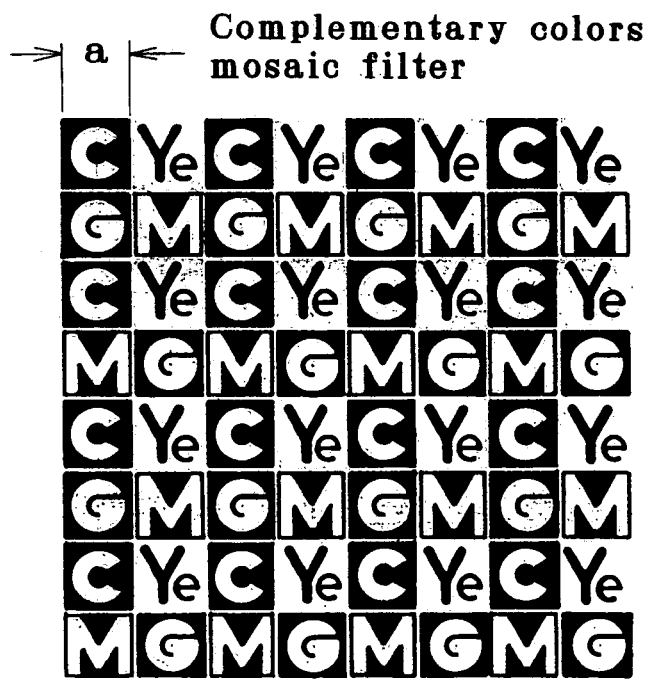
FIG. 13 is illustrative of a color filter arrangement for a complementary colors mosaic filter.

The image pickup plane I of a CCD is provided thereon with a complementary colors mosaic filter wherein, as shown in FIG. 13, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 13, which should preferably have such characteristics as given below.

Each green color filter element G has a spectral strength peak at a wavelength $G_p$, each yellow filter element $Y_e$ has a spectral strength peak at a wavelength $Y_p$, each cyan filter element C has a spectral strength peak at a wavelength $C_p$, and each magenta filter element M has spectral strength peaks at wavelengths $M_{p1}$ and $M_{p2}$, and these wavelengths satisfy the following conditions.

$$510 \text{ nm} < G_p < 540 \text{ nm}$$

$$5 \text{ nm} < Y_p - G_p < 35 \text{ nm}$$

$$-100 \text{ nm} < C_p - G_p < -5 \text{ nm}$$

$$430 \text{ nm} < M_{p1} < 480 \text{ nm}$$

$$580 \text{ nm} < M_{p2} < 640 \text{ nm}$$

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 14:
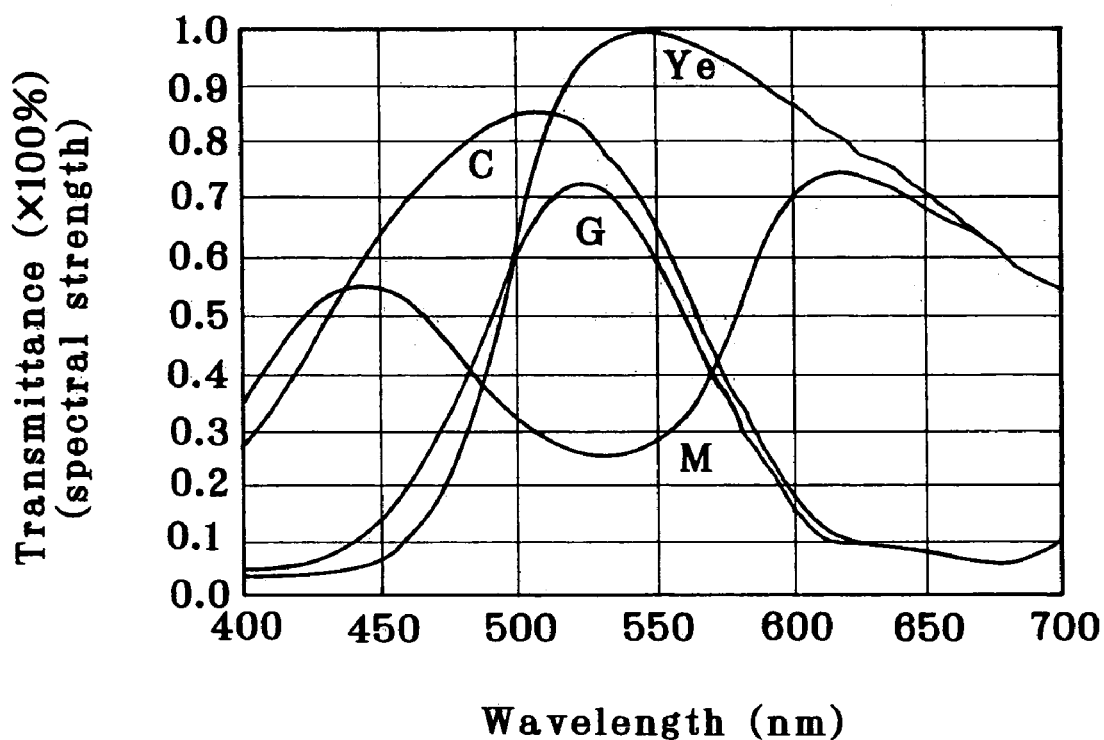
FIG. 14 is illustrative of one example of the wavelength characteristics of a complementary colors mosaic filter.

One example of the wavelength characteristics in the aforesaid respective examples is shown in FIG. 14. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y=|G+M+Y_e+C|\times 1/4$$

For chromatic signals, $$R-Y=|(M+Y_e)-(G+C)|$$

$$B-Y=|(M+C)-(G+Y_e)|$$

Through this signal processing, the signals from the complementary colors filter are converted into R (red), G (green) and B (blue) signals.

Now for, it is noted that the aforesaid near-infrared sharp cut coat may be located anywhere on the optical path, and that the number of low-pass filters may be either two as mentioned above or one.

Figure 15:
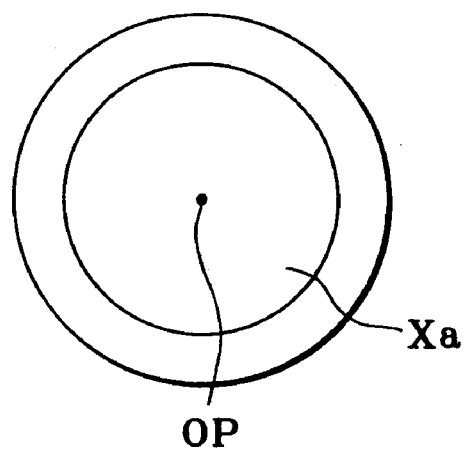
FIG. 15 is illustrative of one exemplary stop configuration upon full aperture.
Figure 16:
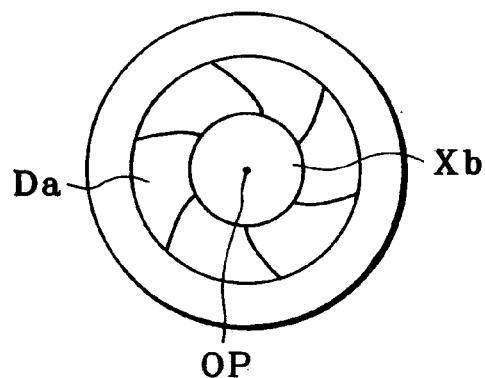
FIG. 16 is illustrative of one exemplary configuration upon two-stage aperture.

The aperture stop S is used for controlling the quantity of light in the imaging system according to the first aspect of the invention. For this aperture stop, for instance, a variable stop may be used, which comprises a plurality of stop blades with a variable aperture for controlling the quantity of light. FIG. 15 is illustrative of one exemplary stop configuration upon full aperture, and FIG. 16 is illustrative of one exemplary configuration upon two-stage aperture. In FIGS. 15 and 16, OP stands for an optical axis, Da six stop blades, and Xa and Xb apertures. In the invention, only two aperture configurations, i.e., full-aperture configuration (FIG. 15) and a stop value (two-stage stop, FIG. 16) providing an F-number that satisfies given conditions may be used.

It is acceptable to use a turret provided with a plurality of aperture stops that are of fixed shape yet having different configurations or transmittances so that any of the aperture stops can be located on the optical axis on the object side of the image-formation optical system depending on the necessary brightness, thereby slimming down the stop mechanism. It is also acceptable to select from a plurality of aperture stops located on the turret one where the quantity of light is minimized, and fitting therein a light quantity decreasing filter that has a transmittance lower than those of other aperture stops. This prevents the aperture diameter of the stops from becoming too small, helping reduce degradation, if any, of image-formation performance due to diffraction occurring with a small aperture diameter of the stops.

Figure 17:
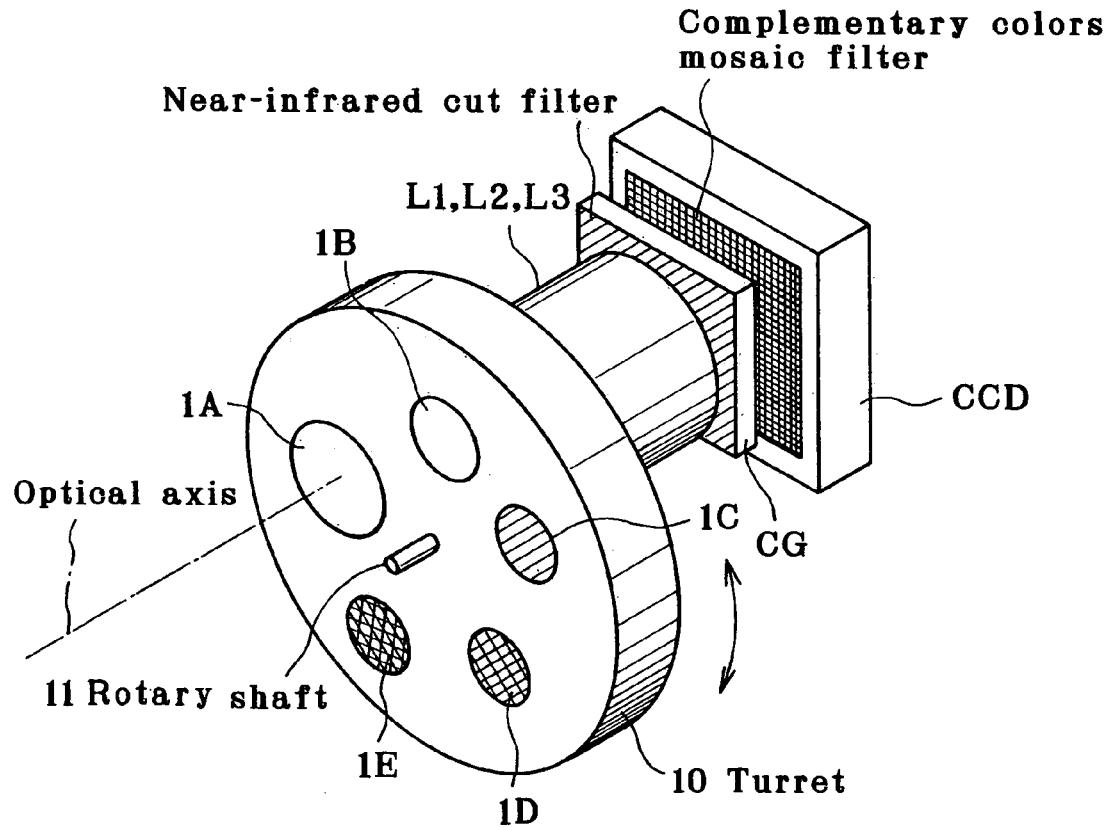
FIG. 17 is illustrative of the construction of the image-formation optical system according to any one of the $1^{st}$ to $5^{th}$ aspects of the invention, wherein there is provided a turret having a plurality of differently shaped aperture stops having different transmittances, each of fixed shape.

FIG. 17 is a perspective view illustrative of one exemplary construction of this case. At an aperture stop S position on the optical axis on the object side of the first positive lens L1 in the image-formation optical system, there is located a turret 10 capable of brightness control at 0 stage, −1 stage, −2 stage, −3 stage and −4 stage.

The turret 10 is composed of an aperture 1A for 0 stage control, which is defined by a maximum stop diameter, circular fixed space (with a transmittance of 100% with respect to 550 nm wavelength), an aperture 1B for −1 stage correction, which is defined by a transparent plane-parallel plate having a fixed aperture shape with an aperture area nearly half that of the aperture 1A (with a transmittance of 99% with respect to 550 nm wavelength), and circular apertures 1C, 1D and 1E for −2, −3 and −4 stage corrections, which have the same aperture area as that of the aperture 1B and are provided with ND filters having the respective transmittances of 50%, 25% and 13% with respect to 550 nm wavelength.

By turning the turret 10 around a rotating shaft 11, any one of the apertures is located at the stop position, thereby controlling the quantity of light.

Figure 18:
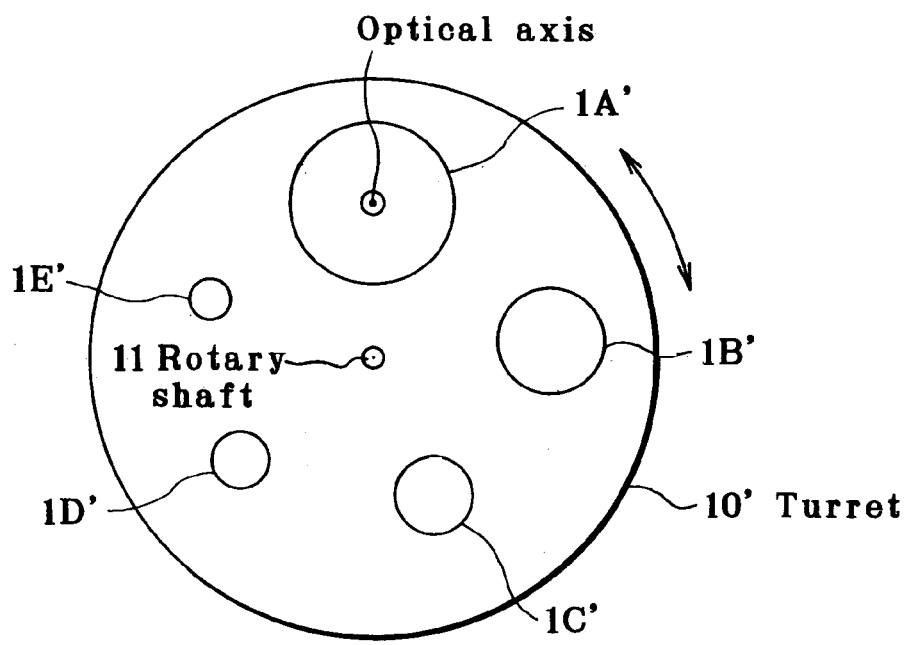
FIG. 18 is a front view of another turret used in place of that of FIG. 17.

Instead of the turret 10 shown in FIG. 17, it is acceptable to use a turret 10' shown in the front view of FIG. 18. This turret 10' capable of brightness control at 0 stage, −1 stage, −2 stage, −3 stage and −4 stage is located at the stop S position on the optical axis on the object side of the first positive lens L1 in the image-formation optical system.

The turret 10' is composed of an aperture 1A' for 0 stage control, which is defined by a maximum stop diameter, circular fixed space, an aperture 1B' for −1 stage correction, which is of a fixed aperture shape with an aperture area nearly half that of the aperture 1A', and apertures 1C', 1D' and 1E' for −2, −3 and −4 stage corrections, which are of fixed shape with decreasing areas in this order.

By turning the turret 10' around a rotating shaft 11, any one of the apertures is located at the stop position thereby controlling the quantity of light.

Figure 19:
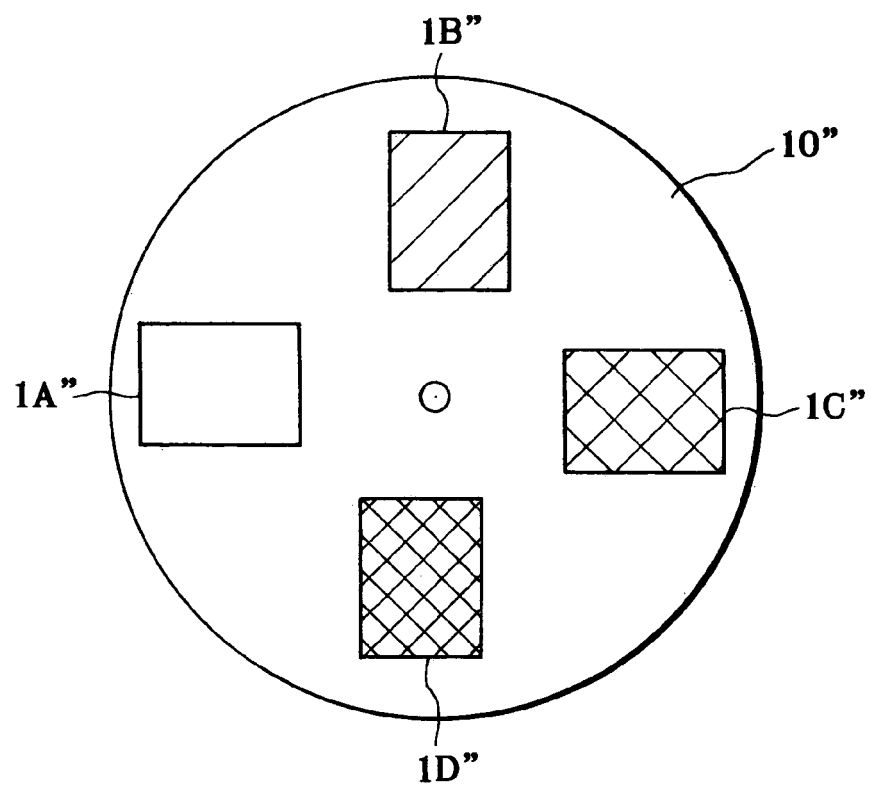
FIG. 19 is illustrative of another turret form of light quantity control filter usable in the $1^{st}$ to $5^{th}$ aspects of the invention.

To achieve further thickness reductions, the aperture in the aperture stop S may be fixed in terms of shape and position, so that the quantity of light may be electrically controlled in response to signals from the image pickup device. Alternatively, the quantity of light may be controlled by insertion or de-insertion of an ND filter in or from other space in the lens system, for instance, in or from between the third negative lens L3 and the CCD cover glass CG. One example of this is shown in FIG. 19. As shown, it is acceptable to use a turret-form filter that comprises a turret 10" having a plain or hollow aperture 1A", an aperture 1B" defined by an ND filter having a transmittance of ½, an aperture 1C" defined by an ND filter having a transmittance of ¼, an aperture 1D" defined by an ND filter having a transmittance of ⅛, etc. For light quantity control, any of the apertures is located anywhere in the optical path by turning the turret around a center rotary shaft.

Figure 20:
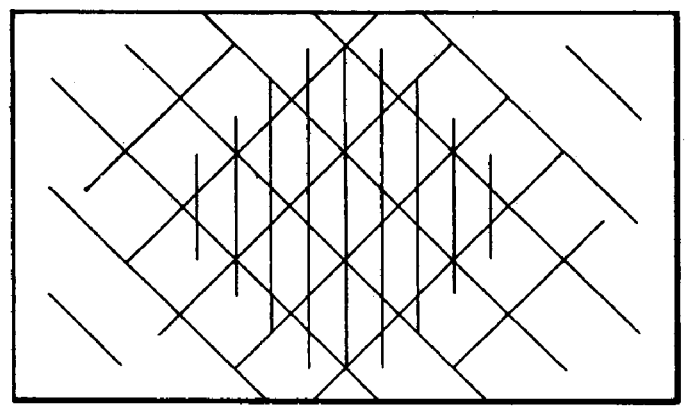
FIG. 20 is illustrative of another example of the filter for reducing light quantity variations.

For the light quantity control filter, it is also acceptable to use a filter surface capable of performing light quantity control in such a way as to reduce light quantity variations, for instance, a filter in which, as shown in FIG. 20, the quantity of light decreases concentrically toward its center in such a way that for a dark subject, uniform transmittance is achieved while the quantity of light at its center is preferentially ensured, and for a bright subject alone, brightness variations are made up for.

Still alternatively, the aperture stop S may be defined by blackening a part of the peripheral portion of the first positive lens L1 on its entrance surface side.

When the imaging system according to the first aspect of the invention is implemented in the form of, for instance, a camera wherein images are stored as still-frame ones, it is preferable to locate the light quantity control shutter in an optical path.

For that shutter, for instance, use may be made of a focal plane shutter, rotary shutter or liquid crystal shutter that is located just before the CCD. Alternatively, the aperture shutter itself may be constructed in a shutter form.

Figure 21A:
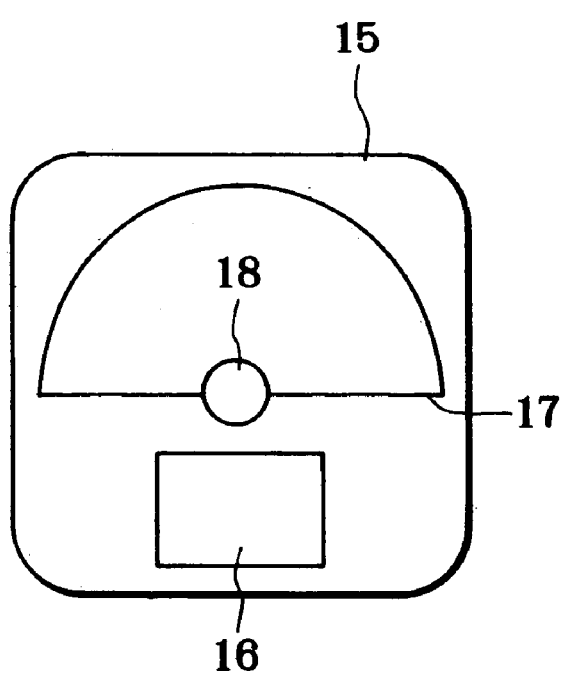
FIGS. 21(*a*) and 21(*b*) are a rear and a front view of one exemplary rotary focal plane shutter.
Figure 21B:
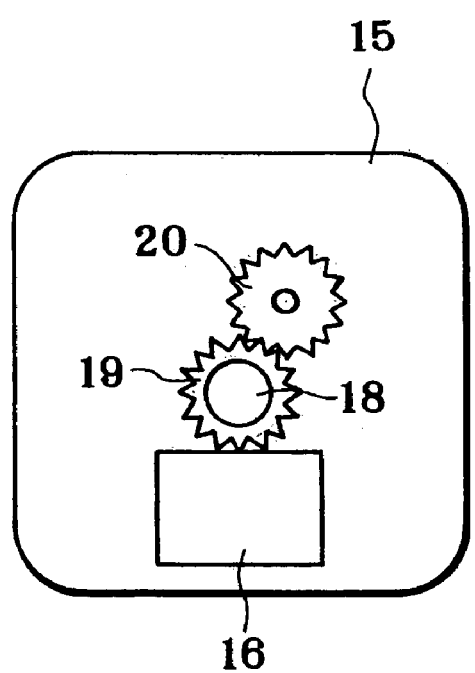
Figure 22A:
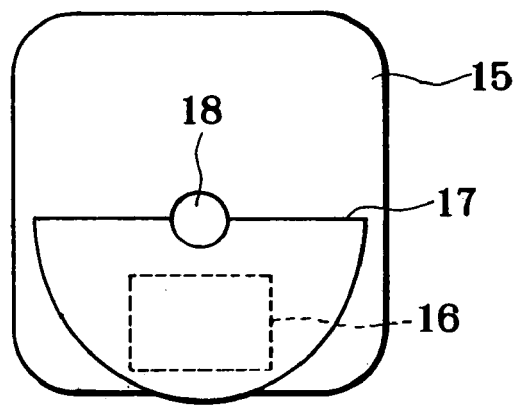
FIGS. 22(*a*), 22(*b*), 22(*c*) and 22(*d*) are illustrative of how the rotary shutter curtain of the shutter of FIG. 21 is rotated.
Figure 22B:
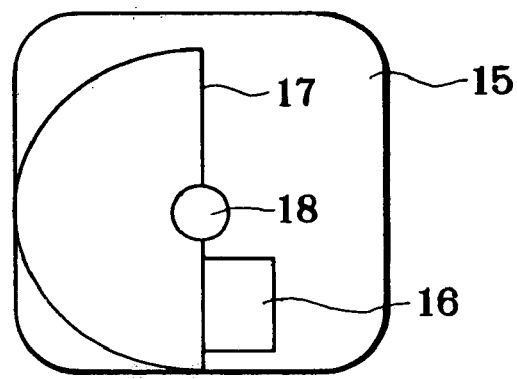
Figure 22C:
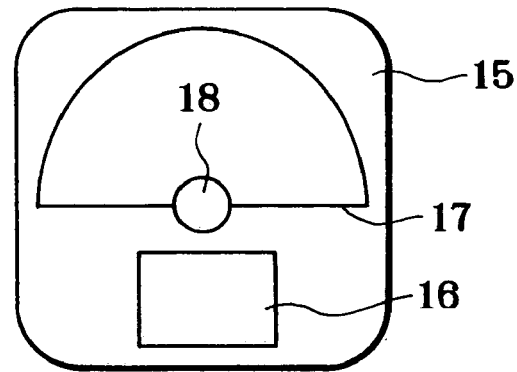
Figure 22D:
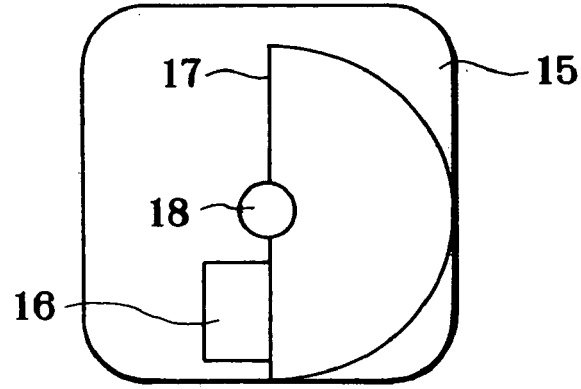

FIG. 21 is illustrative of one example of the shutter used herein. FIGS. 21(*a*) and 21(*b*) are a rear and a front view of a rotary focal plane shutter that is a sort of the focal plane shutter. Reference numeral 15 is a shutter substrate that is to be located just before the image plane or at any desired position in the optical path. The substrate 15 is provided with an aperture 16 through which an effective light beam through an optical system is transmitted. Numeral 17 is a rotary shutter curtain, and 18 a rotary shaft of the rotary shutter curtain 17. The rotary shaft 18 rotates with respect to the substrate 15, and is integral with the rotary shutter curtain 17. The rotary shaft 18 is engaged with gears 19 and 20 on the surface of the substrate 15. The gears 19 and 20 are connected to a motor not shown.

As the motor not shown is driven, the rotary shutter curtain 17 is rotated around the rotary shaft 18 via the gears 19 and 20.

Having a substantially semi-circular shape, the rotary shutter curtain 17 is rotated to open or close the aperture 16 in the substrate 15 to perform a shutter role. The shutter speed is then controlled by varying the speed of rotation of the rotary shutter curtain 17.

FIGS. 22(*a*) to 22(*d*) are illustrative of how the rotary shutter curtain 17 is rotated as viewed from the image plane side. The rotary shutter curtain 17 is displaced in time order of (*a*), (*b*), (*c*), (*d*) and (*a*).

By locating the aperture stops of fixed shape and the light quantity control filter or shutter at different positions in the lens system, it is thus possible to obtain an imaging system in which, while high image quality is maintained with the influence of diffraction minimized, the quantity of light is controlled by the filter or shutter, and the length of the lens system can be cut down as well.

Figure 23:
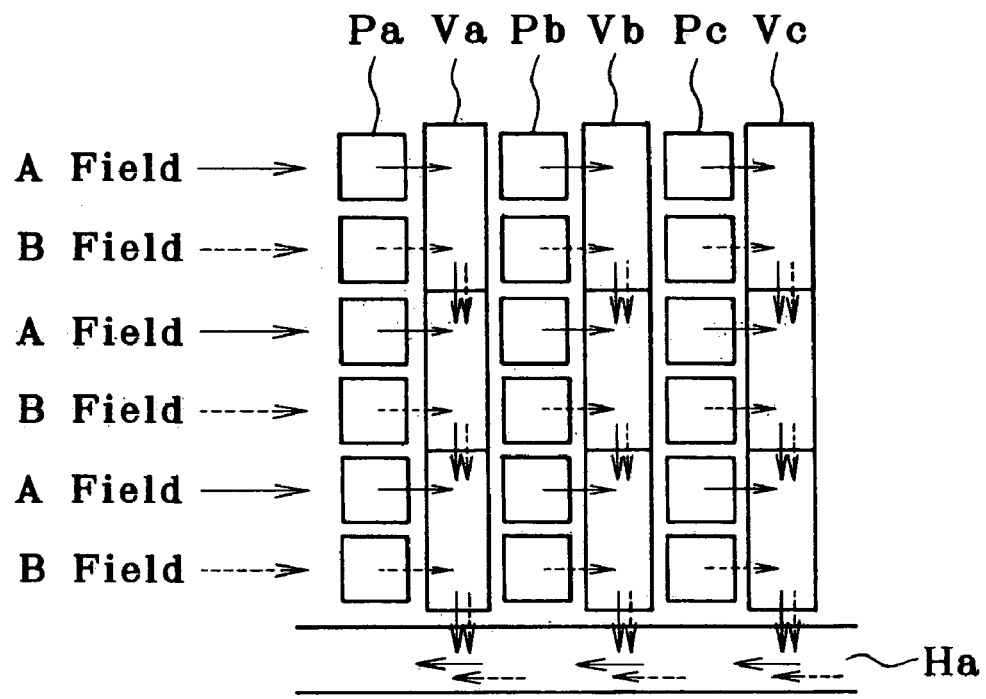
FIG. 23 is illustrative of an interlaced CCD image pickup operation.

In the invention, electrical control may be performed in such a way as to obtain still-frame images by extracting a part of electrical signals of the CCD without recourse to any mechanical shutter. CCD image pickup operation is now explained with reference to FIGS. 23 and 24. FIG. 23 is illustrative of CCD image pickup operation wherein signals are sequentially read in the interlaced scanning mode. In FIG. 23, Pa, Pb and Pc are photosensitive blocks using photodiodes, Va, Vb and Vc are CCD vertical transfer blocks, and Ha is a CCD horizontal transfer block. The A field is an odd-number field and the B field is an even-number field.

In the arrangement of FIG. 23, the basic operation takes place in the following order: (1) accumulation of signal charges by light at the photosensitive block (photoelectric conversion), (2) shift of signal charges from the photosensitive block to the vertical transfer block (field shift), (3) transfer of signal charges at the vertical transfer block (vertical transfer), (4) transfer of signal charges from the vertical transfer block to the horizontal transfer block (line shift), (5) transfer of signal charges at the horizontal transfer block (horizontal transfer), and (6) detection of signal charges at the output end of the horizontal transfer block (detection). Such sequential reading may be carried out using either one of the A field (odd-number field) and the B field (even-number field).

When the interlaced scanning CCD image pickup mode of FIG. 23 is applied to TV broadcasting or analog video formats, the timing of accumulation at the A field and the B field lags by ¹⁄₆₀. When, with this timing lag uncorrected, a frame image is constructed as a DSC (digital spectrum compatible) image, there is blurring such as a double image in the case of a subject in motion. In this CCD image pickup mode, the A field and B field are simultaneously exposed to light to mix signals at adjacent fields. After processed by a mechanical shutter upon the completion of exposure, signals are independently read from the A field and the B field for signal synthesis.

In the first aspect of the invention, while the role of the mechanical shutter is limited to only prevention of smearing, signals are sequentially read out of the A field alone or signals are simultaneously read out of both the A field and the B field in a mixed fashion, so that a high-speed shutter can be released irregardless of the driving speed of the mechanical shutter (because of being controlled by an electronic shutter alone), although there is a drop of vertical resolution. The arrangement of FIG. 23 has the merit of making size reductions easy, because the number of CCDs in the vertical transfer block is half the number of photodiodes forming the photosensitive block.

Figure 24:
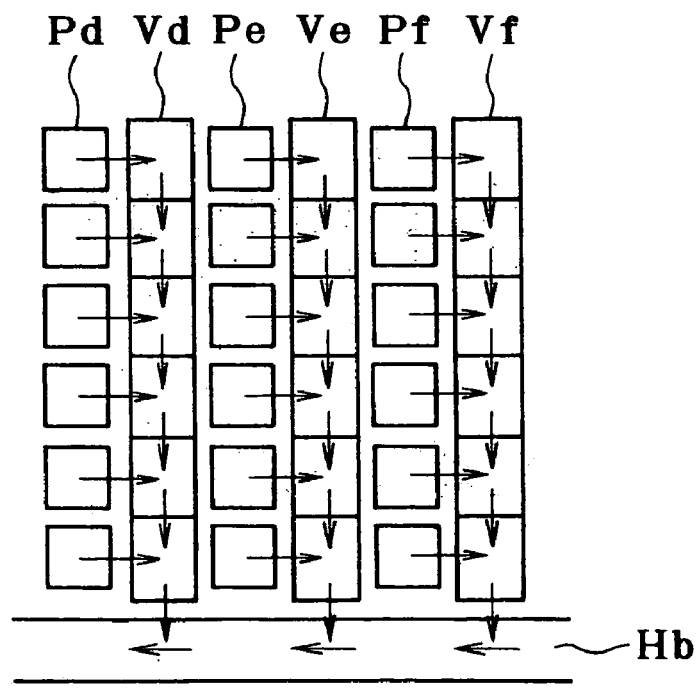
FIG. 24 is illustrative of a progressive CCD image pickup operation.

FIG. 24 is illustrative of CCD image pickup operation wherein the sequential reading of signals is performed in the progressive mode. In FIG. 24, Pd to Pf are photosensitive blocks using photodiodes, Vd, Ve and Vf are CCD vertical transfer blocks and Hb is a CCD horizontal transfer block.

In FIG. 24, signals are read in order of the arranged pixels, so that charge accumulation reading operation can be all electronically controlled. Accordingly, exposure time can be cut down to about (¹⁄₁₀,₀₀₀ second). The arrangement of FIG. 24 has the demerit of making it more difficult to achieve size reductions because of an increased number of vertical CCDs as compared with the arrangement of FIG. 23. However, the invention is applicable to the mode of FIG. 23 as well as to the mode of FIG. 24 because of such merits as mentioned above.

The imaging system according to the first aspect of the invention constructed as described above may be applied to phototaking systems wherein object images formed through image-formation optical systems are received at image pickup devices such as CCDs, in particular, digital cameras or video cameras as well as PCs and telephone sets that are typical information processors, in particular, easy-to-carry cellular phones. Given below are some such embodiments.

Figure 25:
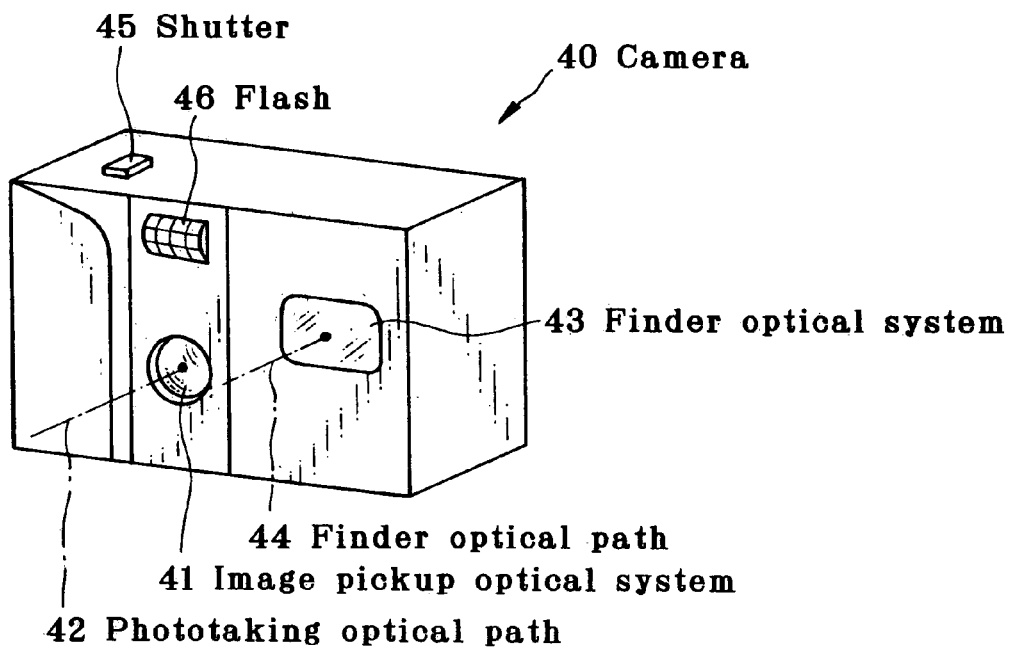
FIG. 25 is a sectional view of a digital camera in which the image-formation optical system according to any one of the first to fifth aspects of the invention is built.
Figure 26:
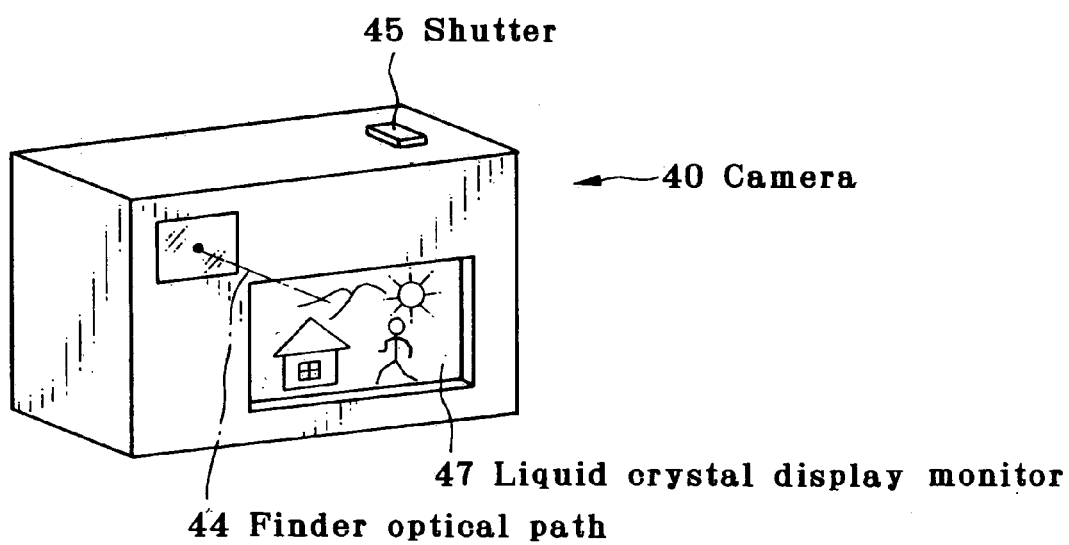
FIG. 26 is a rear perspective view of the digital camera of FIG. 25.
Figure 27:
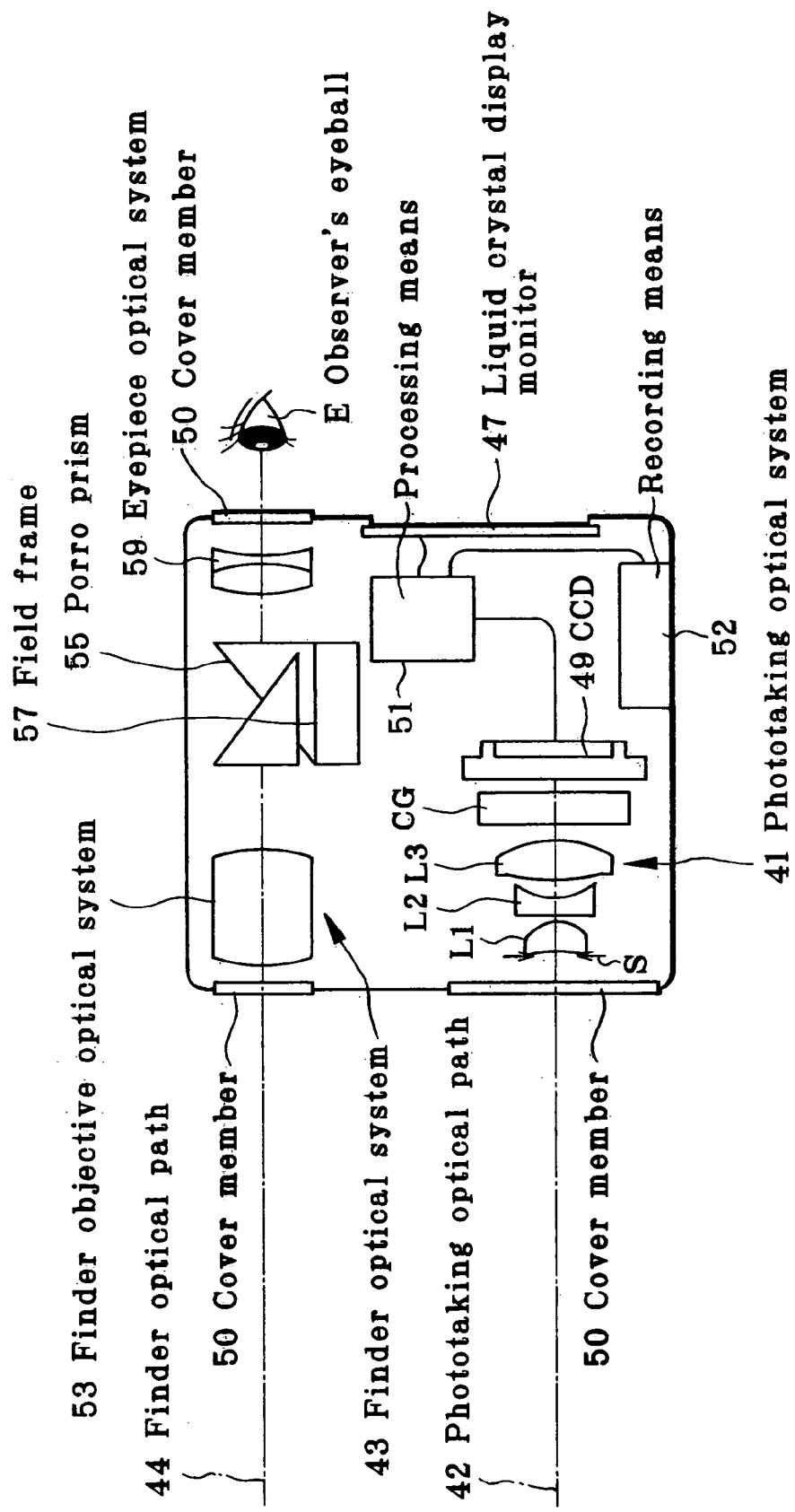
FIG. 27 is illustrative in section of a digital camera in which the image-formation optical system according to any one of the first to fourth aspects of the invention is incorporated.

FIGS. 25, 26 and 27 are conceptual illustrations of a phototaking optical system 41 for digital cameras, in which the image-formation optical system of the invention is incorporated. FIG. 25 is a front perspective view of the outward appearance of a digital camera 40, and FIG. 26 is a rear perspective view of the same. FIG. 27 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41, for instance, the image-formation optical system according to Example 1. An object image formed by the phototaking optical system 41 is formed on the image pickup plane of a CCD 49 via a cover glass CG provided with a near-infrared cut coat and having a low-pass filter function. An object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 27, plane-parallel plates are used as the cover members 50; however, it is acceptable to use powered lenses.

Figure 28:
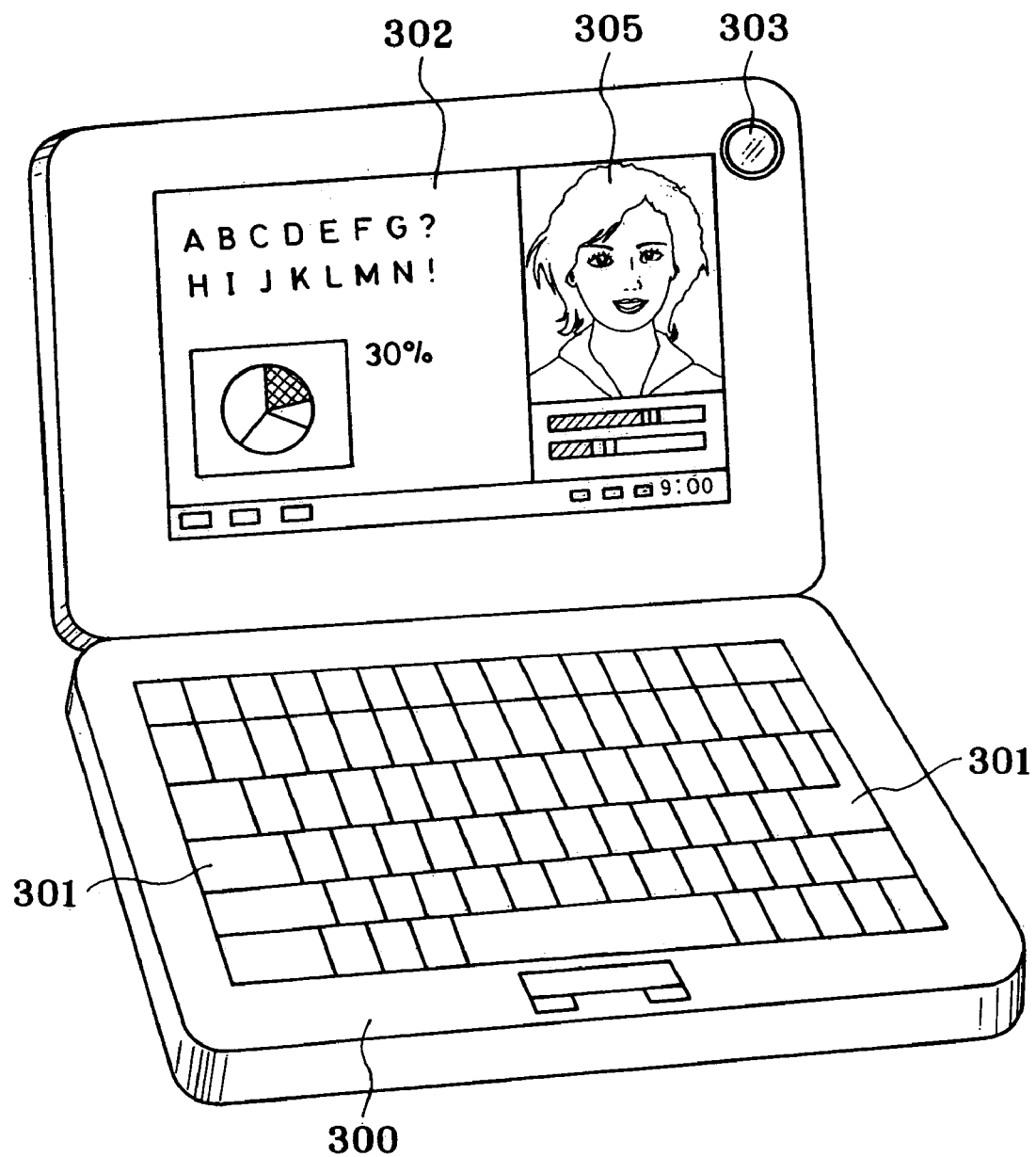
FIG. 28 is a front perspective view of a personal computer with a cover unfolded, in which the image-formation optical system according to any one of the first to fifth aspects of the invention is built as an objective optical system.
Figure 29:
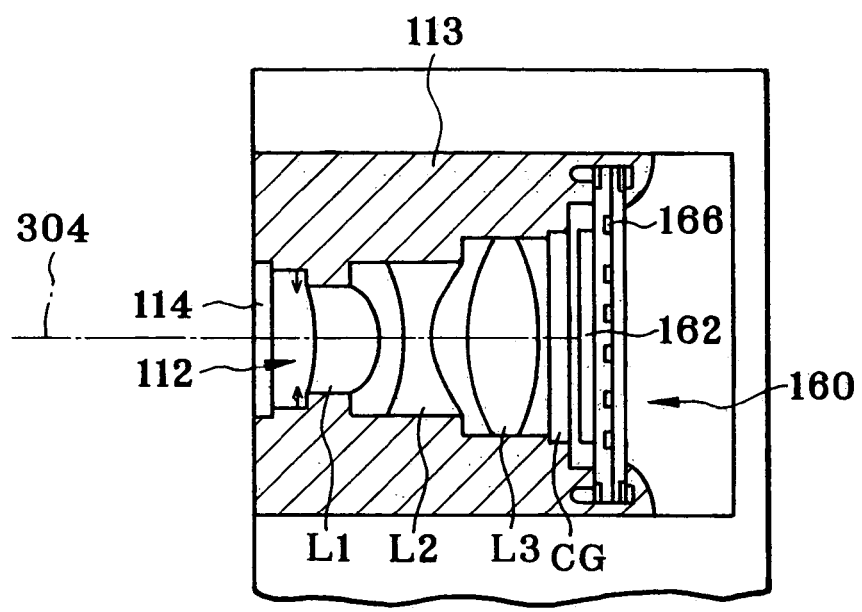
FIG. 29 is illustrative in section of a phototaking optical system in a personal computer in which the image-formation optical system according to any one of the first to fourth aspects of the invention is built.
Figure 30:
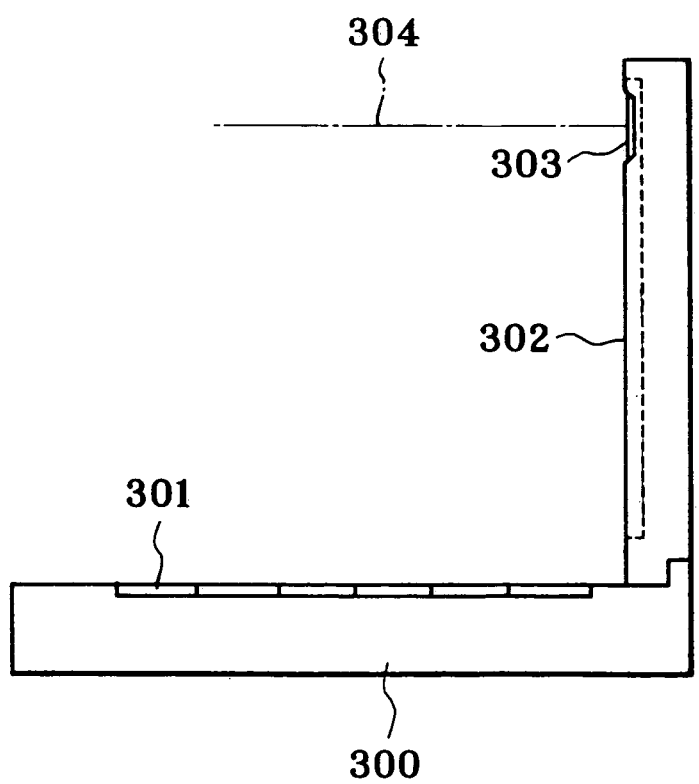
FIG. 30 is a side view of the state of FIG. 28.

FIGS. 26-30 are illustrative of a personal computer that is one example of the information processor in which the image-formation optical system according to the first aspect of the invention is built as an objective optical system. FIG. 26 is a front perspective view of a personal computer 300 in use, FIG. 29 is a sectional view of a phototaking optical system 303 in the personal computer 300, and FIG. 30 is a side view of the state of FIG. 26. As shown in FIGS. 26-30, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising the image-formation optical system according to the first aspect of the invention (roughly shown) and an image pickup device chip 162 for receiving an image. These are built in the personal computer 300.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 26. This image 305 may be shown on a personal computer on the other end via suitable processing means and the Internet or telephone line.

FIGS. 31($a$), 31($b$) and 31($c$) are illustrative of a telephone set that is one example of the information processor in which the image-formation optical system according to the first aspect of the invention is built in the form of a phototaking optical system, especially a convenient-to-carry cellular phone. FIG. 31($a$) and FIG. 31($b$) are a front and a side view of a cellular phone 400, respectively, and FIG. 31($c$) is a sectional view of a phototaking optical system 405. As shown in FIGS. 31($a$), 31($b$) and 31($c$), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communications information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system according to the first aspect of the invention (roughly shown) and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is noted that each of the above examples may be modified in various forms within the scope of what is recited in the claims.

In accordance with the first aspect of the invention, it is possible to provide an small-format yet high-performance image-formation system that does hardly surfer from a deterioration of performance due to fabrication errors, and a small-format yet high-performance imaging system incorporating the same.

Examples 1 to 5 of the image-formation optical system according to the second aspect of the invention are given below. FIGS. 32 to 36 are illustrative in section of the lens arrangements of Examples 1 to 5 upon focused on an object point at infinity. In these figures, S stands for an aperture stop, L1 a first positive lens, L2 a second negative lens, L3 a third positive lens, CG a cover glass for an electronic image pickup device and I an image plane. It is noted that the cover glass CG may be provided on its surface with a wavelength range-limiting multilayer film with or without a low-pass filter function.

EXAMPLE 1

Figure 32:
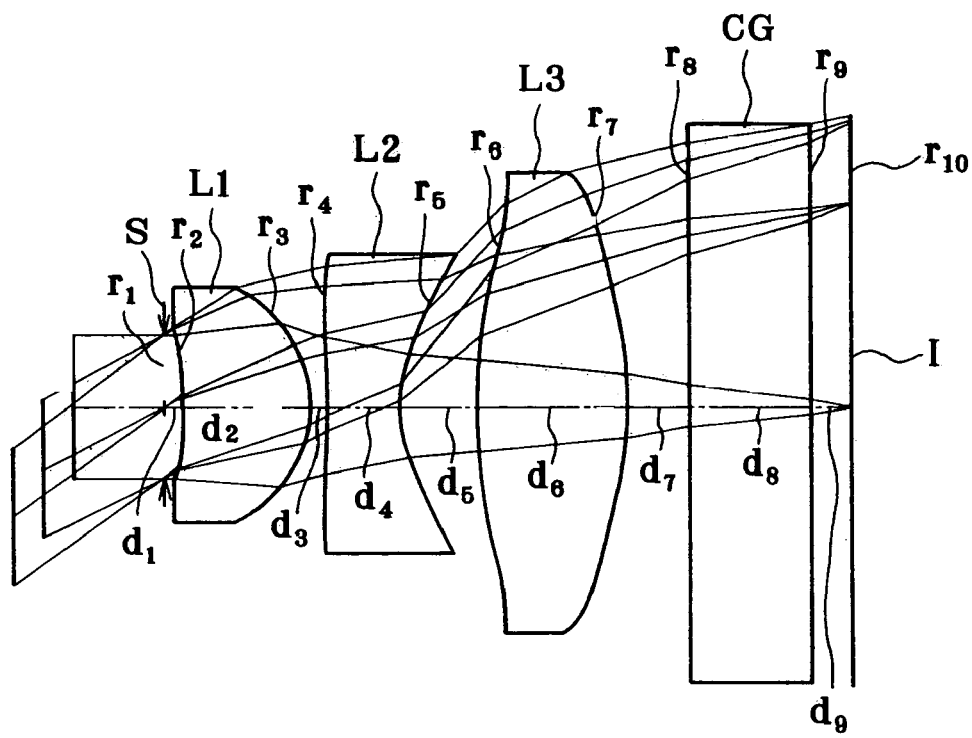
FIG. 32 is a lens arrangement section of Example 1 of the image-formation optical system according to the second aspect of the invention upon focused on an object point at infinity.

As shown in FIG. 32, the image-formation optical system of Example 1 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instant example, the first, second and third lenses L1, L2 and L3 are all made of plastics. More specifically, the second lens L2 is made of polycarbonate, and the first and third lenses L1 and L3 are each made of an amorphous polyolefin Zeonex (trade name).

The specifications of the wide-angle optical system according to this example are:
 a focal length f=3.3 mm,
 an image height Ih=2.4 mm, and
 a half angle of view ω=36°.

The optically effective diameters of the respective lenses (on one sides) are 0.647 mm for $2^{nd}$ surface $r_2$, 0.969 mm for $3^{rd}$ surface $r_3$, 1.146 mm for $4^{th}$ surface $r_4$, 1.241 mm for $5^{th}$ surface $r_5$, 1.662 mm for $6^{th}$ surface $r_6$, and 1.920 mm for $7^{th}$ surface $r_7$.

EXAMPLE 2

Figure 33:
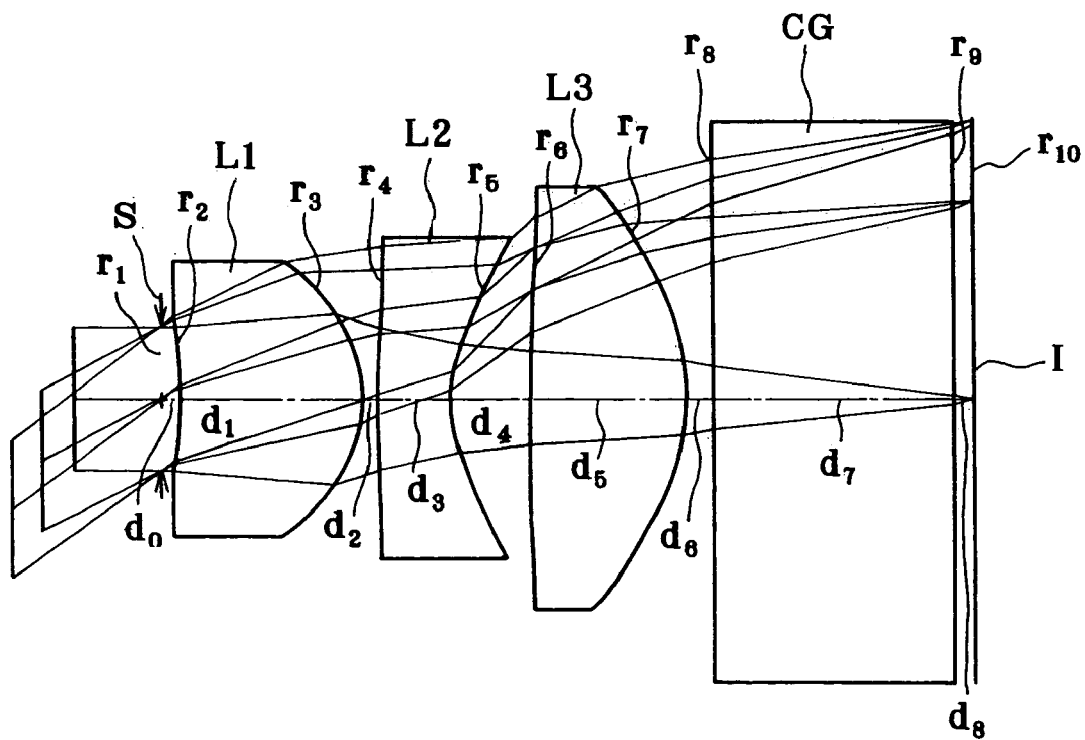
FIG. 33 is a lens arrangement section similar to FIG. 32 of Example 2 of the image-formation optical system.

As shown in FIG. 33, the image-formation optical system of Example 2 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive lens L3 that is of double-convex shape and has aspheric surfaces on both its sides, and a cover glass CG. In the instant example, the first and second lenses L1 and L2 are each made of glass, and the third lens L3 is made of plastics. More specifically, the third lens L3 is made of an amorphous polyolefin Zeonex.

The specifications of the wide-angle optical system according to this example are:
 a focal length f=3.3 mm,
 an image height Ih=2.4 mm, and
 a half angle of view ω=36°.

The optically effective diameters of the respective lenses (on one sides) are 0.656 mm for $2^{nd}$ surface $r_2$, 1.142 mm for $3^{rd}$ surface $r_3$, 1.277 mm for $4^{th}$ surface $r_4$, 1.344 mm for $5^{th}$ surface $r_5$, 1.527 mm for $6^{th}$ surface r6, and 1.776 mm for $7^{th}$ surface $r_7$.

EXAMPLE 3

Figure 34:
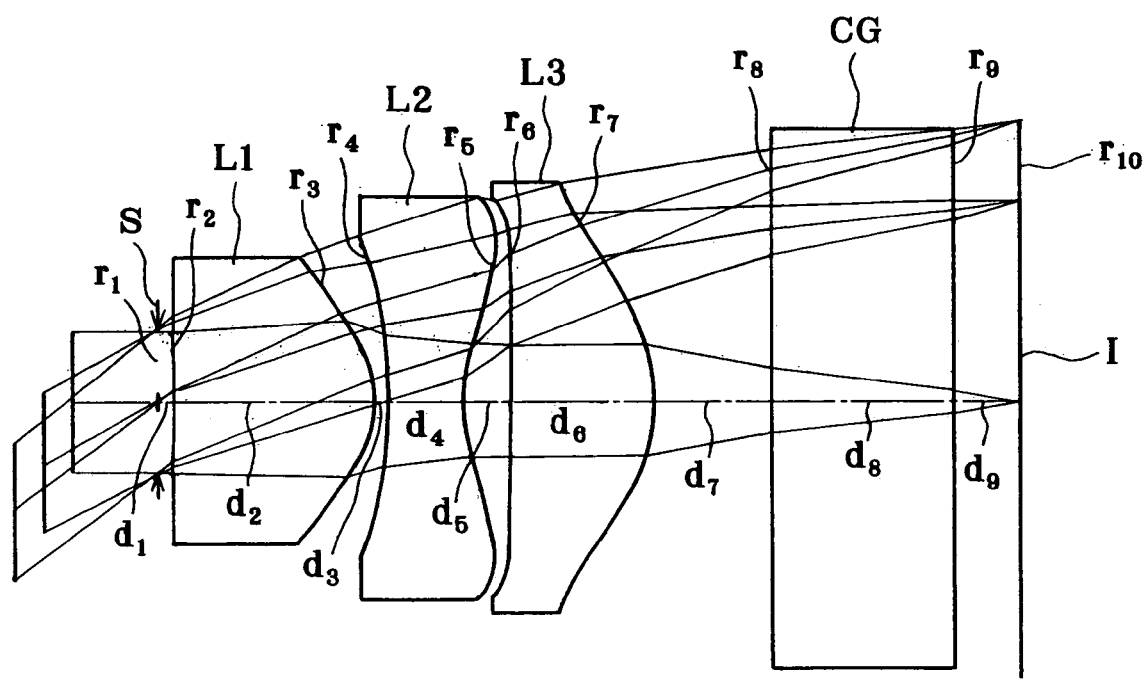
FIG. 34 is a lens arrangement section similar to FIG. 32 of Example 3 of the image-formation optical system.

As shown in FIG. 34, the image-formation optical system of Example 3 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instant example, the first lens L1 is made of plastics, and the second and third lenses L2 and L3 are each made of glass. More specifically, the first lens L1 is made of an amorphous polyolefin Zeonex (trade name).

The specifications of the wide-angle optical system according to this example are:
 a focal length f=3.3 mm,
 an image height Ih=2.4 mm, and
 a half angle of view ω=36°

The optically effective diameters of the respective lenses (on one sides) are 0.674 mm for $2^{nd}$ surface $r_2$, 1.201 mm for $3^{rd}$ surface $r_3$, 1.384 mm for $4^{th}$ surface $r_4$, 1.692 mm for $5^{th}$ surface $r_5$, 1.652 mm for $6^{th}$ surface $r_6$, and 1.801 mm for $7^{th}$ surface $r_7$.

EXAMPLE 4

Figure 35:
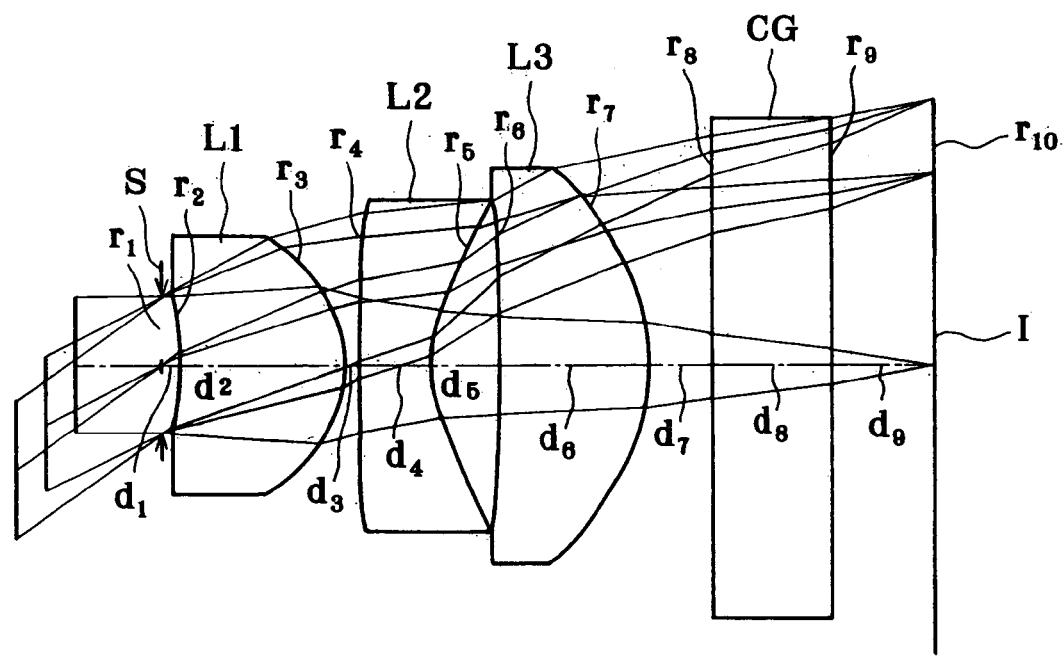
FIG. 35 is a lens arrangement section similar to FIG. 32 of Example 4 of the image-formation optical system.

As shown in FIG. 35, the image-formation optical system of Example 4 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive lens L3 that is convex on its image side and has aspheric surfaces on both its sides, and a cover glass CG. In the instant example, the first, second and third lenses L1, L2 and L3 are all made of plastics. More specifically, the first and third lenses L1 and L3 are each made of an amorphous polyolefin Zeonex, and the second lens L2 is made of polycarbonate.

The specifications of the wide-angle optical system according to this example are:
  a focal length f=3.3 mm,
  an image height Ih=2.4 mm, and
  a half angle of view ω=36°.

The optically effective diameters of the respective lenses (on one sides) are 0.651 mm for $2^{nd}$ surface $r_2$, 1.109 mm for $3^{rd}$ surface $r_3$, 1.330 mm for $4^{th}$ surface $r_4$, 1.439 mm for $5^{th}$ surface $r_5$, 1.445 mm for $6^{th}$ surface $r_6$, and 1.717 mm for $7^{th}$ surface $r_7$.

EXAMPLE 5

Figure 36:
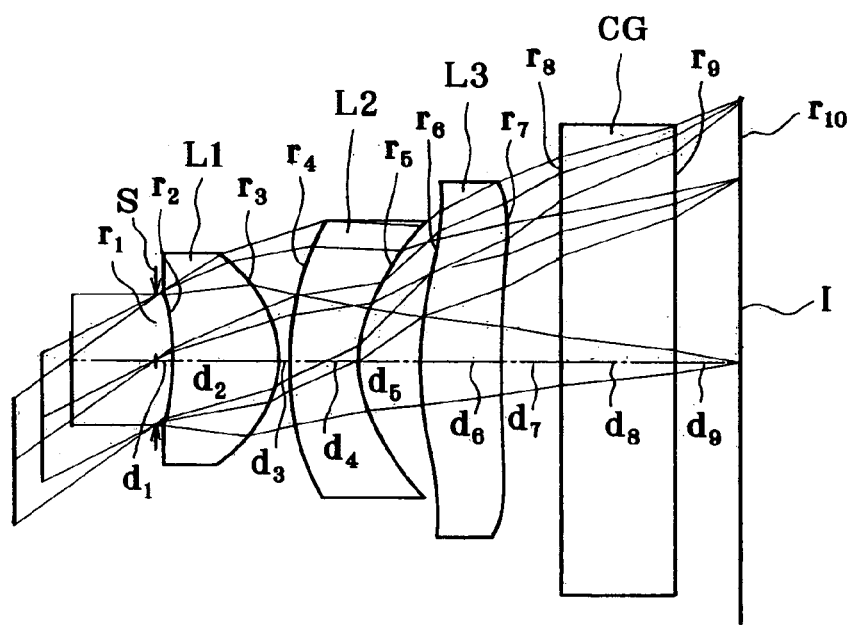
FIG. 36 is a lens arrangement section similar to FIG. 32 of Example 5 of the image-formation optical system.
Figure 37:
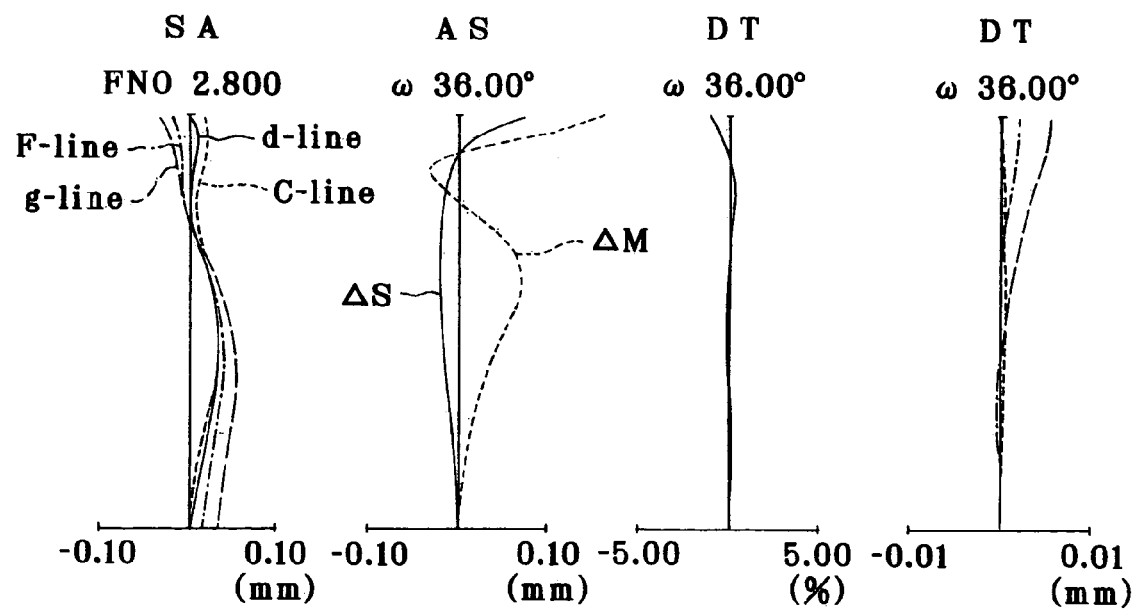
FIG. 37 is an aberration diagram for Example 1 upon focused on an object point at infinity.
Figure 38:
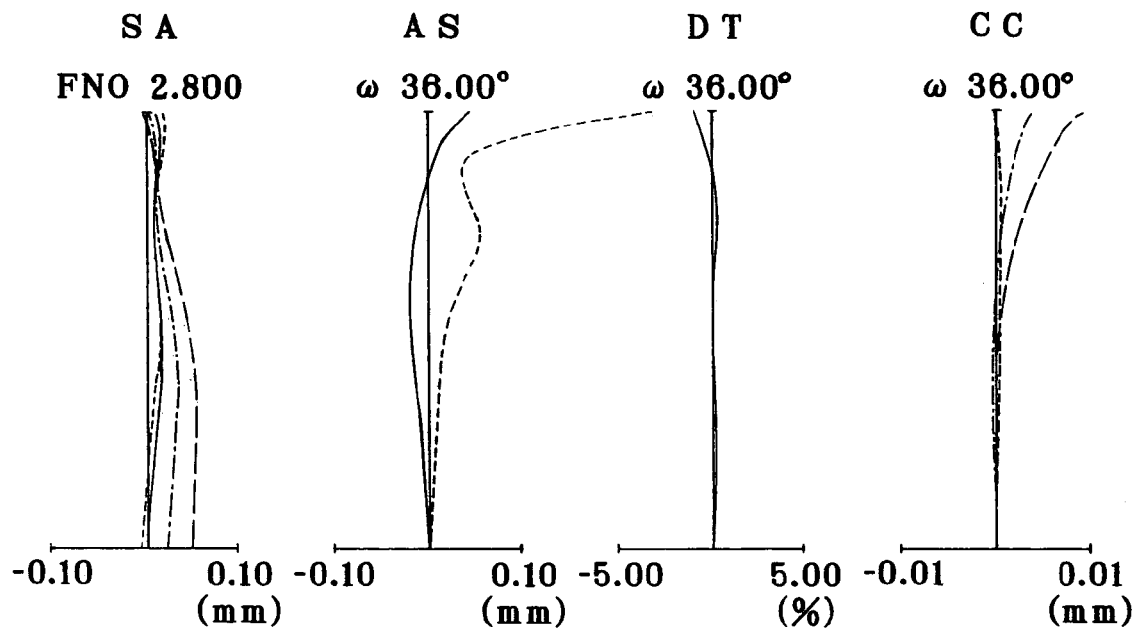
FIG. 38 is an aberration diagram for Example 2 upon focused on an object point at infinity.
Figure 39:
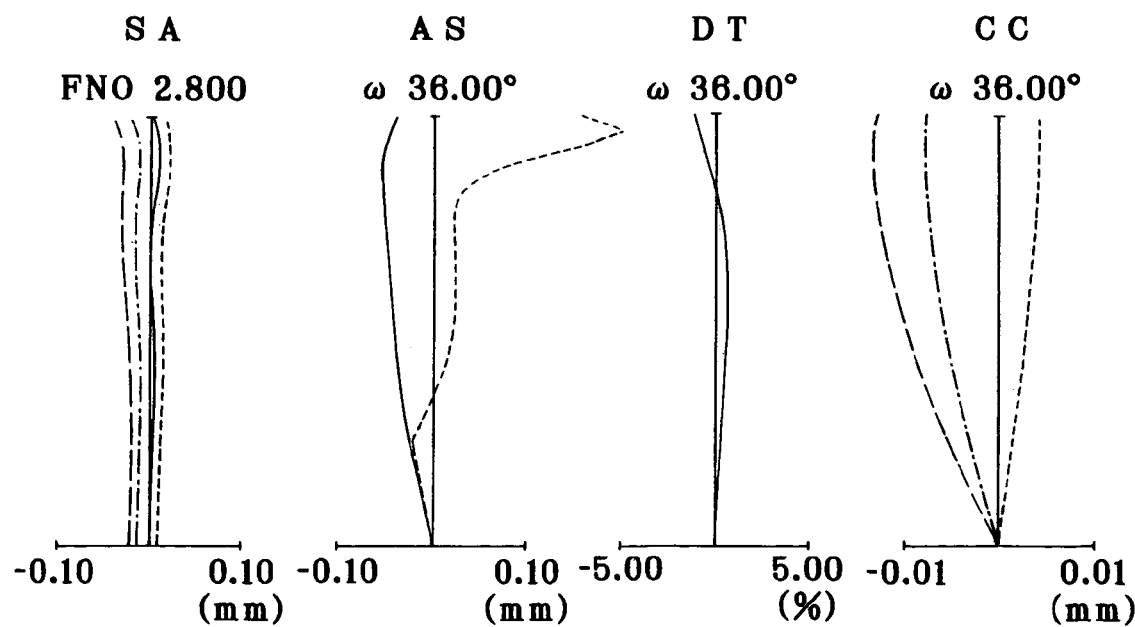
FIG. 39 is an aberration diagram for Example 3 upon focused on an object point at infinity.
Figure 40:
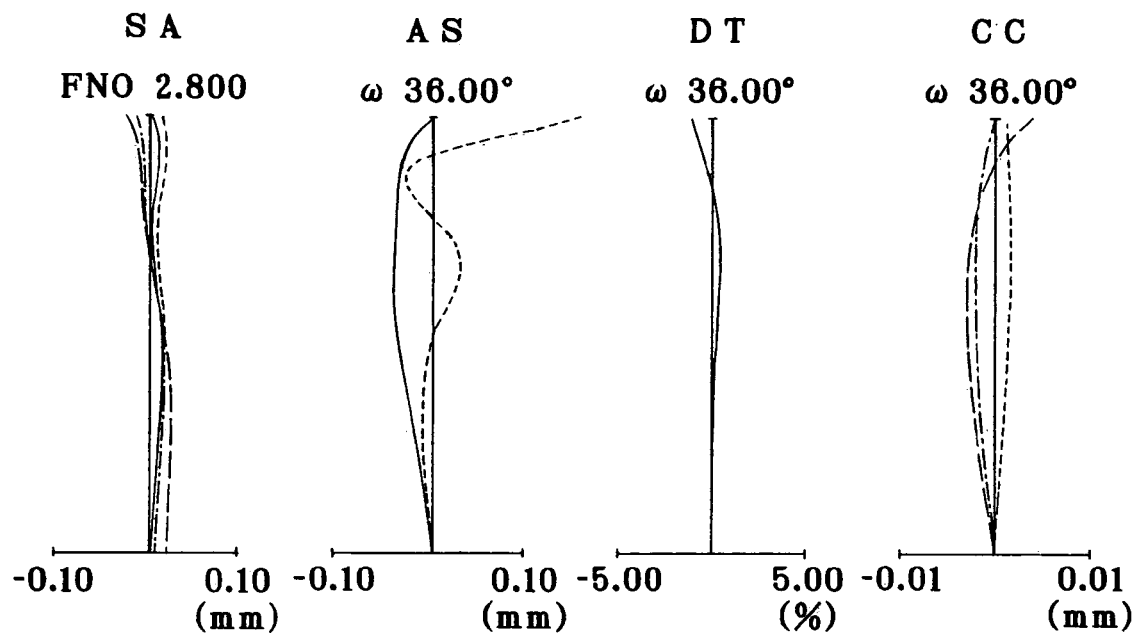
FIG. 40 is an aberration diagram for Example 4 upon focused on an object point at infinity.
Figure 41:
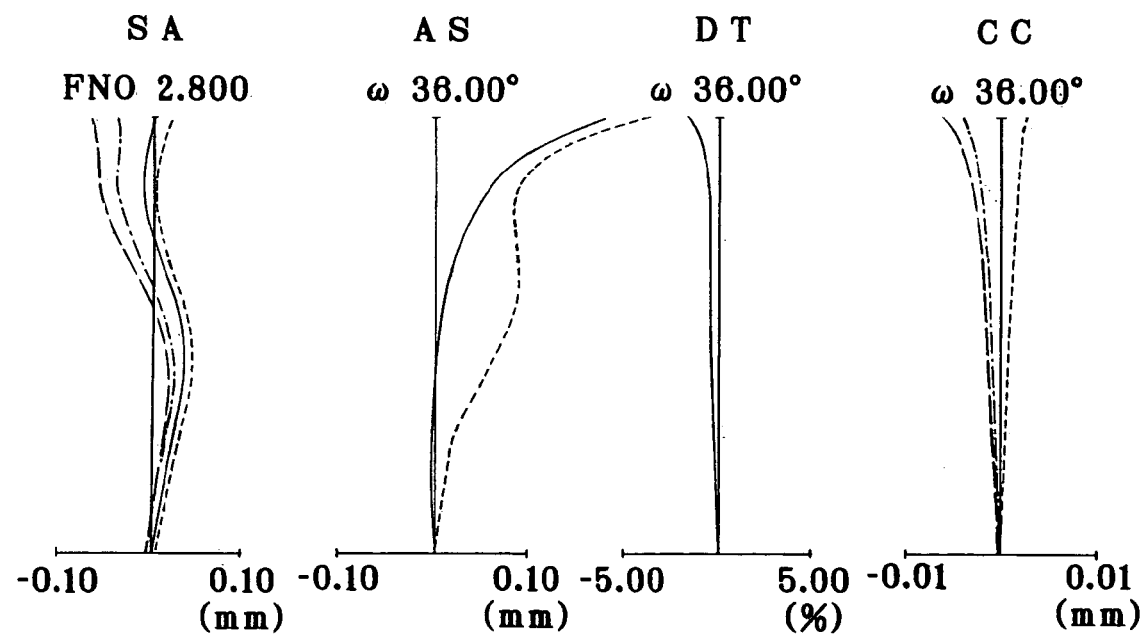
FIG. 41 is an aberration diagram for Example 5 upon focused on an object point at infinity.

As shown in FIG. 36, the image-formation optical system of Example 5 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive meniscus lens L3 that is convex on its object side and has aspheric surfaces on both its sides, and a cover glass CG. In the instant example, the first and second lenses L1 and L2 are each made of glass, and the third lens L3 is made of plastics. More specifically, the third lens L3 is made of an amorphous polyolefin Zeonex.

The specifications of the wide-angle optical system according to this example are:
  a focal length f=3.3 mm,
  an image height Ih=2.4 mm, and
  a half angle of view ω=36°

The optically effective diameters of the respective lenses (on one sides) are 0.630 mm for $2^{nd}$ surface $r_2$, 0.942 mm for $3^{rd}$ surface $r_3$, 1.245 mm for $4^{th}$ surface $r_4$, 1.202 mm for $5^{th}$ surface $r_5$, 1.350 mm for $6^{th}$ surface $r_6$, and 1.599 mm for $7^{th}$ surface $r_7$.

The numerical data on each example are given below. Symbols used hereinafter but not hereinbefore have the following meanings:
$r_1, r_2, \ldots$ : radius of curvature of each lens surface,
$d_1, d_2, \ldots$ : spacing between adjacent lens surfaces,
$n_{d1}, n_{d2}, \ldots$ : d-line refractive index of each lens, and
$\nu_{d1}, \nu_{d2}, \ldots$ : Abbe number of each lens. It is noted that aspheric shape is given by the aforesaid equation (a).

EXAMPLE 1

| | | | |
|---|---|---|---|
| $r_1 = \infty$(Stop) | $d_1 = 0.1500$ | | |
| $r_2 = -7.5279$(Aspheric) | $d_2 = 1.0750$ | $n_{d1} = 1.52542$ | $\nu_{d1} = 55.78$ |
| $r_3 = -0.7163$(Aspheric) | $d_3 = 0.1010$ | | |
| $r_4 = -12.1467$(Aspheric) | $d_4 = 0.6000$ | $n_{d2} = 1.58423$ | $\nu_{d2} = 30.49$ |
| $r_5 = 0.8291$(Aspheric) | $d_5 = 0.6439$ | | |
| $r_6 = 3.4262$(Aspheric) | $d_6 = 1.2447$ | $n_{d3} = 1.52542$ | $\nu_{d3} = 55.78$ |
| $r_7 = -3.5308$(Aspheric) | $d_7 = 0.5000$ | | |
| $r_8 = \infty$ | $d_8 = 1.0000$ | $n_{d4} = 1.51633$ | $\nu_{d4} = 64.10$ |
| $r_9 = \infty$ | $d_9 = 0.3259$ | | |
| $r_{10} = \infty$(Image Plane) | | | |

Aspherical Coefficients

2nd surface $K = 7.7613$
$A_4 = -2.0650 \times 10^{-1}$
$A_6 = 2.3824 \times 10^{-1}$
$A_8 = -1.1397$
$A_{10} = 8.3716 \times 10^{-1}$ 3rd surface $K = -2.9922$
$A_4 = -1.9180 \times 10^{-1}$
$A_6 = -2.0698 \times 10^{-2}$
$A_8 = 4.7778 \times 10^{-2}$
$A_{10} = -7.0770 \times 10^{-2}$ 4th surface $K = 0$
$A_4 = 8.5549 \times 10^{-3}$
$A_6 = -3.3173 \times 10^{-3}$
$A_8 = 2.0235 \times 10^{-2}$
$A_{10} = -4.9724 \times 10^{-3}$ 5th surface $K = -5.4085$
$A_4 = -9.8822 \times 10^{-3}$
$A_6 = 3.8108 \times 10^{-2}$
$A_8 = -2.3110 \times 10^{-2}$
$A_{10} = 6.2728 \times 10^{-3}$ 6th surface $K = 0$
$A_4 = -6.0997 \times 10^{-2}$
$A_6 = 3.5388 \times 10^{-2}$
$A_8 = -9.3482 \times 10^{-3}$
$A_{10} = 5.1984 \times 10^{-4}$ 7th surface $K = -21.9717$
$A_4 = -3.8938 \times 10^{-2}$
$A_6 = 1.7109 \times 10^{-2}$
$A_8 = -1.2600 \times 10^{-3}$
$A_{10} = -4.5069 \times 10^{-4}$

EXAMPLE 2

| | | | |
|---|---|---|---|
| $r_1 = \infty$(Stop) | $d_1 = 0.1500$ | | |
| $r_2 = -5.7501$(Aspheric) | $d_2 = 1.5214$ | $n_{d1} = 1.64000$ | $\nu_{d1} = 60.10$ |
| $r_3 = -0.8591$(Aspheric) | $d_3 = 0.1000$ | | |
| $r_4 = 9.5700$(Aspheric) | $d_4 = 0.6000$ | $n_{d2} = 1.71736$ | $\nu_{d2} = 29.50$ |
| $r_5 = 0.8679$(Aspheric) | $d_5 = 0.6846$ | | |
| $r_6 = 66.8603$(Aspheric) | $d_6 = 1.2746$ | $n_{d3} = 1.52542$ | $\nu_{d3} = 55.78$ |
| $r_7 = -1.9604$(Aspheric) | $d_7 = 0.2000$ | | |
| $r_8 = \infty$ | $d_8 = 2.0000$ | $n_{d4} = 1.51633$ | $\nu_{d4} = 64.14$ |
| $r_9 = \infty$ | $d_9 = 0.1502$ | | |
| $r_{10} = \infty$(Image Plane) | | | |

Aspherical Coefficients

2nd surface $K = -81.2346$
$A_4 = -1.6822 \times 10^{-1}$
$A_6 = 2.5291 \times 10^{-1}$
$A_8 = -7.9239 \times 10^{-1}$
$A_{10} = 7.2511 \times 10^{-1}$ 3rd surface $K = -3.4464$
$A_4 = -1.1481 \times 10^{-1}$
$A_6 = 1.4273 \times 10^{-2}$
$A_8 = -1.9287 \times 10^{-3}$
$A_{10} = -2.7564 \times 10^{-3}$ 4th surface $K = 0$
$A_4 = -3.2122 \times 10^{-2}$ -continued $A_6 = -1.4090 \times 10^{-3}$
$A_8 = 1.2145 \times 10^{-3}$
$A_{10} = 2.2021 \times 10^{-3}$ 5th surface $K = -5.3622$
$A_4 = 1.2231 \times 10^{-2}$
$A_6 = 5.9299 \times 10^{-3}$
$A_8 = -1.3334 \times 10^{-2}$
$A_{10} = 4.7568 \times 10^{-3}$ 6th surface $K = 0$
$A_4 = -6.4796 \times 10^{-2}$
$A_6 = 7.8540 \times 10^{-2}$
$A_8 = -2.7986 \times 10^{-2}$
$A_{10} = 2.8273 \times 10^{-3}$ 7th surface $K = -2.5423$
$A_4 = -2.7889 \times 10^{-2}$
$A_6 = -1.9066 \times 10^{-3}$
$A_8 = 8.8761 \times 10^{-3}$
$A_{10} = -2.0576 \times 10^{-3}$

EXAMPLE 3

| | | | |
|---|---|---|---|
| $r_1 = \infty$(Stop) | $d_1 = 0.1500$ | | |
| $r_2 = -11.1500$(Aspheric) | $d_2 = 1.7182$ | $n_{d1} = 1.52542$ | $\nu_{d1} = 55.78$ |
| $r_3 = -0.7398$(Aspheric) | $d_3 = 0.1176$ | | |
| $r_4 = -5.1048$(Aspheric) | $d_4 = 0.6000$ | $n_{d2} = 1.70514$ | $\nu_{d2} = 41.20$ |
| $r_5 = 0.9630$(Aspheric) | $d_5 = 0.4287$ | | |
| $r_6 = 52.7268$(Aspheric) | $d_6 = 1.1705$ | $n_{d3} = 1.65156$ | $\nu_{d3} = 56.20$ |
| $r_7 = -1.7038$(Aspheric) | $d_7 = 1.0000$ | | |
| $r_8 = \infty$ | $d_8 = 1.5000$ | $n_{d4} = 1.51633$ | $\nu_{d4} = 64.10$ |
| $r_9 = \infty$ | $d_9 = 0.5257$ | | |
| $r_{10} = \infty$(Image Plane) | | | |

Aspherical Coefficients

2nd surface $K = 0$
$A_4 = -8.5390 \times 10^{-2}$
$A_6 = 2.1454 \times 10^{-1}$
$A_8 = -6.7874 \times 10^{-1}$
$A_{10} = 7.1918 \times 10^{-1}$ 3rd surface $K = -3.2699$
$A_4 = -9.4083 \times 10^{-2}$
$A_6 = 2.1539 \times 10^{-2}$
$A_8 = -4.7321 \times 10^{-3}$
$A_{10} = 6.1547 \times 10^{-3}$ 4th surface $K = 11.3618$
$A_4 = -2.5013 \times 10^{-2}$
$A_6 = -1.7135 \times 10^{-2}$
$A_8 = 2.4028 \times 10^{-2}$
$A_{10} = -2.5184 \times 10^{-3}$ 5th surface $K = -8.0182$
$A_4 = -6.4582 \times 10^{-2}$
$A_6 = 4.4917 \times 10^{-2}$
$A_8 = -1.8056 \times 10^{-2}$
$A_{10} = 1.5135 \times 10^{-3}$ 6th surface $K = 0$
$A_4 = -7.2737 \times 10^{-2}$
$A_6 = 6.7906 \times 10^{-2}$ -continued $A_8 = -1.8897 \times 10^{-2}$
$A_{10} = 2.5877 \times 10^{-4}$ 7th surface $K = -2.9885$
$A_4 = -4.5662 \times 10^{-2}$
$A_6 = 4.2454 \times 10^{-4}$
$A_8 = 6.9167 \times 10^{-3}$
$A_{10} = -1.1382 \times 10^{-3}$

EXAMPLE 4

| | | | |
|---|---|---|---|
| $r_1 = \infty$(Stop) | $d_1 = 0.1500$ | | |
| $r_2 = -4.6301$(Aspheric) | $d_2 = 1.4219$ | $n_{d1} = 1.52542$ | $\nu_{d1} = 55.78$ |
| $r_3 = -0.7717$(Aspheric) | $d_3 = 0.1000$ | | |
| $r_4 = 14.7558$(Aspheric) | $d_4 = 0.6000$ | $n_{d2} = 1.58423$ | $\nu_{d2} = 30.49$ |
| $r_5 = 0.8247$(Aspheric) | $d_5 = 0.5796$ | | |
| $r_6 = -70.4957$(Aspheric) | $d_6 = 1.2848$ | $n_{d3} = 1.52542$ | $\nu_{d3} = 55.78$ |
| $r_7 = -1.7517$(Aspheric) | $d_7 = 0.5000$ | | |
| $r_8 = \infty$ | $d_8 = 1.0000$ | $n_{d4} = 1.51633$ | $\nu_{d4} = 64.10$ |
| $r_9 = \infty$ | $d_9 = 0.8550$ | | |
| $r_{10} = \infty$(Image Plane) | | | |

Aspherical Coefficients

2nd surface $K = -25.5256$
$A_4 = -1.5903 \times 10^{-1}$
$A_6 = 2.8109 \times 10^{-1}$
$A_8 = -9.4603 \times 10^{-1}$
$A_{10} = 9.6575 \times 10^{-1}$ 3rd surface $K = -3.1402$
$A_4 = -1.2192 \times 10^{-1}$
$A_6 = 5.8307 \times 10^{-3}$
$A_8 = 1.2448 \times 10^{-2}$
$A_{10} = -7.1920 \times 10^{-3}$ 4th surface $K = 0$
$A_4 = -1.6052 \times 10^{-2}$
$A_6 = -2.7695 \times 10^{-2}$
$A_8 = 2.4775 \times 10^{-2}$
$A_{10} = -3.9737 \times 10^{-3}$ 5th surface $K = -5.2890$
$A_4 = -6.1415 \times 10^{-3}$
$A_6 = 1.9045 \times 10^{-2}$
$A_8 = -1.8452 \times 10^{-2}$
$A_{10} = 4.8187 \times 10^{-3}$ 6th surface $K = 0$
$A_4 = -6.2427 \times 10^{-2}$
$A_6 = 7.8799 \times 10^{-2}$
$A_8 = -2.5631 \times 10^{-2}$
$A_{10} = 6.4222 \times 10^{-5}$ 7th surface $K = -1.5765$
$A_4 = -1.3739 \times 10^{-2}$
$A_6 = -8.3395 \times 10^{-3}$
$A_8 = 1.1410 \times 10^{-2}$
$A_{10} = -2.7793 \times 10^{-3}$

EXAMPLE 5

| | | | |
|---|---|---|---|
| $r_1 = \infty$(Stop) | $d_1 = 0.1500$ | | |
| $r_2 = -3.5483$(Aspheric) | $d_2 = 0.9441$ | $n_{d1} = 1.52542$ | $\nu_{d1} = 55.78$ |
| $r_3 = -0.7869$(Aspheric) | $d_3 = 0.1000$ | | |
| $r_4 = 5.1411$(Aspheric) | $d_4 = 0.6000$ | $n_{d2} = 1.58423$ | $\nu_{d2} = 30.49$ |
| $r_5 = 0.8668$(Aspheric) | $d_5 = 0.5579$ | | |
| $r_6 = 2.7069$(Aspheric) | $d_6 = 0.7310$ | $n_{d3} = 1.52542$ | $\nu_{d3} = 55.78$ |
| $r_7 = 40.9062$(Aspheric) | $d_7 = 0.5000$ | | |
| $r_8 = \infty$ | $d_8 = 1.0000$ | $n_{d4} = 1.51633$ | $\nu_{d4} = 64.10$ |
| $r_9 = \infty$ | $d_9 = 0.5575$ | | |
| $r_{10} = \infty$(Image Plane) | | | |

Aspherical Coefficients

2nd surface $K = 4.8164$
$A_4 = -2.0149 \times 10^{-1}$
$A_6 = 1.6121 \times 10^{-1}$
$A_8 = -7.0842 \times 10^{-1}$
$A_{10} = 4.7295 \times 10^{-1}$ 3rd surface $K = -3.2085$
$A_4 = -1.9378 \times 10^{-1}$
$A_6 = -1.2206 \times 10^{-2}$
$A_8 = 8.1481 \times 10^{-2}$
$A_{10} = -1.0139 \times 10^{-1}$ 4th surface $K = 0$
$A_4 = 5.3097 \times 10^{-2}$
$A_6 = 2.9052 \times 10^{-2}$
$A_8 = -1.8627 \times 10^{-2}$
$A_{10} = 1.7525 \times 10^{-3}$ 5th surface $K = -5.2416$
$A_4 = 3.9126 \times 10^{-2}$
$A_6 = 3.2573 \times 10^{-2}$
$A_8 = 2.9813 \times 10^{-3}$
$A_{10} = -7.9290 \times 10^{-3}$ 6th surface $K = 0$
$A_4 = -8.4473 \times 10^{-2}$
$A_6 = 3.2379 \times 10^{-2}$
$A_8 = -1.0481 \times 10^{-2}$
$A_{10} = 2.9594 \times 10^{-4}$ 7th surface $K = 0$
$A_4 = 1.3909 \times 10^{-2}$
$A_6 = -9.6102 \times 10^{-3}$
$A_8 = 1.8961 \times 10^{-3}$
$A_{10} = -9.8080 \times 10^{-4}$ FIGS. 37 to 41 are aberration diagrams for Examples 1 to 5 upon focused at infinity. In these figures, "SA", "AS", "DT", "CC" and "ω" represent spherical aberrations, astigmatism, distortion, chromatic aberration of magnification and a half angle of view, respectively.

The values of conditions (21)-(29) in each of Examples 1-5 are enumerated below.

| Condition | Example 1 | Example 2 | Example 3 | Example 4 | Example 5 |
|---|---|---|---|---|---|
| (21) | 2.35 | 2.78 | 2.92 | 2.71 | 2.14 |
| (22) | −1.24 | −1.86 | −3.09 | −3.38 | −0.99 |
| (23) | 0.41 | 0.39 | 0.56 | 0.46 | 0.31 |
| (24) | −0.37 | −0.36 | −0.43 | −0.45 | −0.34 |
| (25) | 1.545 | 1.628 | 1.627 | 1.545 | 1.545 |

-continued

| Condition | Example 1 | Example 2 | Example 3 | Example 4 | Example 5 |
|---|---|---|---|---|---|
| (26) | 1.21 | 1.35 | 1.14 | 1.40 | 1.57 |
| (27) | 0.58 | 1.73 | 1.97 | 2.42 | 1.52 |
| | 5.45 | 4.79 | 3.19 | 4.30 | 6.38 |
| (28) | 0.72 | 1.98 | 3.90 | 1.84 | 1.65 |
| | 3.13 | 2.91 | 1.40 | 2.65 | 3.85 |
| (29) | 19.2° | 20.0° | 16.2° | 18.7° | 29.8° |

Regarding conditions (27) and (28), it is noted that the values in the upper row stand for those for the object side-surface, and the values in the lower row stand for those for the image side-surface.

As can be seen from the aberration diagrams of FIGS. 37-41, each image-formation optical system can form images of good quality albeit being of a small-format size.

It is noted that throughout the above examples of the invention, the cover glass may be positioned just before the aperture stop S.

Throughout Examples 1-5 according to the second aspect of the invention, the plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because a deterioration of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In the above examples, that flare stop may be interposed at any desired position between the aperture stop S and the first lens L1, the first lens L1 and the second lens L2, the second lens L2 and the third lens L3, and the third lens L3 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

Figure 42:
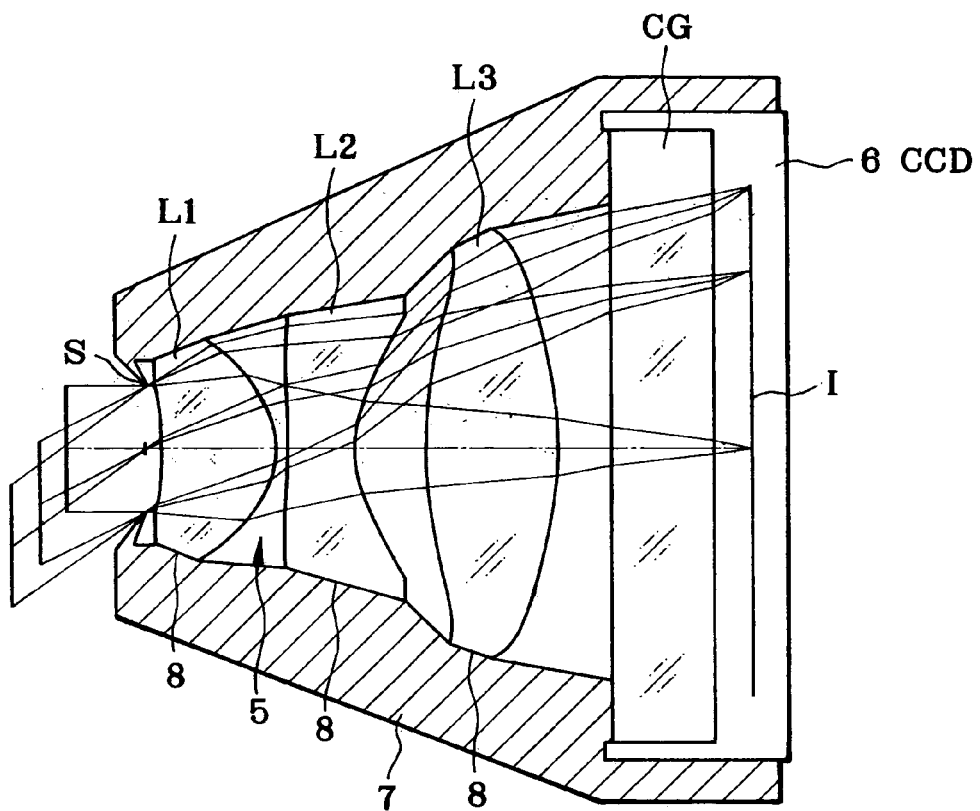
FIG. 42 is illustrative in section of an exemplary arrangement wherein Example 1 of the image-formation optical system according to the second aspect of the invention, and Example 1 of the image-formation optical system according to the fourth aspect of the invention and a CCD located on its image plane are fixed to a lens barrel molded of a resin material by integral molding.

FIG. 42 is a sectional illustration, as taken in the diagonal direction of an image plane I of a CCD 6 inclusive of the optical axis of an image-formation optical system 5 according to Example 1 of the second aspect of the invention, of an arrangement wherein the image-formation optical system 5 and the CCD 6 located on the image plane I are fixed to a lens barrel 7 formed of a resin material by integral molding. An aperture stop S is attached to the resinous lens barrel 7 by integral molding. In this way, the lens barrel 7 for holding the image-formation optical system 5 can be easily fabricated. Integral attachment of the aperture stop S to the lens barrel 7 allows fabrication steps to be considerably cut back, and giving a function of holding the image pickup device CCD 6 to the lens barrel 7 per se makes it less likely for dust, etc. to enter the lens barrel 7.

As can be seen from FIG. 42, the rim 8 of each of the first positive lens L1, the second negative lens L2 and the third positive lens L3 in the image-formation optical system 5 is inclined down in such a way as to come close to the optical axis on the object side thereof, so that the lenses can be fixedly engaged at the inclined rims with the lens barrel 7. Thus, the lenses L1 to L3 can be inserted down into the lens barrel 7 from its image plane side for alignment and fixation.

Figure 43:
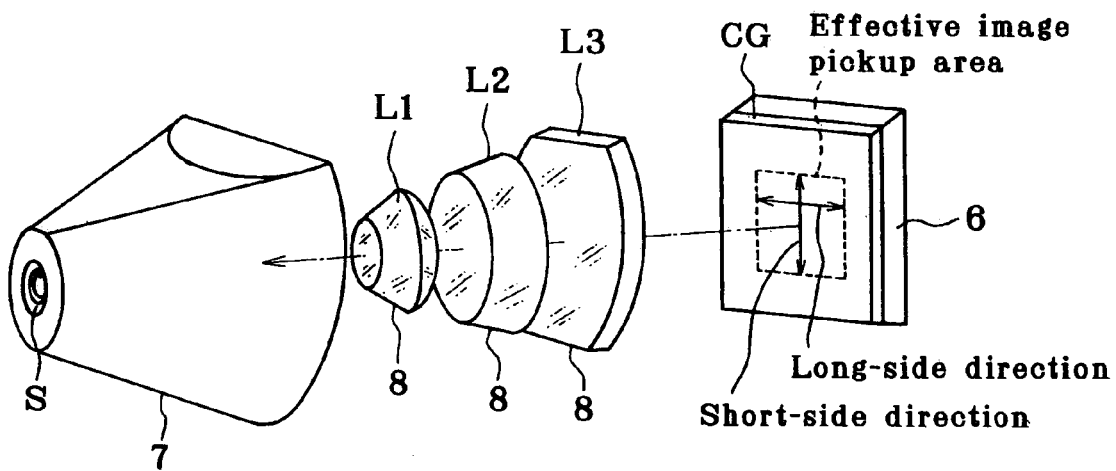
FIG. 43 is a schematic, exploded perspective view of the third positive lens in the image-formation optical system, which is configured in an oval form.

As can be seen from FIG. 43 that is an exploded, schematic view of the image-formation optical system, each of the first positive lens L1 and the second negative lens L2 in the image-formation optical system held within the lens barrel 7 molded of plastics look as a circle as viewed from the entrance side of the optical system, and the third positive lens L3 is in an oval shape that is obtained by cutting off the upper and lower portions of a circular lens. The rims 8 of the respective lenses L1, L2 and L3 are inclined down toward the stop S side, and the inside surface of the lens barrel 7 is correspondingly inclined down in conformity with the inclined rims.

Thus, the first positive lens L1 is configured in such a way as to look as a circle as viewed from the entrance side of the optical system, and the third positive lens L3 is configured in such a shape that the length of the direction corresponding to the short-side direction of the effective image pickup area of the image pickup device is shorter than the length of the direction corresponding to the long-side direction of the effective image pickup area, whereby the contour of the lens assembly comprising the first positive lens L1, the second negative lens L2 and the third positive lens L3 in the image-formation optical system can be consistent with the shape of the effective light beam, so that the optical system can be made compact while shading is held back. In this case, too, the rim 8 of each of the first positive lens L1, the second negative lens L2 and the third positive lens L3 forming part of the image-formation optical system 5 can be fixedly engaged within the lens barrel 7, so that the lenses L1, L2 and L3 can be inserted down into the lens barrel 7 from its image plane side for alignment and fixation.

As can also be seen from the sectional view of FIG. 42, the rim surface of an aperture in the aperture stop S should preferably be inclined toward the lens L1 at an angle of inclination that is larger than the angle of incidence of an effective light beam, so that the corners thereof substantially nearest to the lens side can play a stop role. It is thus possible to make it less likely for a light beam reflected at the rim surface of the aperture in the aperture stop S to enter the image pickup device CCD 6, thereby holding back the influences of flares and ghosts.

It is noted that for each example of the second aspect of the invention as described above, what has been explained with reference to Table A and FIGS. 11-14 holds true, and for each of the imaging systems according to the second aspect of the invention, what has been explained with reference to FIGS. 15-24 holds true. For details, see what has been recounted with reference to the first aspect of the invention.

The imaging system according to the second aspect of the invention constructed as described above may be applied to phototaking systems wherein object images formed through image-formation optical systems are received at image pickup devices such as CCDs, in particular, digital cameras or video cameras as well as PCs and telephone sets that are typical information processors, in particular, easy-to-carry cellular phones. Given below are some such embodiments.

FIGS. 25, 26 and 27 are conceptual illustrations of a phototaking optical system 41 for digital cameras, in which the image-formation optical system according to the second aspect of the invention is incorporated. FIG. 25 is a front perspective view of the outward appearance of a digital camera 40, and FIG. 26 is a rear perspective view of the same. FIG. 27 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41, for instance, the image-formation optical system according to Example 1. An object image formed by the phototaking optical system 41 is formed on the image pickup plane of a CCD 49 via a cover glass CG provided with a near-infrared cut coat and having a low-pass filter function. An object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 27, plane-parallel plates are used as the cover members 50; however, it is acceptable to use powered lenses.

FIGS. 28, 29 and 30 are illustrative of a personal computer that is one example of the information processor in which the image-formation optical system according to the second aspect of the invention is built as an objective optical system. FIG. 28 is a front perspective view of a personal computer 300 in use, FIG. 29 is a sectional view of a phototaking optical system 303 in the personal computer 300, and FIG. 30 is a side view of the state of FIG. 28. As shown in FIGS. 28, 29 and 30, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising the image-formation optical system of the invention (roughly shown) and an image pickup device chip 162 for receiving an image. These are built in the personal computer 300.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 22. This image 305 may be shown on a personal computer on the other end via suitable processing means and the Internet or telephone line.

Figure 31A:
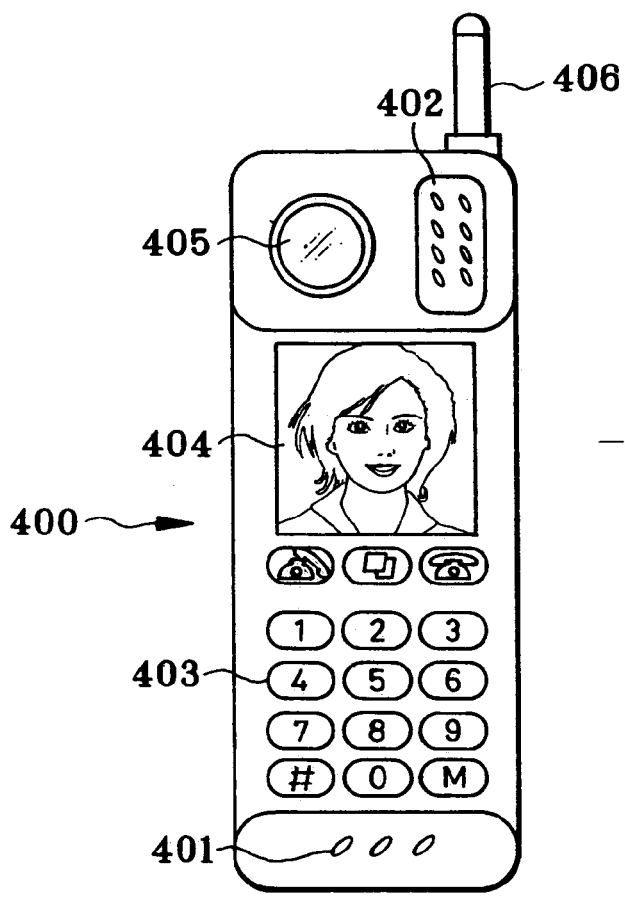
FIGS. 31(*a*) and 31(*b*) are a front and a side view of a cellular phone in which the image-formation optical system according to any one of the first to fourth aspects of the invention is built in the form of an objective optical system, and FIG. 31(*c*) is illustrative in section of a phototaking optical system therein.
Figure 31B:
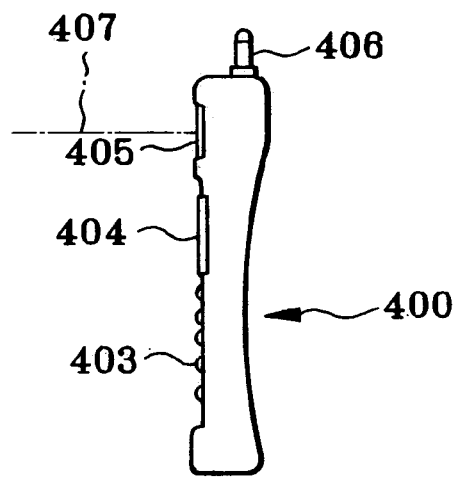
Figure 31C:
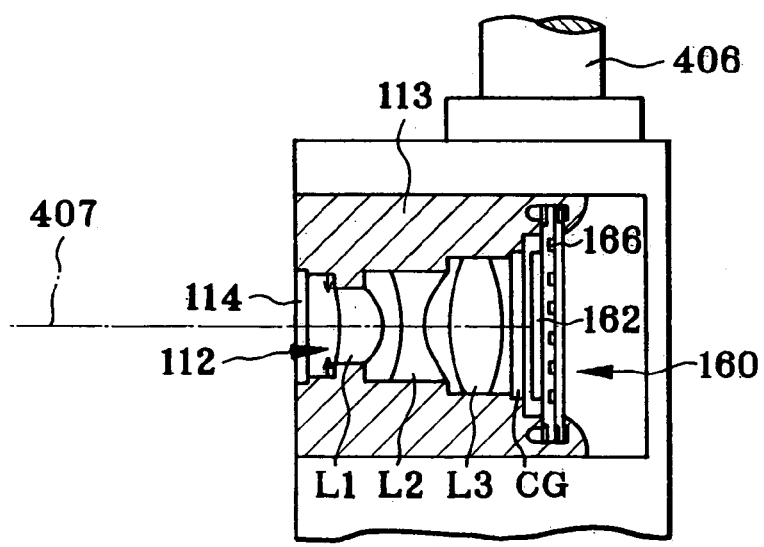

FIGS. 31(a), 31(b) and 31(c) are illustrative of a telephone set that is one example of the information processor in which the image-formation optical system according to the second aspect of the invention is built in the form of a phototaking optical system, especially a convenient-to-carry cellular phone. FIG. 31(a) and FIG. 31(b) are a front and a side view of a cellular phone 400, respectively, and FIG. 31(c) is a sectional view of a phototaking optical system 405. As shown in FIGS. 31(a), 31(b) and 31(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system of the invention (roughly shown) and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is noted that each of the above examples may be modified in various forms within the scope of what is recited in the claims.

The image-formation optical system according to the second aspect of the invention, and the imaging system incorporating the same, for instance, could be embodied as follow.

(1) An image-formation optical system, characterized by comprising, in order from an object side thereof, an aperture stop, a first positive lens, a second negative lens and a third positive lens, and satisfying the following condition:

$$1.5 < d/(f \cdot \tan \theta) < 3.0 \tag{21}$$

where d is a distance of the image-formation optical system as measured from an aperture stop plane to an image plane, θ is a maximum angle of incidence of the image-formation optical system, and f is a focal length of the image-formation optical system.

(2) The image-formation optical system according to (1) above, characterized by satisfying the following condition:

$$1.8 < d/(f \cdot \tan \theta) < 2.8 \tag{21-1}$$

(3) An image-formation optical system, characterized by comprising, in order from an object side thereof, an aperture stop, a first positive meniscus lens that is convex on an image side thereof, a second negative lens and a third positive lens, and satisfying the following condition:

$$-5.0 < f_{2-3}/f < -0.5 \tag{22}$$

where $f_{2-3}$ is a composite focal length of the second negative lens and the third positive lens, and f is a focal length of the image-formation optical system.

(4) The image-formation optical system according to (3) above, characterized by satisfying the following condition:

$$-3.5 < f_{2-3}/f < -0.8 \tag{22-1}$$

(5) The image-formation optical system according to any one of (1) to (4) above, characterized by satisfying the following condition:

$$0.1 < f_1/f_3 < 0.7 \tag{23}$$

where $f_1$ is a focal length of the first positive lens, and $f_3$ if a focal length of the third positive lens.

(6) The image-formation optical system according to (5) above, characterized by satisfying the following condition:

$$0.2 < f_1/f_3 < 0.58 \tag{23-1}$$

(7) The image-formation optical system according to any one of (1) to (6) above, characterized by satisfying the following condition:

$$-0.6 < f_2/f_3 < -0.1 \quad (24)$$

where $f_2$ is a focal length of the second negative lens, and $f_3$ if a focal length of the third positive lens.

(8) The image-formation optical system according to (7) above, characterized by satisfying the following condition:

$$-0.5 < f_2/f_3 < -0.15 \quad (24\text{-}1)$$

(9) The image-formation optical system according to any one of (1) to (8) above, characterized by satisfying the following condition:

$$1.45 < n_{avg} < 1.70 \quad (25)$$

where $n_{avg}$ is an average value of d-line refractive indices of the first positive lens, the second negative lens and the third positive lens.

(10) The image-formation optical system according to (9) above, characterized by satisfying the following condition:

$$1.5 < n_{avg} < 1.65 \quad (25\text{-}1)$$

(11) The image-formation optical system according to any one of (1) to (10) above, characterized by satisfying the following condition:

$$1.0 < (r_{1f} + r_{1r})/(r_{1f} - r_{1r}) < 1.7 \quad (26)$$

where $r_{1f}$ is a paraxial radius of curvature of an object side of the first positive lens, and $r_{1r}$ is a paraxial radius of curvature of an image side of the first positive lens.

(12) The image-formation optical system according to (11) above, characterized by satisfying the following condition:

$$1.1 < (r_{1f} + r_{1r})/(r_{1f} - r_{1r}) < 1.6 \quad (26\text{-}1)$$

(13) The image-formation optical system according to any one of (1) to (12) above, characterized in that the first positive lens comprises at least one aspheric surface that satisfies the following condition:

$$0.01 < |(r_{1s} + r_{1a})/(r_{1s} - r_{1a}) - 1| < 100 \quad (27)$$

where $r_{1s}$ is a paraxial radius of curvature of the aspheric surface of the first positive lens, and $r_{1a}$ is a value of a difference between a radius of curvature of the first positive lens with the aspheric surface taken into account and the paraxial radius of curvature, upon changing to maximum in an optically effective range.

(14) The image-formation optical system according to (13) above, characterized by satisfying the following condition:

$$0.05 < |(r_{1s} + r_{1a})/(r_{1s} - r_{1a}) - 1| < 10 \quad (27\text{-}1)$$

(15) The image-formation optical system according to any one of (1) to (14) above, characterized in that the second negative lens comprises at least one aspheric surface that satisfies the following condition:

$$0.01 < |(r_{2s} + r_{2a})/(r_{2s} - r_{2a}) - 1| < 100 \quad (28)$$

where $r_{2s}$ is a paraxial radius of curvature of the aspheric surface of the second negative lens, and $r_{2a}$ is a value of a difference between a radius of curvature of the second negative lens with the aspheric surface taken into account and the paraxial radius of curvature, upon changing to maximum in an optically effective range.

(16) The image-formation optical system according to (15) above, characterized by satisfying the following condition:

$$0.1 < |(r_{2s} + r_{2a})/(r_{2s} - r_{2a}) - 1| < 5 \quad (28\text{-}1)$$

(17) The image-formation optical system according to any one of (1) to (8) above, characterized by satisfying the following condition:

$$10° < \alpha < 40° \quad (29)$$

where $\alpha$ is an angle of incidence of a chief ray on an image plane at a maximum image height.

(18) The image-formation optical system according to (17) above, characterized by satisfying the following condition:

$$15° < \alpha < 35° \quad (29\text{-}1)$$

(19) An imaging system, characterized by comprising an image-formation optical system that comprises, in order from an object side thereof, an aperture stop, a first positive lens that is convex on an image side thereof, a second negative lens that is concave on an image side thereof and a third positive lens, and an image pickup device located on an image side of the image-formation optical system, wherein said aperture stop has an aperture of fixed shape through which an optical axis of the image-formation optical system passes, and a rim surface of the aperture is inclined down at an angle of inclination not smaller than an angle of incidence of a farthest off-axis light beam in such a way as to come closer to the optical axis on an image side thereof.

(20) An imaging system, characterized by comprising an image-formation optical system that comprises, in order from an object side thereof, an aperture stop, a first positive lens that is convex on an image side thereof, a second negative lens that is concave on an image side thereof and a third positive lens, and an image pickup device located on an image side of the image-formation optical system, wherein the imaging system further comprises a lens barrel for said image-formation optical system and said image pickup device, wherein said lens barrel is integrally molded of the same resin material of which said aperture stop is formed.

(21) An imaging system, characterized by comprising an image-formation optical system that comprises, in order from an object side thereof, an aperture stop, a first positive lens that is convex on an image side thereof, a second negative lens that is concave on an image side thereof and a third positive lens, and an image pickup device located on an image side of the image-formation optical system, wherein the imaging system further comprises a lens barrel for holding said image-formation optical system, wherein a rim of each of at least the first positive lens and the third positive lens is inclined down in such a way as to come closer to an optical axis of the image-formation optical system ond the object side thereon, and an inclined rim is in engagement with said lens barrel.

(22) An imaging system, characterized by comprising an image-formation optical system that comprises, in order from an object side thereof, an aperture stop, a first positive lens that is convex on an image side thereof, a second negative lens that is concave on an image side thereof and a third positive lens, and an image pickup device located on an image side of the image-formation optical system, wherein the imaging system further comprises a lens barrel for holding said image-formation optical system, wherein as viewed from an entrance side of the image-formation optical system, said first positive lens looks as a circle and, as viewed from the entrance side, said third positive lens is in such a shape that a length of a direction corresponding to a short-side direction of an effective image pickup area of the image pickup device is shorter than a length of a direction corresponding to a long-side direction of the image pickup area.

In accordance with the second aspect of the invention, it is possible to obtain an image-formation optical system that has a reduced length and high performance, and that can be well used as a wide-angle arrangement, and a small-format yet high-performance imaging system that incorporates the same.

Examples 1 to 4 of the image-formation optical system according to the third aspect of the invention are given below. FIGS. 44 to 47 are illustrative in section of the lens arrangements of Examples 1 to 4 upon focused on an object point at infinity. In these figures, S stands for an aperture stop, L1 a first positive lens, L2 a second negative lens, L3 a third positive lens, CG a cover glass for an electronic image pickup device, and I an image plane. It is noted that the cover glass CG may be further provided with a low-pass filter function.

EXAMPLE 1

Figure 44:
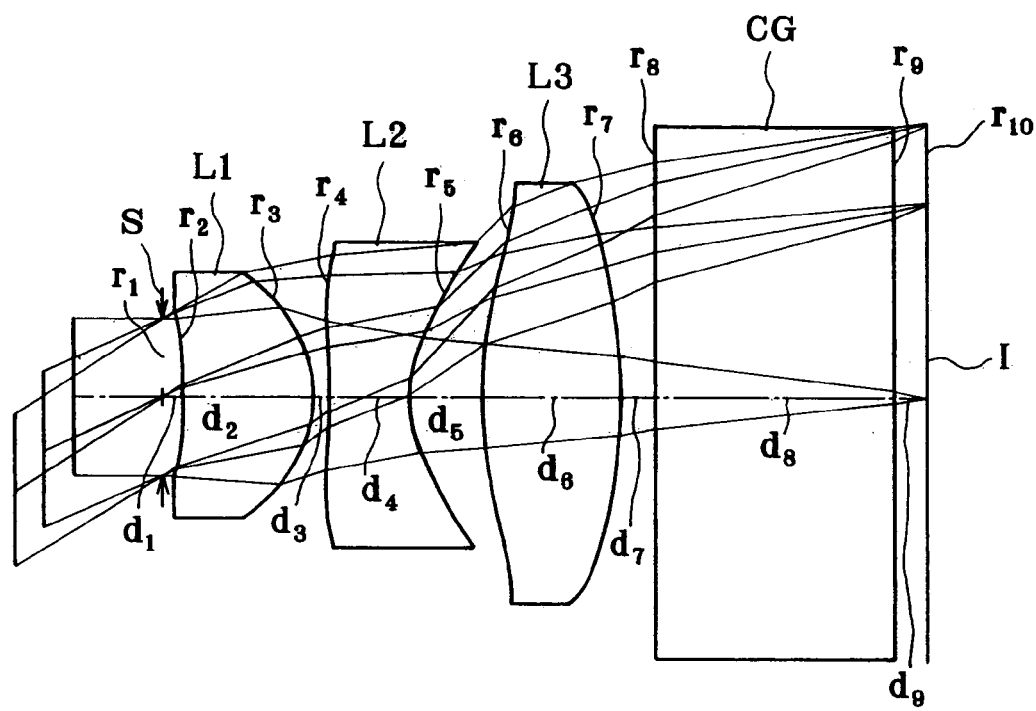
FIG. 44 is a lens arrangement section of Example 1 of the image-formation optical system according to the third aspect of the invention upon focused on an object point at infinity.

As shown in FIG. 44, the image-formation optical system of Example 1 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instance example, the first, second and third lenses L1, L2 and L3 are all made of plastics; the first and third lenses L1 and L3 are each made of an amorphous polyolefin Zeonex (trade name), and the second lens L2 is made of polycarbonate.

The specifications of the wide-angle optical system according to this example are:
a focal length f=3.73 mm,
an image height Ih=2.4 mm, and
a half angle of view ω=32.7°.

The optically effective diameters of the respective lenses (on one sides) are 0.727 mm for $2^{nd}$ surface $r_2$, 1.046 mm for $3^{rd}$ surface $r_3$, 1.208 mm for $4^{th}$ surface $r_4$, 1.306 mm for $5^{th}$ surface $r_5$, 1.583 mm for $6^{th}$ surface $r_6$, and 1.817 mm for $7^{th}$ surface $r_7$.

EXAMPLE 2

Figure 45:
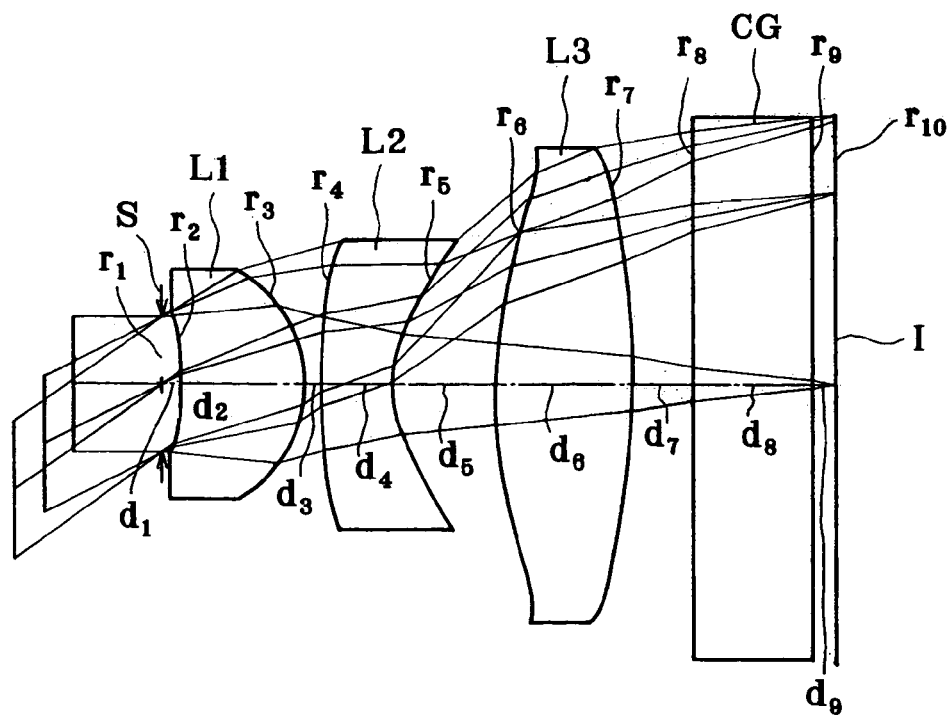
FIG. 45 is a lens arrangement section, similar to FIG. 44, of the image-formation optical system according to Example 2.

As shown in FIG. 45, the image-formation optical system of Example 2 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive lens L3 that is of double-convex shape and has aspheric surfaces on both its sides, and a cover glass CG. In the instance example, the first, second and third lenses L1, L2 and L3 are all made of plastics; the first and third lenses L1 and L3 are each made of an amorphous polyolefin Zeonex (trade name), and the second lens L2 is made of polycarbonate.

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.640 mm for $2^{nd}$ surface $r_2$, 0.986 mm for $3^{rd}$ surface $r_3$, 1.226 mm for $4^{th}$ surface $r_4$, 1.252 mm for $5^{th}$ surface $r_5$, 1.845 mm for $6^{th}$ surface $r_6$, and 2.053 mm for $7^{th}$ surface $r_7$.

EXAMPLE 3

Figure 46:
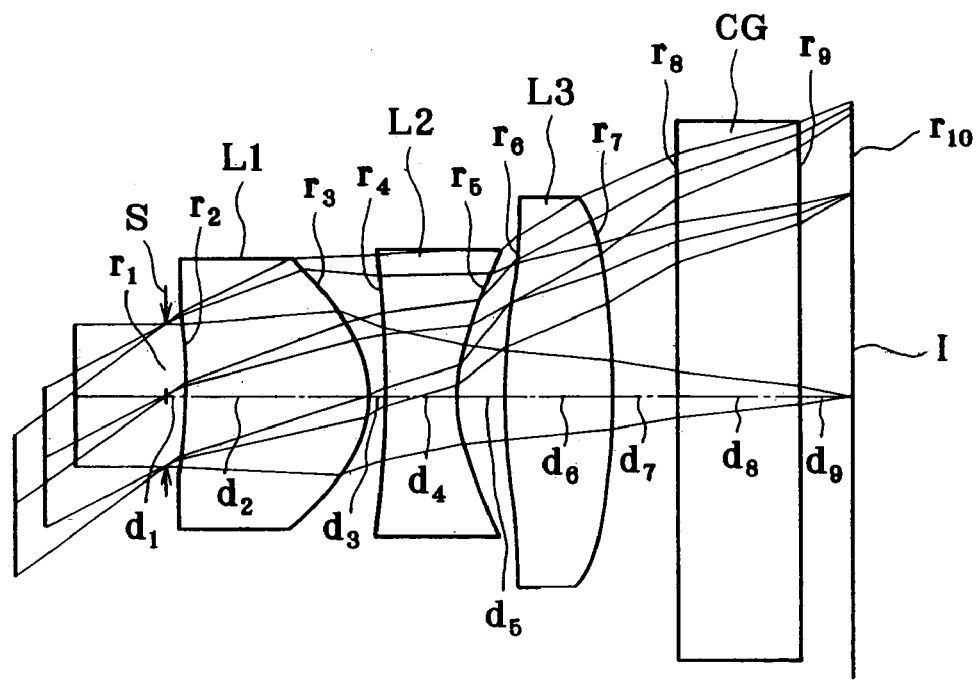
FIG. 46 is a lens arrangement section, similar to FIG. 44, of the image-formation optical system according to Example 3.

As shown in FIG. 46, the image-formation optical system of Example 3 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instance example, the first and second lenses L1 and L2 are each made of glass, and the third lens L3 is made of an amorphous polyolefin Zeonex.

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.670 mm for $2^{nd}$ surface $r_2$, 1.115 mm for $3^{rd}$ surface $r_3$, 1.145 mm for $4^{th}$ surface $r_4$, 1.173 mm for $5^{th}$ surface $r_5$, 1.306 mm for $6^{th}$ surface $r_6$, and 1.607 mm for $7^{th}$ surface $r_7$.

EXAMPLE 4

Figure 47:
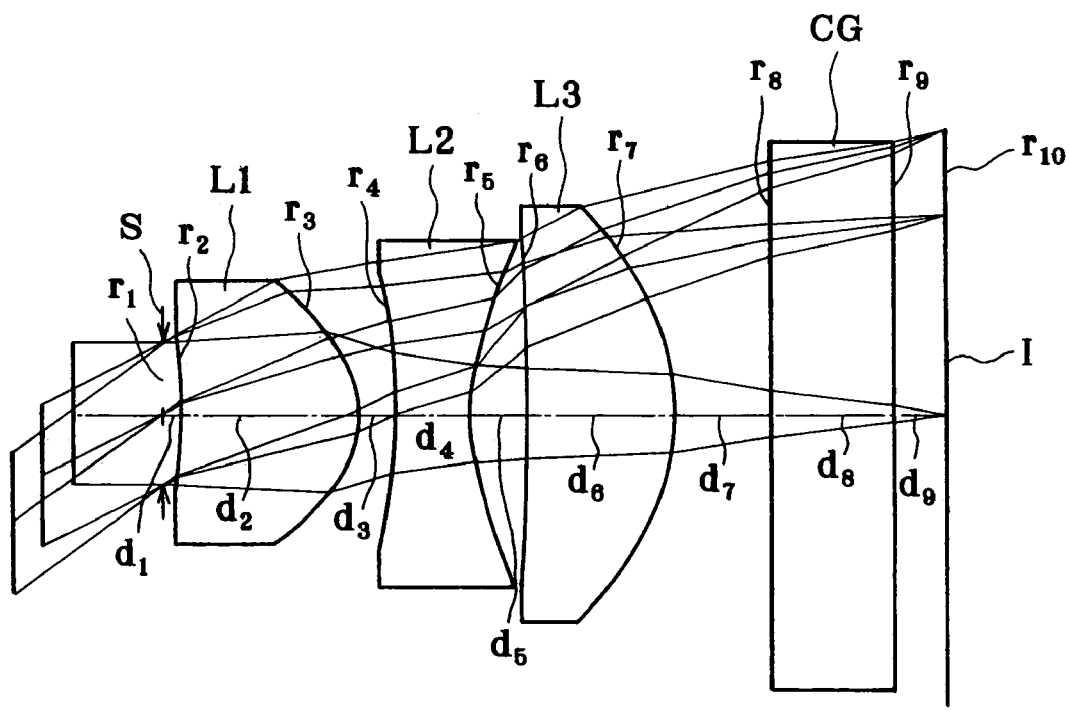
FIG. 47 is a lens arrangement section, similar to FIG. ff, of the image-formation optical system according to Example 4.
Figure 48:
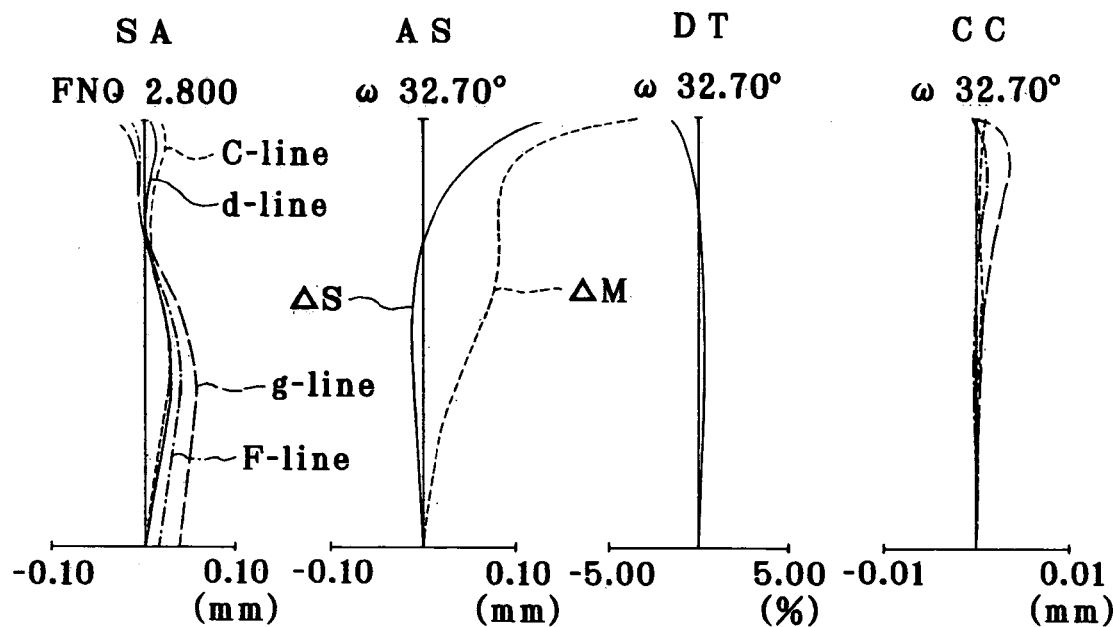
FIG. 48 is an aberration diagram for Example 1 upon focused on an object point at infinity.
Figure 49:
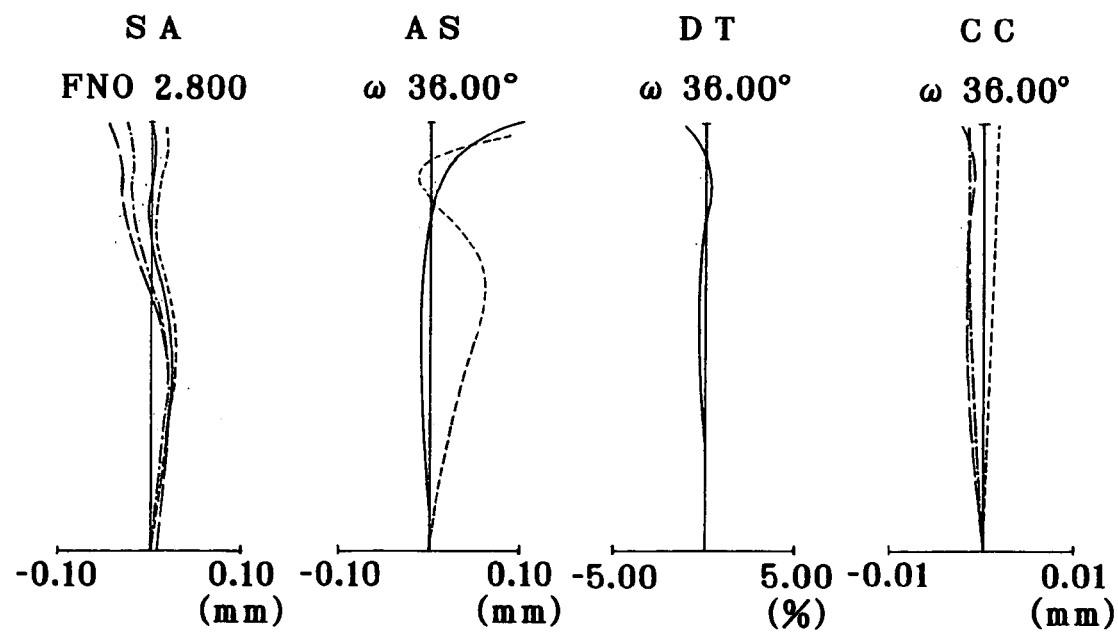
FIG. 49 is an aberration diagram for Example 2 upon focused on an object point at infinity.
Figure 50:
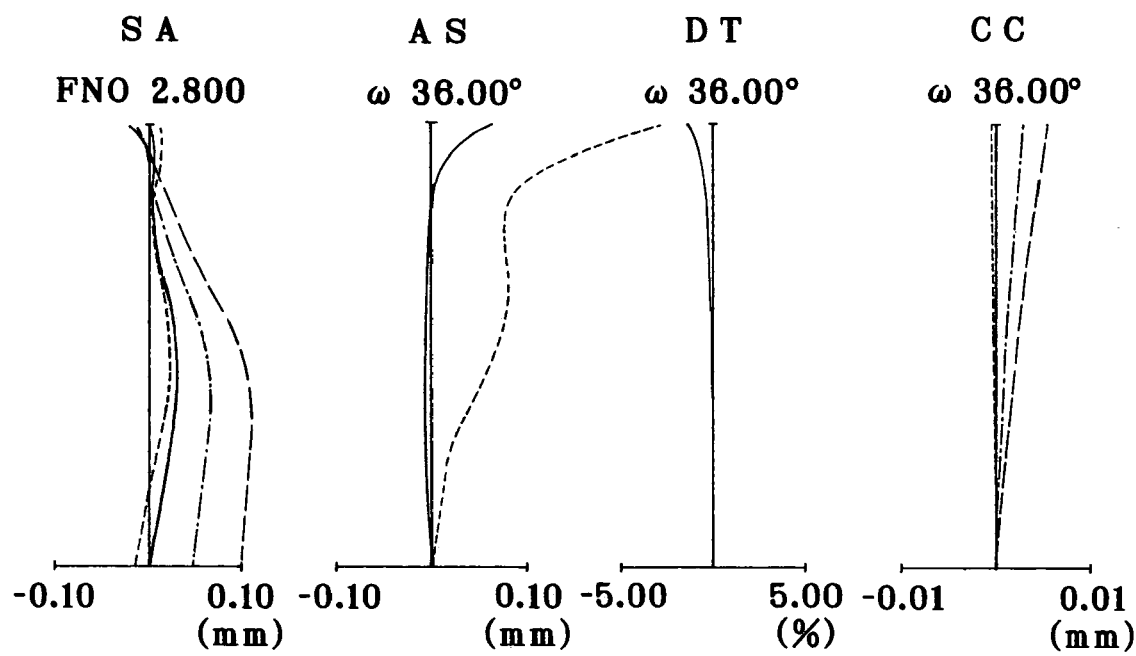
FIG. 50 is an aberration diagram for Example 3 upon focused on an object point at infinity.
Figure 51:
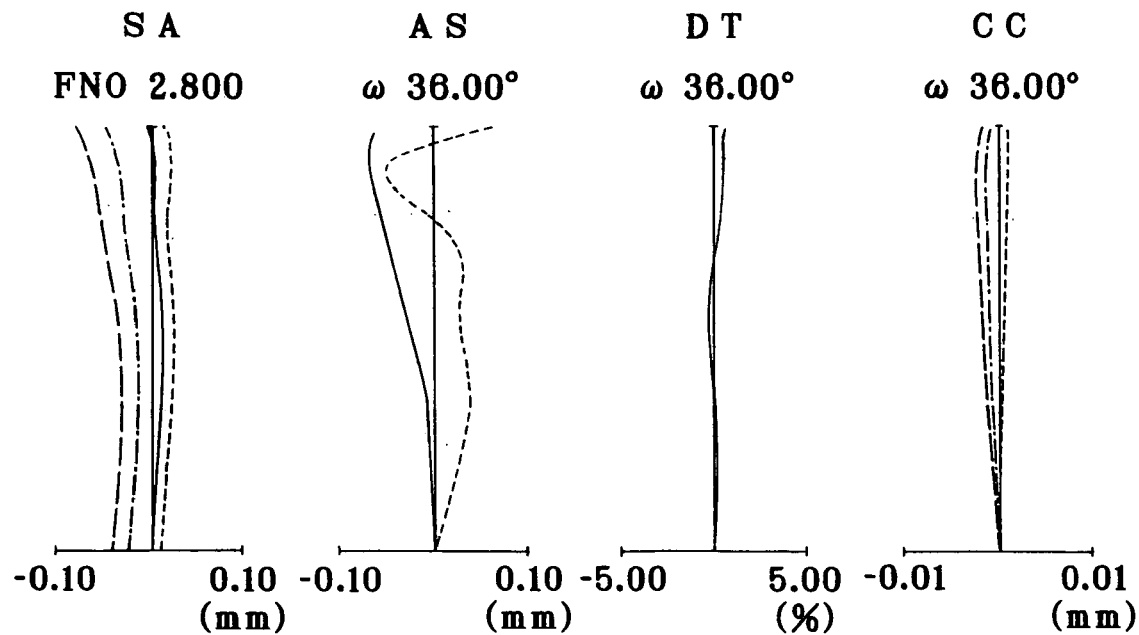
FIG. 51 is an aberration diagram for Example 4 upon focused on an object point at infinity.

As shown in FIG. 47, the image-formation optical system of Example 4 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instance example, the first lens L1 is made of plastics, and the second and third lenses L2 and L3 are each made of glass. More specifically, the first lens L3 is made of an amorphous polyolefin Zeonex (trade name).

The specifications of the wide-angle optical system according to this example are:
a focal length f=3.3 mm,
an image height Ih=2.4 mm, and
a half angle of view ω36°.

The optically effective diameters of the respective lenses (on one sides) are 0.660 mm for $2^{nd}$ surface $r_2$, 1.098 mm for $3^{rd}$ surface $r_3$, 1.226 mm for $4^{th}$ surface $r_4$, 1.446 mm for $5^{th}$ surface $r_5$, 1.464 mm for $6^{th}$ surface $r_6$, and 1.732 mm for $7^{th}$ surface $r_7$.

The numerical data on each example are given below. Symbols used hereinafter but not hereinbefore have the following meanings:
$r_1, r_2, \ldots$: radius of curvature of each lens surface,
$d_1, d_2, \ldots$: spacing between adjacent lens surfaces,
$n_{d1}, n_{d2}, \ldots$: d-line refractive index of each lens, and
$v_{d1}, v_{d2}, \ldots$: Abbe number of each lens. It is noted that aspheric shape is given by the aforesaid equation (a).

EXAMPLE 1

| | | | |
|---|---|---|---|
| $r_1 = \infty$(Stop) | $d_1 = 0.1696$ | | |
| $r_2 = -11.0541$(Aspheric) | $d_2 = 1.1212$ | $n_{d1} = 1.52542$ | $\nu_{d1} = 55.78$ |
| $r_3 = -0.8354$(Aspheric) | $d_3 = 0.1144$ | | |
| $r_4 = -20.1658$(Aspheric) | $d_4 = 0.6782$ | $n_{d2} = 1.58423$ | $\nu_{d2} = 30.49$ |
| $r_5 = 0.8891$(Aspheric) | $d_5 = 0.5892$ | | |
| $r_6 = 3.2644$(Aspheric) | $d_6 = 1.1603$ | $n_{d3} = 1.52542$ | $\nu_{d3} = 55.78$ |
| $r_7 = -4.4171$(Aspheric) | $d_7 = 0.3000$ | | |
| $r_8 = \infty$ | $d_8 = 2.0000$ | $n_{d4} = 1.51633$ | $\nu_{d4} = 64.10$ |
| $r_9 = \infty$ | $d_9 = 0.2469$ | | |
| $r_{10} = \infty$(Image Plane) | | | |

Aspherical Coefficients

2nd surface $K = 20.6298$
$A_4 = -1.4605 \times 10^{-1}$
$A_6 = 8.1598 \times 10^{-2}$
$A_8 = -4.1554 \times 10^{-1}$
$A_{10} = 2.6589 \times 10^{-1}$ 3rd surface $K = -3.0962$
$A_4 = -1.4289 \times 10^{-1}$
$A_6 = -1.4452 \times 10^{-2}$
$A_8 = 3.5563 \times 10^{-2}$
$A_{10} = -3.3357 \times 10^{-2}$ 4th surface $K = 0$
$A_4 = -3.8125 \times 10^{-3}$
$A_6 = 1.7604 \times 10^{-2}$
$A_8 = 2.0635 \times 10^{-2}$
$A_{10} = -1.2278 \times 10^{-2}$ 5th surface $K = -4.8586$
$A_4 = 4.7243 \times 10^{-3}$
$A_6 = 1.4633 \times 10^{-2}$
$A_8 = 5.7255 \times 10^{-3}$
$A_{10} = -4.4597 \times 10^{-3}$ 6th surface $K = 0$
$A_4 = -5.0546 \times 10^{-2}$
$A_6 = 2.1779 \times 10^{-2}$
$A_8 = -6.0043 \times 10^{-3}$
$A_{10} = 3.6380 \times 10^{-4}$ 7th surface $K = -27.4772$
$A_4 = -1.7730 \times 10^{-2}$
$A_6 = 5.1424 \times 10^{-3}$
$A_8 = -2.5695 \times 10^{-4}$
$A_{10} = -4.1667 \times 10^{-4}$

EXAMPLE 2

| | | | |
|---|---|---|---|
| $r_1 = \infty$(Stop) | $d_1 = 0.1500$ | | |
| $r_2 = -4.4414$(Aspheric) | $d_2 = 1.0851$ | $n_{d1} = 1.52542$ | $\nu_{d1} = 55.78$ |
| $r_3 = -0.7656$(Aspheric) | $d_3 = 0.1025$ | | |
| $r_4 = 7.3594$(Aspheric) | $d_4 = 0.6000$ | $n_{d2} = 1.58423$ | $\nu_{d2} = 30.49$ |
| $r_5 = 0.8221$(Aspheric) | $d_5 = 0.8483$ | | |
| $r_6 = 3.5100$(Aspheric) | $d_6 = 1.1893$ | $n_{d3} = 1.52542$ | $\nu_{d3} = 55.78$ |
| $r_7 = -5.2488$(Aspheric) | $d_7 = 0.5000$ | | |
| $r_8 = \infty$ | $d_8 = 1.0000$ | $n_{d4} = 1.51633$ | $\nu_{d4} = 64.14$ |
| $r_9 = \infty$ | $d_9 = 0.1653$ | | |
| $r_{10} = \infty$(Image Plane) | | | |

-continued

Aspherical Coefficients

2nd surface $K = -2.6276$
$A_4 = -1.8738 \times 10^{-1}$
$A_6 = 1.9184 \times 10^{-1}$
$A_8 = -8.9468 \times 10^{-1}$
$A_{10} = 7.5040 \times 10^{-1}$ 3rd surface $K = -3.0386$
$A_4 = -1.7124 \times 10^{-1}$
$A_6 = -1.4963 \times 10^{-3}$
$A_8 = 2.4987 \times 10^{-2}$
$A_{10} = -4.2838 \times 10^{-2}$ 4th surface $K = 0$
$A_4 = 5.9413 \times 10^{-3}$
$A_6 = 1.5563 \times 10^{-2}$
$A_8 = -3.3203 \times 10^{-3}$
$A_{10} = 1.6576 \times 10^{-4}$ 5th surface $K = -4.8199$
$A_4 = 1.5380 \times 10^{-2}$
$A_6 = 2.1836 \times 10^{-2}$
$A_8 = -1.2885 \times 10^{-2}$
$A_{10} = 3.1166 \times 10^{-3}$ 6th surface $K = 0$
$A_4 = -4.6658 \times 10^{-2}$
$A_6 = 2.1561 \times 10^{-2}$
$A_8 = -4.3006 \times 10^{-3}$
$A_{10} = 1.7143 \times 10^{-4}$ 7th surface $K = -57.2784$
$A_4 = -3.2297 \times 10^{-2}$
$A_6 = 1.4832 \times 10^{-2}$
$A_8 = -1.5028 \times 10^{-3}$
$A_{10} = -1.6629 \times 10^{-4}$

EXAMPLE 3

| | | | |
|---|---|---|---|
| $r_1 = \infty$(Stop) | $d_1 = 0.1500$ | | |
| $r_2 = -28.9244$(Aspheric) | $d_2 = 1.4906$ | $n_{d1} = 1.71700$ | $\nu_{d1} = 47.90$ |
| $r_3 = -0.8215$(Aspheric) | $d_3 = 0.1000$ | | |
| $r_4 = -7.1595$(Aspheric) | $d_4 = 0.6000$ | $n_{d2} = 1.84666$ | $\nu_{d2} = 23.80$ |
| $r_5 = 0.9897$(Aspheric) | $d_5 = 0.4137$ | | |
| $r_6 = 3.7363$(Aspheric) | $d_6 = 0.8851$ | $n_{d3} = 1.52542$ | $\nu_{d3} = 55.78$ |
| $r_7 = -5.0481$(Aspheric) | $d_7 = 0.5000$ | | |
| $r_8 = \infty$ | $d_8 = 1.0000$ | $n_{d4} = 1.51633$ | $\nu_{d4} = 64.10$ |
| $r_9 = \infty$ | $d_9 = 0.4010$ | | |
| $r_{10} = \infty$(Image Plane) | | | |

Aspherical Coefficients

2nd surface $K = 17.3876$
$A_4 = -1.3148 \times 10^{-1}$
$A_6 = 1.8184 \times 10^{-1}$
$A_8 = -7.5355 \times 10^{-1}$
$A_{10} = 5.6174 \times 10^{-1}$ 3rd surface $K = -3.7592$
$A_4 = -1.2454 \times 10^{-1}$
$A_6 = 3.7010 \times 10^{-3}$
$A_8 = 8.2207 \times 10^{-4}$ -continued $A_{10} = -5.9303 \times 10^{-3}$
4th surface $K = 0$
$A_4 = 4.8721 \times 10^{-2}$
$A_6 = -6.8012 \times 10^{-2}$
$A_8 = 3.9588 \times 10^{-2}$
$A_{10} = -4.4794 \times 10^{-3}$
5th surface $K = -7.7969$
$A_4 = 3.9472 \times 10^{-3}$
$A_6 = 4.5689 \times 10^{-2}$
$A_8 = -4.3324 \times 10^{-2}$
$A_{10} = 1.5076 \times 10^{-2}$
6th surface $K = 0$
$A_4 = -1.2224 \times 10^{-1}$
$A_6 = 1.0558 \times 10^{-1}$
$A_8 = -3.9962 \times 10^{-2}$
$A_{10} = 2.0606 \times 10^{-3}$
7th surface $K = -72.0657$
$A_4 = -3.5925 \times 10^{-2}$
$A_6 = 1.8804 \times 10^{-2}$
$A_8 = -4.8241 \times 10^{-4}$
$A_{10} = -1.9351 \times 10^{-3}$

EXAMPLE 4

| | | | |
|---|---|---|---|
| $r_1 = \infty$(Stop) | $d_1 = 0.1500$ | | |
| $r_2 = -8.9282$(Aspheric) | $d_2 = 1.4402$ | $n_{d1} = 1.52542$ | $v_{d1} = 55.78$ |
| $r_3 = -0.7917$(Aspheric) | $d_3 = 0.2808$ | | |
| $r_4 = -5.1048$(Aspheric) | $d_4 = 0.6000$ | $n_{d2} = 1.70514$ | $v_{d2} = 41.20$ |
| $r_5 = 1.1356$(Aspheric) | $d_5 = 0.4673$ | | |
| $r_6 = 10.6525$(Aspheric) | $d_6 = 1.2427$ | $n_{d3} = 1.65156$ | $v_{d3} = 56.20$ |
| $r_7 = -2.0845$(Aspheric) | $d_7 = 0.7500$ | | |
| $r_8 = \infty$ | $d_8 = 1.0000$ | $n_{d4} = 1.51633$ | $v_{d4} = 64.10$ |
| $r_9 = \infty$ | $d_9 = 0.4096$ | | |
| $r_{10} = \infty$(Image Plane) | | | |

Aspherical Coefficients

2nd surface $K = 0$
$A_4 = -1.3190 \times 10^{-1}$
$A_6 = 1.2073 \times 10^{-1}$
$A_8 = -5.7355 \times 10^{-1}$
$A_{10} = 4.7588 \times 10^{-1}$
3rd surface $K = -2.7037$
$A_4 = -1.1923 \times 10^{-1}$
$A_6 = -1.1957 \times 10^{-2}$
$A_8 = 1.2911 \times 10^{-2}$
$A_{10} = -1.1746 \times 10^{-2}$
4th surface $K = 11.3677$
$A_4 = 4.2870 \times 10^{-2}$
$A_6 = -5.1596 \times 10^{-2}$
$A_8 = 2.6728 \times 10^{-2}$
$A_{10} = -5.2315 \times 10^{-4}$
5th surface $K = -8.2739$
$A_4 = -1.2967 \times 10^{-2}$
$A_6 = 2.5993 \times 10^{-2}$
$A_8 = -1.7965 \times 10^{-2}$
$A_{10} = 3.9816 \times 10^{-3}$ 6th surface $K = 0$
$A_4 = -1.4779 \times 10^{-1}$
$A_6 = 1.2039 \times 10^{-1}$
$A_8 = -3.6583 \times 10^{-2}$
$A_{10} = 2.6587 \times 10^{-3}$
7th surface $K = -1.0468$
$A_4 = -1.7573 \times 10^{-2}$
$A_6 = -1.1577 \times 10^{-2}$
$A_8 = 1.1866 \times 10^{-2}$
$A_{10} = -2.3216 \times 10^{-3}$ FIGS. 48-51 are aberration diagrams for Examples 1-4 of the third aspect of the invention upon focused at infinity. In these figures, "SA", "AS", "DT", "CC" and "ω" represent spherical aberrations, astigmatism, distortion, chromatic aberration of magnification and a half angle of view, respectively.

The values of conditions (31)-(39) in each of Examples 1-4 are enumerated below.

| Condition | Example 1 | Example 2 | Example 3 | Example 4 |
|---|---|---|---|---|
| (31) | 0.44 | 0.48 | 0.35 | 0.47 |
| (32) | 1.16 | 1.42 | 1.06 | 1.19 |
| (33) | 0.44 | 0.38 | 0.27 | 0.56 |
| (34) | 2.61 | 1.76 | 1.82 | 3.33 |
| (35) | −0.60 | −0.68 | −0.41 | −0.53 |
| (36) | −0.08 | −0.19 | −0.03 | −0.13 |
| (37) | 0.43 | 1.30 | 0.21 | 0.78 |
| (38) | −5.91 | −5.60 | −4.90 | −4.98 |
| (39) | 19.6° | 18.7° | 29.1° | 20.0° |

With each of the above example, it is possible to obtain images of good quality as can be seen from the aberration diagrams of FIGS. 48-51, although it is of a small-format size.

In each example according to the third aspect of the invention, too, the maximum image height Ih on the image plane is defined by ½ of the diagonal length L of the (substantially rectangular) effective area of the image pickup device. When a field frame is located as means for defining the image pickup area, the maximum image height Ih is given by ½ of the diagonal length L of the field frame, and when an image pickup device such as a solid-state image pickup device is used, it is given by ½ of the diagonal length L of its effective image pickup area.

When the image pickup recording medium is a CCD or other electronic image pickup device, what relates the diagonal length L of its effective image pickup plane (effective image pickup area) has to the pixel spacing a has been explained with reference to FIGS. 9 and 10. For further details, see the explanation of the first aspect of the invention.

Throughout Examples 1 to 4 according to the third aspect of the invention, the cover glass may be located just before the aperture stop S.

Throughout the above examples of the third aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1-4, that flare stop may be interposed at any desired position between the aperture stop S and the first lens L1, the first lens L1 and the second lens L2, the second lens L2 and the third lens L3, and the third lens L3 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

Figure 52:
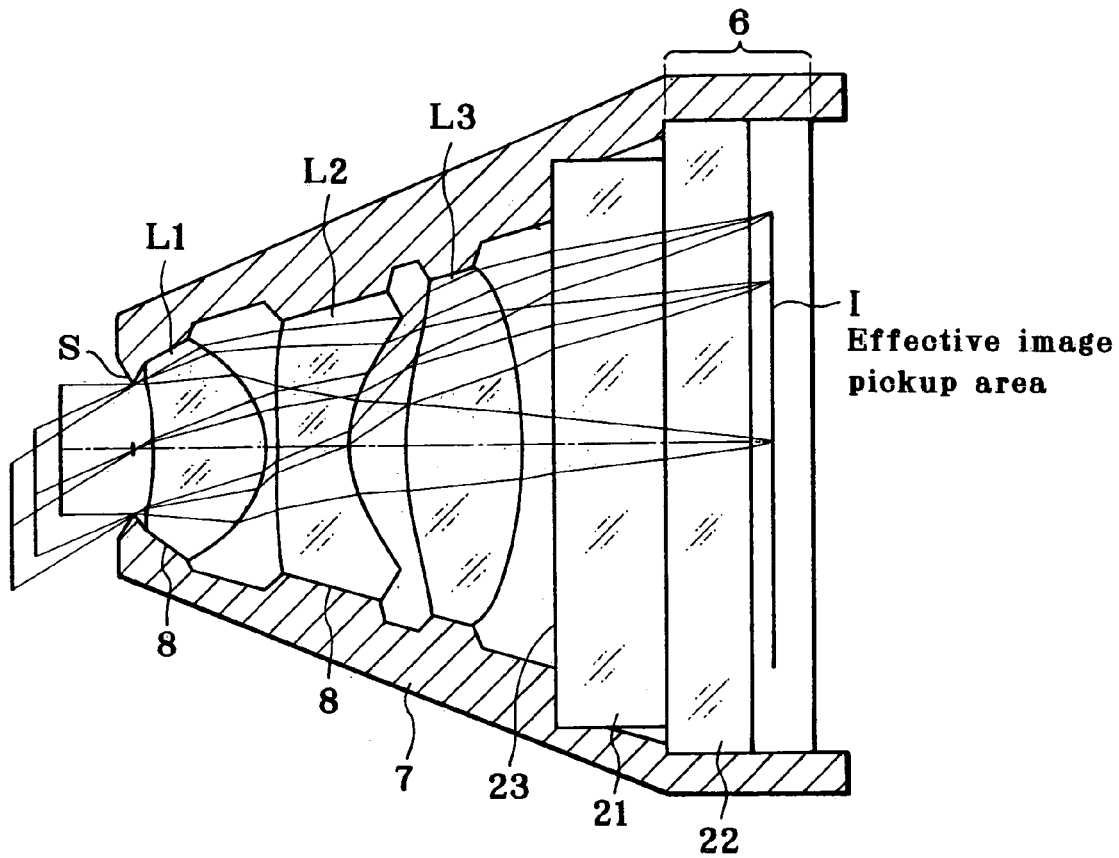
FIG. 52 is illustrative in section of one exemplary arrangement wherein the image-formation optical system according to Example 1 and a CCD located on its image plane are fixed to a lens barrel molded of a resin material by integral molding.

FIG. 52 is a sectional illustration, as taken in the diagonal direction of an image plane I of a CCD unit 6 inclusive of the optical axis of an image-formation optical system 5 according to Example 1 of the third aspect of the invention, of an arrangement wherein the image-formation optical system 5 and the CCD unit 6 located on the image plane I are fixed to a lens barrel 7 formed of a resin material by integral molding. An aperture stop S is attached to the resinous lens barrel 7 by integral molding. In this way, the lens barrel 7 for holding the image-formation optical system 5 can be easily fabricated. Integral attachment of the aperture stop S to the lens barrel 7 allows fabrication steps to be considerably cut back, and giving a function of holding the CCD 6 unit comprising an image pickup device CCD to the lens barrel 7 per se makes it less likely for dust, etc. to enter the lens barrel 7.

As can be seen from FIG. 52, the rim 8 of each of the first positive lens L1, the second negative lens L2 and the third positive lens L3 in the image-formation optical system 5 is inclined down in such a way as to come closer to the optical axis on the object side thereof, so that the lenses can be fixedly engaged at the inclined rims with the lens barrel 7. Thus, the lenses L1 to L3 can be inserted down into the lens barrel 7 from its image plane side for alignment and fixation.

In FIG. 52, it is noted that a plane-parallel plate 21 mounted on the CCD unit 6 may be replaced by a low-pass filter provided at its front surface 23 with an infrared cut coating, and a plane-parallel plate 22 may be replaced by a cover glass. Alternatively, both the plane-parallel plates 21 and 22 may be replaced by a cover glass CG having a total thickness of 2 mm.

Figure 53:
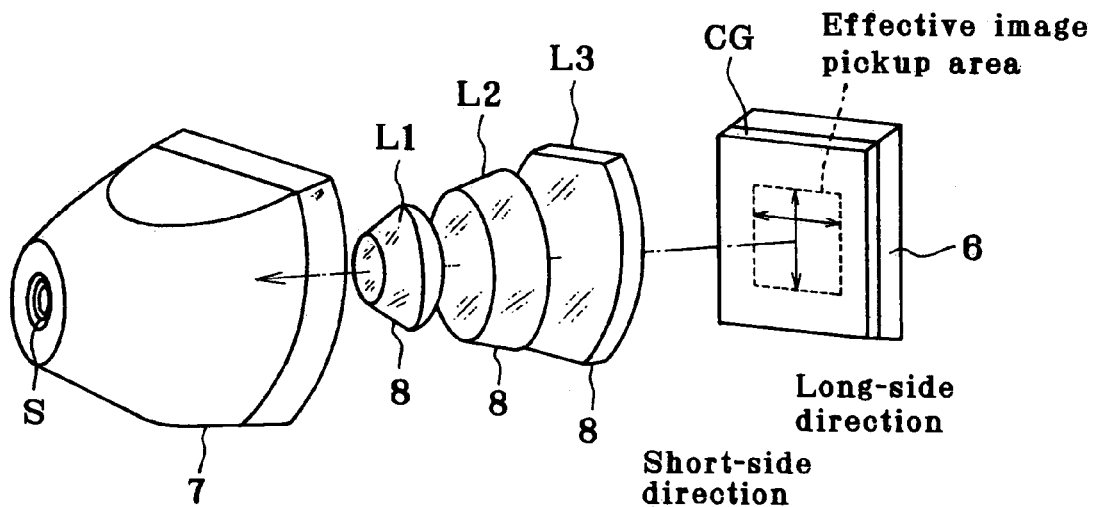
FIG. 53 is a schematic, exploded perspective view of the third positive lens in the image-formation optical system, which is configured in an oval form.

As can be seen from FIG. 53 that is an exploded, schematic view of the image-formation optical system, each of the first positive lens L1 and the second negative lens L2 in the image-formation optical system held within the lens barrel 7 molded of plastics is configured in such a way as to look as a circle as viewed from the entrance side of the optical system, and the third positive lens L3 is in an oval shape that is obtained by cutting off the upper and lower portions of a circular lens. The rims 8 of the respective lenses L1, L2 and L3 are inclined down toward the stop S side, and the inside surface of the lens barrel 7 is correspondingly inclined down in conformity with the inclined rims.

Thus, the first positive lens L1 is configured in such a way as to look as a circle as viewed from the entrance side of the optical system, and the third positive lens L3 is configured in such a shape that the length of the direction corresponding to the short-side direction of the effective image pickup area of the image pickup device is shorter than the length of the direction corresponding to the long-side direction of the effective image pickup area, whereby the contour of the lens assembly comprising the first positive lens L1, the second negative lens L2 and the third positive lens L3 in the image-formation optical system can be consistent with the shape of the effective light beam, so that the optical system can be made compact while shading is held back. In this case, too, the rim 8 of each of the first positive lens L1, the second negative lens L2 and the third positive lens L3 forming part of the image-formation optical system 5 can be fixedly engaged within the lens barrel 7, so that the lenses L1, L2 and L3 can be inserted down into the lens barrel 7 from its image plane side for alignment and fixation.

As can also be seen from the sectional view of FIG. 52, the rim surface of an aperture in the aperture stop S should preferably be inclined down toward the lens L1 at an angle of inclination that is larger than the angle of incidence of an effective light beam, so that the corners thereof substantially nearest to the lens side can play a stop role. It is thus possible to make it less likely for a light beam reflected at the rim surface of the aperture in the aperture stop S to enter the image pickup device CCD, thereby holding back the influences of flares and ghosts.

It is noted that for each example of the third aspect of the invention as described above, what has been explained with reference to Table A and FIGS. 11-14 holds true, and for each of the imaging systems according to the third aspect of the invention, what has been explained with reference FIGS. 15-24 holds true. For details, see what has been recounted with reference to the first aspect of the invention.

The imaging system of the invention constructed as described above may be applied to phototaking systems where object images formed through image-formation optical systems are received at image pickup devices such as CCDS, in particular, digital cameras or video cameras as well as PCs and telephone sets that are typical information processors, in particular, easy-to-carry cellular phones. Given below are some such embodiments.

FIGS. 25, 26 and 27 are conceptual illustrations of a phototaking optical system 41 for digital cameras, in which the image-formation optical system according to the third aspect of the invention is incorporated. FIG. 25 is a front perspective view of the outward appearance of a digital camera 40, and FIG. 26 is a rear perspective view of the same. FIG. 27 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41, for instance, the image-formation optical system according to Example 1. An object image formed by the phototaking optical system 41 is formed on the image pickup plane of a CCD 49 via a cover glass CG provided with a near-infrared cut coating and having a low-pass filter function. An object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 27, plane-parallel plates are used as the cover members 50; however, it is acceptable to use powered lenses.

FIGS. 28, 29 and 30 are illustrative of a personal computer that is one example of the information processor in which the image-formation optical system according to the third aspect of the invention is built as an objective optical system. FIG. 28 is a front perspective view of a personal computer 300 in use, FIG. 29 is a sectional view of a phototaking optical system 303 in the personal computer 300, and FIG. 30 is a side view of the state of FIG. 28. As shown in FIGS. 28, 29 and 30, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising the image-formation optical system of the third aspect of the invention (roughly shown) and an image pickup device chip 162 for receiving an image. These are built in the personal computer 300.

Here a cover CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 22. This image 305 may be shown on a personal computer on the other end via suitable processing means and the Internet or telephone line.

FIGS. 31(*a*), 31(*b*) and 31(*c*) are illustrative of a telephone set that is one example of the information processor in which the image-formation optical system according to the second aspect of the invention is built in the form of a phototaking optical system, especially a convenient-to-carry cellular phone. FIG. 31(*a*) and FIG. 31(*b*) are a front and a side view of a cellular phone 400, respectively, and FIG. 31(*c*) is a sectional view of a phototaking optical system 405. As shown in FIGS. 31(*a*), 31(*b*) and 31(*c*), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system of the invention (roughly shown) and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is noted that each of the above examples may be modified in various forms within the scope of what is recited in the claims.

The image-formation optical system according to the third aspect of the invention, and the imaging system incorporating the same, for instance, could be embodied as follow.

(1) An image-formation optical system, characterized by comprising, in order from an object side thereof, a first positive meniscus lens that is convex on an image side thereof, a second negative lens and a third positive lens, and satisfying the following condition:

$$0.1 < f_1/f < 0.55 \tag{31}$$

where $f_1$ is a focal length of the first positive lens, and f is a focal length of the image-formation optical system.

(2) The image-formation optical system according to (1) above, characterized by satisfying the following condition:

$$0.2 < f_1/f < 0.5 \tag{31-1}$$

(3) An image-formation optical system, characterized by comprising, in order from an object side thereof, a first positive meniscus lens that is convex on an image side thereof, a second negative lens and a third positive lens, and satisfying the following condition:

$$1.0 < (r_{1f} + r_{1r})/(r_{1f} - r_{1r}) < 1.7 \tag{32}$$

where $r_{1f}$ is an axial radius of curvature of an object side-surface of the first positive lens, and $r_{1r}$ is an axial radius of curvature of an image side-surface of the first positive lens.

(4) The image-formation optical system according to (3) above, characterized by satisfying the following condition:

$$1.1 < (r_{1f} + r_{1r})/(r_{1f} - r_{1r}) < 1.5 \tag{32-1}$$

(5) The image-formation optical system according to any one of (1) to (4) above, characterized by satisfying the following condition:

$$0.1 < f_1/f_3 < 0.8 \tag{33}$$

where $f_1$ is a focal length of the first lens, and $f_3$ is a focal length of the third lens.

(6) The image-formation optical system according to (5) above, characterized by satisfying the following condition:

$$0.15 < f_1/f_3 < 0.7 \tag{33-1}$$

(7) The image-formation optical system according to any one of (1) to (6) above, characterized by the following condition:

$$1.0 < f_{1-2}/f < 4.0 \tag{34}$$

where $f_{1-2}$ is a composite focal length of the first and second lenses, and f is a focal length of the image-formation optical system.

(8) The image-formation optical system according to (7) above, characterized by satisfying the following condition:

$$1.5 < f_{1-2}/f < 2.7 \tag{34-1}$$

(9) The image-formation optical system according to any one of (1) to (8) above, characterized by the following condition:

$$-0.75 < f_2/Ih < -0.1 \tag{35}$$

where $f_2$ is a focal length of the second negative lens, and Ih is a maximum image height.

(10) The image-formation optical system according to (9) above, characterized by satisfying the following condition:

$$-0.65 < f_2/Ih < -0.25 \tag{35-1}$$

(11) The image-formation optical system according to any one of (1) to (10) above, characterized by satisfying the following condition:

$$-0.25 < r_{2r}/r_{1f} < -0.01 \tag{36}$$

where $r_{2r}$ is an axial radius of curvature of an image side-surface of the second negative lens, and $r_{1f}$ is an axial radius of curvature of an object side-surface of the first positive lens.

(12) The image-formation optical system according to (11) above, characterized by satisfying the following condition:

$$-0.20 < r_{2r}/r_{1f} < -0.02 \tag{36-1}$$

(13) The image-formation optical system according to any one of (1) to (12) above, characterized by satisfying the following condition:

$$0.01 < |(r_{1fs} + r_{1fa})/(r_{1fs} - r_{1fa}) - 1| < 100 \tag{37}$$

where $r_{1fs}$ is an axial radius of curvature of an object side-surface of the first positive lens, and $r_{1fa}$ is a value of a difference between a radius of curvature of the object side-surface of the first positive lens with an aspheric surface taken into account and the axial radius of curvature, upon changing to maximum in an optically effective range.

(14) The image-formation optical system according to (13) above, characterized by satisfying the following condition:

$$0.02 < |(r_{1fs} + r_{1fs})/(r_{1fs} - r_{1fa}) - 1| < 10 \tag{37-1}$$

(15) The image-formation optical system according to any one of (1) to (14) above, characterized by satisfying the following condition:

$$0.01 < |(r_{1rs} + r_{1ra})/(r_{1rs} - r_{1ra}) - 1| < 100 \tag{38}$$

where $r_{1rs}$ is an axial radius of curvature of an image side-surface of the first positive lens, and $r_{1ra}$ is a value of a difference between a radius of curvature of the image side surface of the first positive lens with an aspheric surface taken into account and the axial radius of curvature, upon changing to maximum in an optically effective range.

(16) The image-formation optical system according to (15) above, characterized by satisfying the following condition:

$$0.02 < |(r_{1rs} + r_{1ra})/(r_{1rs} - r_{1ra}) - 1| < 10 \tag{38-1}$$

(17) The image-formation optical system according to any one of (1) to (16) above, characterized by satisfying the following condition:

$$10° < \alpha < 40° \tag{39}$$

where $\alpha$ is an angle of incidence of a chief ray on an image plane at a maximum image height.

(18) The image-formation optical system according to (17) above, characterized by satisfying the following condition:

$$15° < \alpha < 35° \tag{39-1}$$

(19) An electronic imaging system, characterized by comprising an image-formation optical system as recited in any one of (1) to (18) above and an electronic image pickup device located on an image side thereof

(20) The electronic imaging system according to (19) above, characterized by having a half angle of view of 30° to 50° inclusive.

In accordance with the third aspect of the invention, it is possible to obtain a high-performance yet small-form a image-formation optical system, and a small-format yet high-performance imaging system that incorporates the same.

Examples 1 to 5 of the image-formation optical system according to the fourth aspect of the invention are given below. FIGS. 54 to 58 are illustrative in section of the lens arrangements of Examples 1 to 5 upon focused on an object point at infinity. In these figures, S stands for an aperture stop, L1 a first positive lens, L2 a second negative lens, L3 a third positive lens, CG a cover glass for an electronic image pickup device, and I an image plane. It is noted that the cover glass CG with or without a low-pass filter function may be further provided with a wavelength range-limiting multilayer film.

EXAMPLE 1

Figure 54:
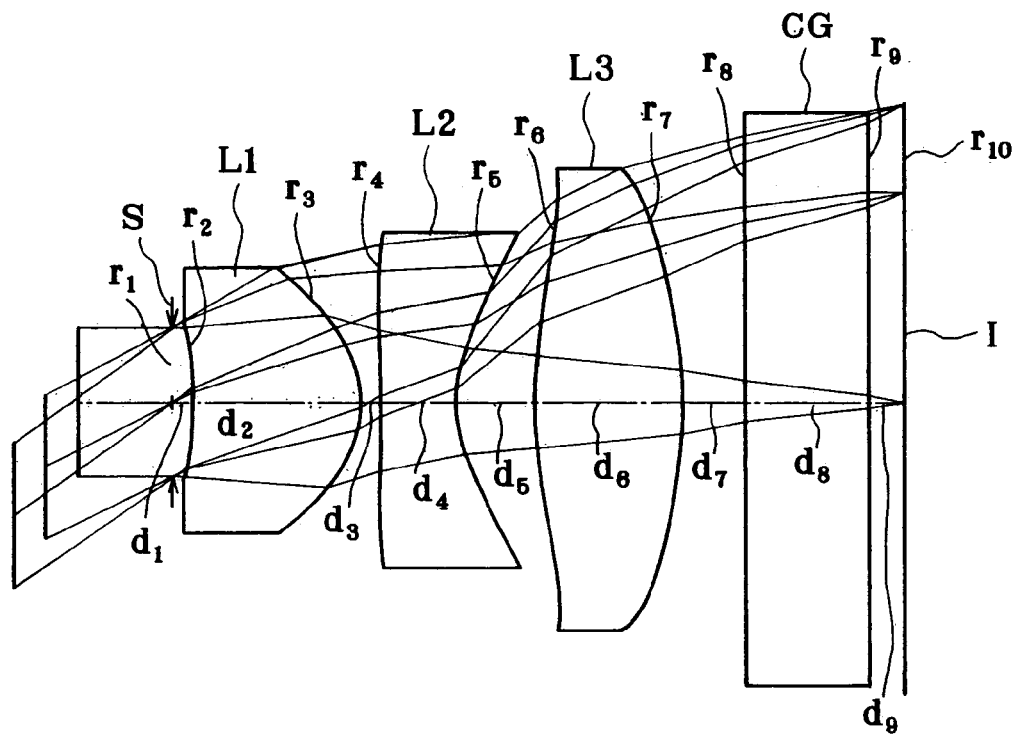
FIG. 54 is a lens arrangement section of Example 1 of the image-formation optical system according to the fourth aspect of the invention upon focused on an object point at infinity.

As shown in FIG. 54, the image-formation optical system of Example 1 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instance example, the first, second and third lenses L1, L2 and L3 are all made of plastics; the first and third lenses L1 and L3 are each made of an amorphous polyolefin Zeonex (trade name), and the second lens L2 is made of polycarbonate.

The specifications of the wide-angle optical system according to this example are:
  a focal length f=3.3 mm,
  an image height Ih=2.4 mm, and
  a half angle of view ω=36°.

The optically effective diameters of the respective lenses (on one sides) are 0.652 mm for $2^{nd}$ surface $r_2$, 1.058 mm for $3^{rd}$ surface $r_3$, 1.238 mm for $4^{th}$ surface $r_4$, 1.335 mm for $5^{th}$ surface $r_5$, 1.592 mm for $6^{th}$ surface $r_6$, and 1.844 mm for $7^{th}$ surface $r_7$.

EXAMPLE 2

Figure 55:
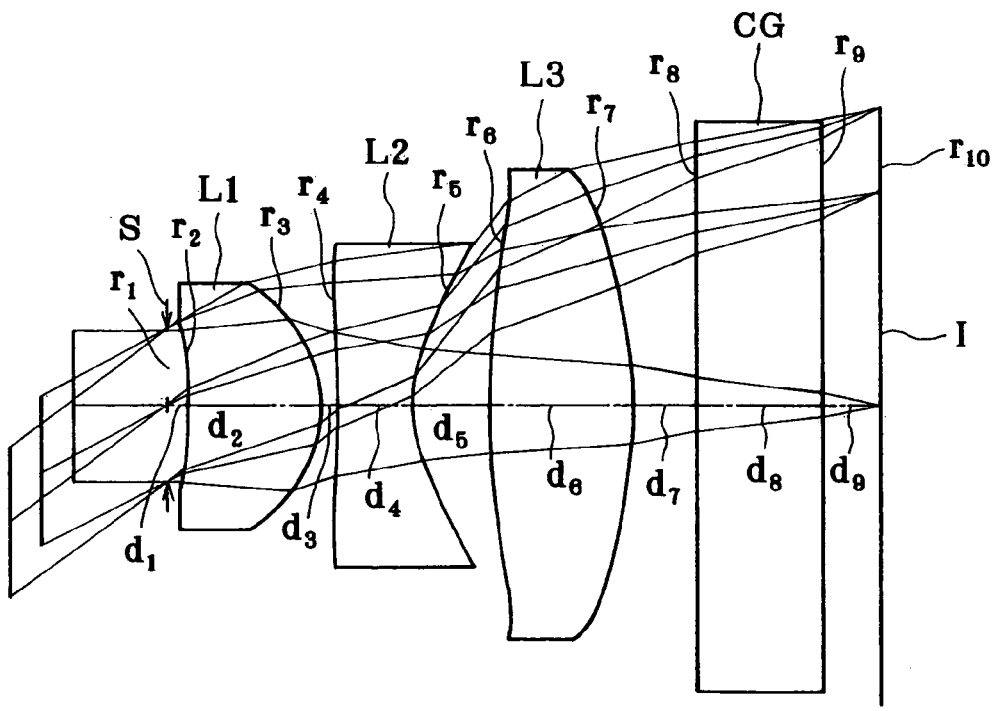
FIG. 55 is a lens arrangement section, similar to FIG. 54, of the image-formation optical system of Example 2.

As shown in FIG. 55, the image-formation optical system of Example 2 is made up of, in order from its object side, an aperture stop S, a first positive meniscus lens L1 that is convex on its image side and has aspheric surfaces on both its sides, a second negative lens L2 that is of double-convex shape and has aspheric surfaces on both its sides, a third positive lens L3 that is of double-convex shape and has aspheric surfaces on both its sides, and a cover glass CG. In the instance example, the first and second lenses L1 and L2 are each made of plastics, and the third lens L3 is made of glass. More specifically, the first lens L1 is made of an amorphous polyolefin Zeonex, and the second lens L2 is made of polycarbonate.

The specifications of the wide-angle optical system according to this example are:
  a focal length f=3.3 mm,
  an image height Ih=2.4 mm, and
  a half angle of view ω=36°.

The optically effective diameters of the respective lenses (on one sides) are 0.653 mm for $2^{nd}$ surface $r_2$, 0.966 mm for $3^{rd}$ surface $r_3$, 1.129 mm for $4^{th}$ surface $r_4$, 1.271 mm for $5^{th}$ surface $r_5$, 1.627 mm for $6^{th}$ surface $r_6$, and 1.871 mm for $7^{th}$ surface $r_7$.

EXAMPLE 3

Figure 56:
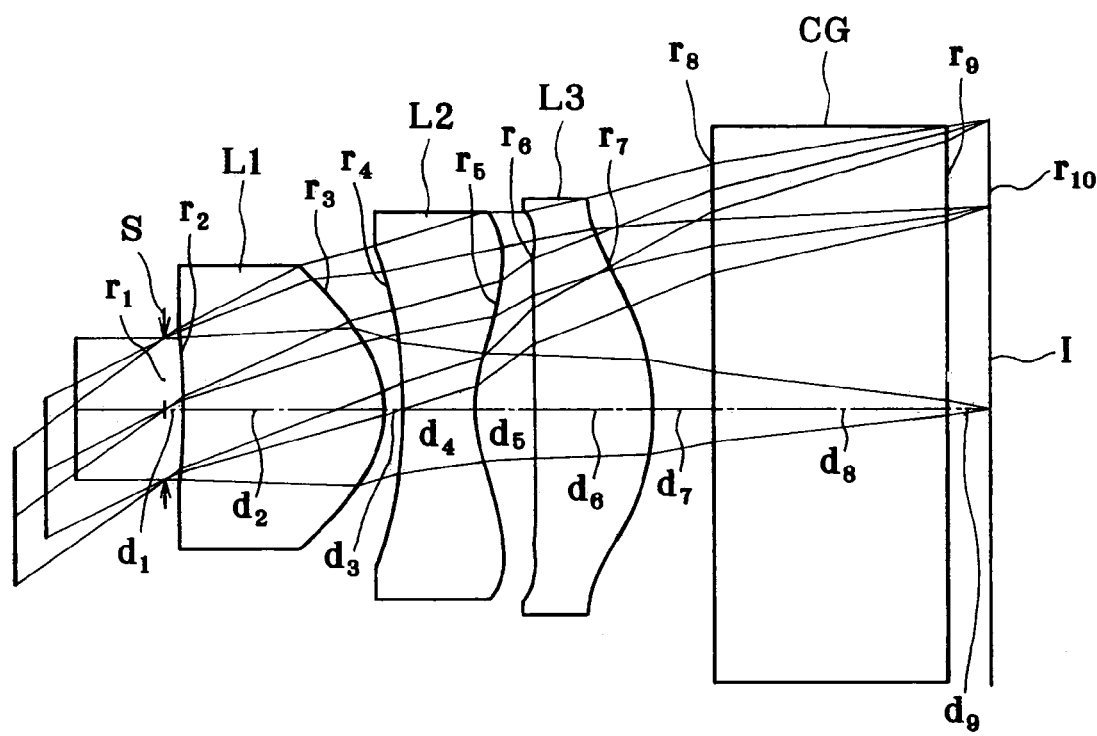
FIG. 56 is a lens arrangement section, similar to FIG. 54, of the image-formation optical system of Example 3.

As shown in FIG. 56, the image-formation optical system of Example 3 is made up of, in order from its object side, an aperture stop S, a first positive meniscus lens L1 that is convex on its image side and has aspheric surfaces on both its sides, a second negative lens L2 that is of double-concave shape and has aspheric surfaces on both its sides, a third positive lens L3 that is of double-convex shape and has aspheric surfaces on both its sides, and a cover glass CG. In the instance example, the first lens L1 is made of plastics, and the second and third lenses L2 and L3 are each made of glass. More specifically, the first lens L1 is made of an amorphous polyolefin Neozex.

The specifications of the wide-angle optical system according to this example are:
  a focal length f=3.3 mm,
  an image height Ih=2.4 mm, and
  a half angle of view ω=36°.

The optically effective diameters of the respective lenses (on one sides) are 0.669 mm for $2^{nd}$ surface $r_2$, 1.186 mm for $3^{rd}$ surface $r_3$, 1.355 mm for $4^{th}$ surface $r_4$, 1.629 mm for $5^{th}$ surface $r_5$, 1.621 mm for $6^{th}$ surface r6, and 1.741 mm for $7^{th}$ surface $r_7$.

EXAMPLE 4

Figure 57:
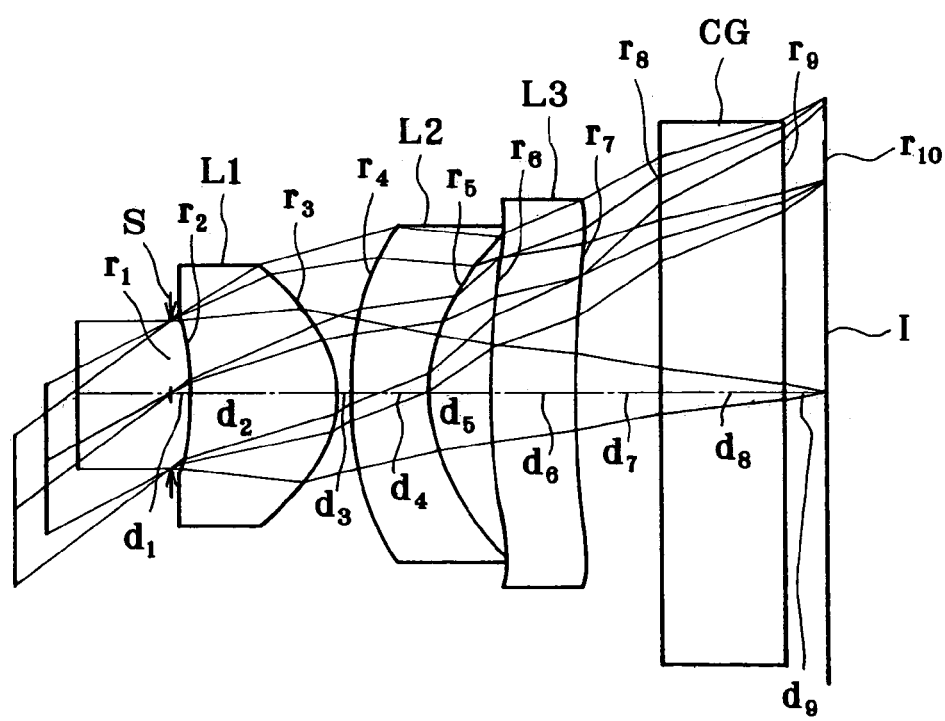
FIG. 57 is a lens arrangement section, similar to FIG. 55, of the image-formation optical system of Example 4.

As shown in FIG. 57, the image-formation optical system of Example 4 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive meniscus lens L3 that is convex on its object side and has aspheric surfaces on both its sides, and a cover glass CG. In the instance example, the first, second and third lenses L1, L2 and L3 are all made of plastics; the first and third lenses L1 and L3 are each made of an amorphous polyolefin Zeonex, and the second lens L2 is made of polycarbonate.

The specifications of the wide-angle optical system according to this example are:
  a focal length f=3.3 mm,
  an image height Ih 2.4 mm, and
  a half angle of view ω=36°.

The optically effective diameters of the respective lenses (on one sides) are 0.635 mm for $2^{nd}$ surface $r_2$, 1.032 mm for $3^{rd}$ surface $r_3$, 1.335 mm for $4^{th}$ surface $r_4$, 1.249 mm for $5^{th}$ surface $r_5$, 1.278 mm for $6^{th}$ surface $r_6$, and 1.544 mm for $7^{th}$ surface $r_7$.

EXAMPLE 5

Figure 58:
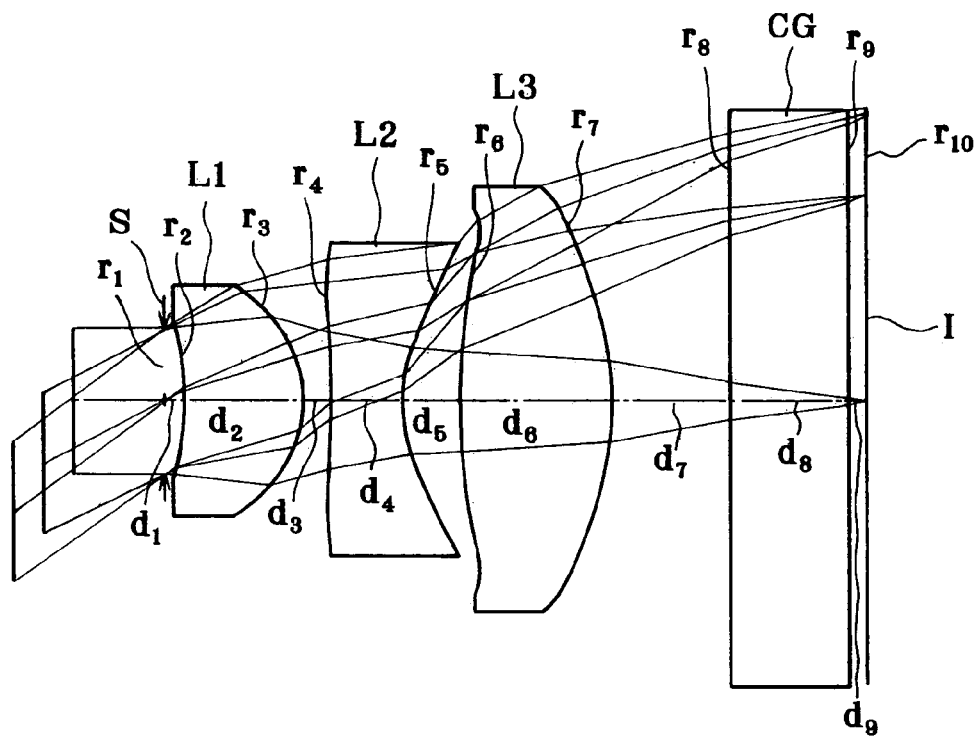
FIG. 58 is a lens arrangement section, similar to FIG. 55, of the image-formation optical system of Example 5.
Figure 59:
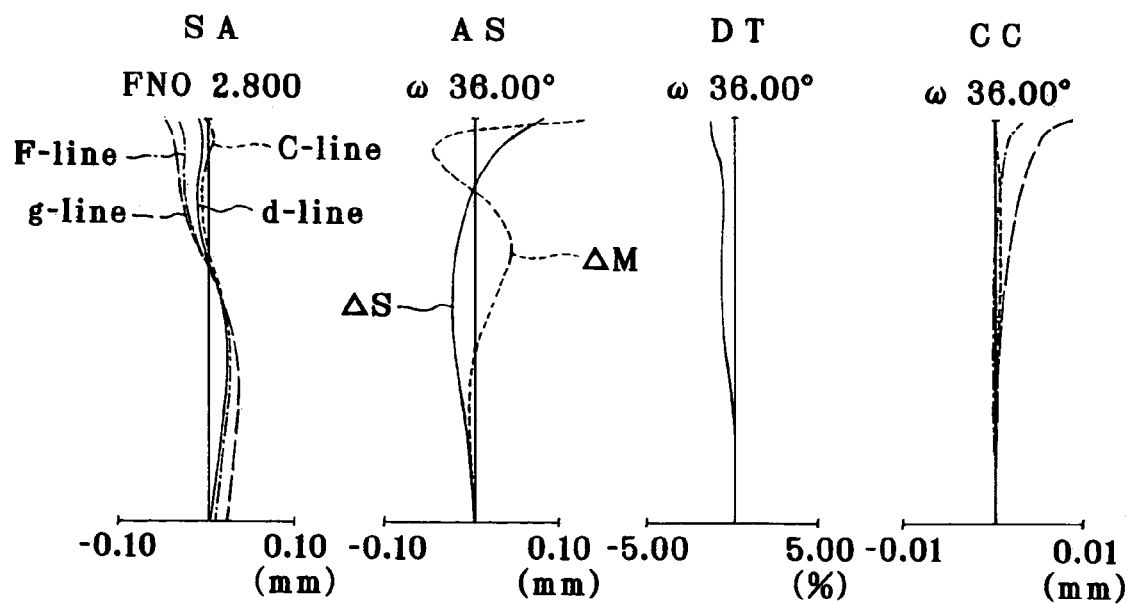
FIG. 59 is an aberration diagram for Example 1 upon focused on an object point at infinity.
Figure 60:
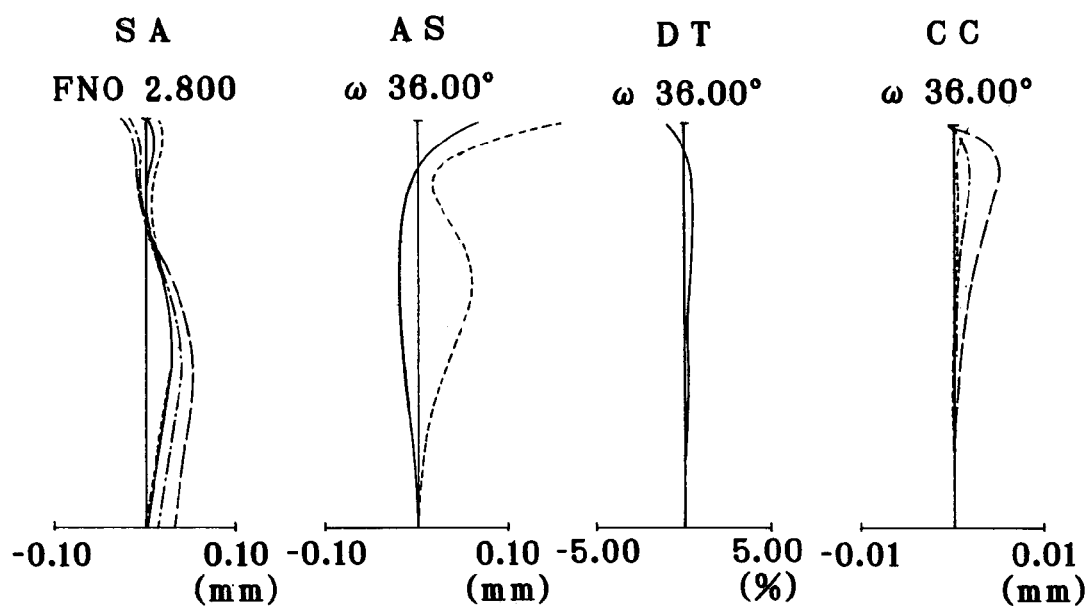
FIG. 60 is an aberration diagram for Example 2 upon focused on an object point at infinity.
Figure 61:
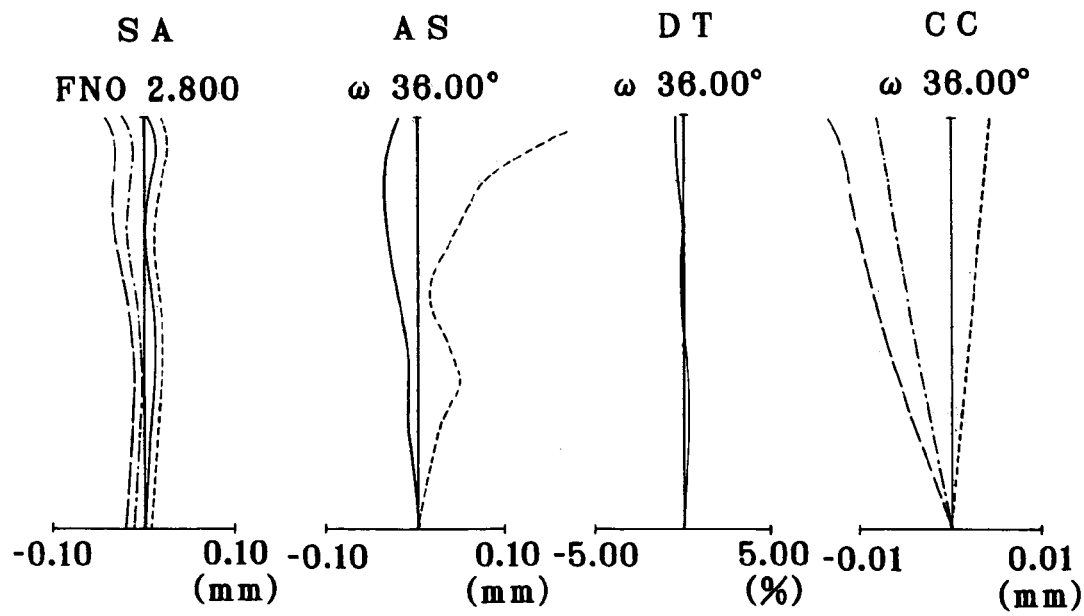
FIG. 61 is an aberration diagram for Example 3 upon focused on an object point at infinity.
Figure 62:
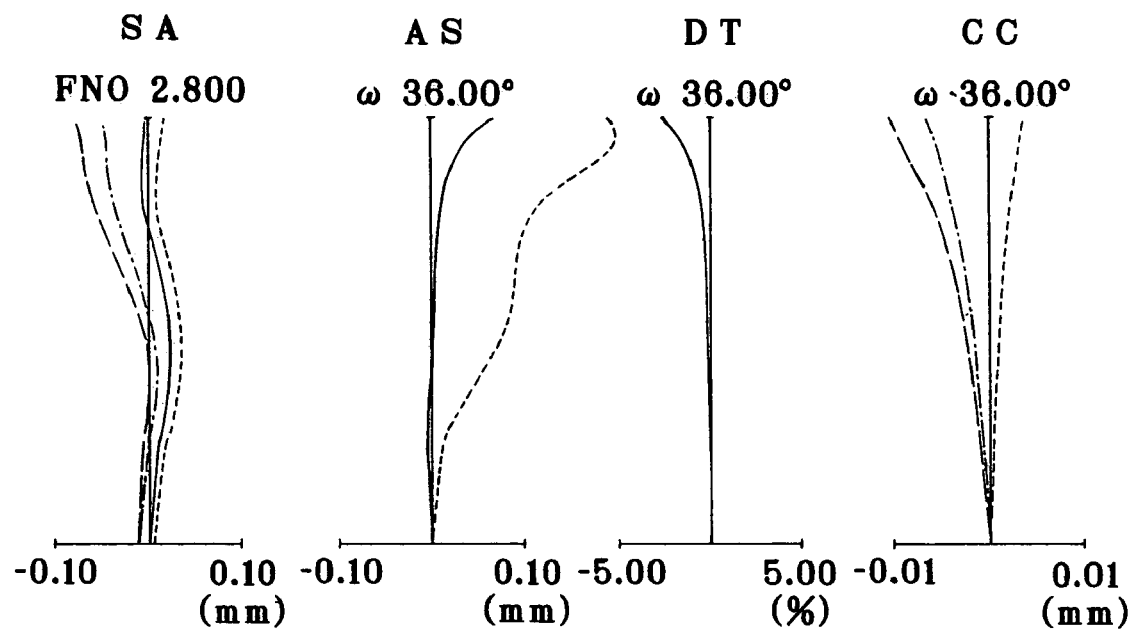
FIG. 62 is an aberration diagram for Example 4 upon focused on an object point at infinity.
Figure 63:
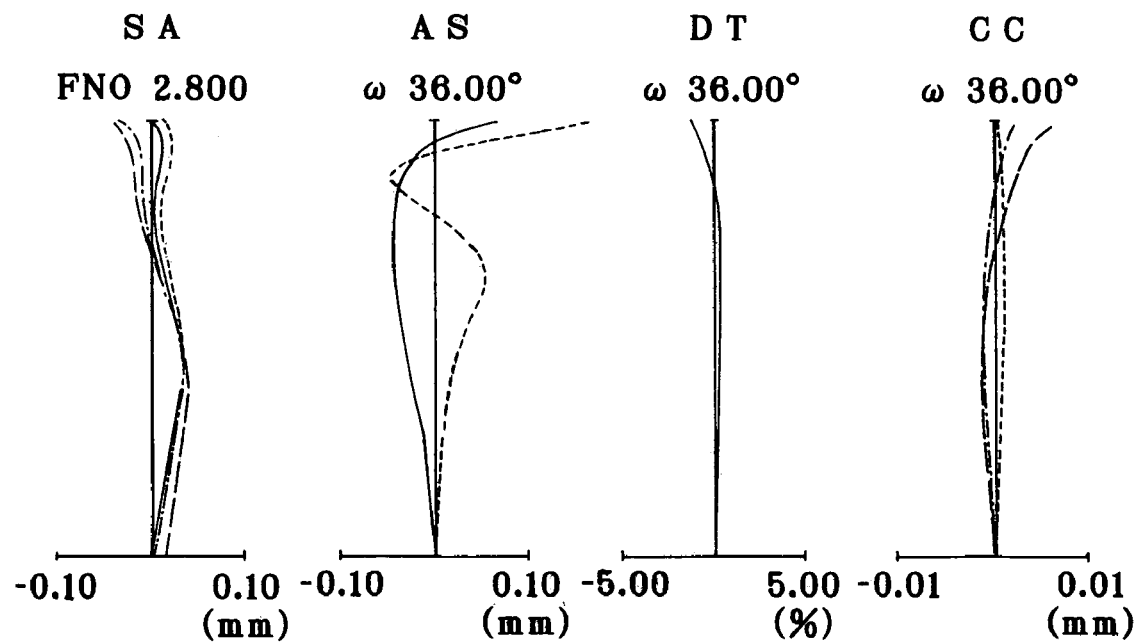
FIG. 63 is an aberration diagram for Example 5 upon focused on an object point at infinity.

As shown in FIG. 58, the image-formation optical system according to Example 5 is made up of, in its object side, an aperture stop S, a first positive meniscus lens L1 that is convex on its image side and has aspheric surfaces on both its sides, a second negative lens L2 that is of concave shape and has aspheric surfaces on both its sides, a third positive lens L3 that is of double-convex shape and has aspheric surfaces on both its sides, and a cover glass CG. In the instance example, the first, second and third lenses L1, L2 and L3 are all made of plastics; the first and third lenses L1 and L3 are each made of an amorphous polyolefin Zeonex, and the second lens L2 is made of polycarbonate.

The specifications of the wide-angle optical system according to this example are:
 a focal length f=3.3 mm,
 an image height Ih=2.4 mm, and
 a half angle of view ω=36°.

The optically effective diameters of the respective lenses (on one sides) are 0.634 mm for $2^{nd}$ surface $r_2$, 0.947 mm for $3^{rd}$ surface $r_3$, 1.179 mm for $4^{th}$ surface $r_4$, 1.285 mm for $5^{th}$ surface $r_5$, 1.461 mm for $6^{th}$ surface $r_6$, and 1.749 mm for $7^{th}$ surface $r_7$.

The numerical data on each example are given below. Symbols used hereinafter but not hereinbefore have the following meanings:
 $r_1, r_2, \ldots$: radius of curvature of each lens surface,
 $d_1, d_2, \ldots$: spacing between adjacent lens surfaces,
 $n_{d1}, n_{d2}, \ldots$: d-line refractive index of each lens, and
 $v_{d1}, v_{d2}, \ldots$: Abbe number of each lens. It is noted that aspheric shape is given by the aforesaid equation (a).

EXAMPLE 1

| | | | |
|---|---|---|---|
| $r_1 = \infty$(Stop) | $d_1 = 0.1500$ | | |
| $r_2 = -6.6854$(Aspheric) | $d_2 = 1.3215$ | $n_{d1} = 1.52542$ | $v_{d2} = 55.78$ |
| $r_3 = -0.7303$(Aspheric) | $d_3 = 0.1459$ | | |
| $r_4 = -30.0120$(Aspheric) | $d_4 = 0.6000$ | $n_{d2} = 1.58423$ | $v_{d2} = 30.49$ |
| $r_5 = 0.7826$(Aspheric) | $d_5 = 0.6381$ | | |
| $r_6 = 3.0717$(Aspheric) | $d_6 = 1.1734$ | $n_{d3} = 1.52542$ | $v_{d3} = 55.78$ |
| $r_7 = -3.9927$(Aspheric) | $d_7 = 0.5000$ | | |
| $r_8 = \infty$ | $d_8 = 1.0000$ | $n_{d4} = 1.51633$ | $v_{d4} = 64.10$ |
| $r_9 = \infty$ | $d_9 = 0.2812$ | | |
| $r_{10} = \infty$(Image Plane) | | | |

Aspherical Coefficients

2nd surface $K = -27.8001$
$A_4 = -1.7921 \times 10^{-1}$
$A_6 = 2.8337 \times 10^{-1}$
$A_8 = -1.0853$
$A_{10} = 8.9415 \times 10^{-1}$ 3rd surface $K = -2.9582$
$A_4 = -1.4120 \times 10^{-1}$
$A_6 = 2.7136 \times 10^{-3}$
$A_8 = -3.8084 \times 10^{-3}$
$A_{10} = -1.4846 \times 10^{-2}$ 4th surface $K = 0$
$A_4 = 3.3297 \times 10^{-2}$
$A_6 = -3.4902 \times 10^{-2}$
$A_8 = 1.8527 \times 10^{-2}$
$A_{10} = -2.0576 \times 10^{-3}$ 5th surface $K = -4.8798$
$A_4 = -1.8292 \times 10^{-2}$
$A_6 = 4.0871 \times 10^{-2}$
$A_8 = -2.4150 \times 10^{-2}$
$A_{10} = 5.4240 \times 10^{-3}$ 6th surface $K = 0$
$A_4 = -7.1823 \times 10^{-2}$
$A_6 = 2.6857 \times 10^{-2}$
$A_8 = -4.1832 \times 10^{-3}$
$A_{10} = -4.5583 \times 10^{-4}$ 7th surface $K = -35.0647$
$A_4 = -4.3006 \times 10^{-2}$
$A_6 = 1.6318 \times 10^{-2}$
$A_8 = -1.5380 \times 10^{-3}$
$A_{10} = -4.1595 \times 10^{-4}$

EXAMPLE 2

| | | | |
|---|---|---|---|
| $r_1 = \infty$(stop) | $d_1 = 0.1500$ | | |
| $r_2 = -11.2515$(Aspheric) | $d_2 = 1.0585$ | $n_{d1} = 1.52542$ | $v_{d1} = 55.78$ |
| $r_3 = -0.7488$(Aspheric) | $d_3 = 0.1029$ | | |
| $r_4 = -10.6642$(Aspheric) | $d_4 = 0.6000$ | $n_{d2} = 1.58423$ | $v_{d2} = 30.49$ |
| $r_5 = 0.8605$(Aspheric) | $d_5 = 0.6195$ | | |
| $r_6 = 4.8797$(Aspheric) | $d_6 = 1.1406$ | $n_{d3} = 1.65160$ | $v_{d3} = 58.50$ |
| $r_7 = -3.7876$(Aspheric) | $d_7 = 0.5000$ | | |
| $r_8 = \infty$ | $d_8 = 1.0000$ | $n_{d4} = 1.51633$ | $v_{d4} = 64.10$ |
| $r_9 = \infty$ | $d_9 = 0.4690$ | | |
| $r_{10} = \infty$(Image Plane) | | | |

Aspherical Coefficients

2nd surface $K = 2.0583$
$A_4 = -1.9830 \times 10^{-1}$
$A_6 = 1.8892 \times 10^{-1}$
$A_8 = -9.9116 \times 10^{-1}$
$A_{10} = 7.9724 \times 10^{-1}$ 3rd surface $K = -3.0167$
$A_4 = -1.8704 \times 10^{-1}$
$A_6 = -3.0791 \times 10^{-2}$
$A_8 = 8.4573 \times 10^{-2}$
$A_{10} = -9.1810 \times 10^{-2}$ 4th surface $K = 0$
$A_4 = -2.2863 \times 10^{-2}$
$A_6 = 5.3472 \times 10^{-2}$
$A_8 = 2.1013 \times 10^{-3}$
$A_{10} = -1.1119 \times 10^{-2}$ 5th surface $K = -5.5091$
$A_4 = -5.6563 \times 10^{-3}$
$A_6 = 3.3297 \times 10^{-2}$
$A_8 = -6.8881 \times 10^{-3}$
$A_{10} = -1.7940 \times 10^{-3}$ 6th surface $K = 0$
$A_4 = -4.4850 \times 10^{-2}$
$A_6 = 2.5395 \times 10^{-2}$
$A_8 = -7.4272 \times 10^{-3}$
$A_{10} = 6.7279 \times 10^{-4}$ 7th surface $K = -21.8659$
$A_4 = -3.2435 \times 10^{-2}$
$A_6 = 1.3768 \times 10^{-2}$
$A_8 = -2.4795 \times 10^{-3}$
$A_{10} = -8.2440 \times 10^{-5}$

EXAMPLE 3

| | | | |
|---|---|---|---|
| $r_1 = \infty$(Stop) | $d_1 = 0.1500$ | | |
| $r_2 = -9.6637$(Aspheric) | $d_2 = 1.7096$ | $n_{d1} = 1.52542$ | $\nu_{d1} = 55.78$ |
| $r_3 = -0.7070$(Aspheric) | $d_3 = 0.1410$ | | |
| $r_4 = -5.3549$(Aspheric) | $d_4 = 0.6000$ | $n_{d2} = 1.70514$ | $\nu_{d2} = 41.20$ |
| $r_5 = 0.9397$(Aspheric) | $d_5 = 0.5132$ | | |
| $r_6 = 8.2853$(Aspheric) | $d_6 = 1.0344$ | $n_{d3} = 1.58913$ | $\nu_{d3} = 61.20$ |
| $r_7 = -1.9020$(Aspheric) | $d_7 = 0.5000$ | | |
| $r_8 = \infty$ | $d_8 = 2.0000$ | $n_{d4} = 1.51633$ | $\nu_{d4} = 64.14$ |
| $r_9 = \infty$ | $d_9 = 0.3328$ | | |
| $r_{10} = \infty$(Image Plane) | | | |

Aspherical Coefficients

2nd surface $K = 0$
$A_4 = -9.9322 \times 10^{-2}$
$A_6 = 2.1958 \times 10^{-1}$
$A_8 = -7.8548 \times 10^{-1}$
$A_{10} = 8.3313 \times 10^{-1}$ 3rd surface $K = -3.2352$
$A_4 = -1.3113 \times 10^{-1}$
$A_6 = 5.7473 \times 10^{-2}$
$A_8 = -3.8798 \times 10^{-2}$
$A_{10} = 1.4136 \times 10^{-2}$ 4th surface $K = 12.4633$
$A_4 = 1.7636 \times 10^{-2}$
$A_6 = -5.3676 \times 10^{-2}$
$A_8 = 3.4664 \times 10^{-2}$
$A_{10} = -4.4294 \times 10^{-3}$ 5th surface $K = -8.4376$
$A_4 = -6.5555 \times 10^{-2}$
$A_6 = 4.5259 \times 10^{-2}$
$A_8 = -2.4528 \times 10^{-2}$
$A_{10} = 3.5103 \times 10^{-3}$ 6th surface $K = 0$
$A_4 = -1.5802 \times 10^{-1}$
$A_6 = 1.2860 \times 10^{-1}$
$A_8 = -3.9408 \times 10^{-2}$
$A_{10} = 3.1658 \times 10^{-3}$ 7th surface $K = -2.5549$
$A_4 = -3.2613 \times 10^{-2}$
$A_6 = -2.0838 \times 10^{-2}$
$A_8 = 2.3457 \times 10^{-2}$
$A_{10} = -4.0787 \times 10^{-3}$

EXAMPLE 4

| | | | |
|---|---|---|---|
| $r_1 = \infty$(stop) | $d_1 = 0.1500$ | | |
| $r_2 = -3.7560$(Aspheric) | $d_2 = 1.1970$ | $n_{d1} = 1.52542$ | $\nu_{d1} = 55.78$ |
| $r_3 = -0.7727$(Aspheric) | $d_3 = 0.1000$ | | |
| $r_4 = 6.2100$(Aspheric) | $d_4 = 0.6000$ | $n_{d2} = 1.58423$ | $\nu_{d2} = 30.49$ |
| $r_5 = 0.9511$(Aspheric) | $d_5 = 0.5038$ | | |
| $r_6 = 4.5116$(Aspheric) | $d_6 = 0.7107$ | $n_{d3} = 1.52542$ | $\nu_{d3} = 55.78$ |
| $r_7 = 29.5761$(Aspheric) | $d_7 = 0.7000$ | | |
| $r_8 = \infty$ | $d_8 = 1.0000$ | $n_{d4} = 1.51633$ | $\nu_{d4} = 64.14$ |
| $r_9 = \infty$ | $d_9 = 0.3371$ | | |
| $r_{10} = \infty$(Image Plane) | | | |

Aspherical Coefficients

2nd surface $K = 1.8547$
$A_4 = -1.9182 \times 10^{-1}$
$A_6 = 1.5418 \times 10^{-1}$
$A_8 = -6.5395 \times 10^{-1}$
$A_{10} = 5.0643 \times 10^{-1}$ 3rd surface $K = -2.9572$
$A_4 = -1.5178 \times 10^{-1}$
$A_6 = -1.5283 \times 10^{-2}$
$A_8 = 5.6949 \times 10^{-2}$
$A_{10} = -5.1828 \times 10^{-2}$ 4th surface $K = 0$
$A_4 = 5.6577 \times 10^{-2}$
$A_6 = 3.2526 \times 10^{-2}$
$A_8 = -1.9586 \times 10^{-2}$
$A_{10} = 2.2295 \times 10^{-3}$ 5th surface $K = -6.2752$
$A_4 = 4.2023 \times 10^{-2}$
$A_6 = 4.1358 \times 10^{-2}$
$A_8 = 4.5499 \times 10^{-3}$
$A_{10} = -9.1887 \times 10^{-3}$ 6th surface $K = 0$
$A_4 = -3.9926 \times 10^{-2}$
$A_6 = 3.5414 \times 10^{-2}$
$A_8 = -1.9119 \times 10^{-2}$
$A_{10} = 2.5213 \times 10^{-3}$ 7th surface $K = 0$
$A_4 = 4.4096 \times 10^{-2}$
$A_6 = -1.3953 \times 10^{-2}$
$A_8 = -1.1535 \times 10^{-3}$
$A_{10} = -1.3319 \times 10^{-4}$

EXAMPLE 5

| | | | |
|---|---|---|---|
| $r_1 = \infty$(Stop) | $d_1 = 0.1500$ | | |
| $r_2 = -4.2723$(Aspheric) | $d_2 = 0.9859$ | $n_{d1} = 1.52542$ | $\nu_{d1} = 55.78$ |
| $r_3 = -0.7970$(Aspheric) | $d_3 = 0.2057$ | | |
| $r_4 = -20.1610$(Aspheric) | $d_4 = 0.6000$ | $n_{d2} = 1.58423$ | $\nu_{d2} = 30.49$ |
| $r_5 = 0.9497$(Aspheric) | $d_5 = 0.4803$ | | |
| $r_6 = 4.6739$(Aspheric) | $d_6 = 1.2757$ | $n_{d3} = 1.52542$ | $\nu_{d3} = 55.78$ |
| $r_7 = -2.3387$(Aspheric) | $d_7 = 1.0000$ | | |
| $r_8 = \infty$ | $d_8 = 1.0000$ | $n_{d4} = 1.51633$ | $\nu_{d4} = 64.10$ |
| $r_9 = \infty$ | $d_9 = 0.1430$ | | |
| $r_{10} = \infty$(Image Plane) | | | |

Aspherical Coefficients

2nd surface $K = 22.5176$
$A_4 = -1.8700 \times 10^{-1}$
$A_6 = 2.8089 \times 10^{-1}$
$A_8 = -1.1438$
$A_{10} = 9.2846 \times 10^{-1}$ 3rd surface $K = -2.5781$
$A_4 = -1.5623 \times 10^{-1}$
$A_6 = -7.6367 \times 10^{-2}$
$A_8 = 9.3334 \times 10^{-2}$ -continued $A_{10} = -8.7816 \times 10^{-2}$
4th surface $K = 0$
$A_4 = -5.1907 \times 10^{-3}$
$A_6 = 8.8894 \times 10^{-4}$
$A_8 = 1.7568 \times 10^{-2}$
$A_{10} = -3.6261 \times 10^{-3}$
5th surface $K = -5.2062$
$A_4 = 4.3573 \times 10^{-3}$
$A_6 = 1.1495 \times 10^{-2}$
$A_8 = -1.2427 \times 10^{-2}$
$A_{10} = 4.9772 \times 10^{-3}$
6th surface $K = 0$
$A_4 = -4.4377 \times 10^{-2}$
$A_6 = 4.4915 \times 10^{-2}$
$A_8 = -1.6658 \times 10^{-2}$
$A_{10} = 8.7133 \times 10^{-4}$
7th surface $K = -5.5015$
$A_4 = -2.6667 \times 10^{-2}$
$A_6 = 5.1523 \times 10^{-3}$
$A_8 = 5.8435 \times 10^{-3}$
$A_{10} = -2.1188 \times 10^{-3}$ FIGS. 59-63 are aberration diagrams for Examples 1-5 of the fourth aspect of the invention upon focused at infinity. In these figures, "SA", "AS", "DT", "CC" and "ω" represent spherical aberrations, astigmatism, distortion, chromatic aberration of magnification and a half angle of view, respectively.

The values of conditions (41)-(51) in each of Examples 1-4 are enumerated below.

| Condition | Example 1 | Example 2 | Example 3 | Example 4 | Example 5 |
|---|---|---|---|---|---|
| (41) | −0.37 | −0.39 | −0.40 | −0.20 | −0.49 |
| (42) | −0.13 | 0.13 | 0.63 | −1.36 | 0.33 |
| (43) | 0.46 | 0.44 | 0.17 | 0.77 | 0.34 |
| (44) | 0.25 | 0.18 | 0.11 | 0.21 | 0.20 |
| (45) | 0.18 | 0.20 | 0.37 | −0.026 | 0.34 |
| (46) | 1.5254 | 1.6516 | 1.5891 | 1.5254 | 1.5254 |
| (47) | 1.25 | 1.14 | 1.16 | 1.52 | 1.46 |
| (48) | −0.54 | −0.56 | −0.45 | −0.82 | −0.64 |
| (49) | 2.68 | 3.82 | 2.12 | 5.18 | 6.12 |
| (50) | 7.61 | 24.86 | 3.90 | 7.55 | 9.10 |
| (51) | 20.0° | 19.2° | 20.0° | 33.0° | 20.0° |

With each of the above example, it is possible to obtain images of good quality as can be seen from the aberration diagrams of FIGS. 59-63, although it is of a small-format size.

In each example according to the fourth aspect of the invention, too, the maximum image height Ih on the image plane is defined by ½ of the diagonal length L of the (substantially rectangular) effective area of the image pickup device. When a field frame is located as means for defining the image pickup area, the maximum image height Ih is given by ½ of the diagonal length L of the field frame, and when an image pickup device such as a solid-state image pickup device is used, it is given by ½ of the diagonal length L of its effective image pickup area.

When the image pickup recording medium is a CCD or other electronic image pickup device, what relations the diagonal length L of its effective image pickup plane (effective image pickup area) has to the pixel spacing a has been explained with reference to FIGS. 9 and 10. For further details, see the explanation of the first aspect of the invention.

Throughout Examples 1 to 5 according to the fourth aspect of the invention, the cover glass may be located just before the aperture stop S.

Throughout the above examples of the fourth aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1-5, that flare stop may be interposed at any desired position between the aperture stop S and the first lens L1, the first lens L1 and the second lens L2, the second lens L2 and the third lens L3, and the third lens L3 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

FIG. 42 is a sectional illustration, as taken in the diagonal direction of an image plane I of a CCD 6 inclusive of the optical axis of an image-formation optical system 5 according to Example 1 of the third aspect of the invention, of an arrangement wherein the image-formation optical system 5 and the CCD 6 located on the image plane I are fixed to a lens barrel 7 formed of a resin material by integral molding. An aperture stop S is attached to the resinous lens barrel 7 by integral molding. In this way, the lens barrel 7 for holding the image-formation optical system 5 can be easily fabricated. Integral attachment of the aperture stop S to the lens barrel 7 allows fabrication steps to be considerably cut back, and giving a function of holding the CCD 6 comprising an image pickup device CCD to the lens barrel 7 per se makes it less likely for dust, etc. to enter the lens barrel 7.

As can be seen from FIG. 42, the rim 8 of each of the first positive lens L1, the second negative lens L2 and the third positive lens L3 in the image-formation optical system 5 is inclined down in such a way as to come closer to the optical axis one the object side thereof, so that the lenses can be fixedly engaged at the inclined rims with the lens barrel 7. Thus, the lenses L1 to L3 can be inserted down into the lens barrel 7 from its image plane side for alignment and fixation.

As can be seen from FIG. 43 that is an exploded, schematic view of the irnage-formation optical system, each of the first positive lens L1 and the second negative lens L2 in the image-formation optical system held within the lens barrel 7 molded of plastics is configured in such a way as to look as a circle as viewed from the entrance side of the optical system, and the third positive lens L3 is in an oval shape that is obtained by cutting off the upper and lower portions of a circular lens. The rims 8 of the respective lenses L1, L2 and L3 are inclined down toward the stop S side, and the inside surface of the lens barrel 7 is correspondingly inclined down in conformity with the inclined rims.

Thus, the first positive lens L1 is configured in such a way as to look as a circle as viewed from the entrance side of the optical system, and the third positive lens L3 is configured in such a shape that the length of the direction corresponding to the short-side direction of the effective image pickup area of the CCD 6 is shorter than the length of the direction corresponding to the long-side direction of the effective image pickup area, whereby the contour of the lens assembly comprising the first positive lens L1, the second negative lens L2 and the third positive lens L3 in the image-formation optical system can be consistent with the shape of the effective light beam, so that the optical system can be made compact while shading is held back. In this case, too, the rim 8 of each of the first positive lens L1, the second negative lens L2 and the third positive lens L3 forming part of the image-formation optical system 5 can be fixedly engaged within the lens barrel 7, so that the lenses L1, L2 and L3 can be inserted down into the lens barrel 7 from its image side for alignment and fixation.

As can also be seen from the sectional view of FIG. 42, the rim surface of an aperture in the aperture stop S should preferably be inclined toward the lens L1 at an angle of inclination that is larger than the angle of incidence of an effective light beam, so that the corners thereof substantially nearest to the lens side can play a stop role. It is thus possible to make it less likely for a light beam reflected at the rim surface of the aperture in the aperture stop S to enter the image pickup device CCD 6, thereby holding back the influences of flares and ghosts.

It is noted that for each example of the fourth aspect of the invention as described above, what has been explained with reference to Table A and FIGS. 11-14 holds true, and for each of the imaging systems according to the second aspect of the invention, what has been explained with reference FIGS. 15-24 holds true. For details, see what has been recounted with reference to the first aspect of the invention.

The imaging system according to the fourth aspect of the invention constructed as described above may be applied to phototaking systems where object images formed through image-formation optical systems are received at image pickup devices such as CCDs, in particular, digital cameras or video cameras as well as PCs and telephone sets that are typical information processors, in particular, easy-to-carry cellular phones. Given below are some such embodiments.

FIGS. 25, 26 and 27 are conceptual illustrations of a phototaking optical system 41 for digital cameras, in which the image-formation optical system according to the fourth aspect of the invention is incorporated. FIG. 25 is a front perspective view of the outward appearance of a digital camera 40, and FIG. 26 is a rear perspective view of the same. FIG. 27 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41, for instance, the image-formation optical system according to Example 1. An object image formed by the phototaking optical system 41 is formed on the image pickup plane of a CCD 49 via a cover glass CG provided with a near-infrared cut coat and having a low-pass filter function. An object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 27, plane-parallel plates are used as the cover members 50; however, it is acceptable to use powered lenses.

FIGS. 28, 29 and 30 are illustrative of a personal computer that is one example of the information processor in which the image-formation optical system according to the fourth aspect of the invention is built as an objective optical system. FIG. 28 is a front perspective view of a personal computer 300 in use, FIG. 29 is a sectional view of a phototaking optical system 303 in the personal computer 300, and FIG. 30 is a side view of the state of FIG. 28. As shown in FIGS. 28, 29 and 30, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising the image-formation optical system of the third aspect of the invention (roughly shown) and an image pickup device chip 162 for receiving an image. These are built in the personal computer 300.

Here a cover CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 22. This image 305 may be shown on a personal computer on the other end via suitable processing means and the Internet or telephone line.

FIGS. 31(a), 31(b) and 31(c) are illustrative of a telephone set that is one example of the information processor in which the image-formation optical system according to the fourth aspect of the invention is built in the form of a phototaking optical system, especially a convenient-to-carry cellular phone. FIG. 31(a) and FIG. 31(b) are a front and a side view of a cellular phone 400, respectively, and FIG. 31(c) is a sectional view of a phototaking optical system 405. As shown in FIGS. 31(a), 31(b) and 31(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system of the invention (roughly shown) and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is noted that each of the above examples may be modified in various forms within the scope of what is recited in the claims.

The image-formation optical system according to the fourth aspect of the invention, and the imaging system incorporating the same, for instance, could be embodied as follow.

(1) An image-formation optical system, characterized by comprising, in order from an object side thereof, an aperture stop, a first positive meniscus lens that is convex on an image side thereof, a second negative lens and a third positive lens, and satisfying the following condition:

$$-0.55 < f_2/f_3 < -0.1 \tag{41}$$

where $f_2$ is a focal length of the second negative lens, and $f_3$ is a focal length of the third positive lens.

(2) The image-formation optical system according to (1) above, characterized by satisfying the following condition:

$$-0.5 < f_2/f_3 < -0.15 \tag{41-1}$$

(3) An image-formation optical system, characterized by comprising, in order from an object side thereof, an aperture stop, a first positive meniscus lens that is convex on an image side thereof, a second negative lens and a third positive lens, characterized by satisfying the following conditions:

$$-2.0 < (r_{3f}+r_{3r})/(r_{3f}-r_{3r}) < 0.85 \tag{42}$$

$$0.1 < \beta_3 < 1.0 \tag{43}$$

where $r_{3f}$ is an axial radius of curvature of an object side-surface of the third positive lens, $r_{3r}$ is an axial radius of curvature of an image side-surface of the third positive lens, and $\beta_3$ is a transverse magnification of the third positive lens.

(4) The image-formation optical system according to (3) above, characterized in that the third positive lens is of a double-convex shape both surfaces of which have positive powers, with satisfaction of the following condition:

$$-0.95 < (r_{3f}+r_{3r})/(r_{3f}-r_{3r}) < 0.85 \tag{42-2}$$

(5) The image-formation optical system according to (3) above, characterized in that the third positive lens is of a meniscus shape that is convex on an object side thereof, with satisfaction of the following condition:

$$-2.0 < (r_{3f}+r_{3r})/(r_{3f}-r_{3r}) < -1.0 \tag{42-4}$$

(6) The image-formation optical system according to any one of (3) to (5) above, characterized by satisfying the following condition:

$$0.2 < \beta_3 < 0.8 \tag{43-1}$$

(7) The image-formation optical system according to any one of (1) to (6) above, characterized by satisfying the following condition:

$$0.1 < r_{2r}/r_{3f} < 1.0 \tag{44}$$

where $r_{2r}$ is an axial radius of curvature of an image side-surface of the second negative lens, and $r_{3f}$ is an axial radius of curvature of an object side-surface of the third positive lens.

(8) The image-formation optical system according to (7) above, characterized by satisfying the following condition:

$$0.1 < r_2/r_3 < 0.5 \tag{44-1}$$

(9) The image-formation optical system according to any one of (1) to (8), characterized by satisfying the following condition:

$$-0.25 < r_{1r}/r_{3r} < 0.6 \tag{45}$$

where $r_{1r}$ is an axial radius of curvature of an image side-surface of the first positive lens, and $r_{3r}$ is an axial radius of curvature of an image side-surface of the third positive lens.

(10) The image-formation optical system according to (9) above, characterized by satisfying the following condition:

$$-0.2 < r_{1r}/r_{3r} < 0.45 \tag{45-1}$$

(11) The image-formation optical system according to any one of (1) to (10) above, characterized by satisfying the following condition:

$$1.40 < n_3 < 1.66 \tag{46}$$

where $n_3$ is a refractive index of the third positive lens.

(12) The image-formation optical system according to (11) above, characterized by satisfying the following condition:

$$1.45 < n_3 < 1.60 \tag{46-1}$$

(13) The image-formation optical system according to any one of (1) to (12) above, characterized by satisfying the following condition:

$$1.0 < (r_{1f} + r_{1r})/(r_{1f} - r_{1r}) < 2.5 \tag{47}$$

where $r_{1f}$ an axial radius of curvature of an object side-surface of the first positive lens, and $r_{1r}$ is an axial radius of curvature of an image side-surface of the first positive lens.

(14) The image-formation optical system according to (13) above, characterized by satisfying the following condition:

$$10.0 < (r_{1f} + r_{1r})/(r_{1f} - r_{1r}) < 1.7 \tag{47-1}$$

(15) The image-formation optical system according to (7) above, characterized by satisfying the following condition:

$$-10.0 < f_2/Ih < -0.05 \tag{48}$$

where $f_2$ is a focal length of the second negative lens, and Ih is a maximum image height.

(16) The image-formation optical system according to any one of (1) to (15) above, characterized in that at least an object side-surface of the third positive lens is defined by an aspheric surface, with satisfaction of the following condition:

$$0.01 < |(r_{3fs} + r_{3fa})/(r_{3fs} - r_{3fa}) - 1| < 100 \tag{49}$$

where $r_{3fs}$ is an axial radius of curvature of the object side-surface of the third positive lens, and $r_{3fa}$ is a value of a difference between a radius of curvature of the object side-surface of the third positive lens with the aspheric surface taken into account and said axial radius of curvature, upon changing to maximum in a range inside of a point through which a chief ray for a maximum image height passes.

(17) The image-formation optical system according to (16) above, characterized by satisfying the following condition:

$$0.05 < |(r_{3fs} + r_{3fa})/(r_{3fs} - r_{3fa}) - 1| < 10 \tag{49-1}$$

(18) The image-formation optical system according to any one of (1) to (17) above, characterized in that at least an image side-surface of the third positive lens is defined by an aspheric surface, with satisfaction of the following condition:

$$0.01 < |(r_{3rs} + r_{3ra})/(r_{3rs} - r_{3ra}) - 1| < 100 \tag{50}$$

where $r_{3rs}$ is an axial radius of curvature of the image side-surface of the third positive lens, and $r_{3ra}$ is a value of a difference between a radius of curvature of the image side-surface of the third positive lens with the aspheric surface taken into account and said axial radius of curvature, upon changing to maximum in a range inside of a point through which a chief ray for a maximum image height passes.

(19) The image-formation optical system according to (18) above, characterized by satisfying the following condition:

$$0.05 < |(r_{3rs} + r_{3ra})/(r_{3rs} - r_{3ra}) - 1| < 10 \tag{50-1}$$

(20) The image-formation optical system according to any one of (1) to (19) above, characterized by satisfying the following condition:

$$10° < \alpha < 40° \tag{51}$$

where $\alpha$ is an angle of incidence of a chief ray on an image plane at a maximum image height.

(21) The image-formation optical system according to (20) above, characterized by satisfying the following condition:

$$15° < \alpha < 35° \tag{51}$$

(22) An electronic imaging system, characterized by comprising an image-formation optical system as recited in any one of (1) to (21) above, and an electronic image pickup device located on an image side thereof.

According to the fourth aspect of the invention, it is possible to obtain a wide-angle optical system that is of high performance and small-format size and has a half angle of view of about 35°, and a small-format yet high-performance imaging system incorporating the same.

Figure 64:
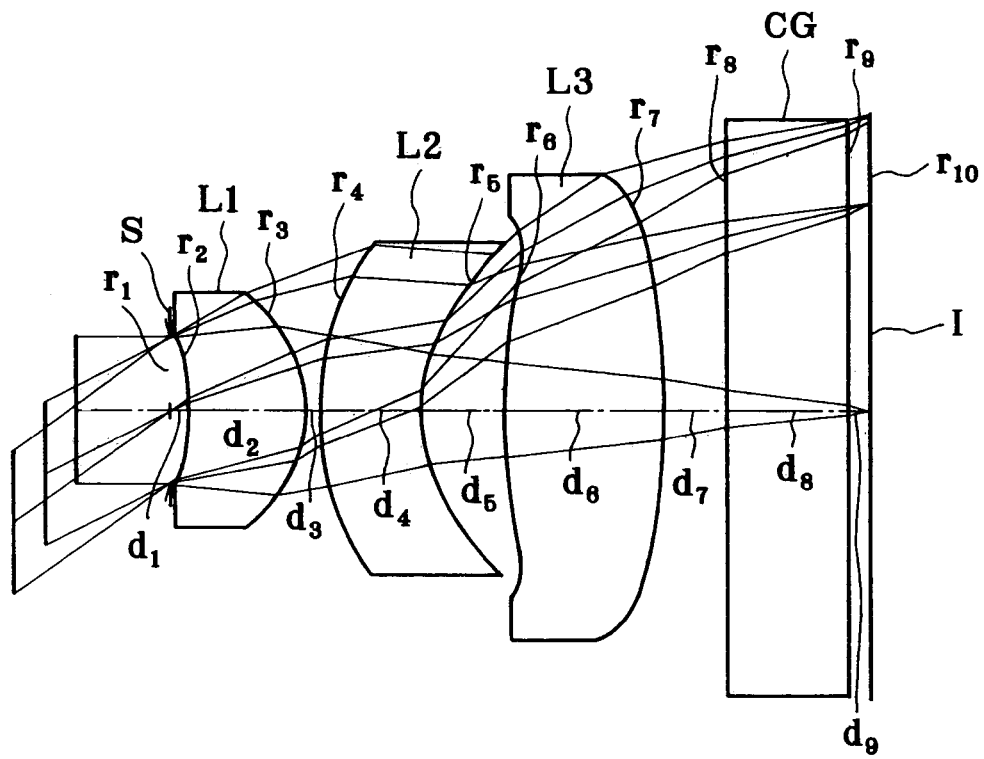
FIG. 64 is a lens arrangement section of Example 1 of the image-formation optical system according to the fifth aspect of the invention upon focused on an object point at infinity.
Figure 65:
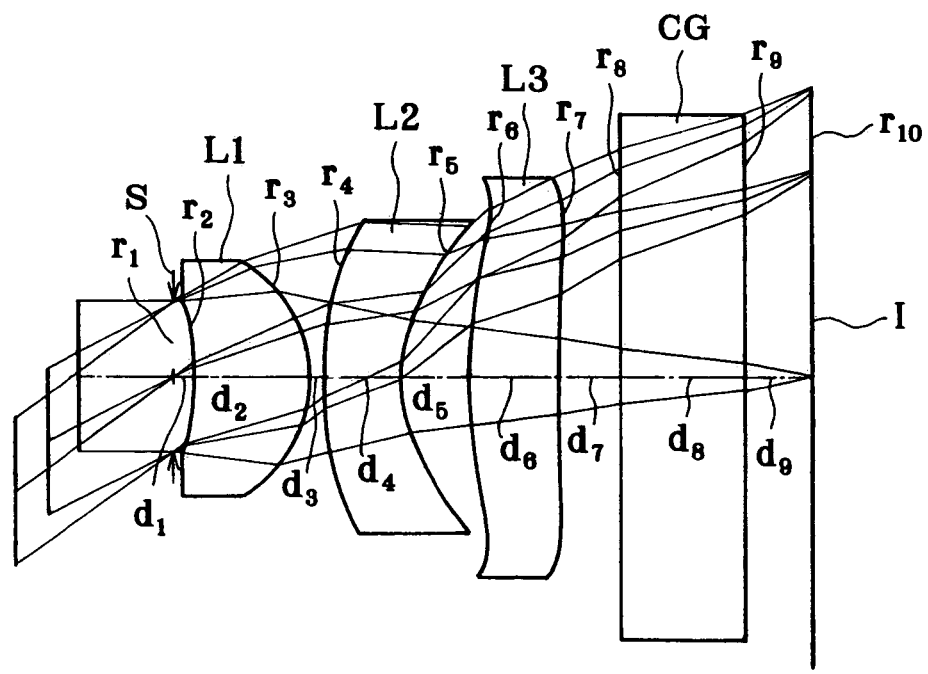
FIG. 65 is a lens arrangement section, similar to FIG. 64, of the image-formation optical system of Example 2.
Figure 66:
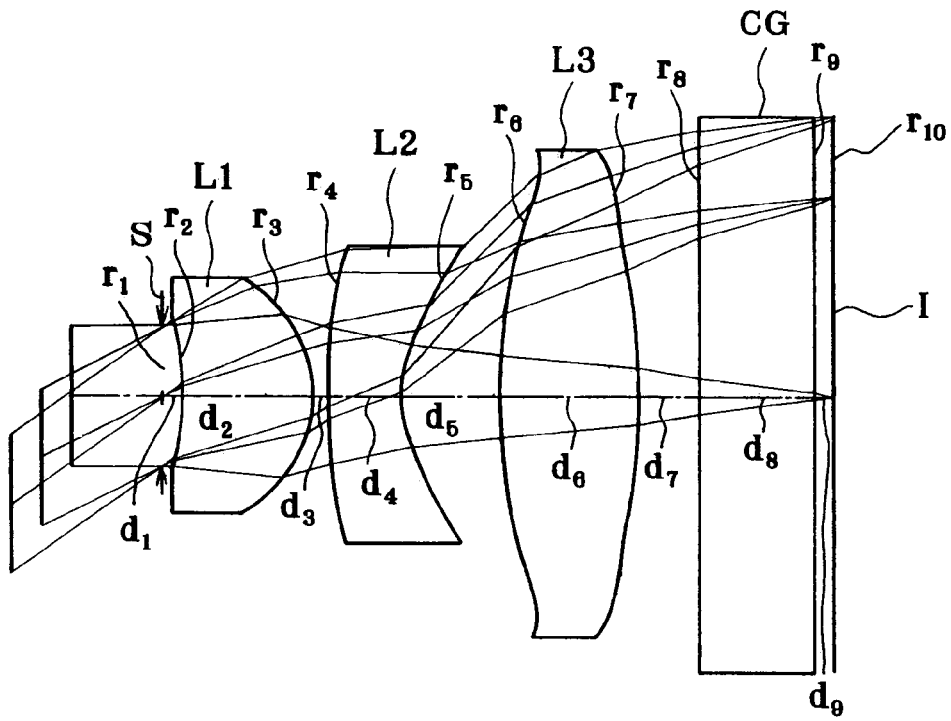
FIG. 66 is a lens arrangement section, similar to FIG. 64, of the image-formation optical system of Example 3.

Examples 1 to 3 of the image-formation optical system according to the fifth aspect of the invention are given below. FIGS. 64 to 66 are illustrative in section of the lens arrangements of Examples 1 to 3 upon focused on an object point at infinity. In these figures, S stands for an aperture stop, L1 a first positive lens, L2 a second negative lens, L3 a third positive lens, CG a cover glass for an electronic image pickup device, and I an image plane. It is noted that the cover glass CG may be further provided on its surface with a wavelength range-limiting multilayer film, with or without a low-pass filter function.

EXAMPLE 1

As shown in FIG. 64, the image-formation optical system of Example 1 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive lens L3 that is of double-convex shape and has aspheric surfaces on both its sides, and a cover glass CG. In the instance example, the first, second and third lenses L1, L2 and L3 are all made of plastics; the first and third lenses L1 and L3 are each made of an amorphous polyolefin Zeonex (trade name), and the second lens L2 is made of polycarbonate.

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.610 mm for $2^{nd}$ surface $r_2$, 0.953 mm for $3^{rd}$ surface $r_3$, 1.341 mm for $4^{th}$ surface $r_4$, 1.245 mm for $5^{th}$ surface $r_5$, 1.438 mm for $6^{th}$ surface $r_6$, and 1.884 mm for $7^{th}$ surface $r_7$.

EXAMPLE 2

As shown in FIG. 65, the image-formation optical system of Example 2 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive meniscus lens L3 that is convex on its object side and has aspheric surfaces on both its sides, and a cover glass CG. In the instance example, the first and second lenses L1 and L2 are each made of glass, and the third lens L3 is made of plastics. More specifically, the third lens L3 is made of an amorphous polyolefin Zeonex.

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.630 mm for $2^{nd}$ surface $r_2$, 0.942 mm for $3^{rd}$ surface $r_3$, 1.245 mm for $4^{th}$ surface $r_4$, 1.202 mm for $5^{th}$ surface $r_5$, 1.350 mm for $6^{th}$ surface $r_6$, and 1.599 mm for $7^{th}$ surface $r_7$.

EXAMPLE 3

As shown in FIG. 66, the image-formation optical system of Example 3 is made up of, in order from its object side, an aperture stop S, a first positive meniscus lens L1 that is convex on its image side and has aspheric surfaces on both its sides, a second negative meniscus lens L2 that is convex on its object side and has aspheric surfaces on both its sides, a third positive lens L3 that is of double-convex shape and has aspheric surfaces on both its sides, and a cover glass CG. In the instance example, the first, second and third lenses L1, L2 and L3 are all made of plastics; the first and third lenses L1 and L3 are each made of an amorphous polyolefin Zeonex (trade name), and the second lens L2 is made of polycarbonate.

The specifications of the wide-angle optical system according to this example are:
a focal length f=3.3 mm,
an image height Ih=2.4 mm, and
a half angle of view ω=36°.

The optically effective diameters of the respective lenses (on one sides) are 0.640 mm for 2nd surface $r_2$, 0.986 mm for $3^{rd}$ surface $r_3$, 1.226 mm for $4^{th}$ surface $r_4$, 1.252 mm for $5^{th}$ surface $r_5$, 1.845 mm for $6^{th}$ surface $r_6$, and 2.053 mm for $7^{th}$ surface $r_7$.

The numerical data on each example are given below. Symbols used hereinafter but not hereinbefore have the following meanings:

$r_1, r_2, \ldots$ : radius of curvature of each lens surface,
$d_1, d_2, \ldots$ : spacing between adjacent lens surfaces,
$n_{d1}, n_{d2}, \ldots$ : d-line refractive index of each lens, and
$v_{d1}, v_{d2}, \ldots$ : Abbe number of each lens. It is noted that aspheric shape is given by the aforesaid equation (a).

EXAMPLE 1

| | | | |
|---|---|---|---|
| $r_1 = \infty$(Stop) | $d_1 = 0.1200$ | | |
| $r_2 = -2.6726$(Aspheric) | $d_2 = 0.9687$ | $n_{d1} = 1.49241$ | $v_{d1} = 57.66$ |
| $r_3 = -0.9138$(Aspheric) | $d_3 = 0.1000$ | | |
| $r_4 = 2.8532$(Aspheric) | $d_4 = 0.8000$ | $n_{d2} = 1.58423$ | $v_{d2} = 30.49$ |
| $r_5 = 0.9461$(Aspheric) | $d_5 = 0.6800$ | | |
| $r_6 = 3.3561$(Aspheric) | $d_6 = 1.2969$ | $n_{d3} = 1.49241$ | $v_{d3} = 57.66$ |
| $r_7 = -5.5439$(Aspheric) | $d_7 = 0.5000$ | | |
| $r_8 = \infty$ | $d_8 = 1.0000$ | $n_{d4} = 1.51633$ | $v_{d4} = 64.14$ |
| $r_9 = \infty$ | $d_9 = 0.1749$ | | |
| $r_{10} = \infty$(Image Plane) | | | |

| Aspherical Coefficients |
|---|
| 2nd surface |
| $K = 0$ |
| $A_4 = -1.2923 \times 10^{-1}$ |
| $A_6 = -2.6271 \times 10^{-2}$ |
| $A_8 = -7.6282 \times 10^{-2}$ |
| $A_{10} = 0.0000$ |
| 3rd surface |
| $K = -2.6868$ |
| $A_4 = -1.5367 \times 10^{-1}$ |
| $A_6 = 5.0013 \times 10^{-2}$ |
| $A_8 = -4.5494 \times 10^{-2}$ |
| $A_{10} = 0.0000$ |
| 4th surface |
| $K = -18.3300$ |
| $A_4 = 8.0480 \times 10^{-2}$ |
| $A_6 = -8.9950 \times 10^{-3}$ |
| $A_8 = 7.8434 \times 10^{-4}$ |
| $A_{10} = 0.0000$ |
| 5th surface |
| $K = -4.2745$ |
| $A_4 = 2.7143 \times 10^{-2}$ |
| $A_6 = 1.4933 \times 10^{-2}$ |
| $A_8 = 1.3242 \times 10^{-4}$ |
| $A_{10} = 0.0000$ |
| 6th surface |
| $K = -34.8663$ |
| $A_4 = 3.2814 \times 10^{-2}$ |
| $A_6 = -4.4307 \times 10^{-2}$ |
| $A_8 = 2.3091 \times 10^{-2}$ |
| $A_{10} = -5.9202 \times 10^{-3}$ |
| 7th surface |
| $K = 7.2292$ |
| $A_4 = 1.3056 \times 10^{-2}$ |
| $A_6 = 2.3976 \times 10^{-3}$ |
| $A_8 = -1.2672 \times 10^{-3}$ |
| $A_{10} = -8.5404 \times 10^{-5}$ |

EXAMPLE 2

| | | | |
|---|---|---|---|
| $r_1 = \infty$ (絞り) | $d_1 = 0.1500$ | | |
| $r_2 = -3.5483$(Aspheric) | $d_2 = 0.9441$ | $n_{d1} = 1.52542$ | $\nu_{d1} = 55.78$ |
| $r_3 = -0.7869$(Aspheric) | $d_3 = 0.1000$ | | |
| $r_4 = 5.1411$(Aspheric) | $d_4 = 0.6000$ | $n_{d2} = 1.58423$ | $\nu_{d2} = 30.49$ |
| $r_5 = 0.8668$(Aspheric) | $d_5 = 0.5579$ | | |
| $r_6 = 2.7069$(Aspheric) | $d_6 = 0.7310$ | $n_{d3} = 1.52542$ | $\nu_{d3} = 55.78$ |
| $r_7 = 40.9062$(Aspheric) | $d_7 = 0.5000$ | | |
| $r_8 = \infty$ | $d_8 = 1.0000$ | $n_{d4} = 1.51633$ | $\nu_{d4} = 64.10$ |
| $r_9 = \infty$ | $d_9 = 0.5575$ | | |
| $r_{10} = \infty$(Image Plane) | | | |

Aspherical Coefficients

2nd surface $K = 4.8164$
$A_4 = -2.0149 \times 10^{-1}$
$A_6 = 1.6121 \times 10^{-1}$
$A_8 = -7.0842 \times 10^{-1}$
$A_{10} = 4.7295 \times 10^{-1}$ 3rd surface $K = -3.2085$
$A_4 = -1.9378 \times 10^{-1}$
$A_6 = -1.2206 \times 10^{-2}$
$A_8 = 8.1481 \times 10^{-2}$
$A_{10} = -1.0139 \times 10^{-1}$ 4th surface $K = 0$
$A_4 = 5.3097 \times 10^{-2}$
$A_6 = 2.9052 \times 10^{-2}$
$A_8 = -1.8627 \times 10^{-2}$
$A_{10} = 1.7525 \times 10^{-3}$ 5th surface $K = -5.2416$
$A_4 = 3.9126 \times 10^{-2}$
$A_6 = 3.2573 \times 10^{-2}$
$A_8 = 2.9813 \times 10^{-3}$
$A_{10} = -7.9290 \times 10^{-3}$ 6th surface $K = 0$
$A_4 = -8.4473 \times 10^{-2}$
$A_6 = 3.2379 \times 10^{-2}$
$A_8 = -1.0481 \times 10^{-2}$
$A_{10} = 2.9594 \times 10^{-4}$ 7th surface $K = 0$
$A_4 = 1.3909 \times 10^{-2}$
$A_6 = -9.6102 \times 10^{-3}$
$A_8 = 1.8961 \times 10^{-3}$
$A_{10} = -9.8080 \times 10^{-4}$

EXAMPLE 3

| | | | |
|---|---|---|---|
| $r_1 = \infty$ (絞り) | $d_1 = 0.1500$ | | |
| $r_2 = -4.4414$(Aspheric) | $d_2 = 1.0851$ | $n_{d1} = 1.52542$ | $\nu_{d1} = 55.78$ |
| $r_3 = -0.7656$(Aspheric) | $d_3 = 0.1025$ | | |
| $r_4 = 7.3594$(Aspheric) | $d_4 = 0.6000$ | $n_{d2} = 1.58423$ | $\nu_{d2} = 30.49$ |
| $r_5 = 0.8221$(Aspheric) | $d_5 = 0.8483$ | | |
| $r_6 = 3.5100$(Aspheric) | $d_6 = 1.1893$ | $n_{d3} = 1.52542$ | $\nu_{d3} = 55.78$ |
| $r_7 = -5.2488$(Aspheric) | $d_7 = 0.5000$ | | |
| $r_8 = \infty$ | $d_8 = 1.0000$ | $n_{d4} = 1.51633$ | $\nu_{d4} = 64.14$ |
| $r_9 = \infty$ | $d_9 = 0.1653$ | | |
| $r_{10} = \infty$(Image Plane) | | | |

Aspherical Coefficients

Figure 67:
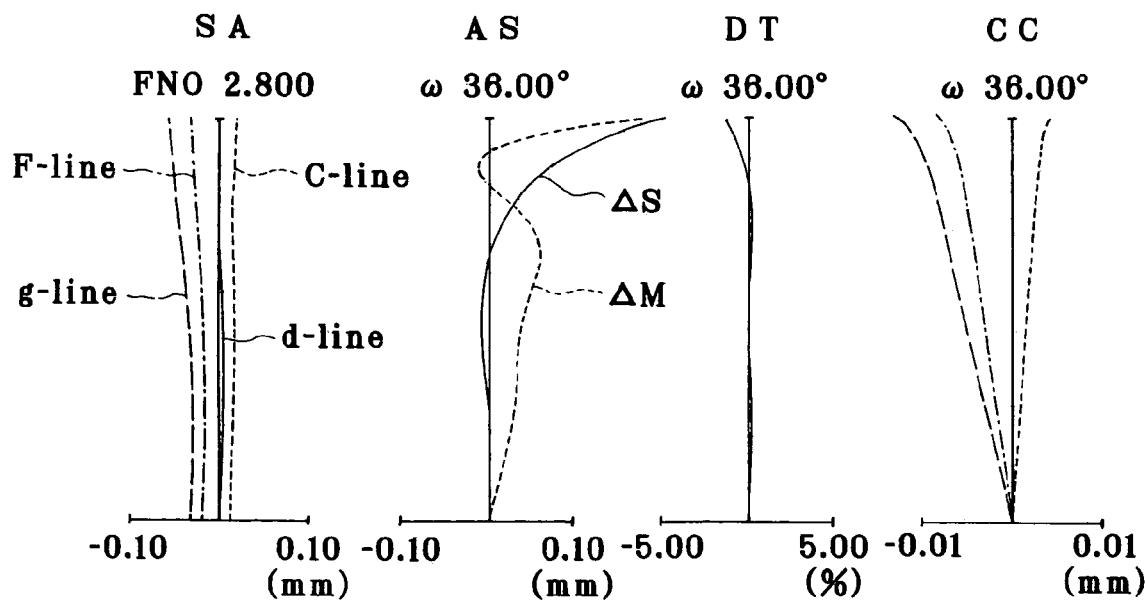
FIG. 67 is an aberration diagram for Example 1 upon focused on an object point at infinity.
Figure 68:
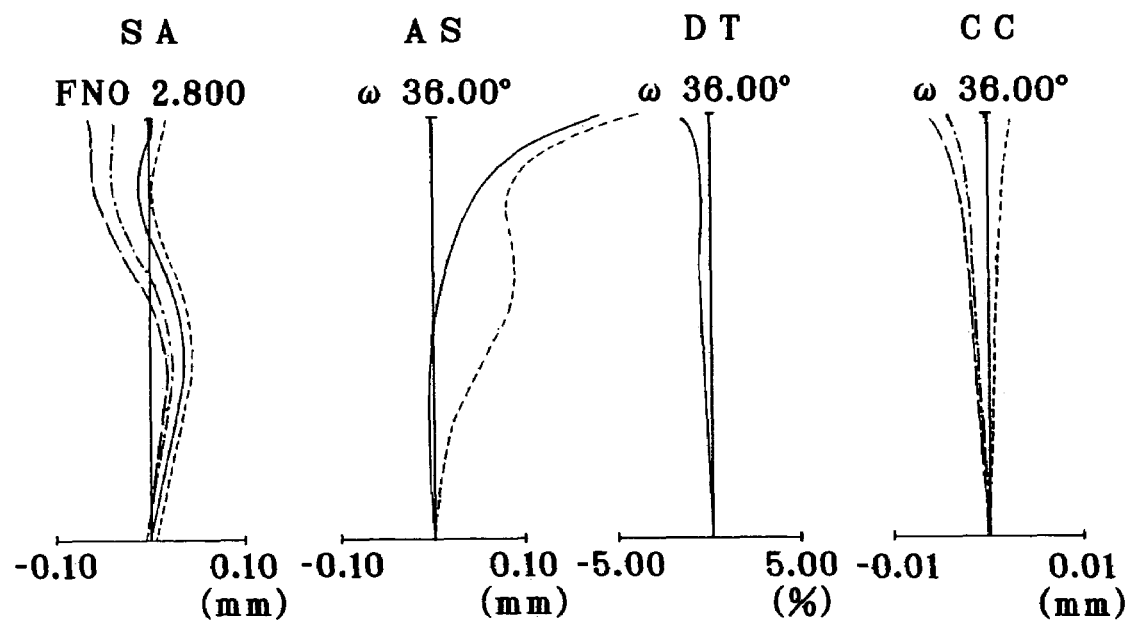
FIG. 68 is an aberration diagram for Example 2 upon focused on an object point at infinity.
Figure 69:
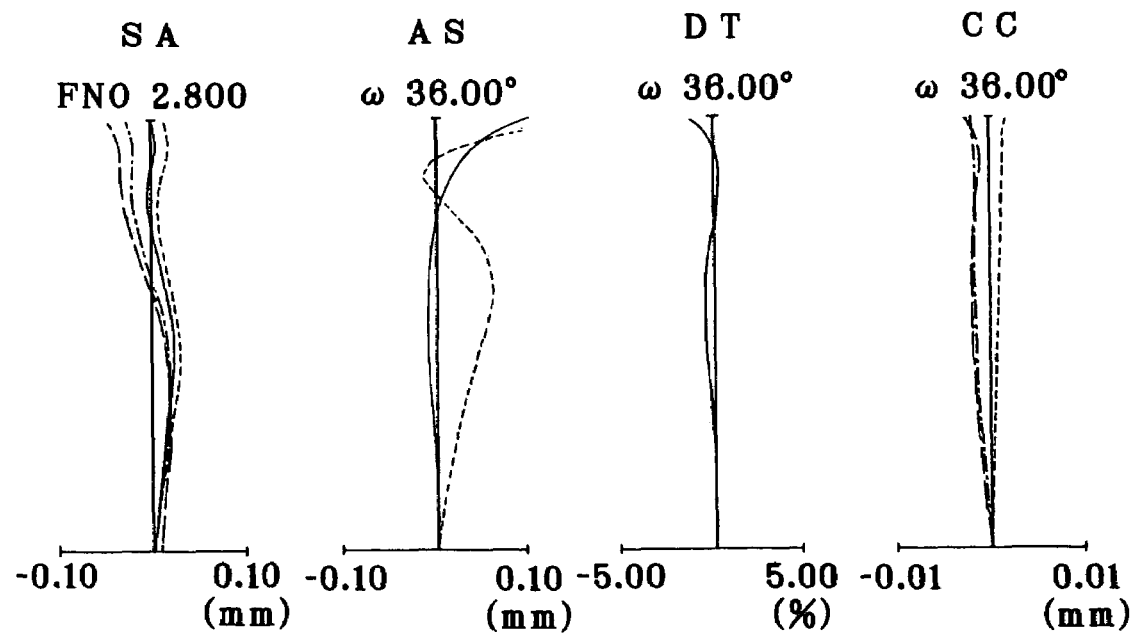
FIG. 69 is an aberration diagram for Example 3 upon focused on an object point at infinity.

2nd surface $K = -2.6276$
$A_4 = -1.8738 \times 10^{-1}$
$A_6 = 1.9184 \times 10^{-1}$
$A_8 = -8.9468 \times 10^{-1}$
$A_{10} = 7.5040 \times 10^{-1}$ 3rd surface $K = -3.0386$
$A_4 = -1.7124 \times 10^{-1}$
$A_6 = -1.4963 \times 10^{-3}$
$A_8 = 2.4987 \times 10^{-2}$
$A_{10} = -4.2838 \times 10^{-2}$ 4th surface $K = 0$
$A_4 = 5.9413 \times 10^{-3}$
$A_6 = 1.5563 \times 10^{-2}$
$A_8 = -3.3203 \times 10^{-3}$
$A_{10} = 1.6576 \times 10^{-4}$ 5th surface $K = -4.8199$
$A_4 = 1.5380 \times 10^{-2}$
$A_6 = 2.1836 \times 10^{-2}$
$A_8 = -1.2885 \times 10^{-2}$
$A_{10} = 3.1166 \times 10^{-3}$ 6th surface $K = 0$
$A_4 = -4.6658 \times 10^{-2}$
$A_6 = 2.1561 \times 10^{-2}$
$A_8 = -4.3006 \times 10^{-3}$
$A_{10} = 1.7143 \times 10^{-4}$ 7th surface $K = -57.2784$
$A_4 = -3.2297 \times 10^{-2}$
$A_6 = 1.4832 \times 10^{-2}$
$A_8 = -1.5028 \times 10^{-3}$
$A_{10} = -1.6629 \times 10^{-4}$ FIGS. 67-69 are aberration diagrams for Examples 1-3 of the fifth aspect of the invention upon focused at infinity. In these figures, "SA", "AS", "DT", "CC" and "ω" represent spherical aberrations, astigmatism, distortion, chromatic aberration of magnification and a half angle of view, respectively.

The values of conditions (61)-(71) in each of Examples 1-3 are enumerated below.

| Condition | Example 1 | Example 2 | Example 3 |
|---|---|---|---|
| (61) | −0.32 | −0.15 | −0.10 |
| (62) | −0.97 | −0.91 | −0.93 |
| (63) | 0.85 | 1.90 | 2.10 |
| (64) | −0.64 | −0.34 | −0.39 |
| (65) | −0.25 | −1.14 | −0.20 |
| (66) | 1.99 | 1.41 | 1.25 |
| (67) | 5.98 | 1.65 | 1.84 |
| (68) | 4.30 | 3.85 | 3.30 |
| (69) | 2.03 | 2.84 | 5.15 |
| (70) | 2.08 | 0.34 | 15.06 |
| (71) | 21.6° | 29.8° | 18.7° |

With each of the above example, it is possible to obtain images of good quality as can be seen from the aberration diagrams of FIGS. 67-69, although it is of a small-format size.

Throughout the above examples of the fifth aspect of the invention, plastic lenses may be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1-5, that flare stop may be interposed at any desired position between the aperture stop S and the first lens L1, the first lens L1 and the second lens L2, the second lens L2 and the third lens L3, and the third lens L3 and the image plane I. Alternatively, the lens frame may be used to cut out flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut out not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

Figure 70:
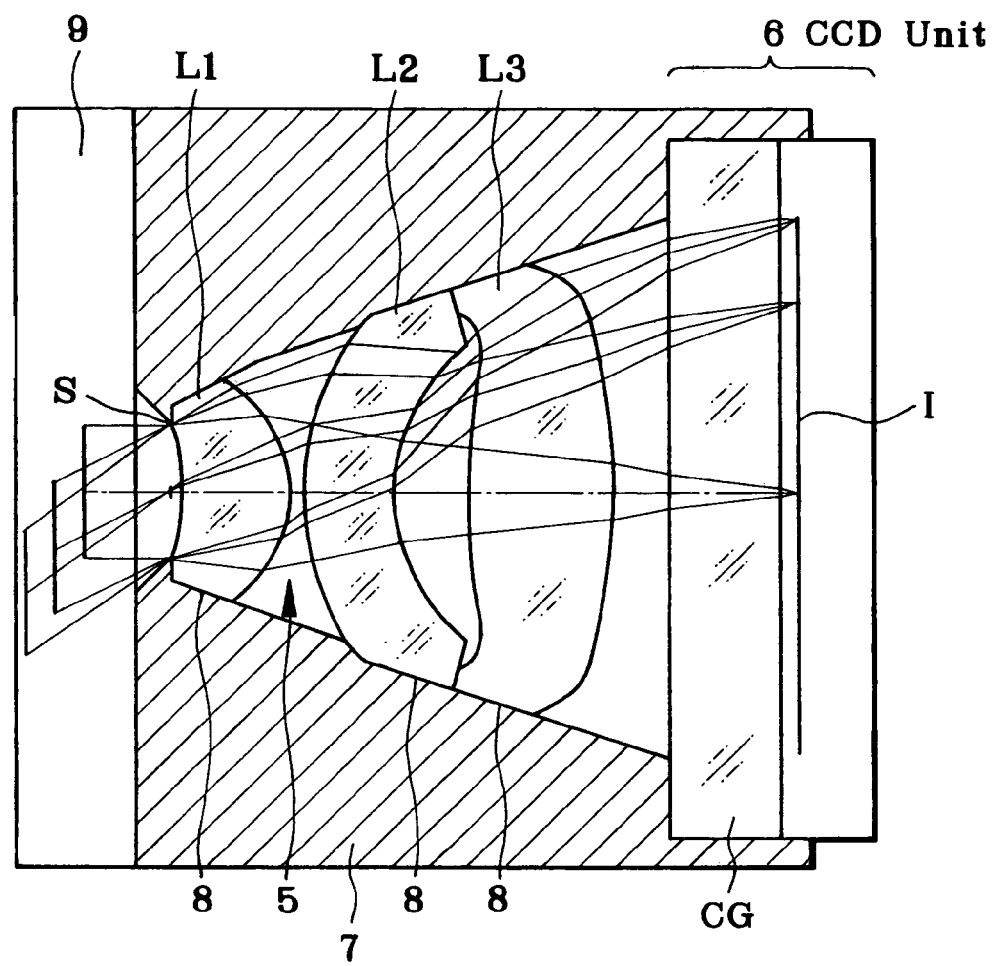
FIG. 70 is illustrative in section of one exemplary arrangement wherein the image-formation optical system according to Example 1 and a CCD located on its image plane are fixed to a lens barrel molded of a resin material by integral molding.

FIG. 70 is a sectional illustration, as taken in the diagonal direction of an image plane I of a CCD unit 6 inclusive of the optical axis of an image-formation optical system 5 according to Example 1 of the fifth aspect of the invention, of an arrangement wherein the image-formation optical system 5 and the CCD unit 6 located on the image plane I are fixed to a lens barrel 7 formed of a resin material by integral molding. An aperture stop S is attached to the resinous lens barrel 7 by integral molding. In this way, the lens barrel 7 for holding the image-formation optical system 5 can be easily fabricated. Integral attachment of the aperture stop S to the lens barrel 7 allows fabrication steps to be considerably cut back, and giving a function of holding the CCD unit 6 comprising an image pickup device CCD to the lens barrel 7 per se makes it less likely for dust, etc. to enter the lens barrel 7.

As can be seen from FIG. 70, the rim 8 of each of the first positive lens L1, the second negative lens L2 and the third positive lens L3 in the image-formation optical system 5 is inclined down in such a way as to come closer to the optical axis on the object side thereof, so that the lenses can be fixedly engaged at the inclined rims with the lens barrel 7. Thus, the lenses L1 to L3 can be inserted down into the lens barrel 7 from its image plane side for alignment and fixation.

Figure 71:
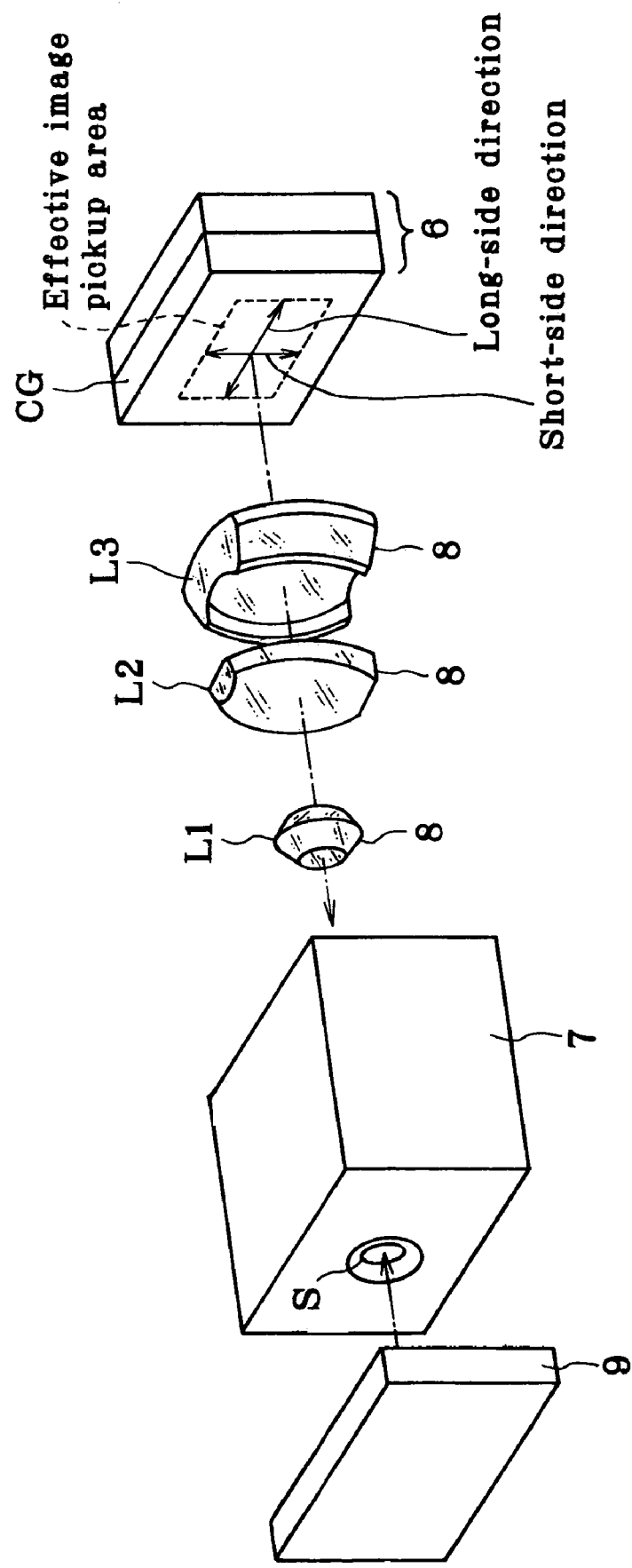
FIG. 71 is a schematic, exploded perspective view of the third positive lens in the image-formation optical system, which is configured in an oval form.

As can be seen from FIG. 71 that is an exploded, schematic view of the image-formation optical system, each of the first positive lens L1 and the second negative lens L2 in the image-formation optical system held within the lens barrel 7 molded of plastics is configured in such a way as to look as a circle as viewed from the entrance side of the optical system, and the third positive lens L3 is in an oval shape that is obtained by cutting off the upper and lower portions of a circular lens. The rims 8 of the respective lenses L1, L2 and L3 are inclined down toward the stop S side, and the inside surface of the lens barrel 7 is correspondingly inclined down in conformity with the inclined rims.

Thus, the first positive lens L1 is configured in such a way as to look as a circle as viewed from the entrance side of the optical system, and the third positive lens L3 is configured in such a shape that the length of the direction corresponding to the short-side direction of the effective image pickup area of the CCD 6 is shorter than the length of the direction corresponding to the long-side direction of the effective image pickup area, whereby the contour of the lens assembly comprising the first positive lens L1, the second negative lens L2 and the third positive lens L3 in the image-formation optical system can be consistent with the shape of the effective light beam, so that the optical system can be made compact while shading is held back. In this case, too, the rim 8 of each of the first positive lens L1, the second negative lens L2 and the third positive lens L3 forming part of the image-formation optical system 5 can be fixedly engaged within the lens barrel 7, so that the lenses L1, L2 and L3 can be inserted down into the lens barrel 7 from its image side for alignment and fixation.

As can also be seen from the sectional view of FIG. 70, the rim surface of an aperture in the aperture stop S should preferably be inclined down toward the lens L1 at an angle of inclination that is larger than the angle of incidence of an effective light beam, so that the corners thereof substantially nearest to the lens side can play a stop role. It is thus possible to make it less likely for a light beam reflected at the rim surface of the aperture in the aperture stop S to enter the image pickup device CCD 6, thereby holding back the influences of flares and ghosts.

In the examples according to the fifth aspect of the invention as described above, it is noted that, as shown in FIGS. 70 and 71, a cover glass 9 may be located just before the aperture stop S.

It is noted that for each example of the fifth aspect of the invention as described above, what has been explained with reference to Table A and FIGS. 11-14 holds true, and for each of the imaging systems according to the second aspect of the invention, what has been explained with reference FIGS. 15-24 holds true. For details, see what has been recounted with reference to the first aspect of the invention.

The imaging system according to the fifth aspect of the invention constructed as described above may be applied to phototaking systems where object images formed through image-formation optical systems are received at image pickup devices such as CCDs, in particular, digital cameras or video cameras as well as PCs and telephone sets that are typical information processors, in particular, easy-to-carry cellular phones. Given below are some such embodiments.

Figure 72:
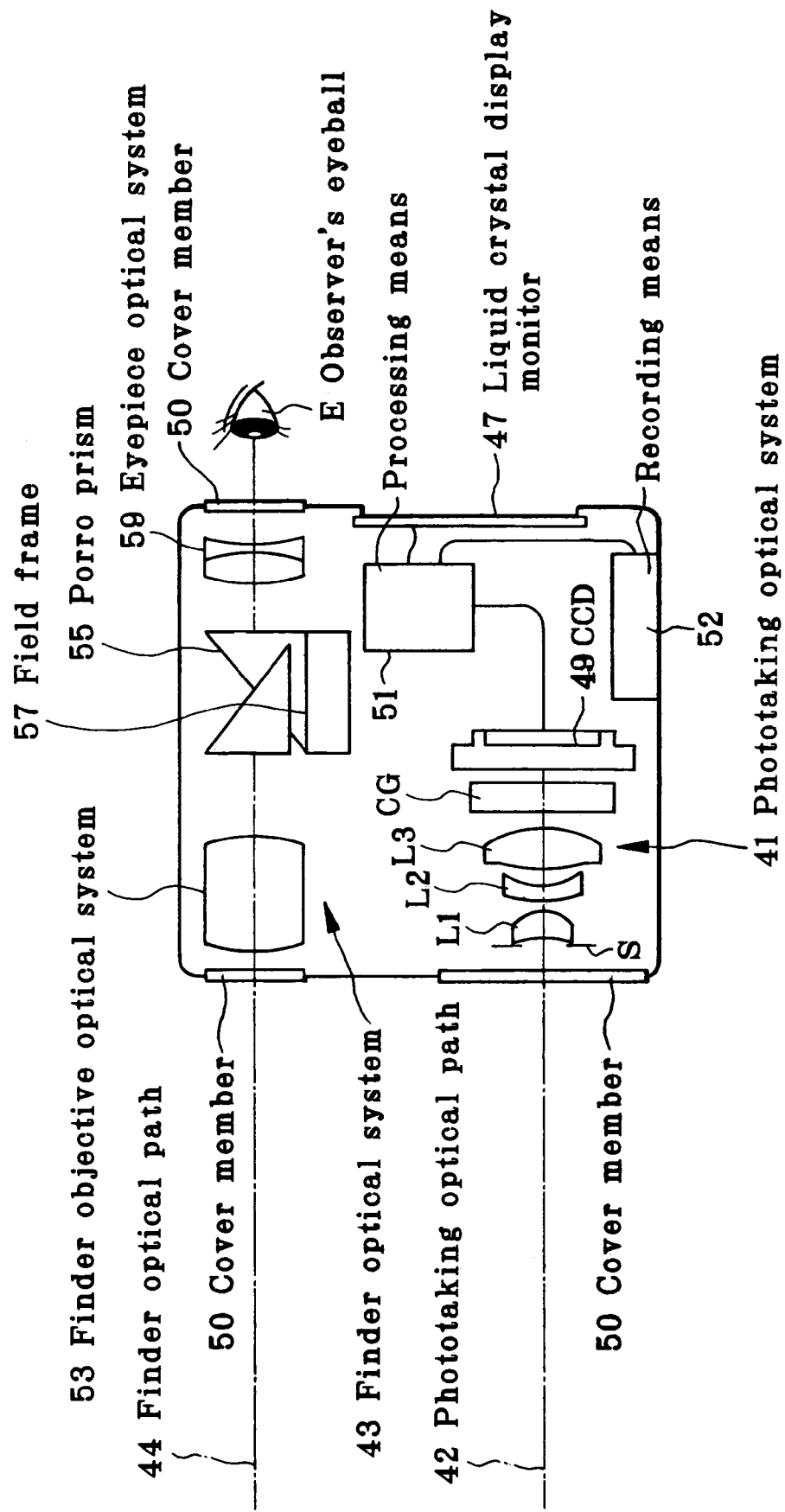
FIG. 72 is illustrative in section of a digital camera in which the image-formation optical system according to the fifth aspect of the invention is built.

FIGS. 25-26 and FIG. 72 are conceptual illustrations of a phototaking optical system 41 for digital cameras, in which the image-formation optical system according to the fifth aspect of the invention is incorporated. FIG. 25 is a front perspective view of the outward appearance of a digital camera 40, and FIG. 26 is a rear perspective view of the same. FIG. 72 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41, for instance, the image-formation optical system according to Example 1. An object image formed by the phototaking optical system 41 is formed on the image pickup plane of a CCD 49 via a cover glass CG provided with a near-infrared cut coat and having a low-pass filter function. An object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 72, plane-parallel plates are used as the cover members 50; however, it is acceptable to use powered lenses.

Figure 73:
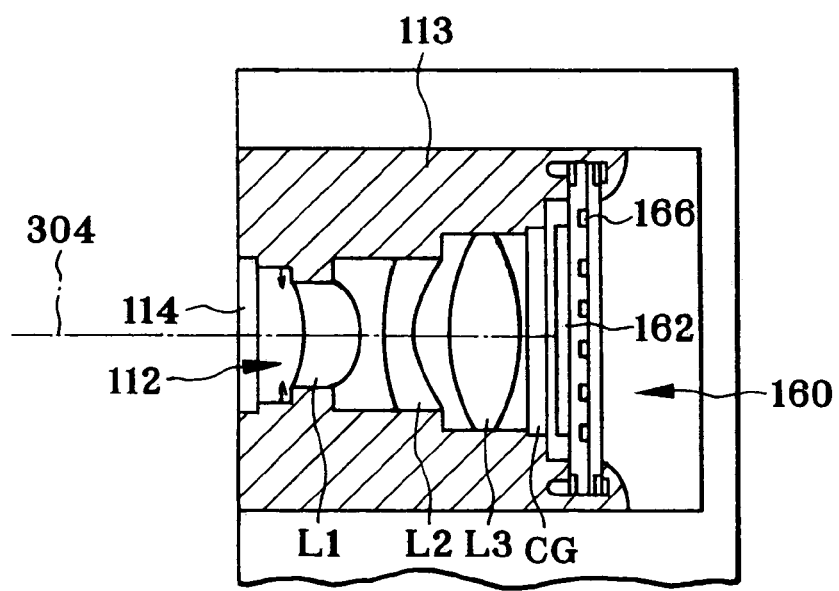
FIG. 73 is illustrative in section of an phototaking optical system in a personal computer, in which the image-formation optical system according to the fifth aspect of the invention is built.

FIGS. 28, 73 and 30 are illustrative of a personal computer that is one example of the information processor in which the image-formation optical system according to the fifth aspect of the invention is built as an objective optical system. FIG. 28 is a front perspective view of a personal computer 300 in use, FIG. 73 is a sectional view of a phototaking optical system 303 in the personal computer 300, and FIG. 30 is a side view of the state of FIG. 28. As shown in FIGS. 28, 73 and 30, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising the image-formation optical system of the fifth aspect of the invention (roughly shown) and an image pickup device chip 162 for receiving an image. These are built in the personal computer 300.

Here a cover CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 22. This image 305 may be shown on a personal computer on the other end via suitable processing means and the Internet or telephone line.

Figure 74A:
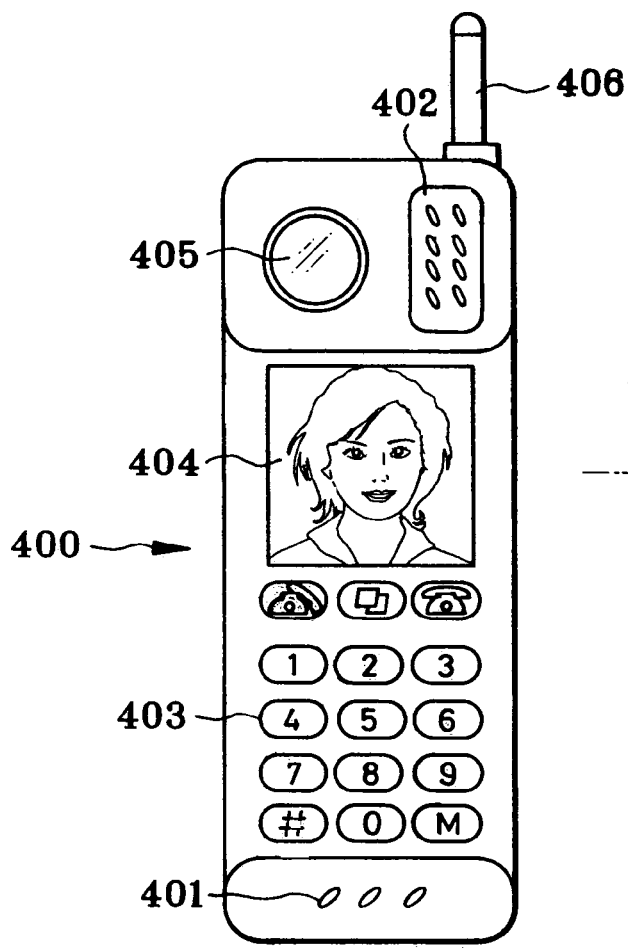
FIGS. 74(a) and 74(b) are a front and a side view of a cellular phone in which the image-formation optical system according to the fifth aspect of the invention is incorporated as an objective optical system.
Figure 74B:
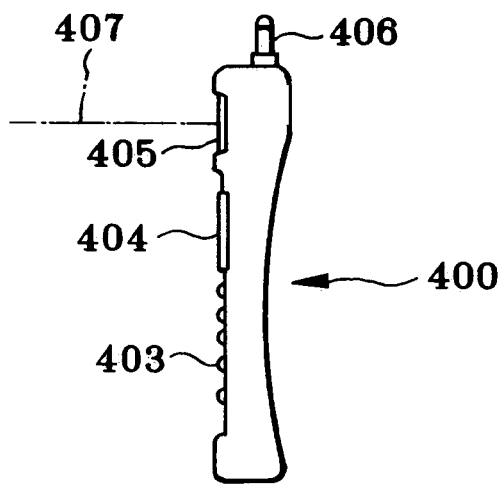
Figure 74C:
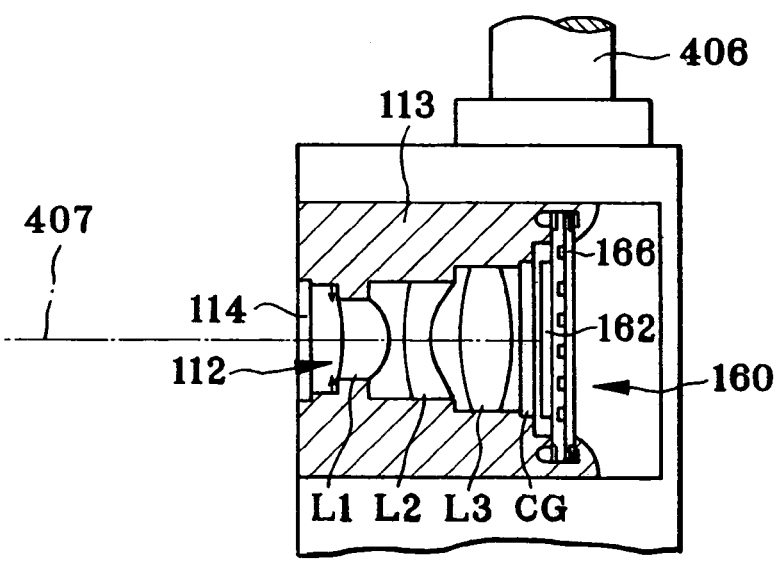
FIG. 74(c) is a sectional view of an phototaking optical system therein.

FIGS. 74(a), 74(b) and 74(c) are illustrative of a telephone set that is one example of the information processor in which the image-formation optical system according to the fifth aspect of the invention is built in the form of a phototaking optical system, especially a convenient-to-carry cellular phone. FIG. 74(a) and FIG. 74(b) are a front and a side view of a cellular phone 400, respectively, and FIG. 74(c) is a sectional view of a phototaking optical system 405. As shown in FIGS. 74(a), 74(b) and 74(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system of the invention (roughly shown) and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is noted that each of the above examples may be modified in various forms within the scope of what is recited in the claims.

The image-formation optical system according to the fifth aspect of the invention, and the imaging system incorporating the same, for instance, could be embodied as follow.

(1) An image-formation optical system, characterized by comprising, in order from an object side thereof, an aperture stop, a first positive meniscus lens that is convex on an image side thereof, a second negative meniscus lens that is convex on an object side thereof and a third lens, and satisfying the following conditions:

$$-0.35 < r_{1r}/r_{2f} < -0.08 \quad (61)$$

$$-1.5 < r_{1r}/r_{2r} < -0.75 \quad (62)$$

where $r_{1r}$ is an axial radius of curvature of an image side-surface of the first positive lens, $r_{2f}$ is an axial radius of curvature of an object side-surface of the second negative lens, and $r_{2r}$ is an axial radius of curvature of an image side-surface of the second negative lens.

(2) The image-formation optical system according to (1) above, characterized by satisfying at least one of the following conditions:

$$-0.3 < f_{1r}/r_{2f} < -0.1 \quad (61\text{-}1)$$

$$-1.2 < r_{1r}/r_{2r} < -0.8 \quad (62\text{-}1)$$

(3) An image-formation optical system, characterized by comprising, in order from an object side thereof, an aperture stop, a first positive lens, a second negative meniscus lens that is convex on an object side thereof and a third positive lens, and satisfying the following condition:

$$0.2 < r_{2f}/r_{3f} < 3.5 \quad (63)$$

where $r_{2f}$ is an axial radius of curvature of an object side-surface of the second negative lens, and $r_{3f}$ is an axial radius of curvature of an object side-surface of the third positive lens.

(4) The image-formation optical system according to (3) above, characterized by satisfying the following condition:

$$0.4 < r_{2f}/r_{3f} < 2.5 \quad (63\text{-}1)$$

(5) The image-formation optical system according to any one of (1) to (4) above, characterized by satisfying the following condition:

$$-0.7 < f_2/f_3 < -0.1 \quad (64)$$

where $f_2$ is a focal length of the second negative lens, and $f_3$ is a focal length of the third positive lens.

(6) The image-formation optical system according to (5) above, characterized by satisfying the following condition:

$$-0.5 < f_2/f_3 < -0.25 \quad (64\text{-}1)$$

(7) The image-formation optical system according to any one of (1) to (6) above, characterized by satisfying the following condition:

$$-2.0 < (r_{3f} + r_{3r})/(r_{3f} - r_{3r}) < 0.8 \quad (65)$$

where $r_{3f}$ is an axial radius of curvature of an object side-surface of the third positive lens, and $r_{3r}$ is an axial radius of curvature of an image side-surface of the third positive lens.

(8) The image-formation optical system according to (7) above, characterized by satisfying the following condition:

$$-1.5 < (r_{3f} + r_{3r})/(r_{3f} - r_{3r}) < 0.5 \quad (65\text{-}1)$$

(9) The image-formation optical system according to any one of (1) to (8) above, characterized by satisfying the following condition:

$$1.2 < (r_{2f} + r_{2r})/(r_{2f} - r_{2r}) < 2.0 \quad (66)$$

where $r_{2f}$ is an axial radius of curvature of an object side-surface of the second negative lens, and $r_{2r}$ is an axial radius of curvature of an image side-surface of the second negative lens.

(10) The image-formation optical system according to (9) above, characterized by satisfying the following condition:

$$1.4 < (r_{2f} + r_{2r})/(r_{2f} - r_{2r}) < 1.8 \quad (66\text{-}1)$$

(11) The image-formation optical system according to any one of (1) to (10) above, characterized in that an object side-surface of the second negative lens is defined by an aspheric surface, with satisfaction of the following condition:

$$0.01 < (r_{2fs} + r_{2fa})/(r_{2fs} - r_{2fa}) - 1| < 100 \quad (67)$$

where $r_{2fs}$ is an axial radius of curvature of an object side-surface of the second negative lens, and $r_{2fa}$ is a value of a radius of curvature of the object side-surface of the second negative lens with the aspheric surface taken into consideration and said axial radius of curvature, upon changing to maximum in an optically effective range.

(12) The image-formation optical system according to (11) above, characterized by satisfying the following condition:

$$0.1 < |(r_{2fs} + r_{2fa})/(r_{2fs} - r_{2fa}) - 1| < 10.0 \quad (67\text{-}1)$$

(13) The image-formation optical system according to any one of (1) to (12) above, characterized in that an image side-surface of the second negative lens is defined by an aspheric surface, with satisfaction of the following condition:

$$0.01 < |(r_{2rs} + r_{2ra})/(r_{2rs} - r_{2ra}) - 1| < 100 \quad (68)$$

where $r_{2rs}$ is an axial radius of curvature of the image side-surface of the second negative lens, and $r_{2ra}$ is a value of a radius of curvature of the image side-surface of the second negative lens with the aspheric surface taken into consideration and said axial radius of curvature, upon changing to maximum in an optically effective range.

(14) The image-formation optical system according to (13) above, characterized by satisfying the following condition:

$$0.05 < |(r_{2rs} + r_{2ra})/(r_{2rs} - r_{2ra}) - 1| < 10.0 \quad (68\text{-}1)$$

(15) The image-formation optical system according to any one of (1) to (14) above, characterized in that an object side-surface of the third positive lens is defined by an aspheric surface, with satisfaction of the following condition:

$$0.01 < |(r_{3fs} + r_{3fa})/(r_{3fs} - r_{3fa}) - 1| < 100 \quad (69)$$

where $r_{3fs}$ is an axial radius of curvature of the object side-surface of the third positive lens, and $r_{3fa}$ is a value of a difference between a radius of curvature of the object side-surface of the third positive lens with the aspheric surface taken into account and said axial radius of curvature, upon changing to maximum in a range inside of a point through which a chief ray for a maximum image height passes.

(16) The image-formation optical system according to (15) above, characterized by satisfying the following condition:

$$0.05<|(r_{3fs}+r_{3fa})/(r_{3fs}-r_{3fa})-1|<10 \quad (69\text{-}1)$$

(17) The image-formation optical system according to any one of (1) to (16) above, characterized in that an image side-surface of the third positive lens is defined by an aspheric surface, with satisfaction of the following condition:

$$0.01<|(r_{3rs}+r_{3ra})/(r_{3rs}-r_{3ra})-1|<100 \quad (70)$$

where $r_{3rs}$ is an axial radius of curvature of the image side-surface of the third positive lens, and $r_{3ra}$ is a value of a difference between a radius of curvature of the image side-surface of the third positive lens with the aspheric surface taken into account and said axial radius of curvature, upon changing to maximum in a range inside of a point through which a chief ray for a maximum image height passes.

(18) The image-formation optical system according to (17) above, characterized by satisfying the following condition:

$$0.05<|(r_{3rs}+r_{3ra})/(r_{3rs}-r_{3ra})-1|<10 \quad (70\text{-}1)$$

(19) The image-formation optical system according to any one of (1) to (18) above, characterized by satisfying the following condition:

$$10°<\alpha<40° \quad (71)$$

where α is an angle of incidence of a chief ray on an image plane at a maximum image height.

(20) The image-formation optical system according to (19) above, characterized by satisfying the following condition:

$$15°<\alpha<35° \quad (71\text{-}1)$$

(21) An electronic imaging system, characterized by comprising an image-formation optical system as recited in any one of (1) to (20) above, and an electronic image pickup device located on an image side thereof.

(22) The electronic imaging system according to (21) above, characterized in that the image-formation optical system has a half angle of view of 30° to 50° inclusive.

According to the fifth aspect of the invention, it is possible to obtain a small-format image-formation optical system that is less susceptible to a deterioration of performance due to fabrication errors, and maintains high performance even upon length reductions.

I claim:

1. An image-formation optical system, characterized by comprising, in order from an object side thereof, an aperture stop, a first positive meniscus lens that is convex on an image side thereof, a second negative lens that is of double-concave shape and a third positive lens, three lenses in all, wherein there are a total of three lens elements.

2. An imaging system, characterized by comprising an image-formation optical system comprising, in order from an object side thereof, an aperture stop, a first positive meniscus lens that is convex on an image side thereof, a second negative lens that is of double-concave shape and a third positive lens, three lenses in all, wherein there are a total of three lens elements.

3. An imaging system as recited in claim 2, characterized in that an image pickup device is located on an image side of an arrangement comprising said three lenses.

4. An imaging system as recited in claim 2, characterized in that the three lenses are each defined by a single lens, and two air lenses defined by the three lenses are interposed between differently shaped two refracting surfaces.

5. An imaging system as recited in claim 4, characterized in that said two air lenses are interposed between differently shaped two aspheric surfaces.

6. An imaging system, characterized by comprising an image-formation optical system comprising, in order from an object side thereof, an aperture stop, and a first positive lens defined by a positive single lens wherein an absolute value of an axial radius of curvature of an image side-surface thereof is smaller than an absolute value of an axial radius of curvature of an object side-surface thereof, a second negative lens defined by a negative single lens wherein an absolute value of an axial radius of curvature of an image side-surface thereof is smaller than an absolute value of an axial radius of curvature of an object side-surface thereof and a third positive lens defined by a positive single lens, three single lenses in all, and an image pickup device located on an image side of the image-formation optical system, wherein there are a total of three lens elements, with satisfaction of the following conditions:

$$0.30<f_1/Ih<0.90 \quad (10)$$

$$-0.75<f_2/Ih<-0.1 \quad (3)$$

$$0.70<f_3/Ih<2.00 \quad (11)$$

where $f_1$ is a focal length of the first positive lens, $f_2$ is a focal length of the second negative lens, $f_3$ is a focal length of the third positive lens, and Ih is a maximum image height.

7. An imaging system, characterized by comprising an image-formation optical system comprising, in order from an object side thereof, an aperture stop, and a first positive lens defined by a positive single lens wherein an absolute value of an axial radius of curvature of an image side-surface thereof is smaller than an absolute value of an axial radius of curvature of an object side-surface thereof, a second negative lens defined by a negative single lens wherein an absolute value of an axial radius of curvature of an image side-surface thereof is smaller than an absolute value of an axial radius of curvature of an object side-surface thereof and a third positive lens defined by a positive single lens, three single lenses in all, and an image pickup device located on an image side of the image-formation optical system, wherein the following conditions are satisfied:

$$0.1<f_1/f<0.46 \quad (9\text{-}3)$$

$$-0.75<f_2/f<-0.29 \quad (12)$$

$$0.40<f_3/f<0.85 \quad (13)$$

where $f_1$ is a focal length of the first positive lens, $f_2$ is a focal length of the second negative lens, $f_3$ is a focal length of the third positive lens, and f is a focal length of the image-formation optical system.

8. An imaging system as recited in any one of claims 2, 6 and 7, characterized by satisfying the following condition:

$$-0.5<(r_{2f}+r_{2r})/(r_{2f}-r_{2r})<0.98 \quad (1)$$

where $r_{2f}$ is an axial radius of curvature of the object side-surface of the second negative lens, and $r_{2r}$ is an axial radius of curvature of the image side-surface of the second negative lens.

9. An imaging system as recited in claim 2 or 7, characterized by satisfying the following condition:

$$0.01 < r_{1r}/r_{2f} < 0.75 \quad (2)$$

where $r_{1r}$ is an axial radius of curvature of the image side-surface of the first positive lens, and $r_{2f}$ is an axial radius of curvature of the object side-surface of the second negative lens.

10. An imaging system as recited in any one of claims 2, 6 and 7, characterized by satisfying the following condition:

$$-0.75 < f_2/Ih < -0.1 \quad (3)$$

where $f_2$ is the focal length of the second negative lens, and Ih is the maximum image height.

11. An imaging system as recited in any one of claims 2, 6 and 7, characterized by satisfying the following condition:

$$-5.0 < f_{2-3}/f < 0.1 \quad (4)$$

where $f_{2-3}$ is a composite focal length of the second negative lens and the third positive lens, and f is the focal length of the image-formation optical system.

12. An imaging system as recited in any one of claims 2, 6 and 7, characterized by satisfying the following condition:

$$-0.8 < f_2/f_3 < -0.1 \quad (5)$$

where $f_2$ is the focal length of the second negative lens, and $f_3$ is the focal length of the third positive lens.

13. An imaging system as recited in any one of claims 2, 6 and 7, characterized in that the object side-surface of the second negative lens is defined by an aspheric surface, with satisfaction of the following condition:

$$0.01 < |(r_{2fs}+r_{2fa})/(r_{2fs}-r_{2fa})-1| < 100 \quad (6)$$

where $r_{2fs}$ is an axial radius of curvature of the object side-surface of the second negative lens, and $r_{2fa}$ is a radius of curvature of the object side-surface of the second negative lens with the aspheric surface taken into consideration, upon a difference between $r_{2fs}$ and said radius of curvature reaching a maximum.

14. An imaging system as recited in any one of claims 2, 6 and 7, characterized in that the image side-surface of the second negative lens is defined by an aspheric surface, with satisfaction of the following condition:

$$0.01 < |(r_{2rs}+r_{2ra})/(r_{2rs}-r_{2ra})-1| < 100 \quad (7)$$

where $r_{2rs}$ is an axial radius of curvature of the image side-surface of the second negative lens, and $r_{2ra}$ is a radius of curvature of the image side-surface of the second negative lens with the aspheric surface taken into consideration, upon a difference between $r_{2fs}$ and said radius of curvature reaching a maximum.

15. An imaging system as recited in any one of claims 2, 6 and 7, characterized by satisfying the following condition:

$$10° < \alpha < 40° \quad (8)$$

where $\alpha$ is an angle of incidence of a chief ray on an image plane at the maximum image height.

16. An imaging system as recited in claim 2 or 6, characterized by satisfying the following condition:

$$0.1 < f_1/f < 1.2 \quad (9)$$

where $f_1$ is the focal length of the first positive lens, and f is the focal length of the image-formation optical system.

17. An imaging system, characterized by comprising an image-formation optical system that comprises, in order from an object side thereof, an aperture stop, and a first positive meniscus lens that is convex on an image side thereof, a second negative lens and a third positive lens, three lenses in all, where there are a total of three lens elements, with satisfaction of the following condition:

$$-0.75 < f_2/Ih < -0.1 \quad (3)$$

where $f_2$ is a focal length of the second negative lens, and Ih is a maximum image height.

18. An image-formation optical system, characterized by comprising, in order from an object side thereof, an aperture stop, a first meniscus positive lens that is convex on an image side thereof, a second negative lens and a third positive lens, wherein there are a total of three lens elements, with satisfaction of the following condition:

$$-5.0 < f_{2-3}/f < -0.5 \quad (22)$$

where $f_{2-3}$ is a composite focal length of the second negative lens and the third positive lens, and f is a focal length of the image-formation optical system.

19. An imaging system, characterized by comprising an image-formation optical system comprising, in order from an object side thereof, an aperture stop, a first positive lens that is convex on an image side thereof, a second negative lens that is concave on an image side thereof and a third positive lens, and an image pickup device located on an image side of the image-formation optical system, wherein said image-formation optical system comprises a total of three lens elements, and said aperture stop has an aperture of fixed shape through which an optical axis of the image-formation optical system passes, and a rim surface of the aperture is inclined down at an angle of inclination greater than an angle of incidence of a farthest off-axis light beam in such a way as to come closer to the optical axis on an image plane side thereof.

20. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$0.2 < f_1/f_3 < 0.58 \quad (23-1)$$

where $f_1$ is a focal length of the first positive lens, and $f_3$ is a focal length of the third positive lens.

21. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$0.1 < f_1/f < 0.55 \quad (31)$$

where $f_1$ is a focal length of the first positive lens, and f is a focal length of the image-formation optical system.

22. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$1.0 < (r_{1f}+r_{1r})/(r_{1f}-r_{1r}) < 1.7 \quad (32)$$

where $r_{1f}$ is an axial radius of curvature of an object side-surface of the first positive lens, and $r_{1r}$ is an axial radius of curvature of an image side-surface of the first positive lens.

23. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$-0.25 < r_{2r}/r_{1f} < -0.01 \tag{36}$$

where $r_{2r}$ is an axial radius of curvature of an image side-surface of the second negative lens, and $r_{1f}$ is an axial radius of curvature of an object side-surface of the first positive lens.

24. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$-0.55 < f_2/f_3 < -0.1 \tag{41}$$

where $f_2$ is a focal length of the second negative lens, and $f_3$ is a focal length of the third positive lens.

25. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following conditions:

$$-2.0 < (r_{3f}+r_{3r})/(r_{3f}-r_{3r}) < 0.85 \tag{42}$$

$$0.1 < \beta_3 < 1.0 \tag{43}$$

where $r_{3f}$ is an axial radius of curvature of an object side-surface of the third positive lens, $r_{3r}$ is an axial radius of curvature of an image side-surface of the third positive lens, and $\beta_3$ is a transverse magnification of the third positive lens.

26. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$-0.8 < (r_{3f}+r_{3r})/(r_{3f}-r_{3r}) < 0.15 \tag{42-6}$$

where $r_{3f}$ is an axial radius of curvature of an object side-surface of the third positive lens, and $r_{3r}$ is an axial radius of curvature of an image side-surface of the third positive lens.

27. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$0.1 < r_{2r}/r_{3f} < 0.23 \tag{44-3}$$

where $r_{2r}$ is an axial radius of curvature of an image side-surface of the second negative lens, and $r_{3f}$ is an axial radius of curvature of an object side-surface of the third positive lens.

28. An image-formation optical system, characterized by comprising, in order from an object side thereof, an aperture stop, a first positive meniscus lens that is convex on an image side thereof, a second negative lens and a third positive lens, wherein there are a total of three lens elements, with satisfaction of the following condition:

$$-0.15 < r_{1r}/r_{3r} < 0.35 \tag{45-2}$$

where $r_{1r}$ is an axial radius of curvature of an image side-surface of the first positive lens, and $r_{3r}$ is an axial radius of curvature of an image side-surface of the third positive lens.

29. An image-formation optical system, characterized by comprising, in order from an object side thereof, an aperture stop, a first positive meniscus lens that is convex on an image side thereof, a second negative meniscus lens that is convex on an object side thereof and a third positive lens, wherein there are a total of three lens elements, with satisfaction of the following conditions:

$$-0.35 < r_{1r}/r_{2f} < -0.08 \tag{61}$$

$$-1.5 < r_{1r}/r_{2r} < 0.75 \tag{62}$$

where $r_{1r}$ is an axial radius of curvature of an image side-surface of the first positive lens, $r_{2f}$ is an axial radius of curvature of an object side-surface of the second negative lens, and $r_{2r}$ is an axial radius of curvature of an image side-surface of the second negative lens.

* * * * *

UNITED STATES PATENT AND TRADEMARK OFFICE
CERTIFICATE OF CORRECTION

PATENT NO. : 7,301,712 B2  Page 1 of 1
APPLICATION NO. : 10/728745
DATED : November 27, 2007
INVENTOR(S) : Yuji Kamo It is certified that error appears in the above-identified patent and that said Letters Patent is hereby corrected as shown below:

Column 111, line 3, change "$0.01_{r1r}/_{r2f}0.75$ (2)" to --$0.01<r_{1r}/r_{2f}<0.75$ (2)--;

Column 111, line 17, change "$-5.0<f_{2-3}/f<0.1$ (4)" to -- $-5.0<f_{2-3}/f<-0.1$ (4)--; and Column 114, line 36, change "$-1.5<r_{1r}/r_{2r}<0.75$ (62)" to -- $-1.5<r_{1r}/r_{2r}<-0.75$ (62)--.

Signed and Sealed this

Eighth Day of July, 2008

JON W. DUDAS
*Director of the United States Patent and Trademark Office*